Aug. 25, 1959 W. P. BURRELL ET AL 2,901,168

DIGITAL DATA SYSTEM

Filed March 5, 1954 52 Sheets-Sheet 1

INVENTORS

W. P. BURRELL
A. A. COHEN
G. A. HARDENBERGH

BY

Joseph C. Sweet, Jr.
ATTORNEY

INVENTORS
W.P.BURRELL
A.A.COHEN
G.A.HARDENBERGH
BY Joseph C. Sweet, Jr.
ATTORNEY

DIGITAL DATA SYSTEM

Filed March 5, 1954 52 Sheets-Sheet 3

INVENTORS
W.P. BURRELL
A.A. COHEN
G.A. HARDENBERGH
BY Joseph C. Sweet, Jr.
ATTORNEY

DIGITAL DATA SYSTEM

Filed March 5, 1954 52 Sheets-Sheet 4

INVENTORS
W.P. BURRELL
A.A. COHEN
G.A. HARDENBERGH
Joseph C. Sweet Jr.
ATTORNEY

INVENTORS
W. P. BURRELL
A. A. COHEN
G. A. HARDENBERGH
Joseph C. Sweet, Jr.
ATTORNEY INVENTORS
W.P. BURRELL
A.A. COHEN
G.A. HARDENBERGH
Joseph C. Sweet Jr.
ATTORNEY INVENTORS
W. P. BURRELL
A. A. COHEN
G. A. HARDENBERGH
Joseph C. Sweet, Jr.
ATTORNEY INVENTORS
W. P. BURRELL
A. A. COHEN
G. A. HARDENBERGH
Joseph C. Sweet, Jr.
ATTORNEY INVENTORS
W. P. BURRELL
A. A. COHEN
G. A. HARDENBERGH
BY
Joseph C. Sweet Jr.
ATTORNEY

DIGITAL DATA SYSTEM

Filed March 5, 1954 52 Sheets-Sheet 10

INVENTORS
W.P. BURRELL
A. A. COHEN
G. A. HARDENBERGH
Joseph C. Sweet, Jr.
ATTORNEY

INVENTORS
W.P.BURRELL
A.A.COHEN
G.A.HARDENBERGH

Joseph C. Sweet, Jr
ATTORNEY

DIGITAL DATA SYSTEM

Filed March 5, 1954 52 Sheets-Sheet 12

INVENTORS
W.P. BURRELL
A.A. COHEN
G.A. HARDENBERGH
BY
Joseph C. Sweet, Jr.
ATTORNEY INVENTORS
W. P. BURRELL
A. A. COHEN
G. A. HARDENBERGH
Joseph C. Sweet, Jr.
ATTORNEY INVENTORS
W. P. BURRELL
A. A. COHEN
G. A. HARDENBERGH
BY
Joseph C. Sweet, Jr.
ATTORNEY INVENTORS
W.P.BURRELL
A.A.COHEN
G.A.HARDENBERGH
BY
Joseph C. Sweet Jr.
ATTORNEY

DIGITAL DATA SYSTEM

Filed March 5, 1954 52 Sheets-Sheet 16

INVENTORS
W. P. BURRELL
A. A. COHEN
G. A. HARDENBERGH
Joseph C. Sweet, Jr.
ATTORNEY INVENTORS
W. P. BURRELL
A.A. COHEN
G.A. HARDENBERGH
Joseph C. Sweet, Jr.
ATTORNEY Aug. 25, 1959 W. P. BURRELL ET AL 2,901,168

DIGITAL DATA SYSTEM

Filed March 5, 1954 52 Sheets-Sheet 18

INVENTORS
W. P. BURRELL
A. A. COHEN
G. A. HARDENBERGH

BY Joseph C. Sweet, Jr.
ATTORNEY

Aug. 25, 1959 W. P. BURRELL ET AL 2,901,168

DIGITAL DATA SYSTEM

Filed March 5, 1954 52 Sheets-Sheet 19

INVENTORS

W. P. BURRELL
A. A. COHEN
G. A. HARDENBERGH

BY

Joseph C. Sweet Jr.
ATTORNEY

INVENTORS
W.P.BURRELL
A.A.COHEN
G.A.HARDENBERGH
Joseph C. Sweet, Jr.
ATTORNEY

INVENTORS
W.P. BURRELL
A.A. COHEN
G.A. HARDENBERGH
Joseph C. Sweet, Jr.
ATTORNEY INVENTORS
W. P. BURRELL
A. A. COHEN
G. A. HARDENBERGH
Joseph C. Sweet, Jr.
ATTORNEY INVENTORS
W. P. BURRELL
A. A. COHEN
G. A. HARDENBERGH
Joseph C. Sweet Jr.
ATTORNEY Aug. 25, 1959 W. P. BURRELL ET AL 2,901,168

DIGITAL DATA SYSTEM

Filed March 5, 1954 52 Sheets-Sheet 24

INVENTORS
W. P. BURRELL
A. A. COHEN
G. A. HARDENBERGH

BY Joseph C. Sweet Jr.
ATTORNEY

INVENTORS
W. P. BURRELL
A. A. COHEN
G. A. HARDENBERGH
BY Joseph C. Sweet, Jr.
ATTORNEY INVENTORS
W. P. BURRELL
A. A. COHEN
G. A. HARDENBERGH
Joseph C. Sweet, Jr.
ATTORNEY INVENTORS
W.P. BURRELL
A.A. COHEN
G.A. HARDENBERGH
Joseph C. Sweet, Jr.
ATTORNEY INVENTORS
W. P. BURRELL
A. A. COHEN
G. A. HARDENBERGH
Joseph C. Sweet, Jr.
ATTORNEY INVENTORS
W. P. BURRELL
A. A. COHEN
G. A. HARDENBERGH
BY Joseph C. Sweet, Jr.
ATTORNEY

INVENTORS
W.P. BURRELL
A.A. COHEN
G.A. HARDENBERGH

BY

Joseph C. Sweet, Jr.
ATTORNEY

INVENTORS
W. P. BURRELL
A. A. COHEN
G. A. HARDENBERGH
BY *Joseph C. Sweet, Jr.*
ATTORNEY INVENTORS
W. P. BURRELL
A. A. COHEN
G. A. HARDENBERGH
BY Joseph C. Sweet, Jr.
ATTORNEY

INVENTORS
W.P. BURRELL
A.A. COHEN
G.A. HARDENBERGH

BY Joseph C. Sweet, Jr.
ATTORNEY

INVENTORS
W. P. BURRELL
A. A. COHEN
G. A. HARDENBERGH

BY Joseph C. Sweet, Jr.
ATTORNEY

INVENTORS
W. P. BURRELL
A. A. COHEN
G. A. HARDENBERGH

BY Joseph C. Sweet, Jr.
ATTORNEY

INVENTORS
W.P. BURRELL
A.A. COHEN
G.A. HARDENBERGH
BY Joseph C. Sweet, Jr.
ATTORNEY

| ADDER MODES | | MP | A | A' | B | B' | C | D | E | MP |
|---|---|---|---|---|---|---|---|---|---|---|
| AUGMENT | (AUG.) | | | | AR | III | FS' | D | E | |
| DIMINISH | (DIM.) | | | | AR | III | FS | D | E | |
| PAD | (PAD) | | | | AR | III | 9 | D | E | |
| IDLE | (IDL.) | | | | AR | III | O | D | E | |
| CLEAR | (CLR.) | | O | III | | | O | D | E | |
| ENTER | (ENT.) | | O | III | | | FS' | D | E | |
| COMPLEMENT | (COM.) | | O | III | AR | | | D | E | |
| ENTER QUOTIENT DIGIT (E Q D) | | | O | III | | | DK | D | E | |

INVENTORS
W. P. BURRELL
A. A. COHEN
G. A. HARDENBERGH
BY Joseph C. Sweet, Jr.
ATTORNEY Aug. 25, 1959 W. P. BURRELL ET AL 2,901,168

DIGITAL DATA SYSTEM

Filed March 5, 1954 52 Sheets-Sheet 38

INVENTORS
W. P. BURRELL
A. A. COHEN
G. A. HARDENBERGH

BY Joseph C. Sweet, Jr.
ATTORNEY

DIGITAL DATA SYSTEM

Filed March 5, 1954 52 Sheets-Sheet 39

INVENTORS
W.P. BURRELL
A.A. COHEN
G.A HARDENBERGH
BY
Joseph C. Sweet, Jr.
ATTORNEY

INVENTORS
W. P. BURRELL
A. A. COHEN
G. A. HARDENBERGH

BY Joseph C. Sweet, Jr.
ATTORNEY

INVENTORS
W.P. BURRELL
A.A. COHEN
G.A. HARDENBERGH
BY Joseph C. Sweet, Jr.
ATTORNEY (ADDER INPUT TRANSLATOR 1010)

INVENTORS
W. P. BURRELL
A. A. COHEN
G. A. HARDENBERGH
BY
Joseph C. Sweet, Jr.
ATTORNEY (ADDER SUBTRACTION TABLE 1026)

INVENTORS
W. P. BURRELL
A. A. COHEN
G. A. HARDENBERGH
BY Joseph C. Sweet, Jr.
ATTORNEY

INVENTORS
W. P. BURRELL
A. A. COHEN
G. A. HARDENBERGH

BY Joseph C. Sweet, Jr.
ATTORNEY

NUMERICAL EXAMPLES

RESUME ↑ (column 30)

| | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| MARKERS | | | | | b | | | | | a | | | | | b | | | | | a | | | | | b | | | | | a | | | | | |
| MINUEND | 0 | 0 | 0 | 4 | 2 | 9 | 0 | 5 | 2 | 4 | 0 | 0 | 0 | 4 | 2 | 9 | 0 | 5 | 2 | 4 | 0 | 0 | 0 | 4 | 2 | 9 | 0 | 5 | 2 | 4 | 0 | 0 | 0 | 4 | 2 |
| SUBTRAHEND | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| CARRY | | | | | | | | | | | | | | | | | | | | | | | | | | | | | | S | | | | | |
| DIFFERENCE | 0 | 0 | 0 | 4 | 2 | 9 | 0 | 5 | 2 | 4 | 0 | 0 | 0 | 4 | 2 | 9 | 0 | 5 | 2 | 4 | 0 | 0 | 0 | 4 | 2 | 9 | 0 | 5 | 2 | 4 | 0 | 0 | 0 | 4 | 2 |
| | | | | | | | | | | | | | | | | | | | | | | | | | | | | | | I | | | | | |
| MODE | | | | | | | | | | | | | | | | | | | | | | | | | | | | | | D | | | | | |
| | | | | | | | | | | | | | | | | | | | | | | | | | | | | | | L | | | | | |
| DIGIT CTR. | ← | | | | | | | | | | | | | | | | | | | | | | | | | | | | | | | | | | |
| STEP CTR. | ← | | | | | | | | | | | | | | | | | | | | | | | | | | | | | | | | | | |

FIG. 30 A

INVENTORS
W. P. BURRELL
A. A. COHEN
G. A. HARDENBERGH
BY Joseph C. Sweet, Jr.
ATTORNEY Aug. 25, 1959 W. P. BURRELL ET AL 2,901,168

DIGITAL DATA SYSTEM

Filed March 5, 1954 52 Sheets-Sheet 46

INVENTORS
W.P. BURRELL
A. A. COHEN
G. A. HARDENBERGH
BY Joseph C. Sweet, Jr.
ATTORNEY INVENTOR.
W. P. BURRELL
A. A. COHEN
G. A. HARDENBERGH
BY Joseph C. Sweet, Jr.
ATTORNEY INVENTORS
W. P. BURRELL
A. A. COHEN
G. A. HARDENBERGH
BY Joseph C. Sweet, Jr.
ATTORNEY INVENTORS
W. P. BURRELL
A. A. COHEN
G. A. HARDENBERGH
BY Joseph C. Sweet, Jr.
ATTORNEY INVENTORS
W. P. BURRELL
A. A. COHEN
G. A. HARDENBERGH
BY Joseph C. Sweet, Jr.
ATTORNEY

SUM

INVENTORS
W. P. BURRELL
A. A. COHEN
G. A. HARDENBERGH
BY Joseph C. Sweet, Jr.
ATTORNEY

DIGITAL DATA SYSTEM

Filed March 5, 1954 52 Sheets-Sheet 52

*INVENTORS*
W. P. BURRELL
A. A. COHEN
G. A. HARDENBERGH
*BY* Joseph C. Sweet Jr.
ATTORNEY 2,901,168

DIGITAL DATA SYSTEM

Warren P. Burrell and Arnold A. Cohen, Minneapolis, and George A. Hardenbergh, St. Paul, Minn., assignors, by mesne assignments, to International Business Machines Corporation, New York, N.Y., a corporation of New York Application March 5, 1954, Serial No. 414,341

43 Claims. (Cl. 235—61.6)

This invention relates to digital data handling circuits and particularly to such circuits for performing arithmetic operations upon digital data. The invention further pertains to such circuits for use in what may be termed the arithmetic section of a digital computer.

In greater detail, the invention covers circuits suitable for the arithmetic section of a digital computer, which computer is to be controlled by and/or have as a data input a supply of punched or otherwise marked record cards and provide an output in the form of similar cards. The invention is furthermore concerned with the use of continuously revolving magnetizable members, such as a rotatable drum having a magnetizable periphery or a magnetizable belt.

This application is related to our copending application, Serial No. 284,914, filed April 29, 1952, now Patent 2,718,356, issued September 20, 1955, and constitutes a continuation-in-part thereof.

In the present invention, digital data available in serial form may be continuously recirculated through a path comprising electronic circuitary and a magnetizable medium, and additional digital data may be combined in serial form with the original data to produce an output representing an arithmetic operation. That is, numbers or the like established by the digital data may be added, subtracted, multiplied and divided. The circuitry and apparatus used to perform the arithmetic operations receive data from record cards such as punched cards, and conversion means are provided for reading data from record cards and converting the data to magnetic flux form prior to introduction into the arithmetic circuits.

The general nature of the invention may be further understood in connection with the detailed description below.

It is a primary object of this invention to provide novel circuits for handling digital data and for performing arithmetic operations thereon.

It is a further object of the invention to provide such novel circuits which may cooperate with apparatus for converting the data from physical form, as on record cards, to a magnetic flux form, and reconverting the same back into physical form.

It is a further object of this invention to provide digital circuits for performing arithmetic operations wherein numbers are made up of digits passing in serial order through electronic circuitry and magnetizable mediums.

It is a still further object of the invention to provide circuits for performing arithmetic operations on digital data wherein a given number in digital form circulates serially through a recirculation path and wherein an additional number of digits may be arithmetically combined with the first number by serially combining the digits in an adding circuit.

It is a still further object of this invention to provide digital arithmetic circuits wherein a digit may recirculate continuously through a circuit including an adding circut and wherein shifting and counting circuits are provided for performing multiplication and division operations on the introduction of additional digits into the recirculation path at predetermined times.

It is a further object to provide, in a circuit as in the preceding objects, an adding circuit having inputs operating on a time-sharing basis.

Other objects of the invention will be pointed out in the following description and claims and illustrated in the accompanying drawings, which disclose, by way of examples, the principle of the invention and the best mode which has been contemplated of applying that principle.

Figure 9A:
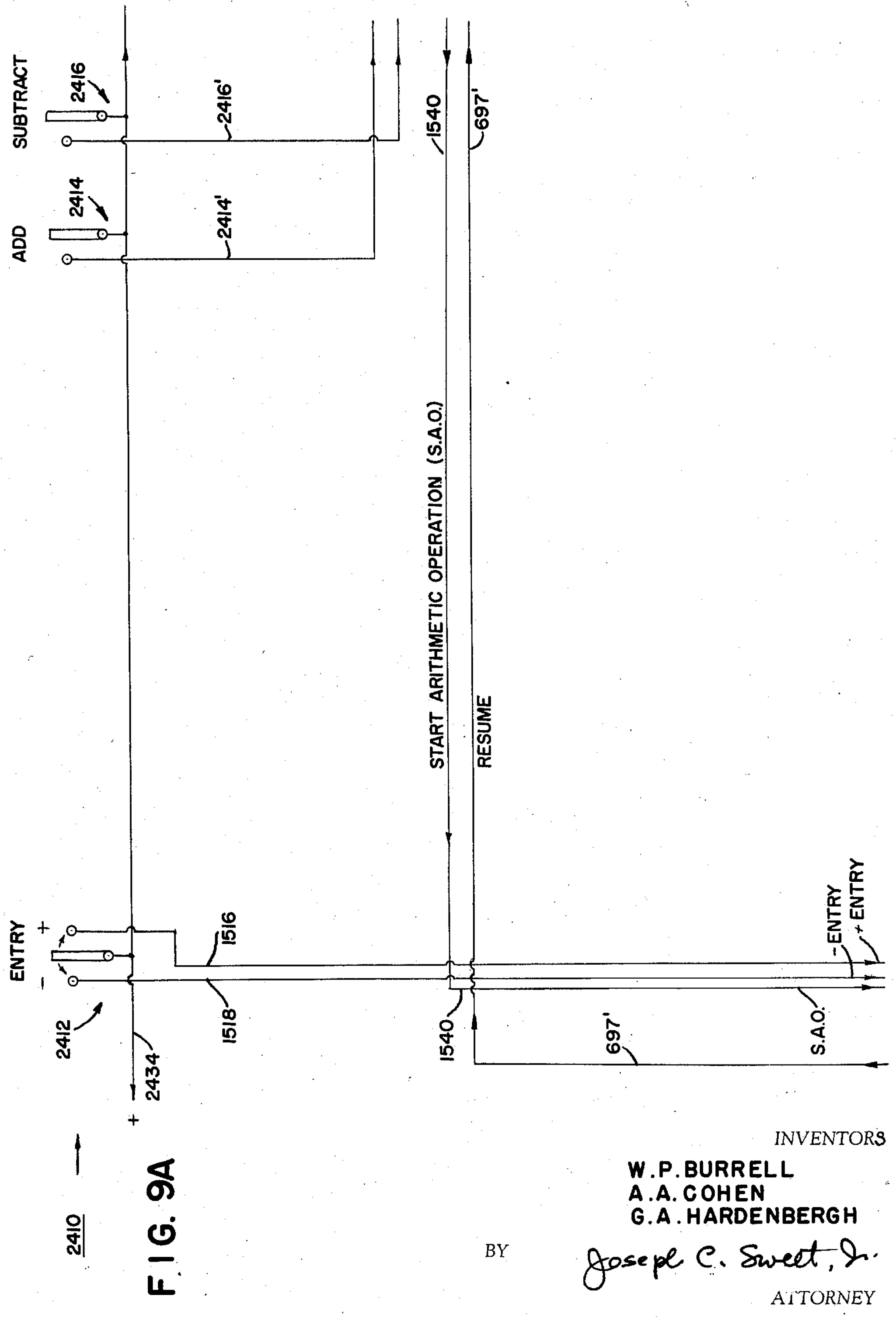
Figure 9B:
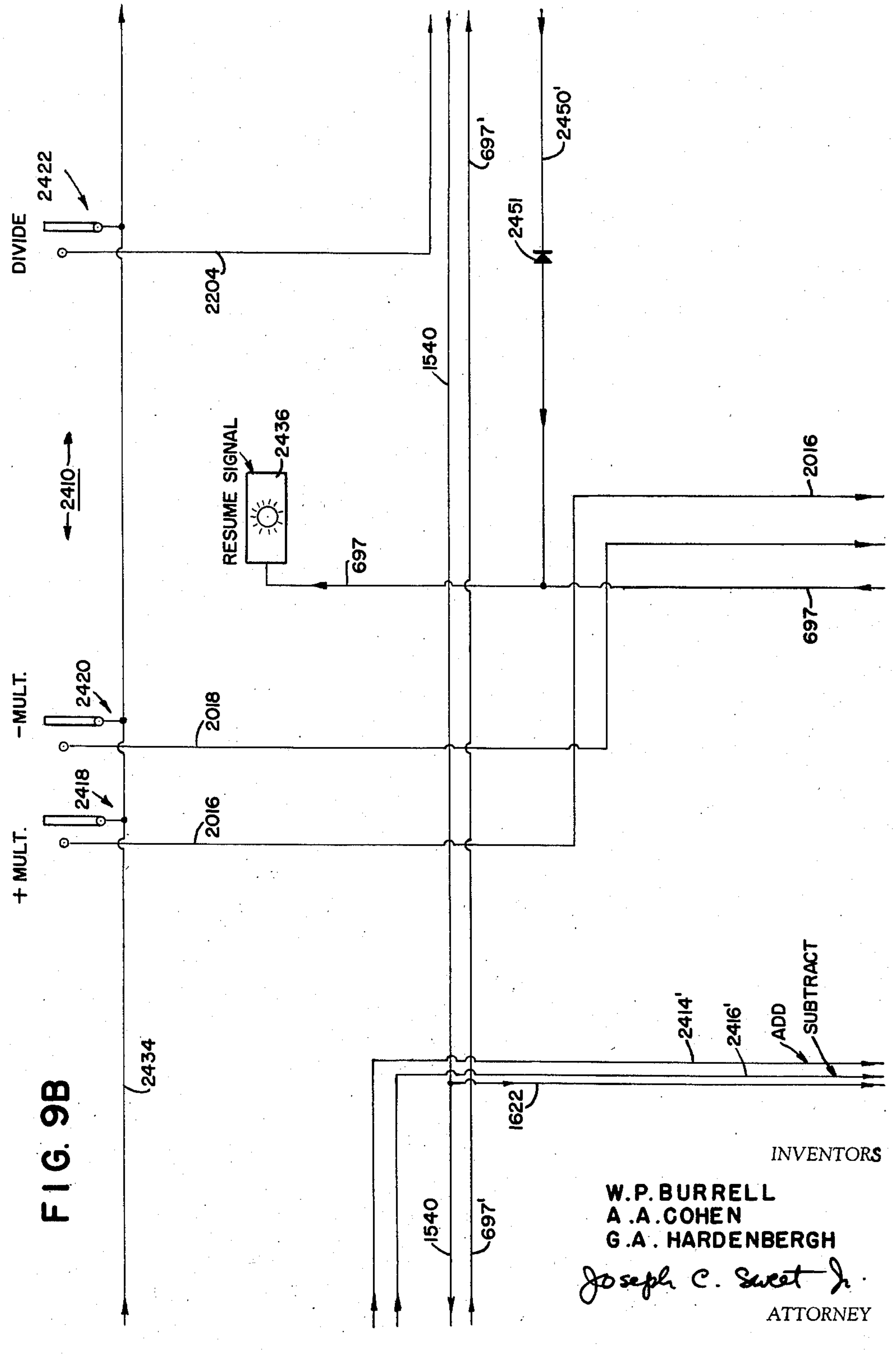
Figure 9C:
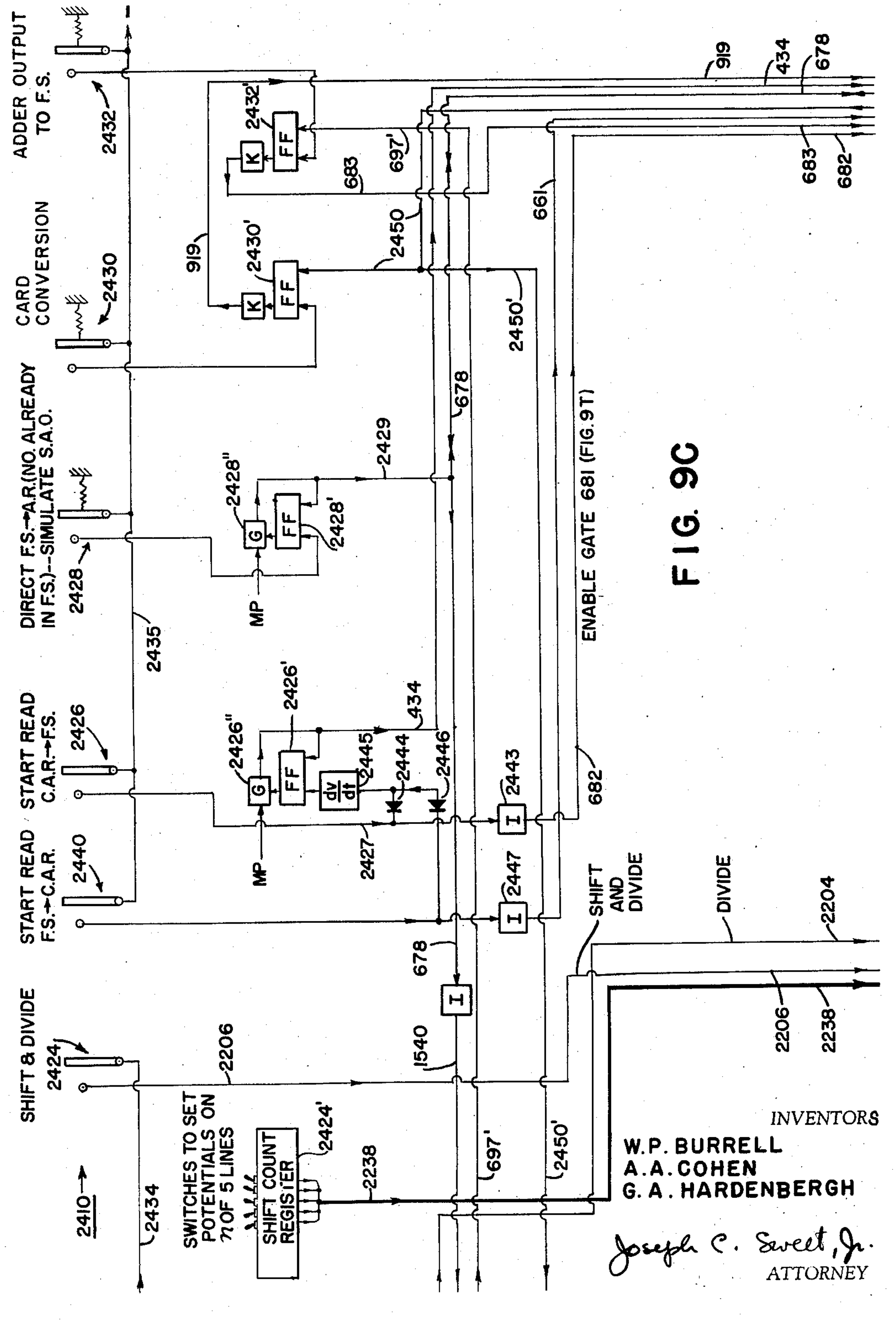
Figure 9D:
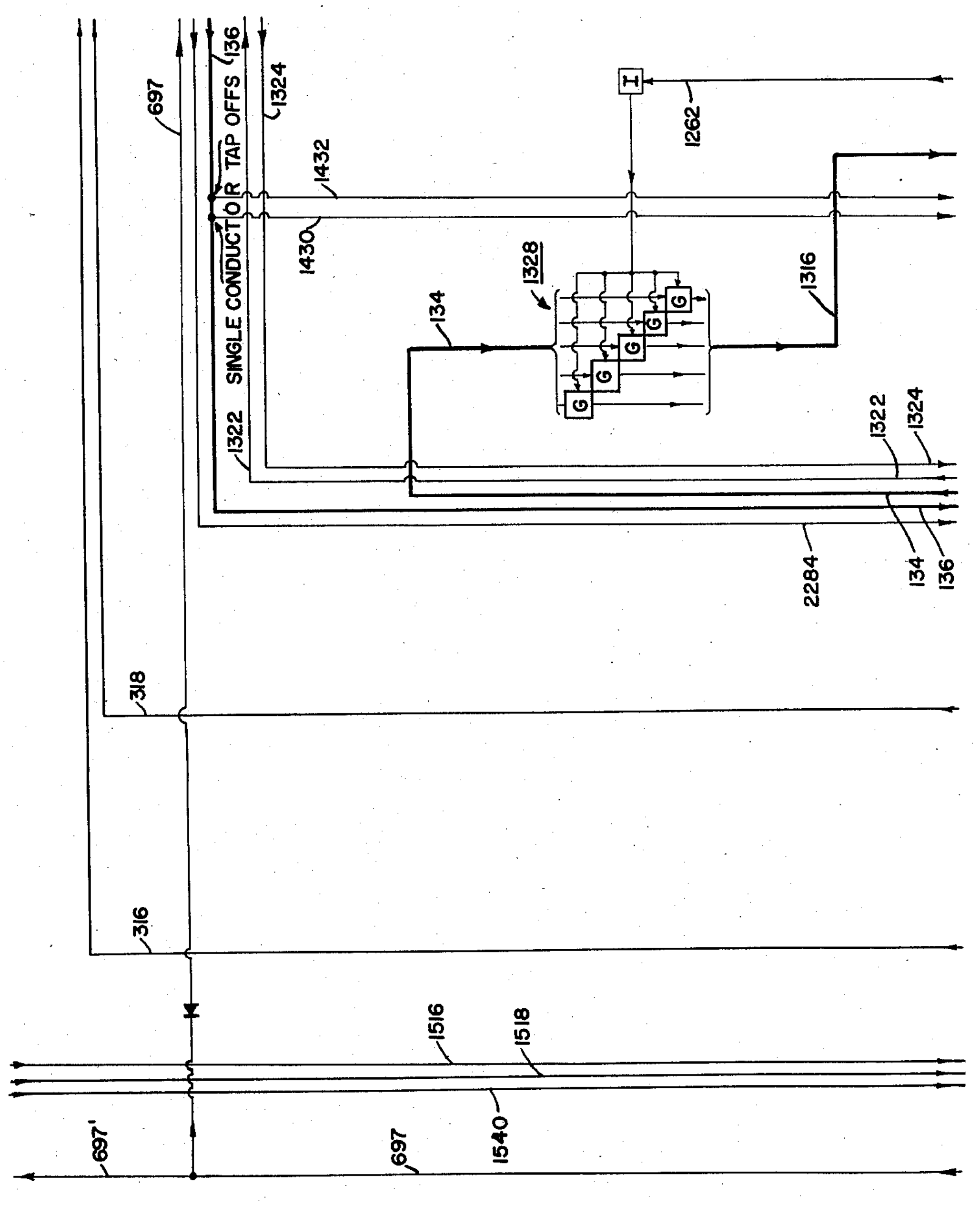
Figure 9E:
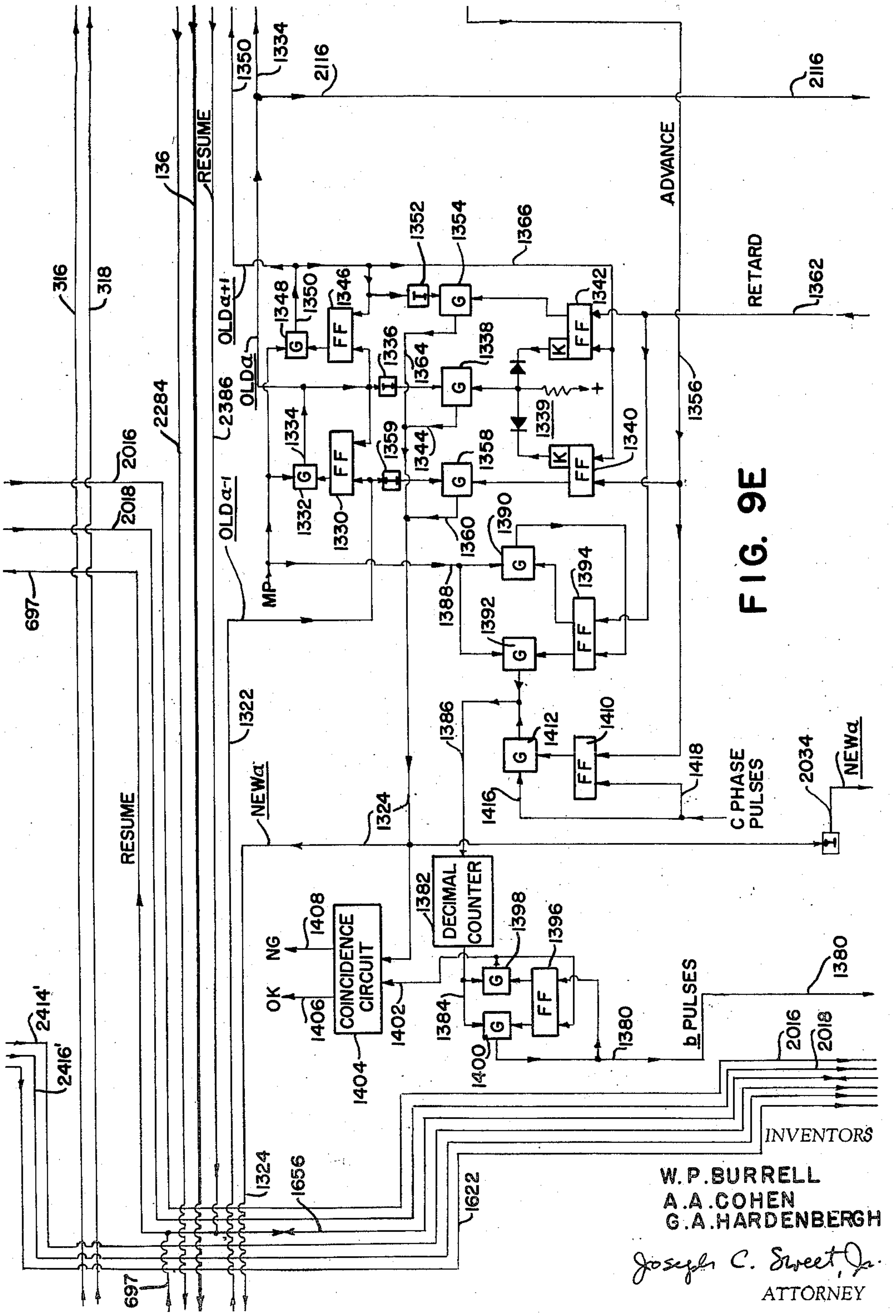
Figure 9F:
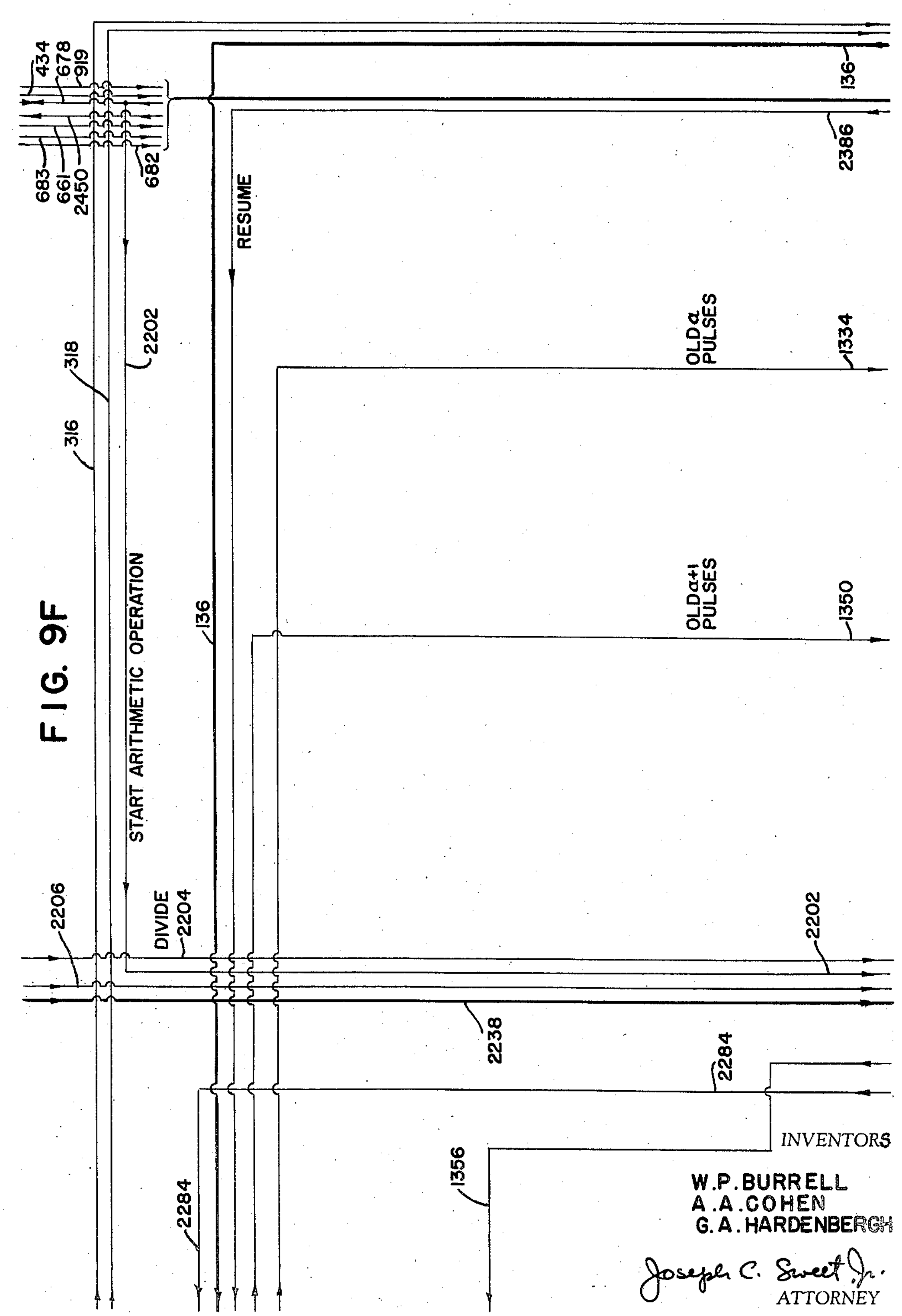
Figure 9G:
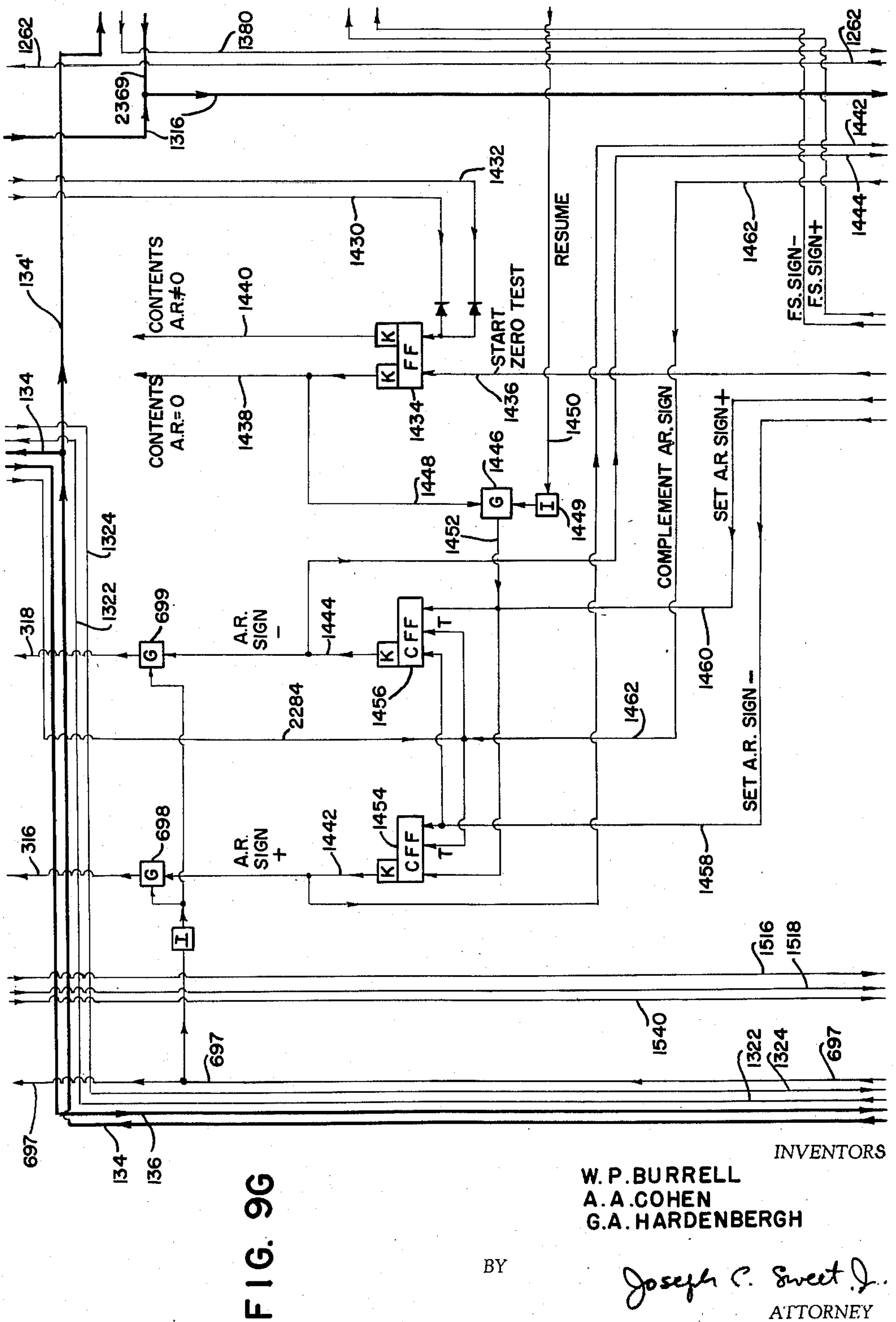
Figure 9H:
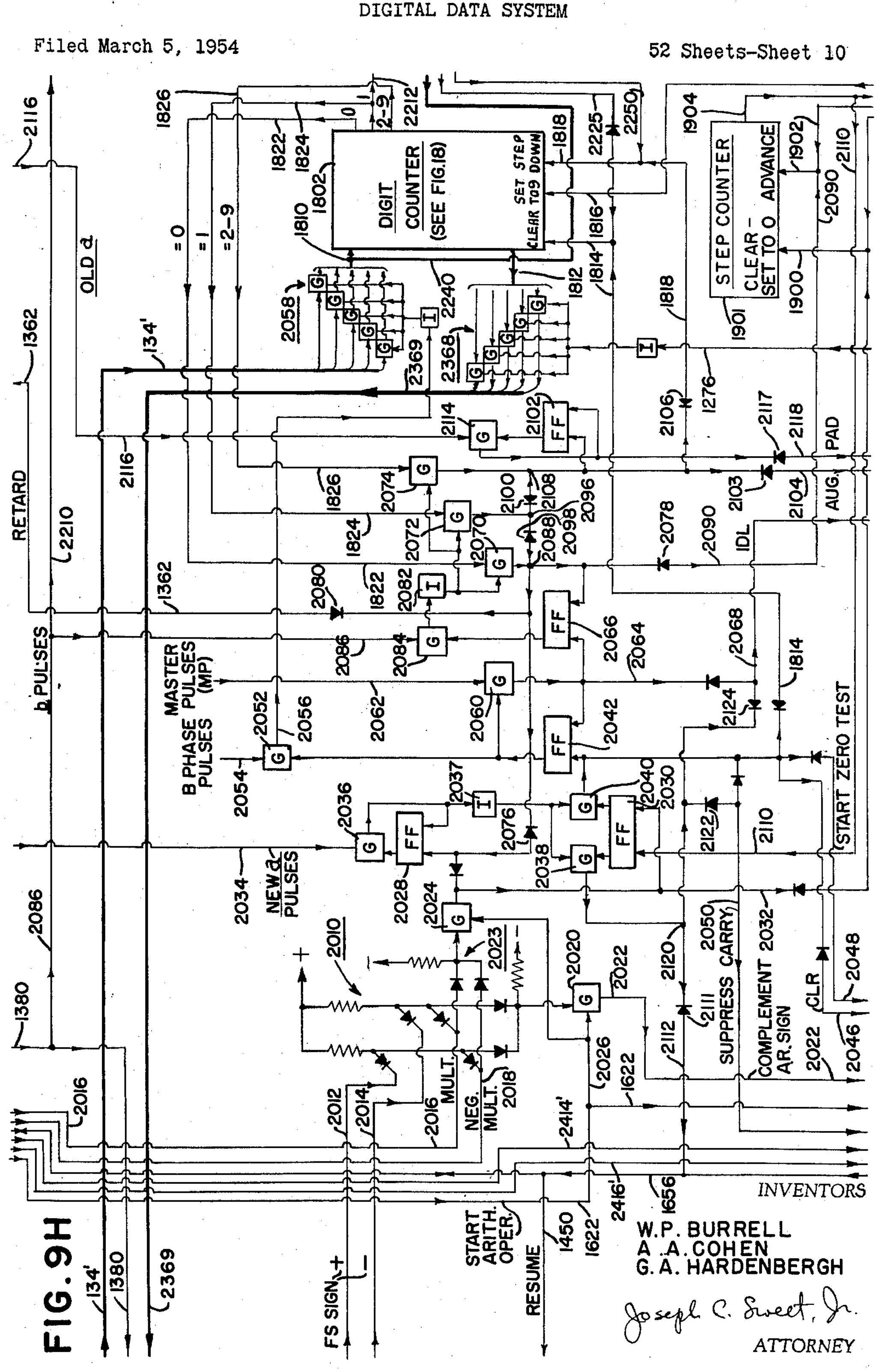
Figure 9I:
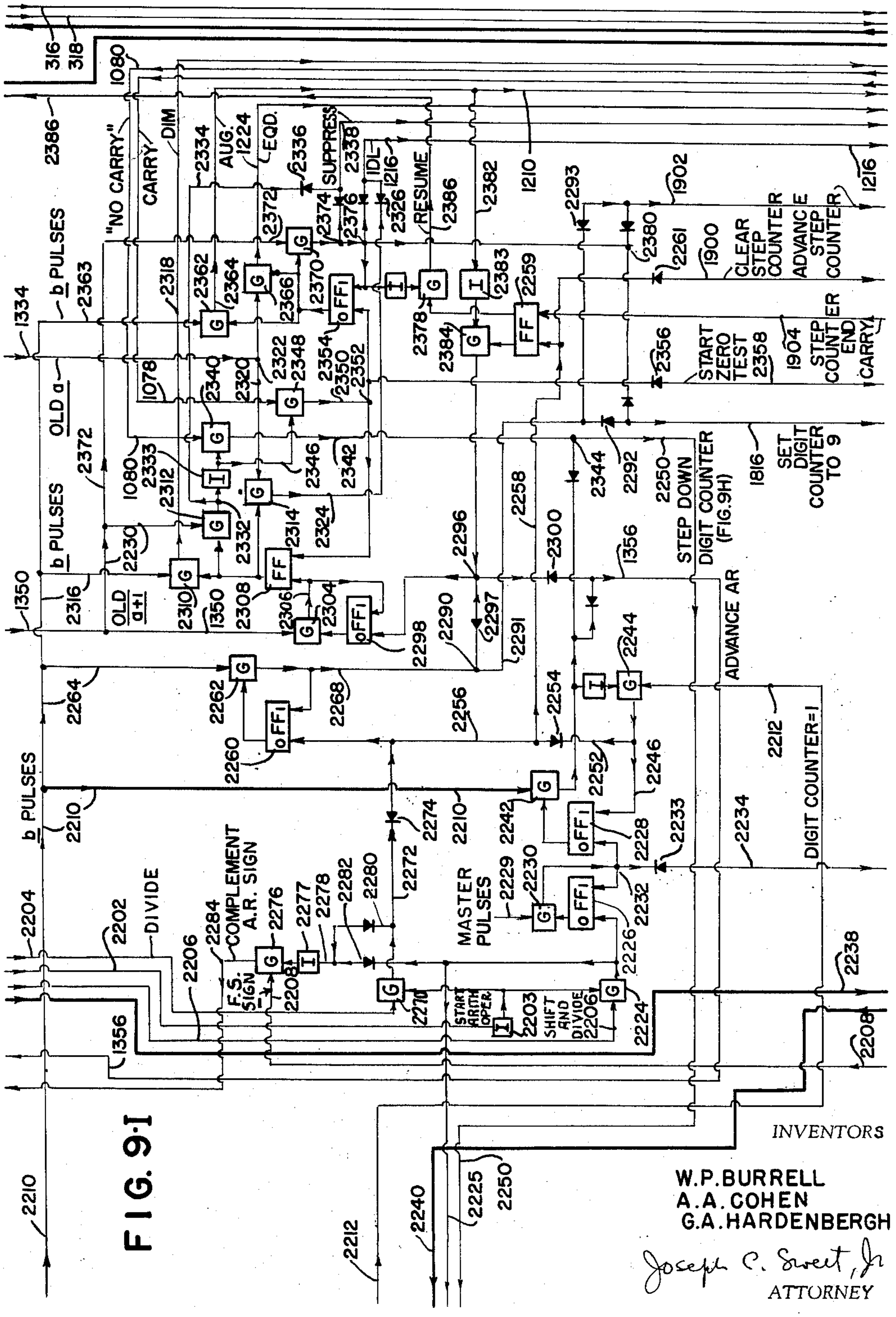
Figure 9J:
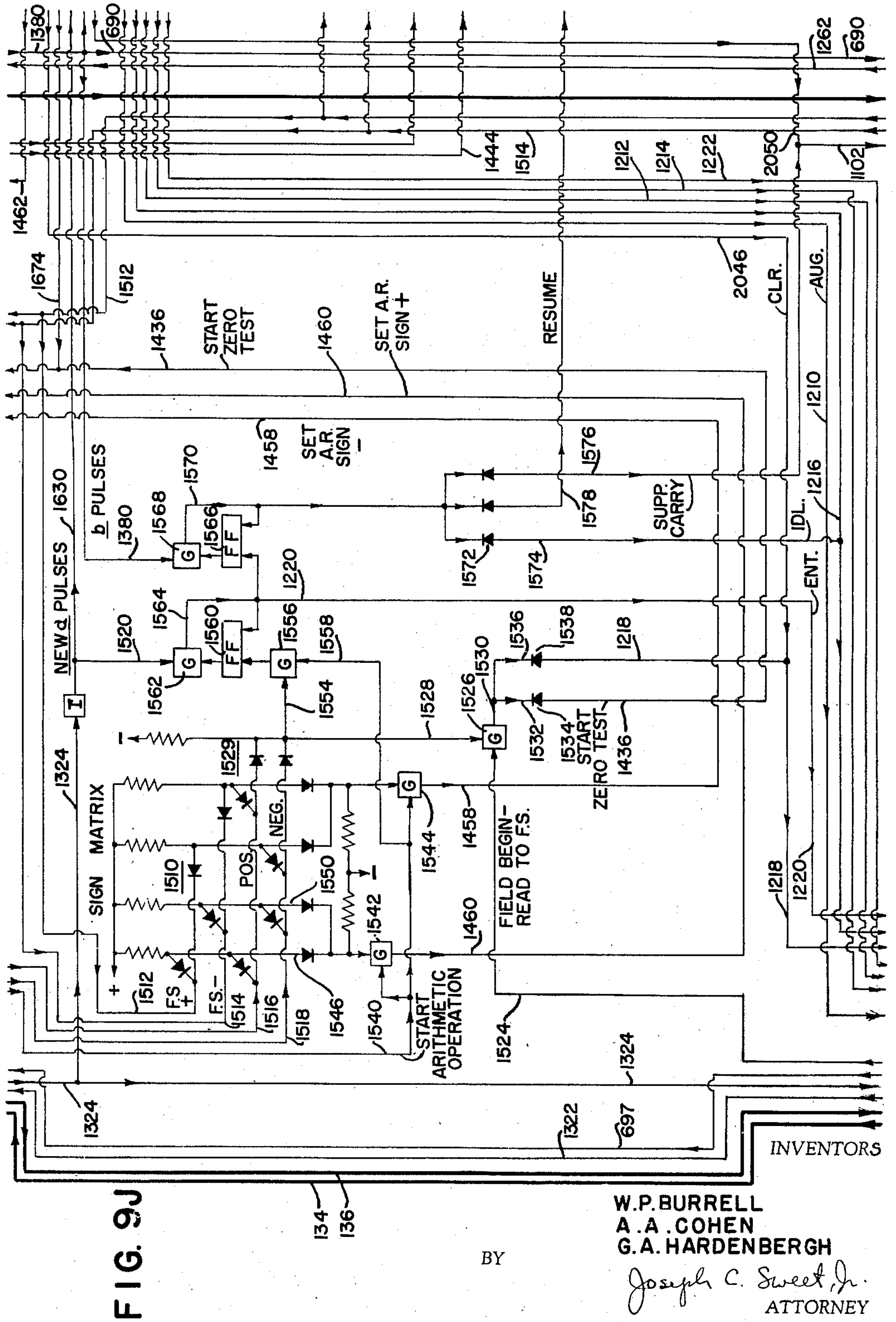
Figure 9K:
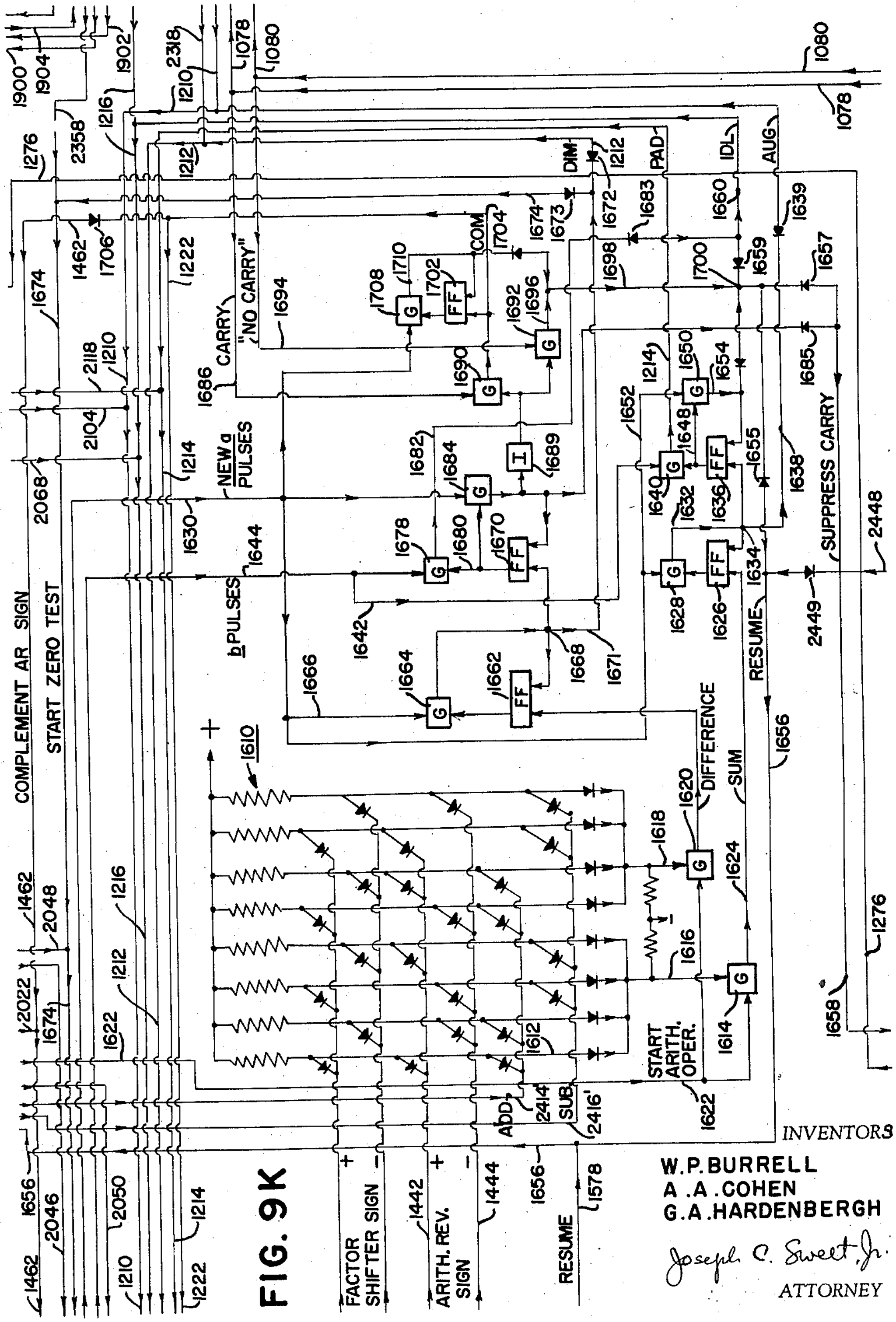
Figure 9L:
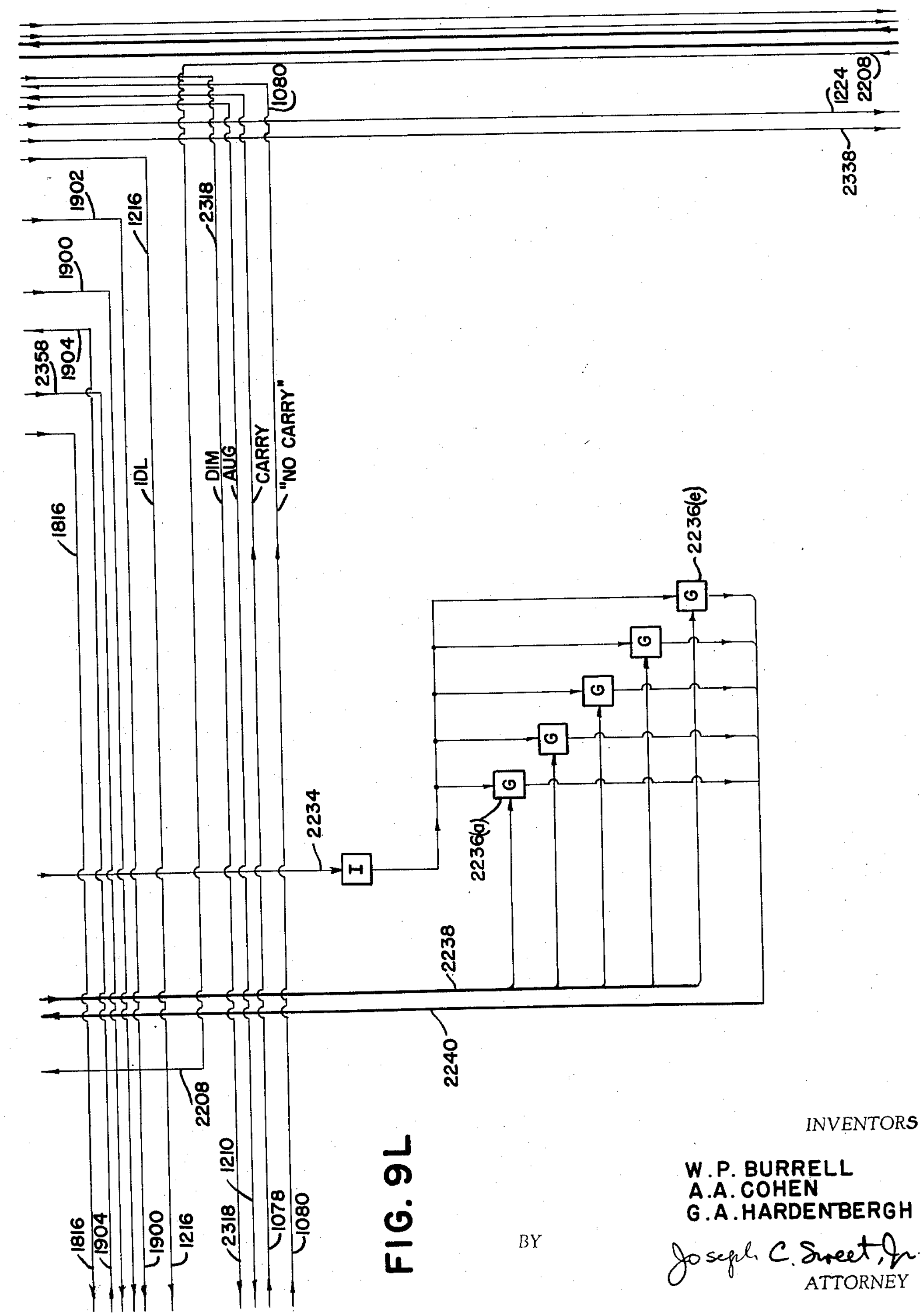
Figure 9M:
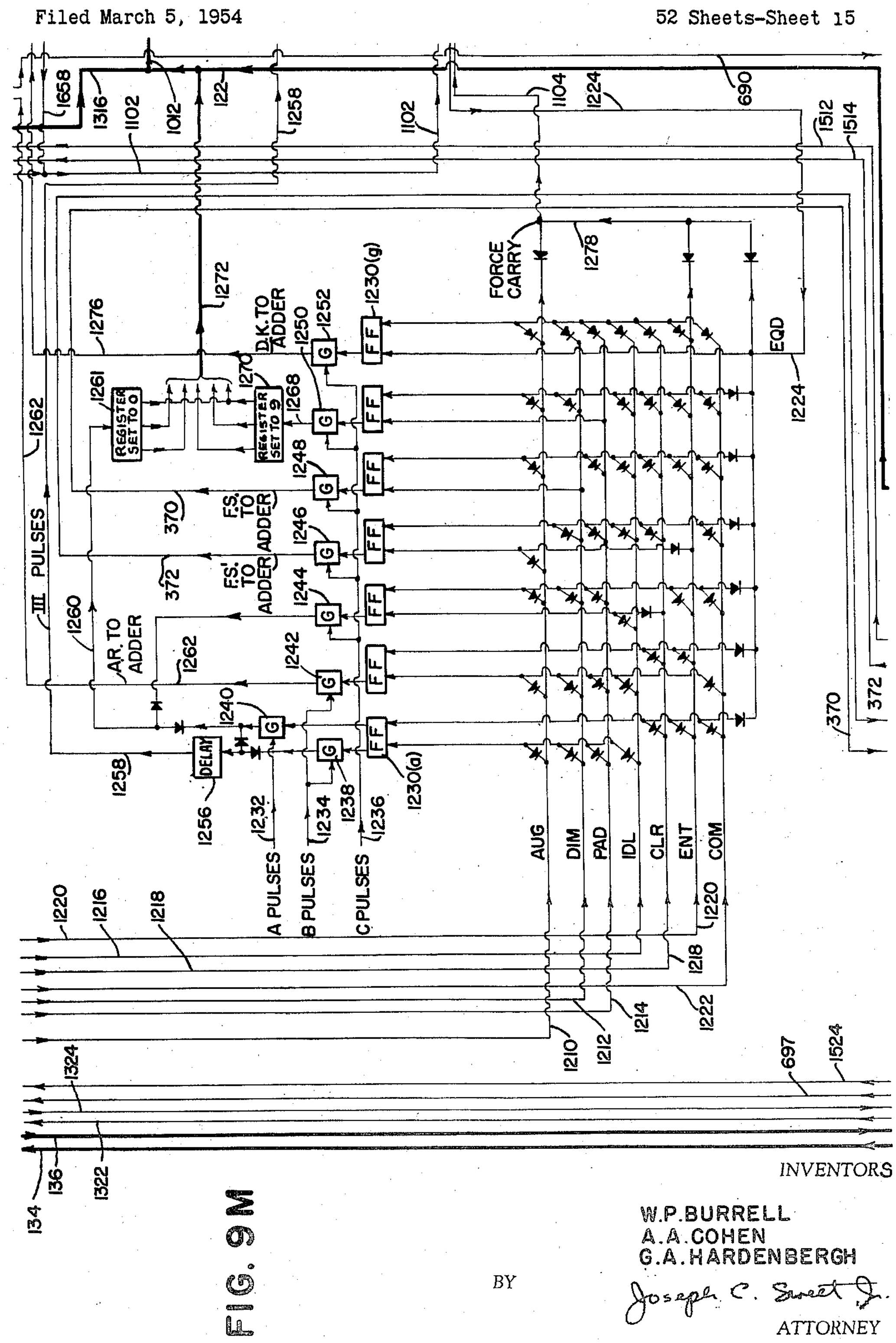
Figure 9N:
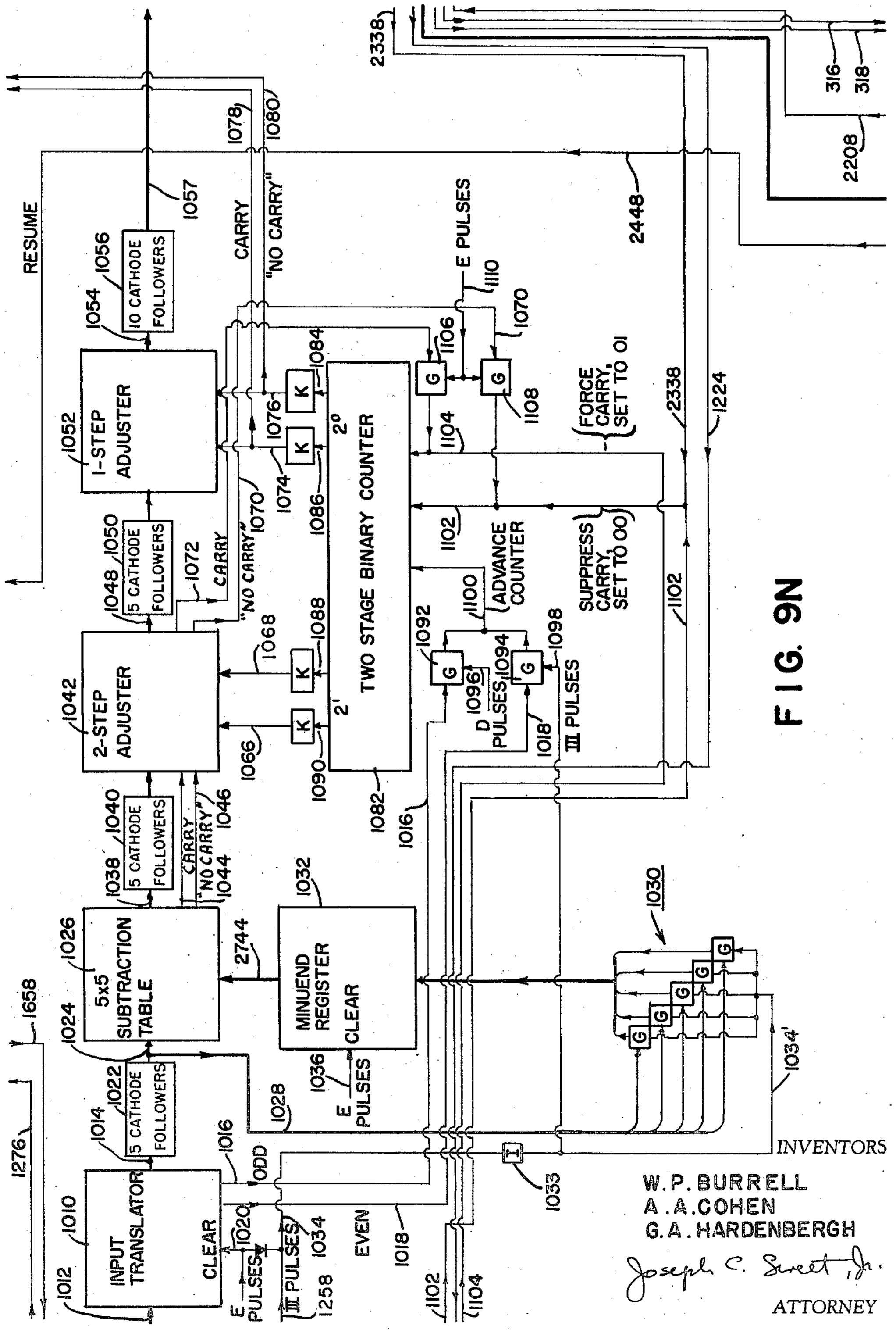
Figure 9P:
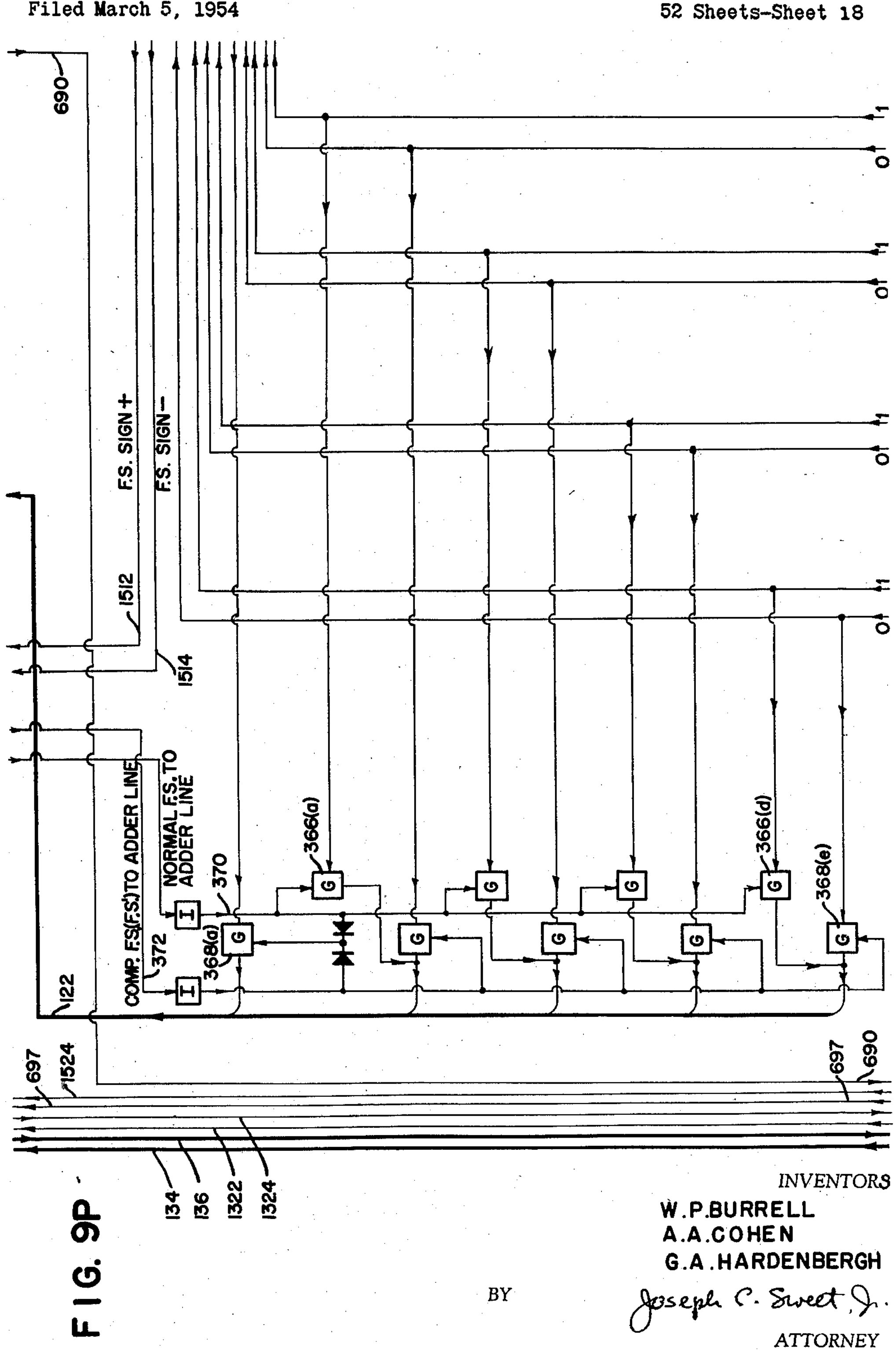
Figure 9Q:
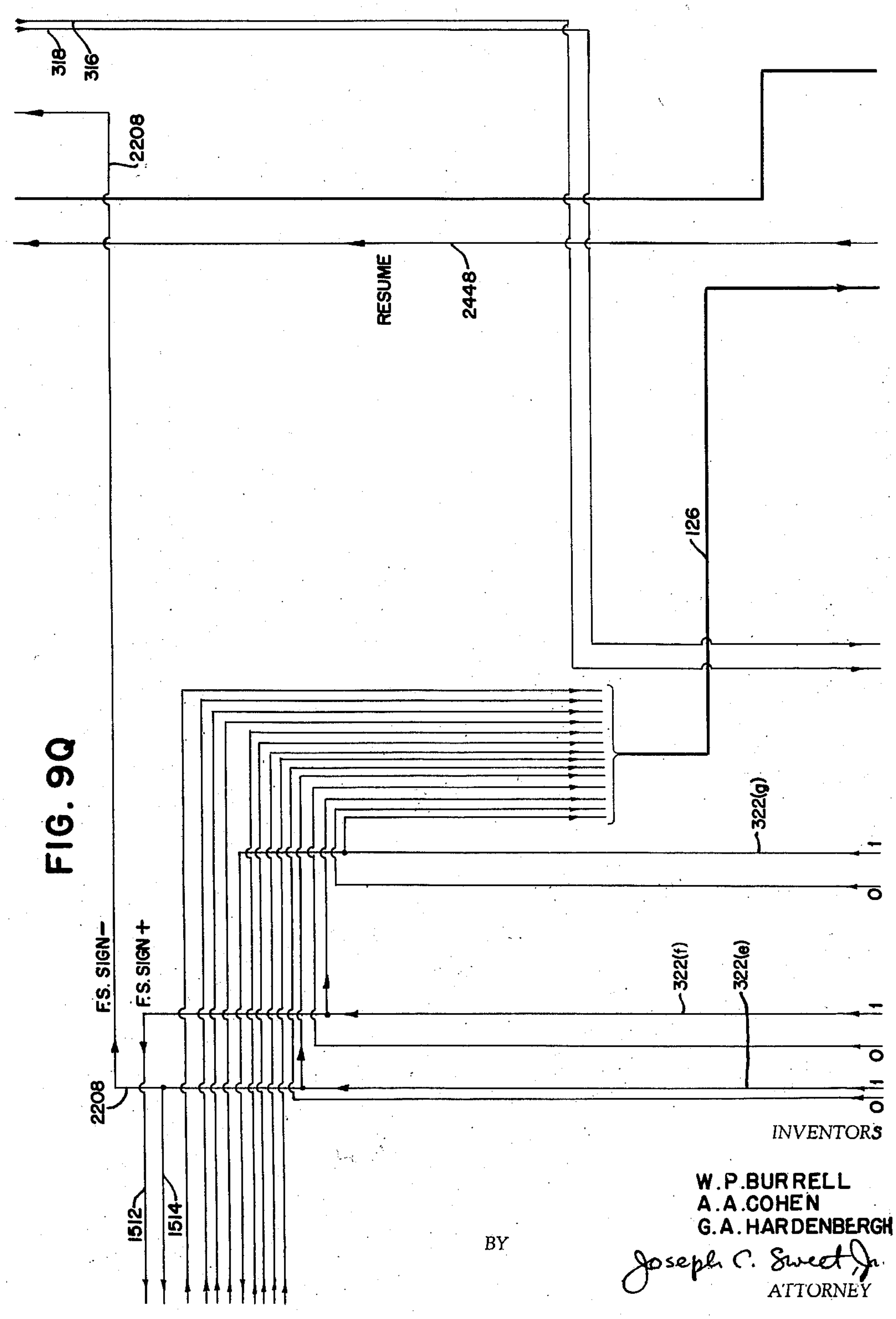
Figure 9R:
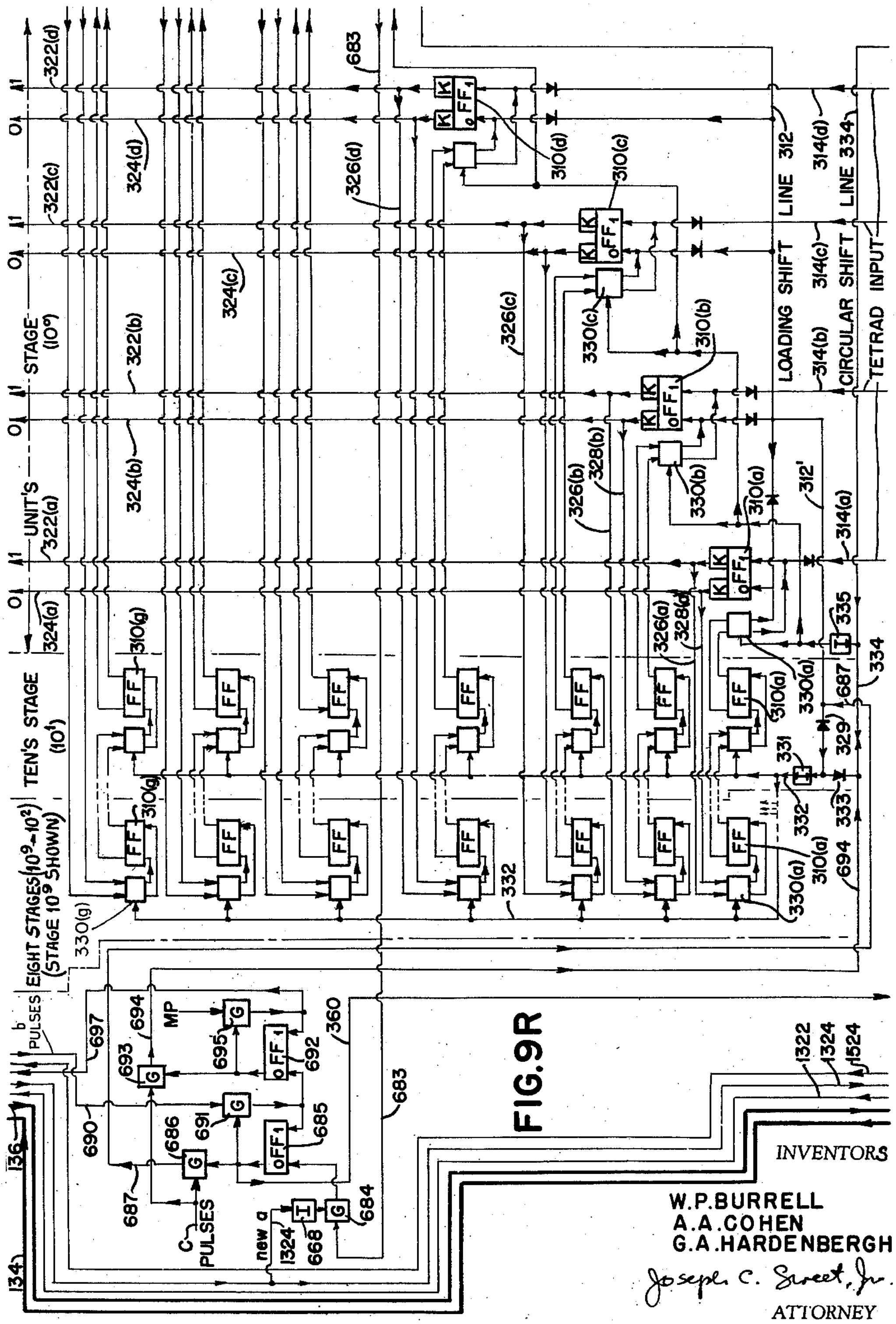
Figure 9S:
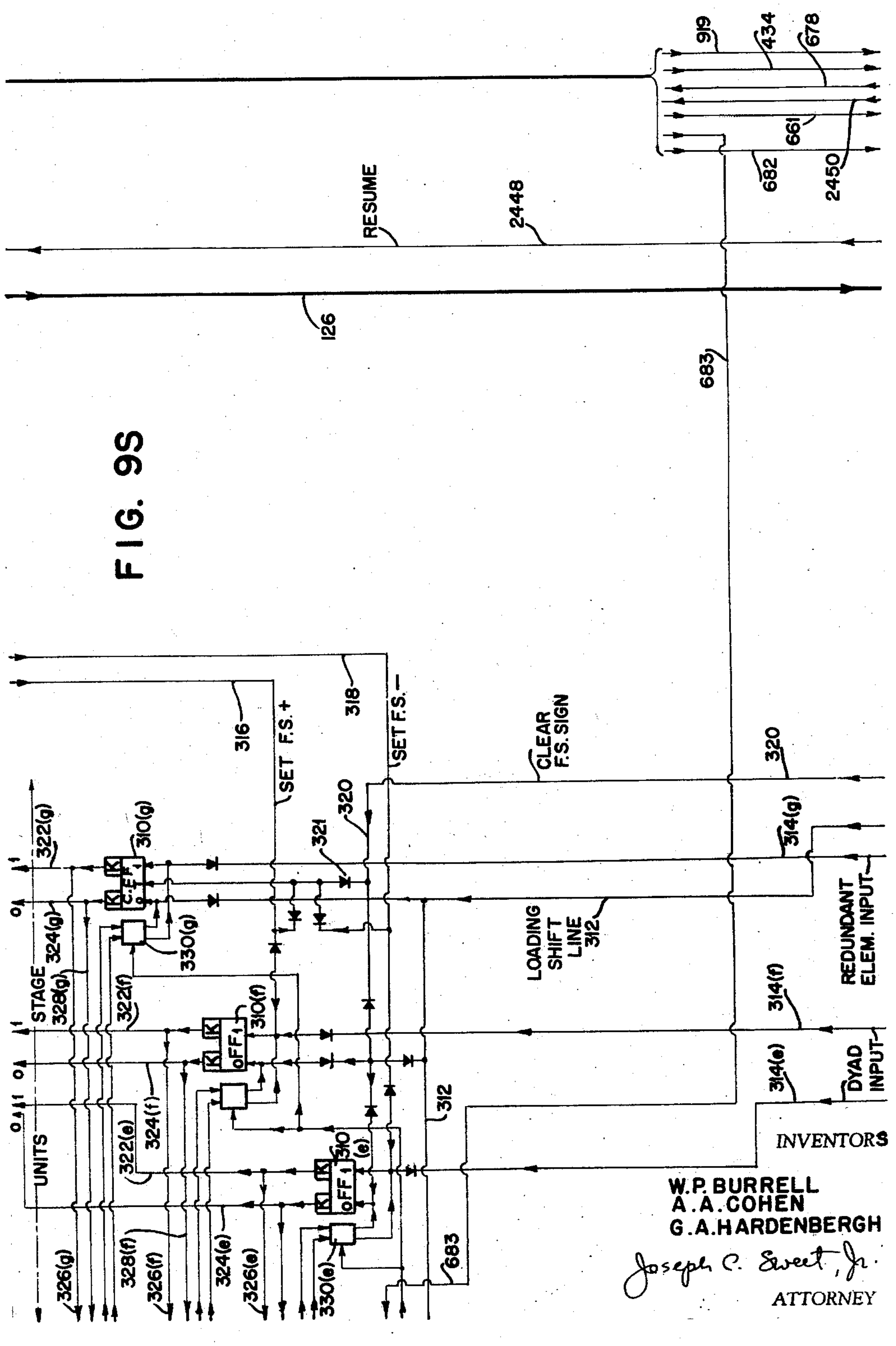
Figure 9T:
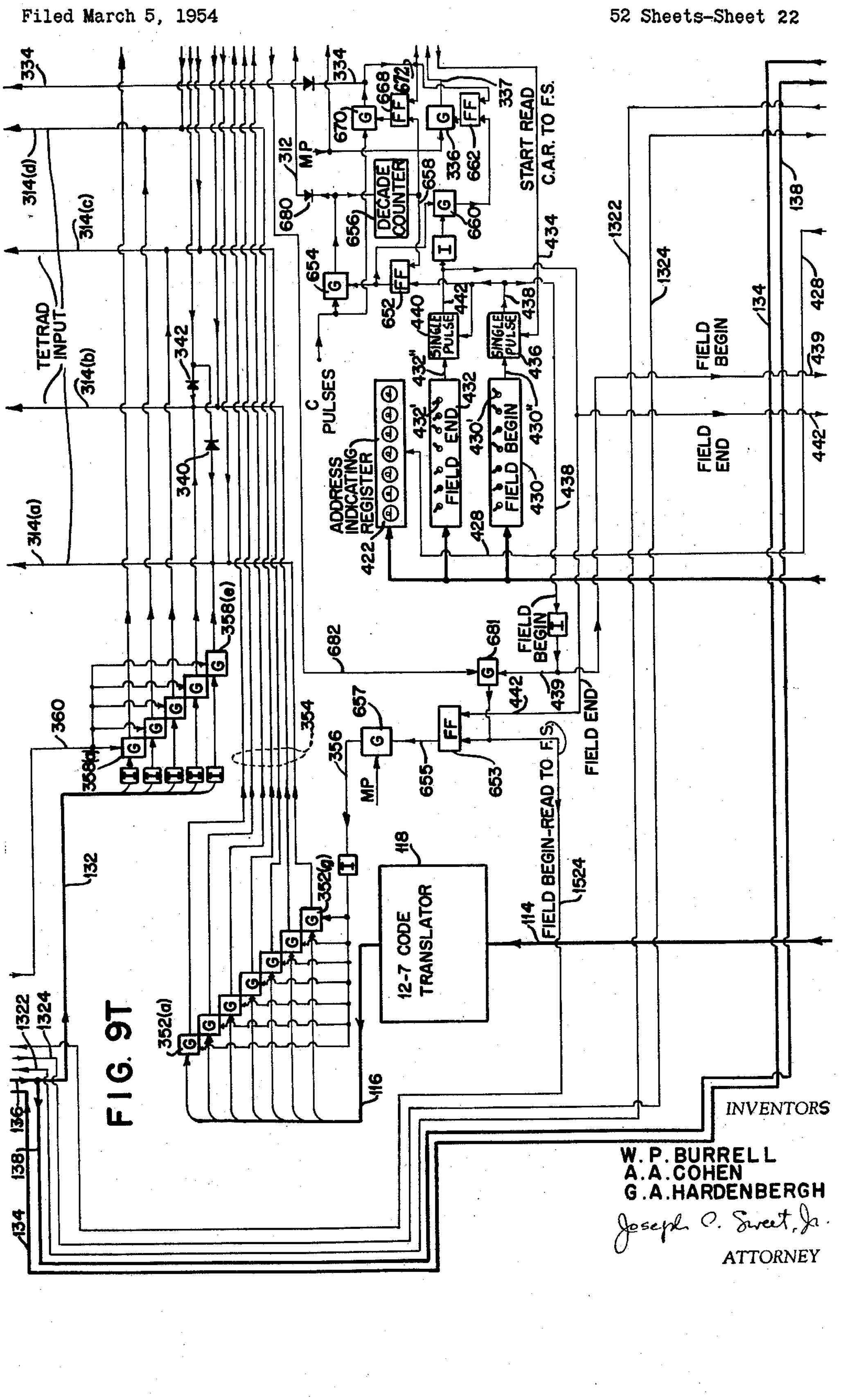
Figure 9U:
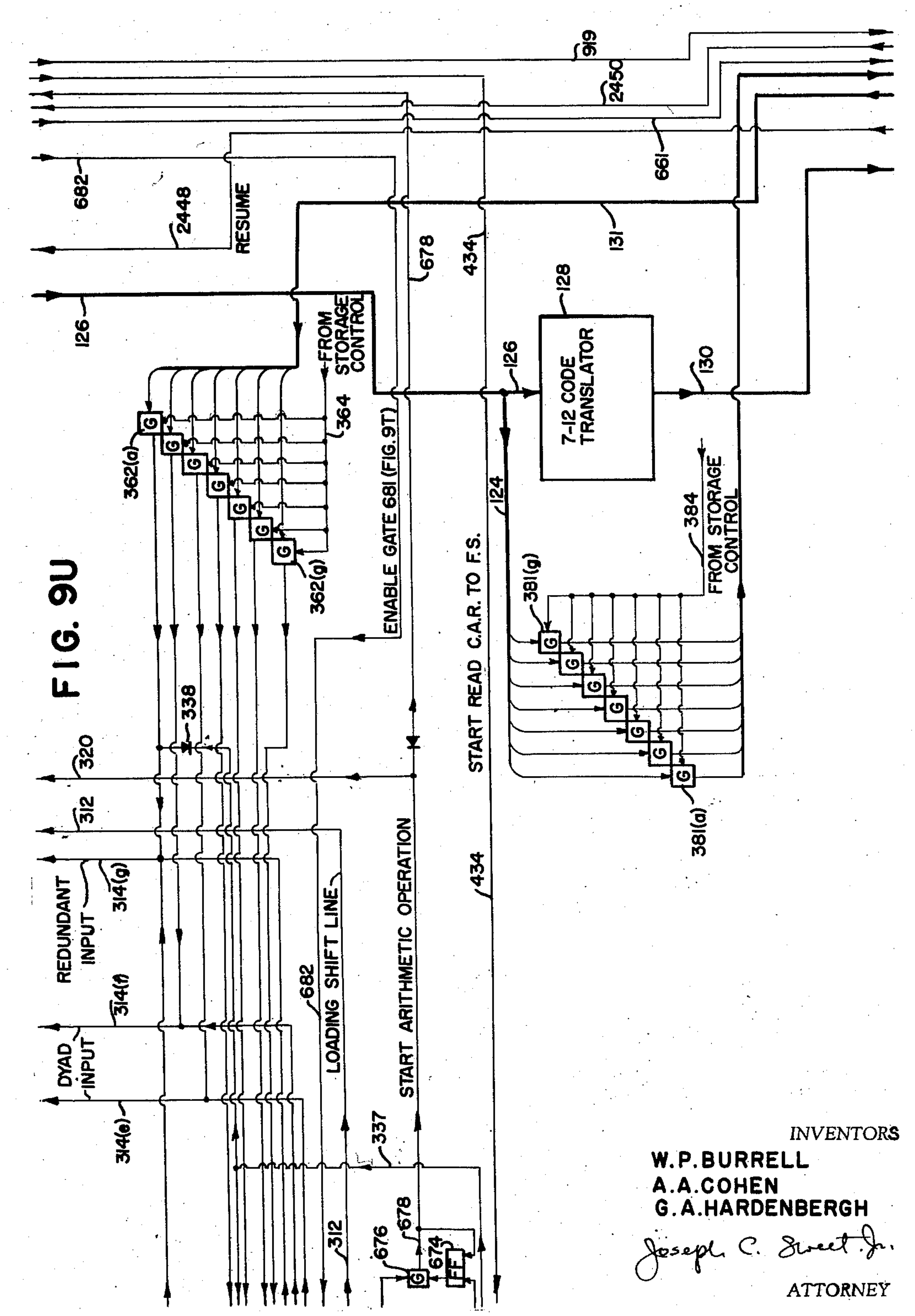
Figure 9V:
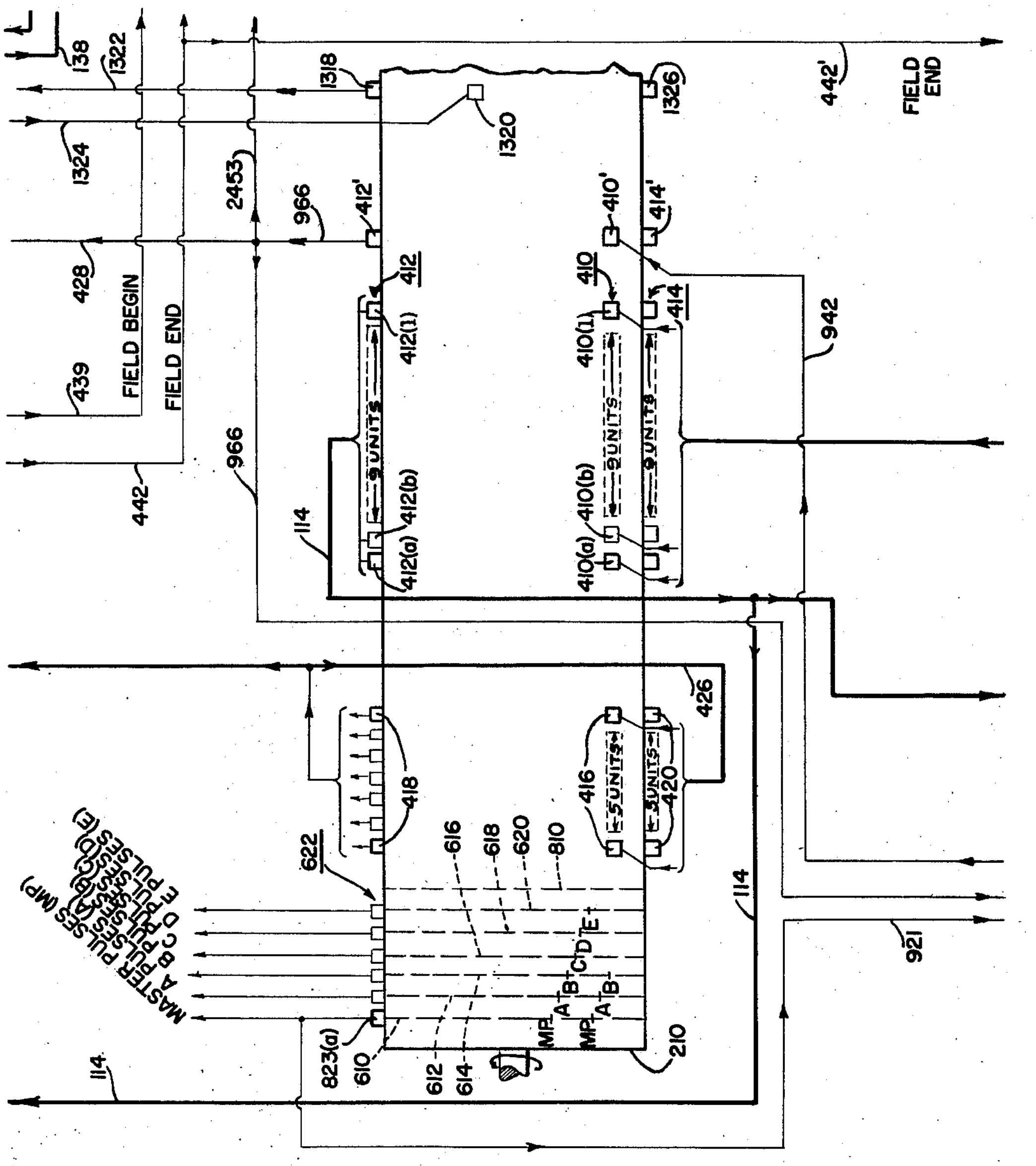
Figure 9W:
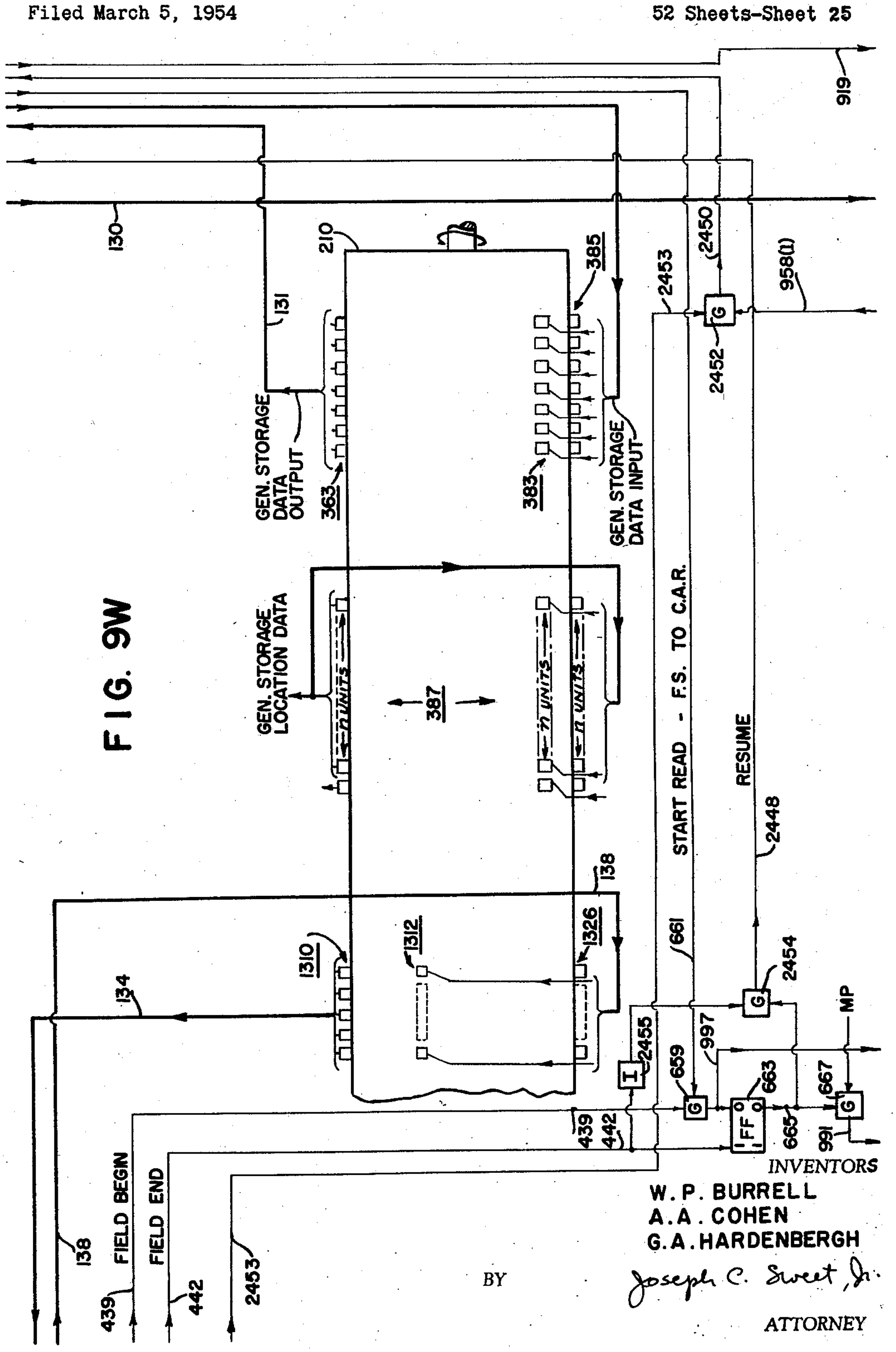
Figure 9X:
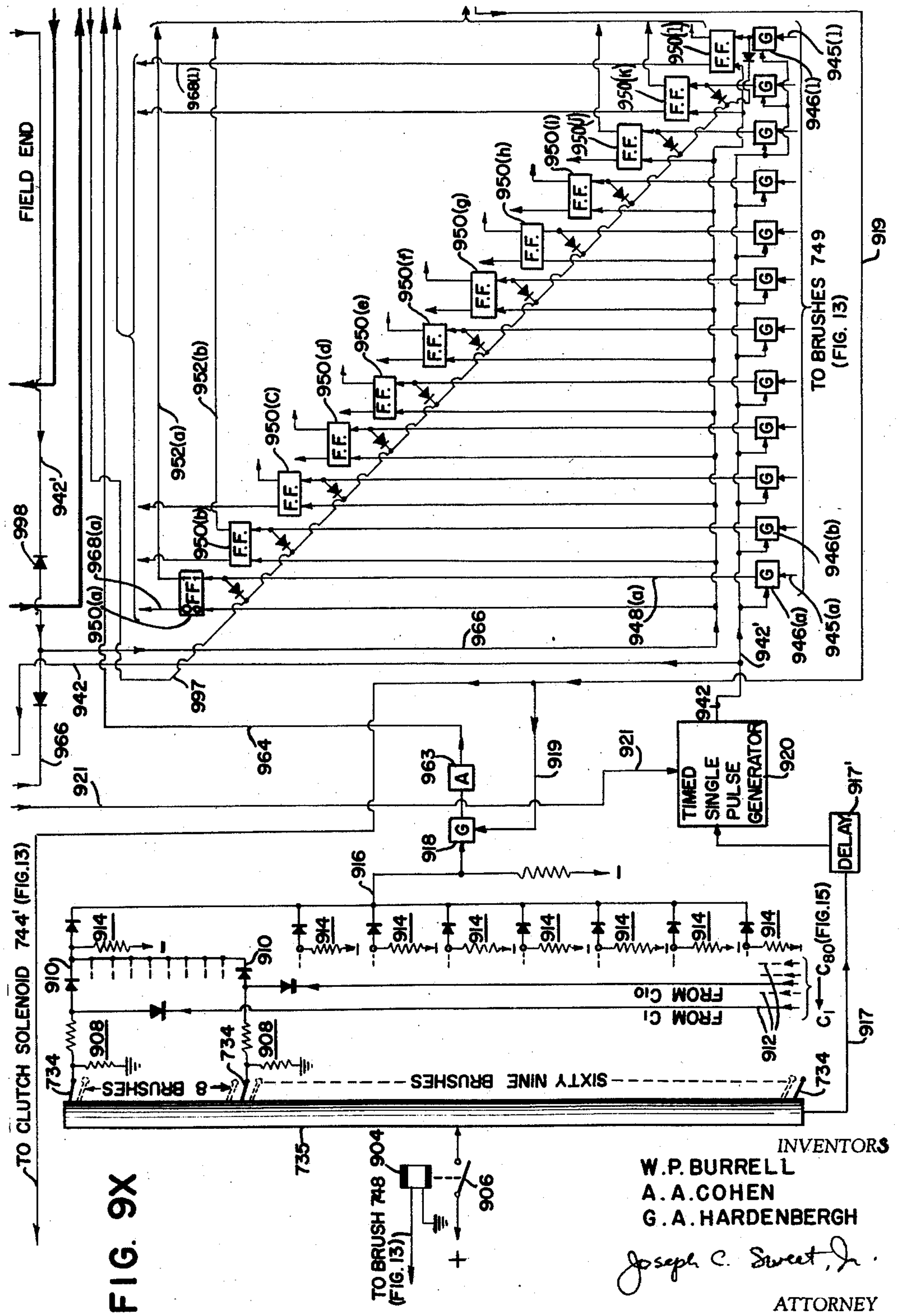
Figure 9Y:
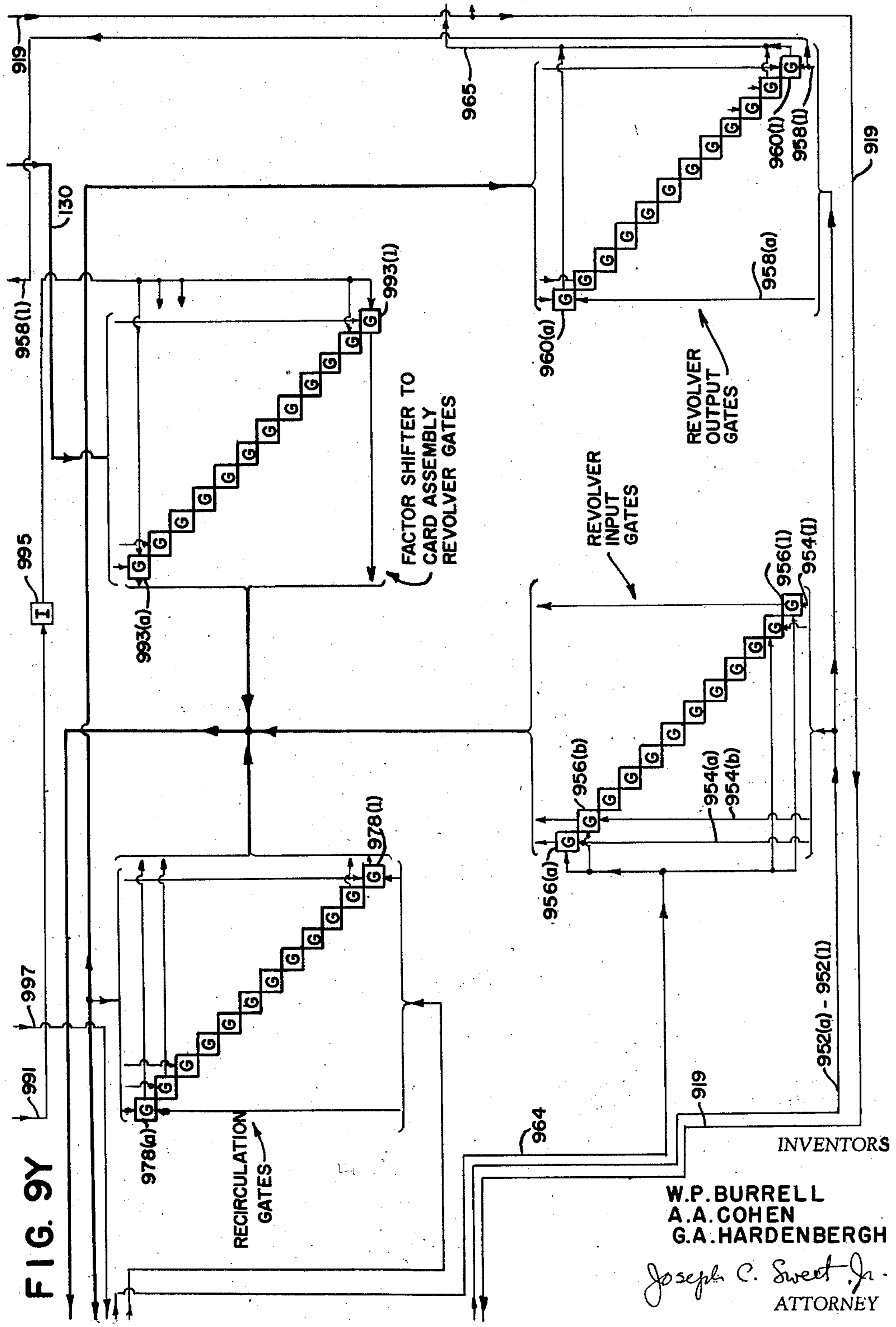
Figure 9Z:
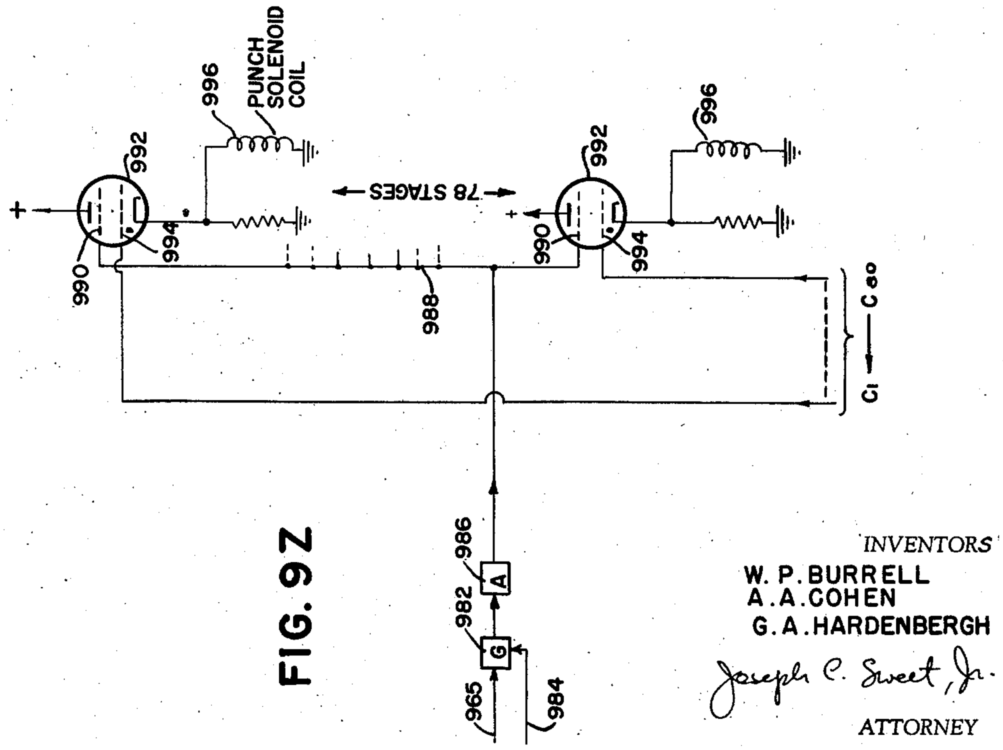
Figure 9A:
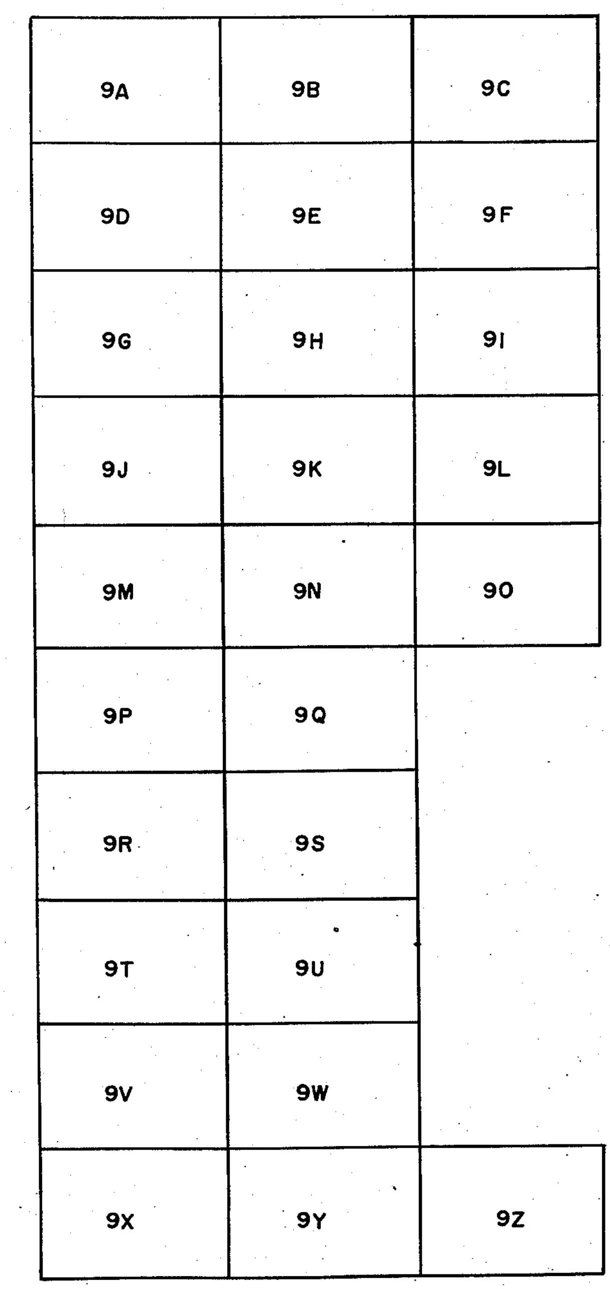

Figures 9A through 9Z (26 sheets) when joined as indicated in Fig. 9AA, below, constitute a schematic diagram of the system of the present invention.

Figure 9AA is a chart indicating the layout of Figures 9A–9Z.

Figure 10:
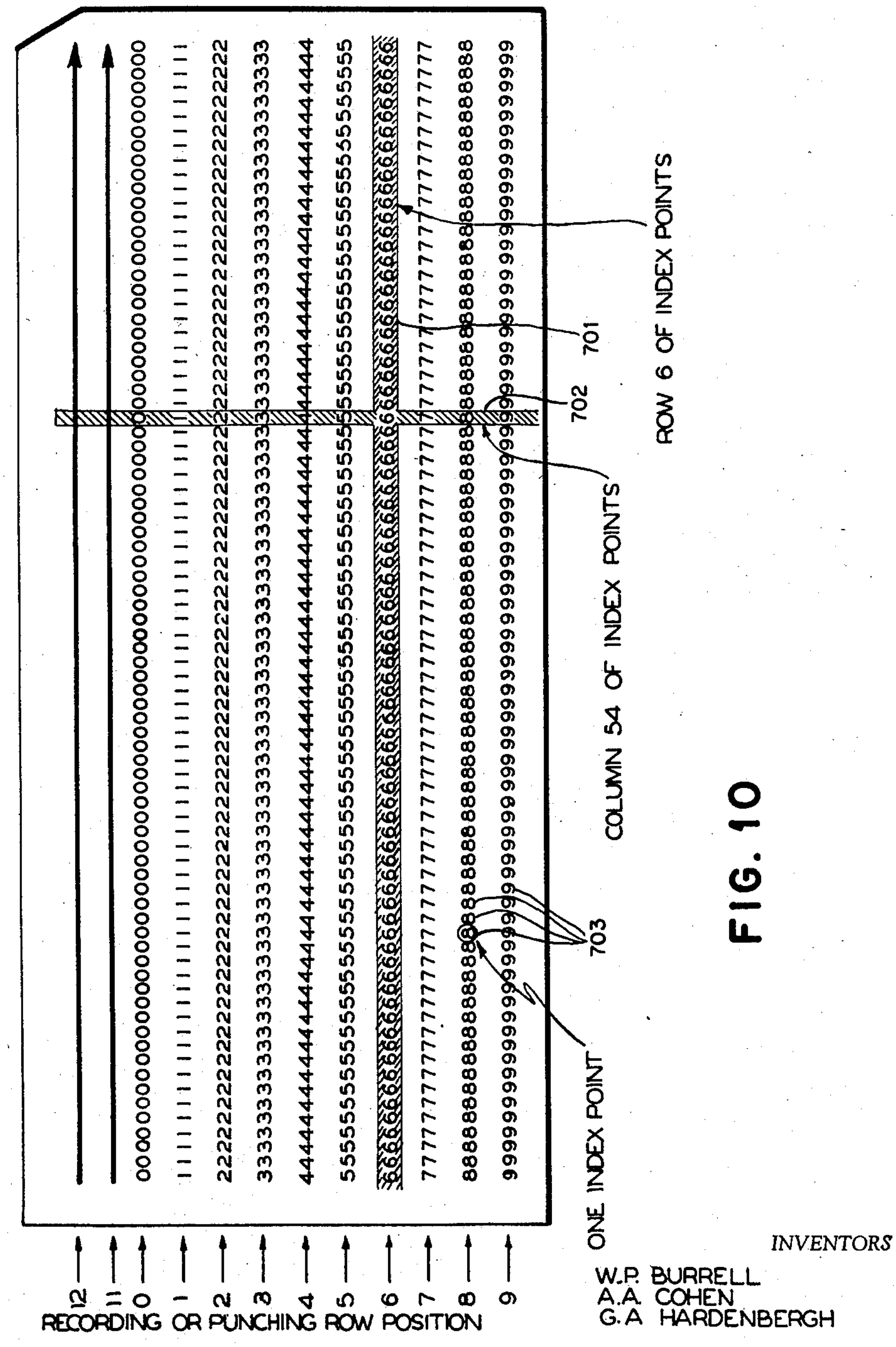

Figure 10 is an illustration of a typical record card employed in the present invention.

Figures 11, 29:
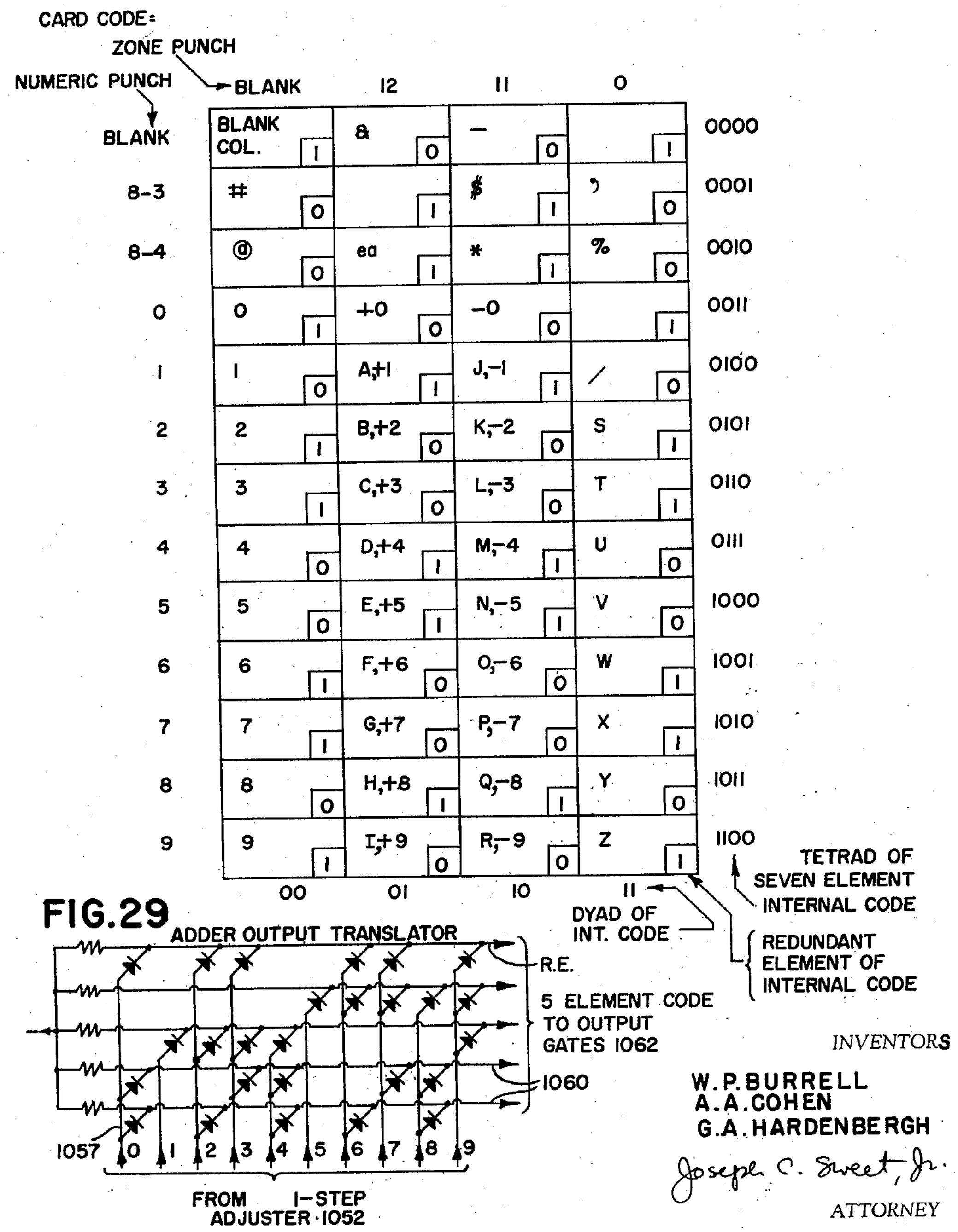

Figure 11 is a chart showing codes used in the present invention.

Figure 12:
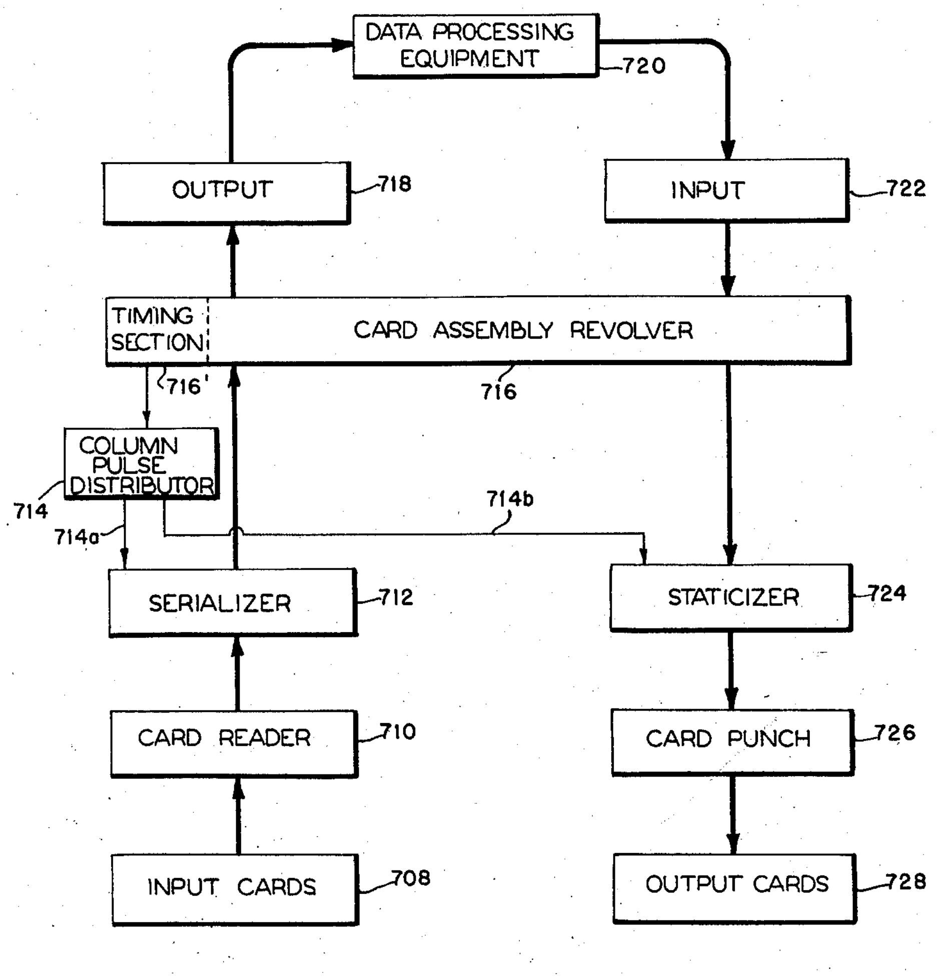

Figure 12 is a diagrammatic illustration of card reading and punching equipment employed with the present invention.

Figure 13:
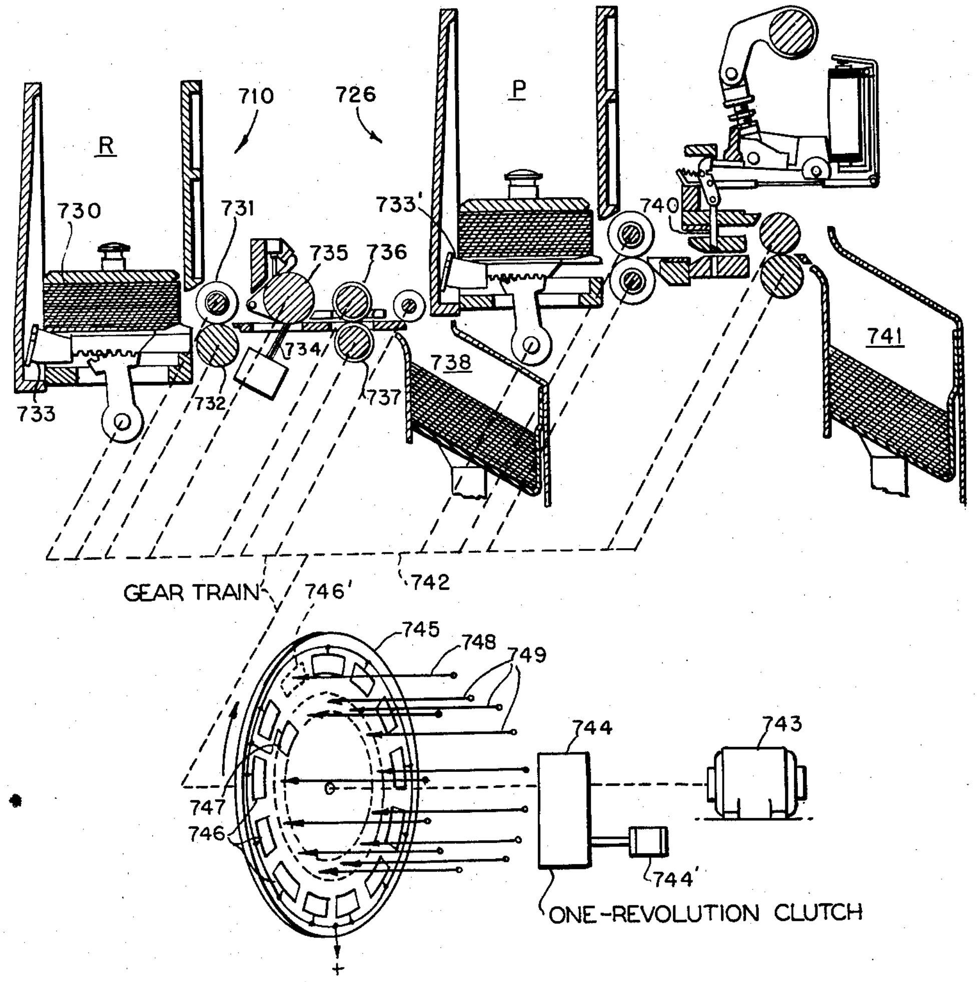

Figure 13 is an illustration, partly in diagrammatic form, of details of card reading and punching equipment employed in the present invention.

Figure 14:
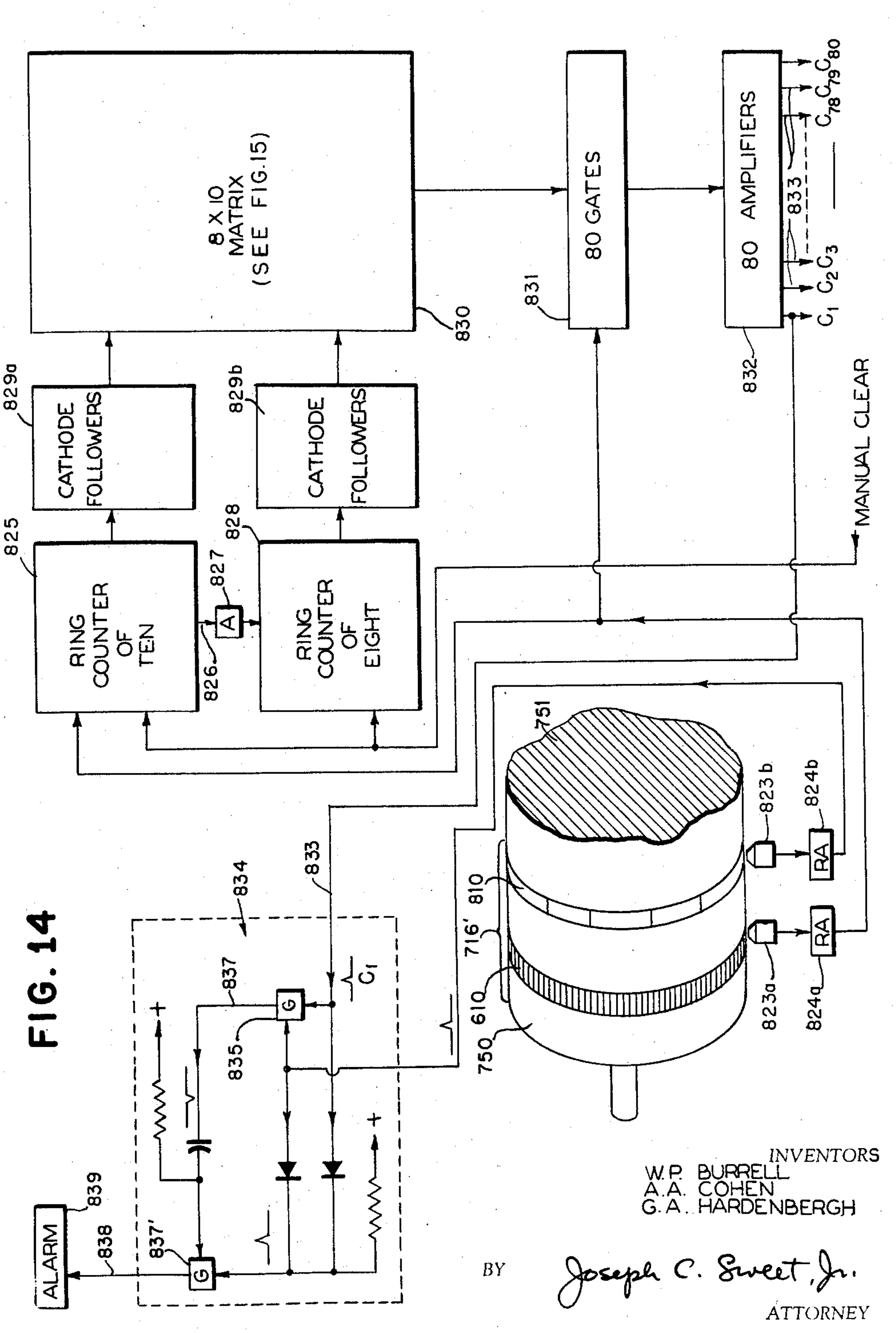

Figure 14 shows a block diagram of circuits employed in the card reading and punching equipment of the present invention.

Figure 15:
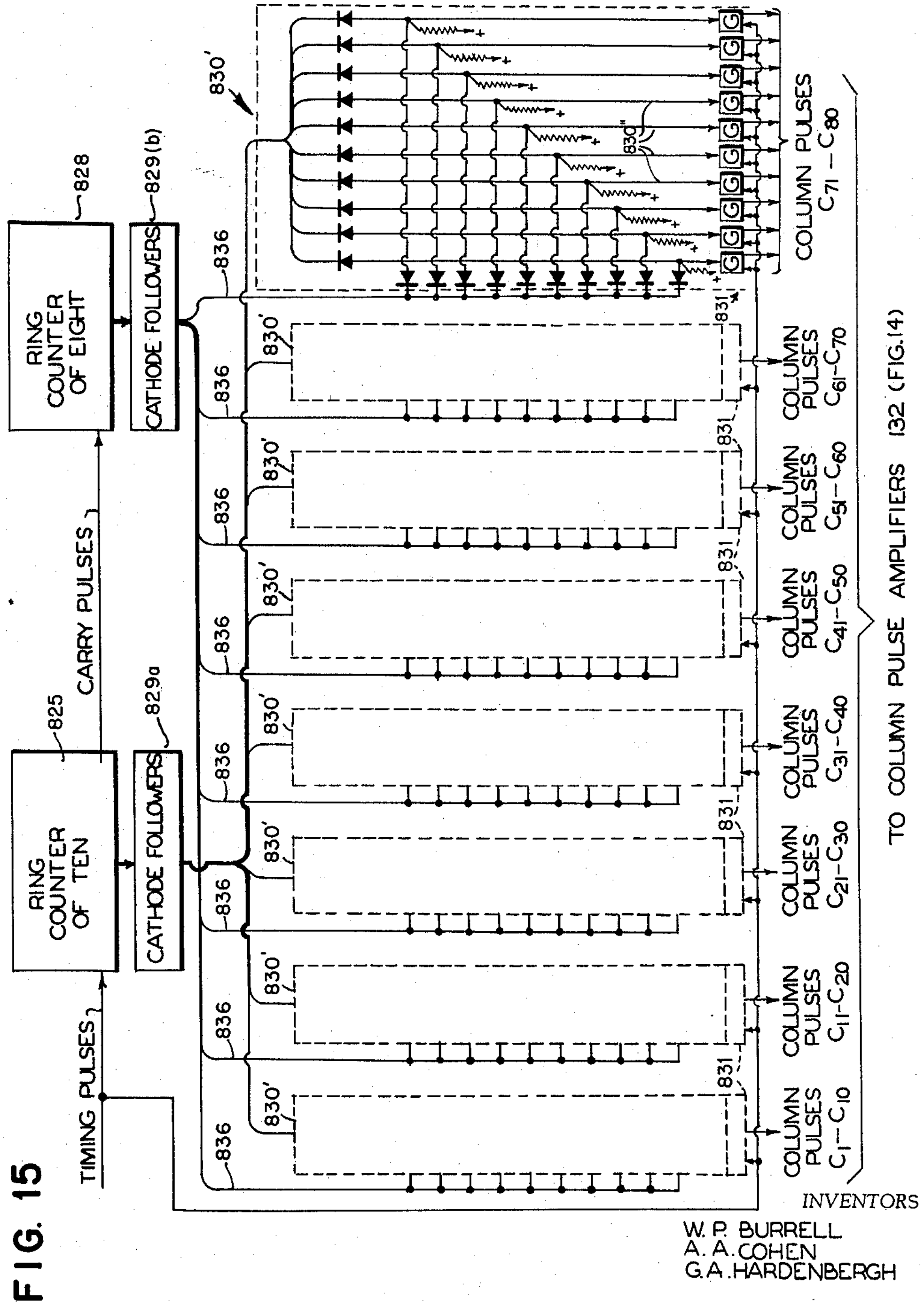

Figure 15 constitutes a diagram of further circuitry employed in the card reading and punching equipment of the present invention.

Figure 16:
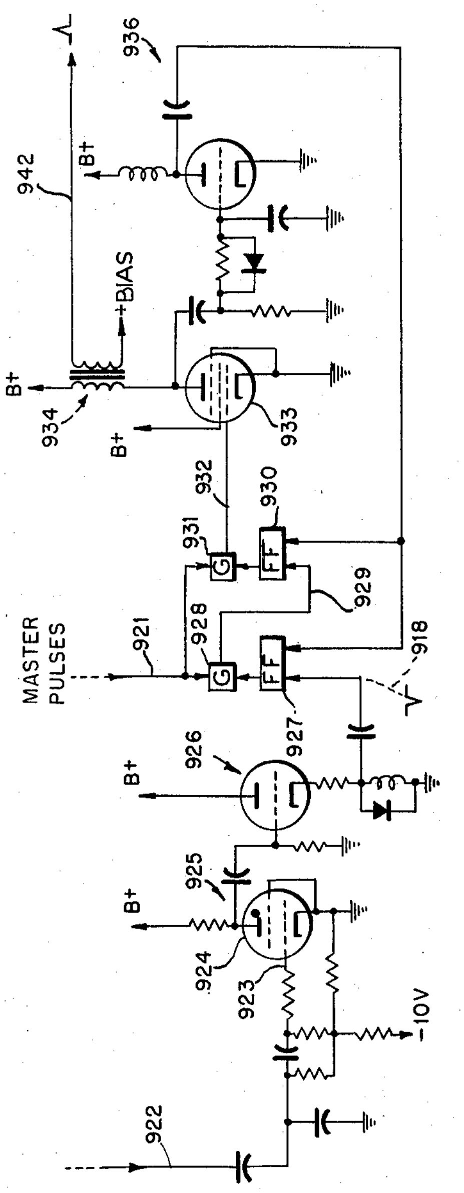

Figure 16 is a wiring diagram, partly in block form, of a single-pulse circuit.

Figures 17, 20:
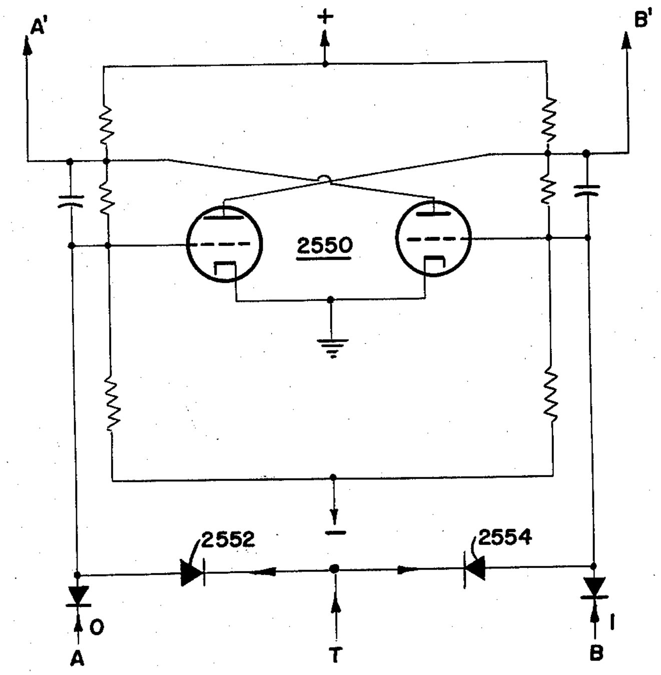

Figure 17 illustrates a chart of modes of operation of an adder circuit of the present invention.

Figure 18:
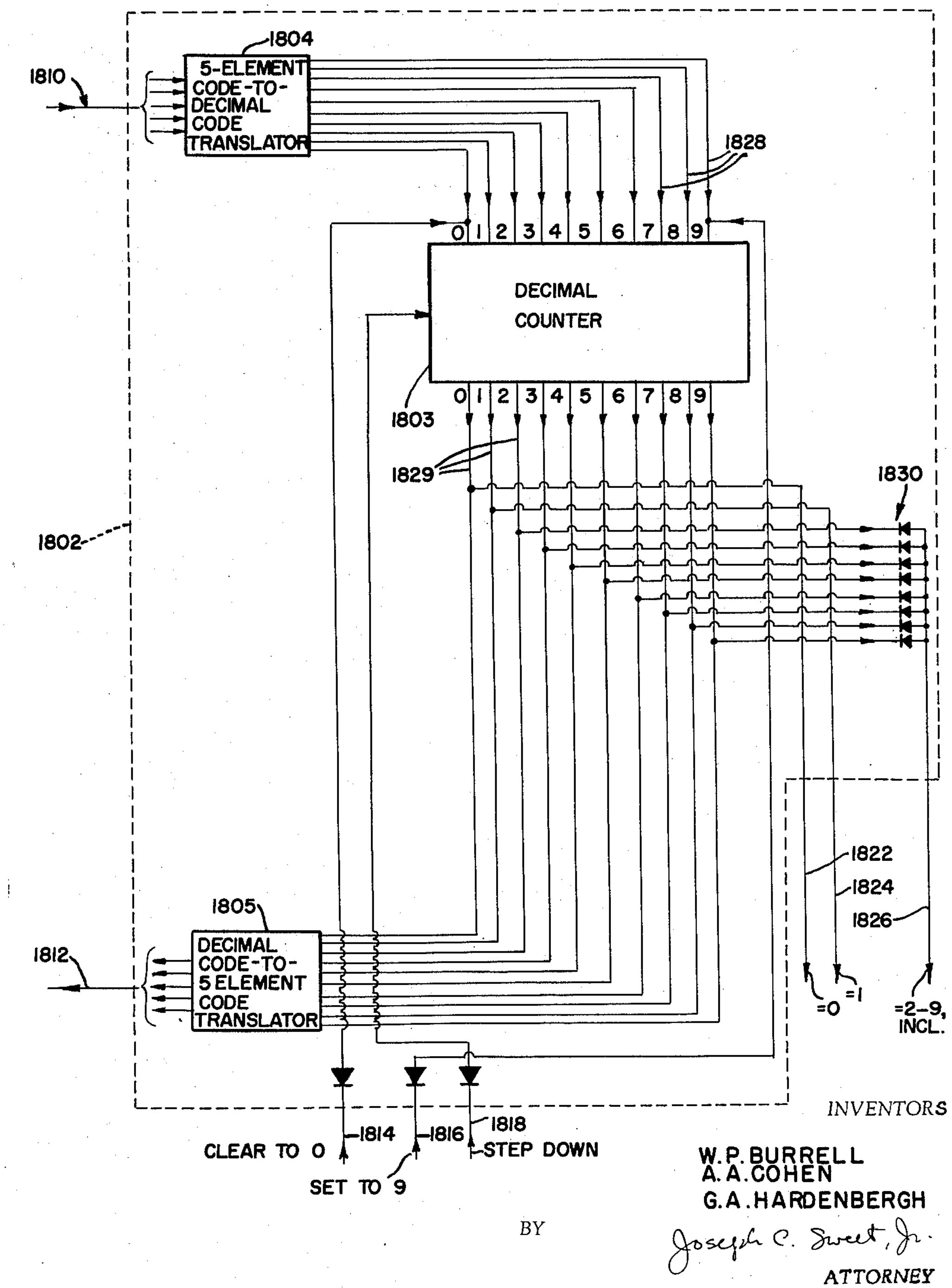

Figure 18 is a block diagram of a digit counter of the present invention.

Figure 19A:
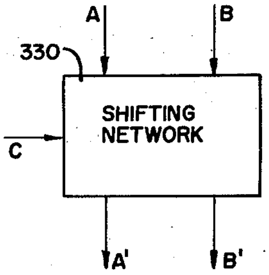

Figure 19A is a block diagram of a shifting network.

Figure 19B:
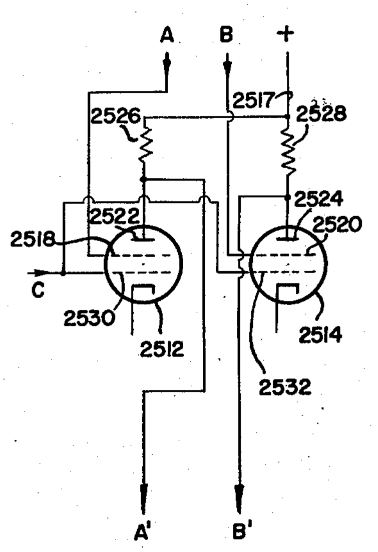

Figure 19B is a wiring diagram of the circuit of Figure 19A.

Figure 3A:
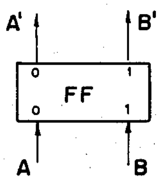
Figure 3A is a block diagram of a two-input flip-flop circuit.
Figure 3B:
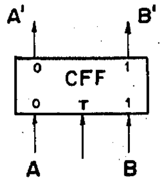
Figure 3B is a block diagram of a three-input or complementing flip-flop circuit.

Figure 20 is a schematic diagram of a complementing flip-flop circuit, which is shown in block diagram form in Figure 3B.

Figure 21:
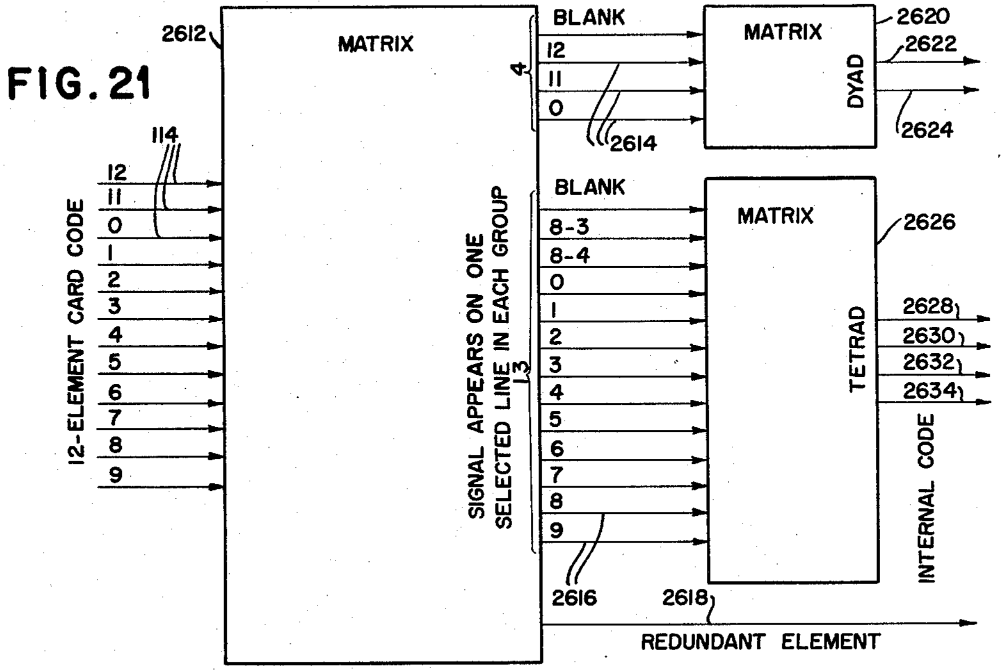

Figure 21 is a block diagram of a 12-to-7 code translator.

Figure 22:
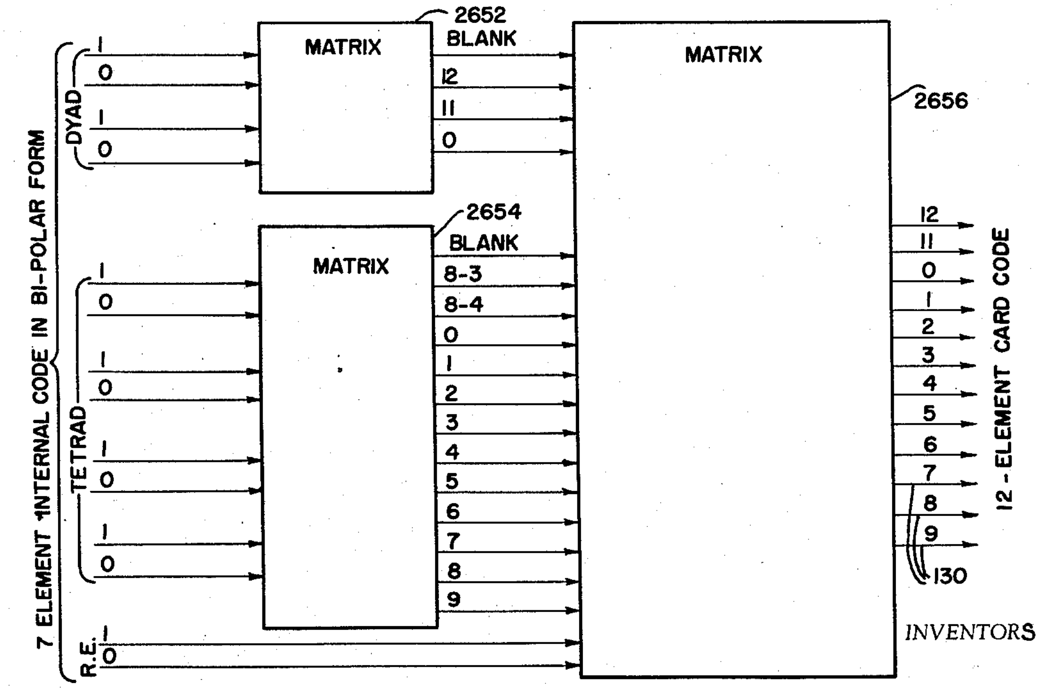

Figure 22 is a block diagram of a 7-to-12 code translator.

Figure 23:
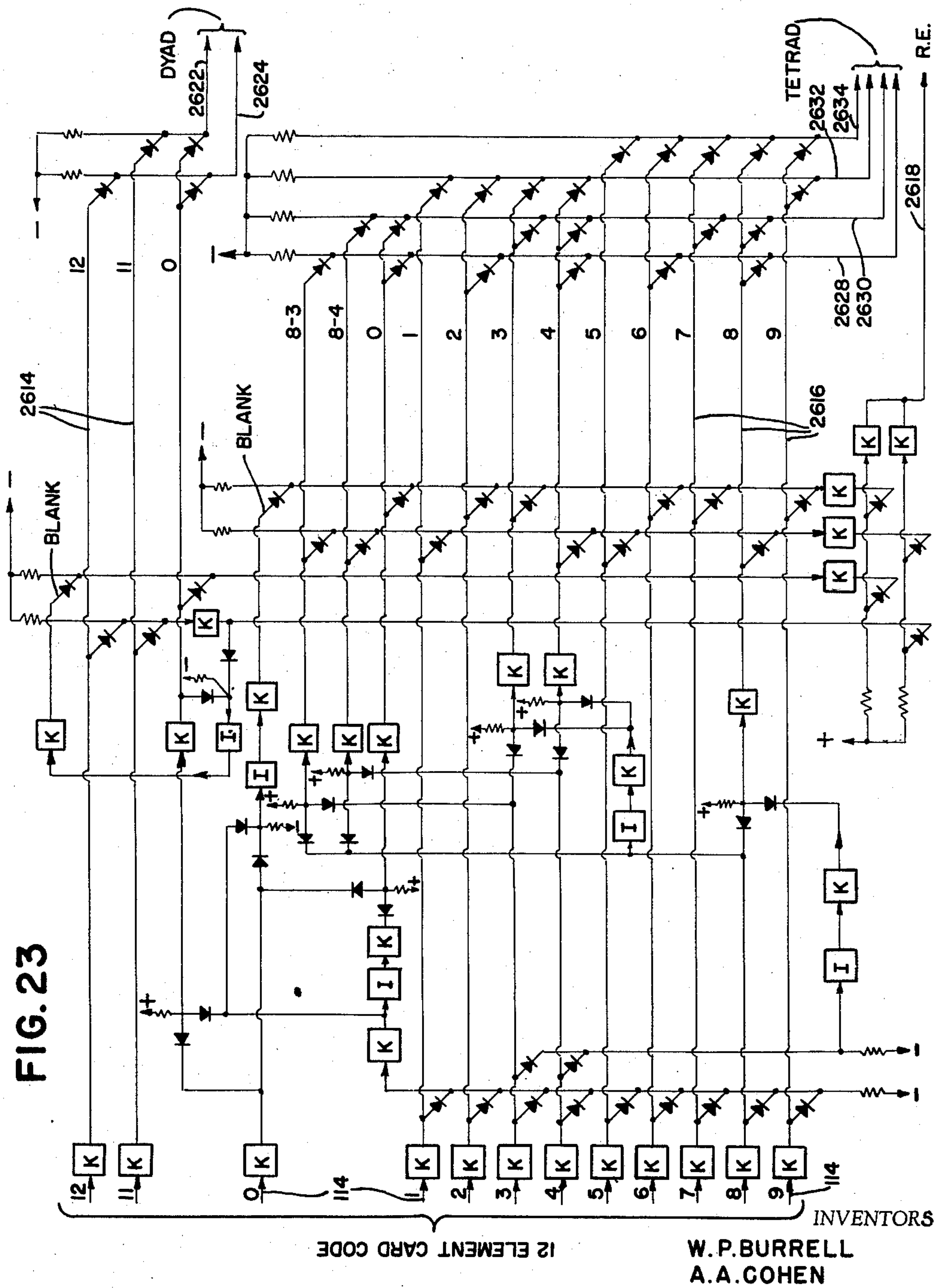

Figure 23 is a schematic diagram of the circuit of Figure 21.

Figure 24:
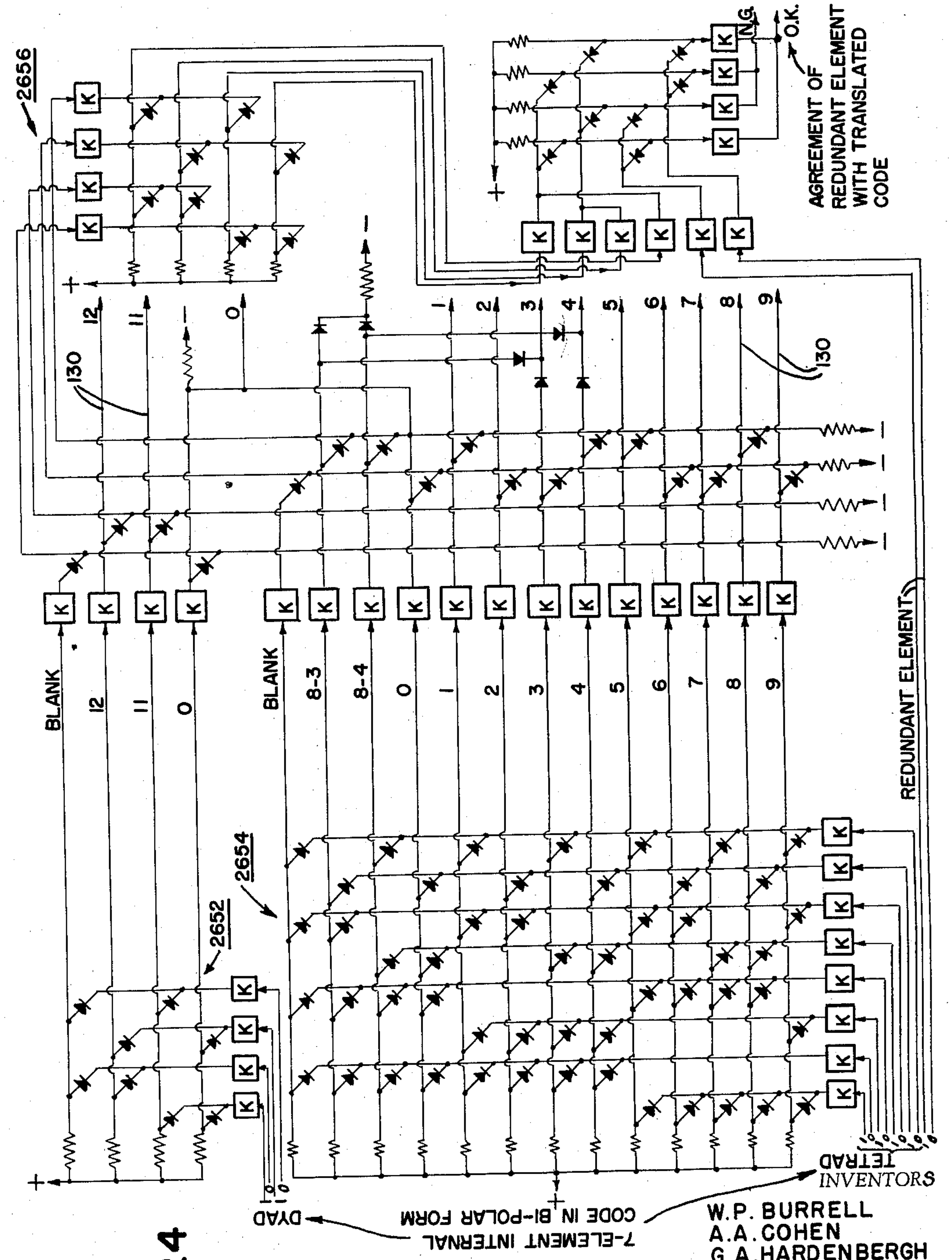

Figure 24 is a schematic diagram of the circuit of Figure 22.

Figure 25:
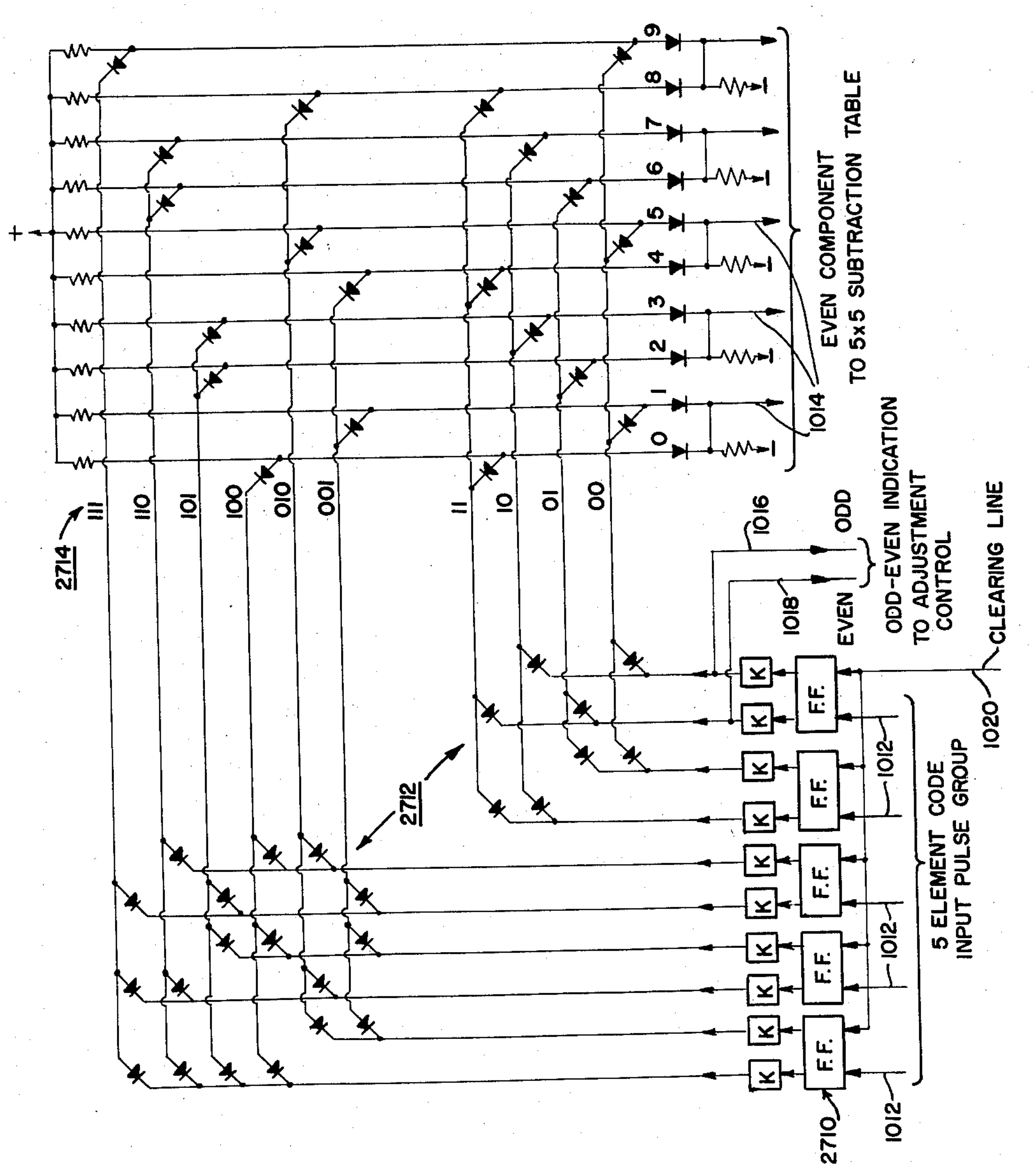

Figure 25 is a schematic diagram of an adder input translator matrix.

Figure 26:
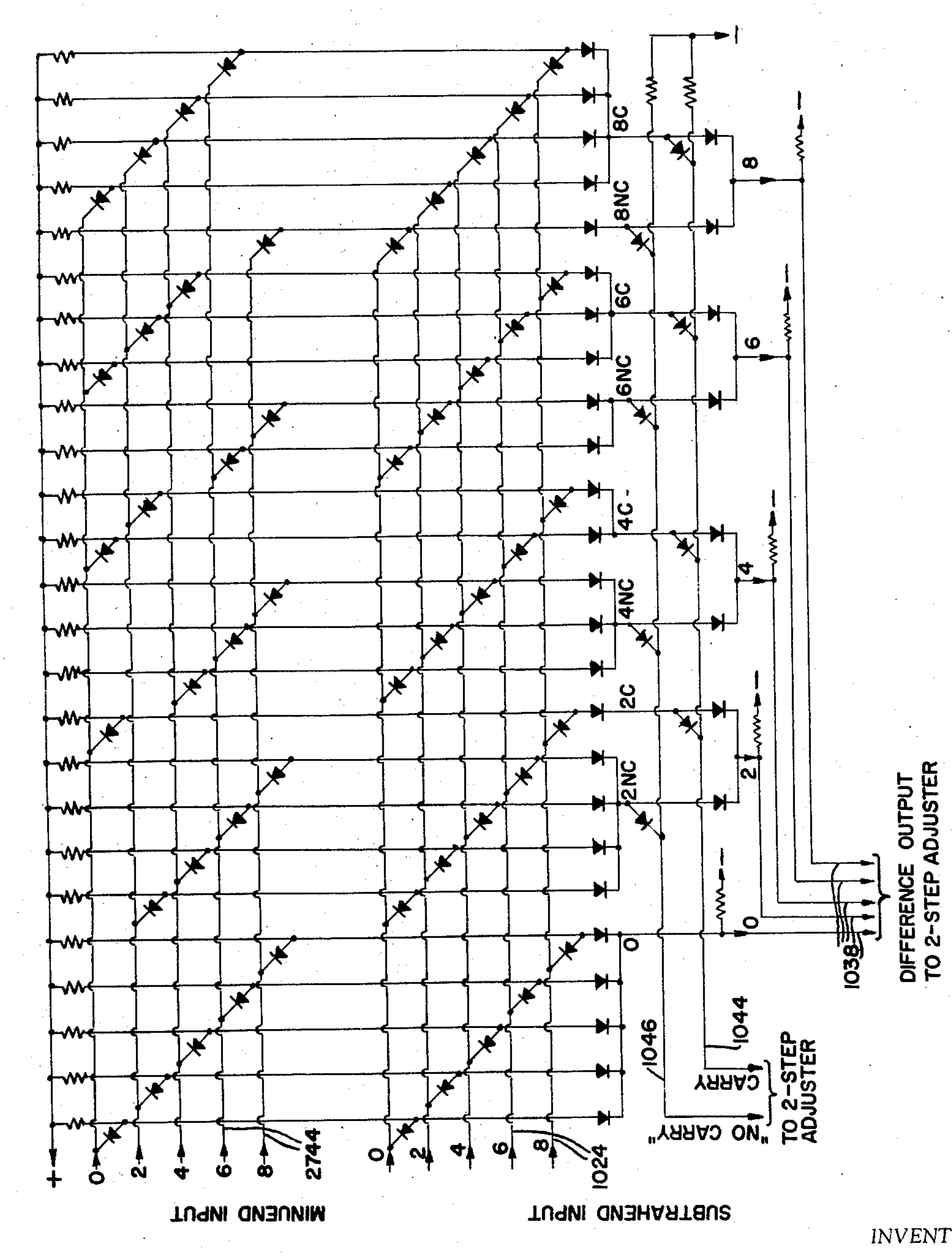

Figure 26 is a schematic diagram of an adder-subtractor table matrix.

Figure 27:
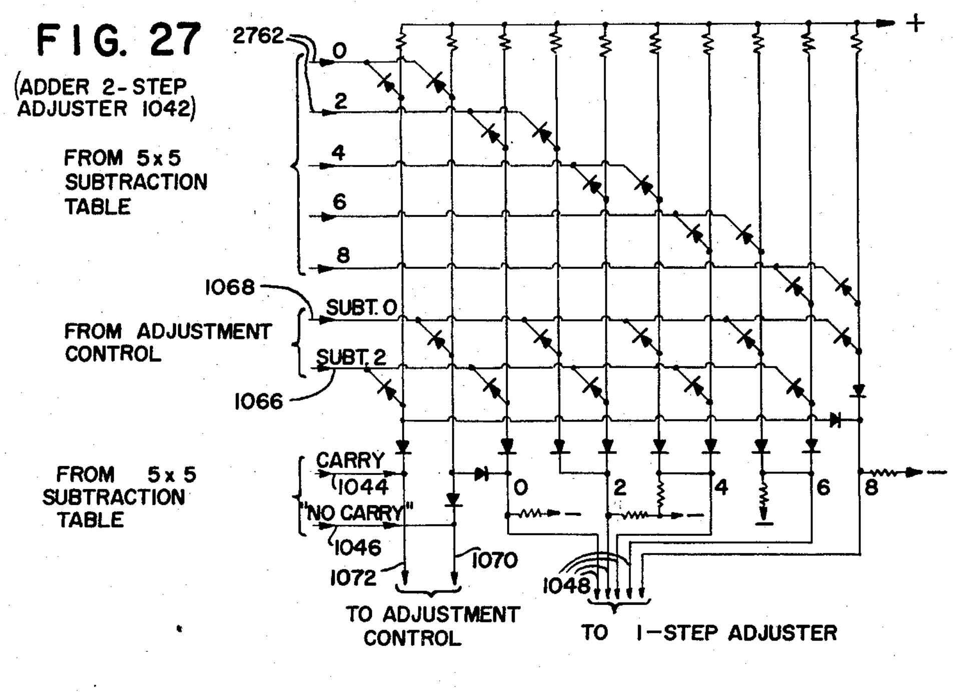

Figure 27 is a schematic diagram of an adder two-step adjuster matrix.

Figure 28:
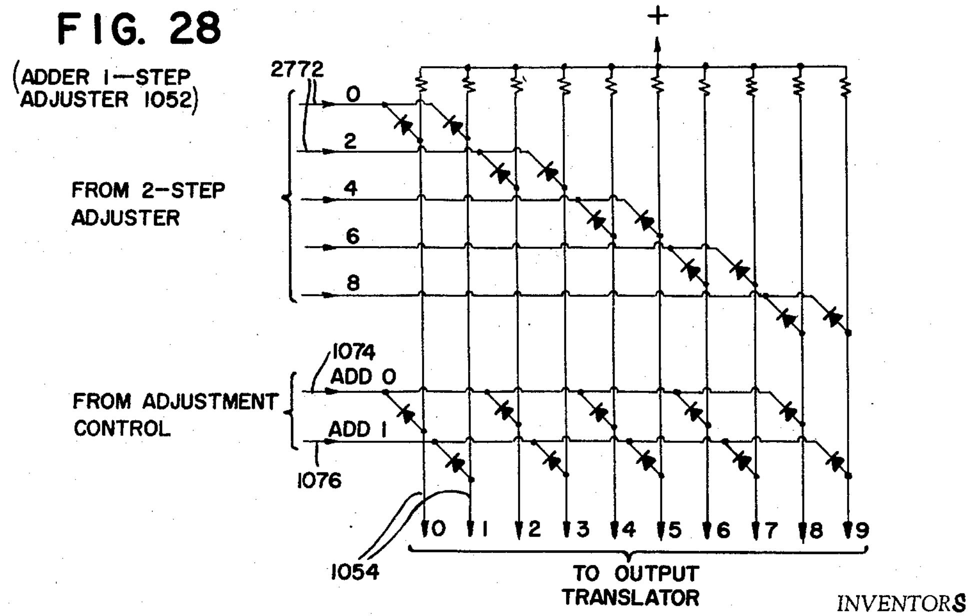

Figure 28 is a schematic diagram of an adder one-step adjuster matrix.

Figure 29 is a schematic diagram of an adder output translator matrix, and

Figures 30A–30H illustrate sample examples to demonstrate the operation of the invention.

It may be noted that Figures 10 and 12–16 of the present application are copied from Figures 1, 2, 3, 5, 6 and 7A, respectively, of our above-mentioned application, Serial No. 284,914, now Patent 2,718,356.

GENERAL DESCRIPTION

Figure 1:
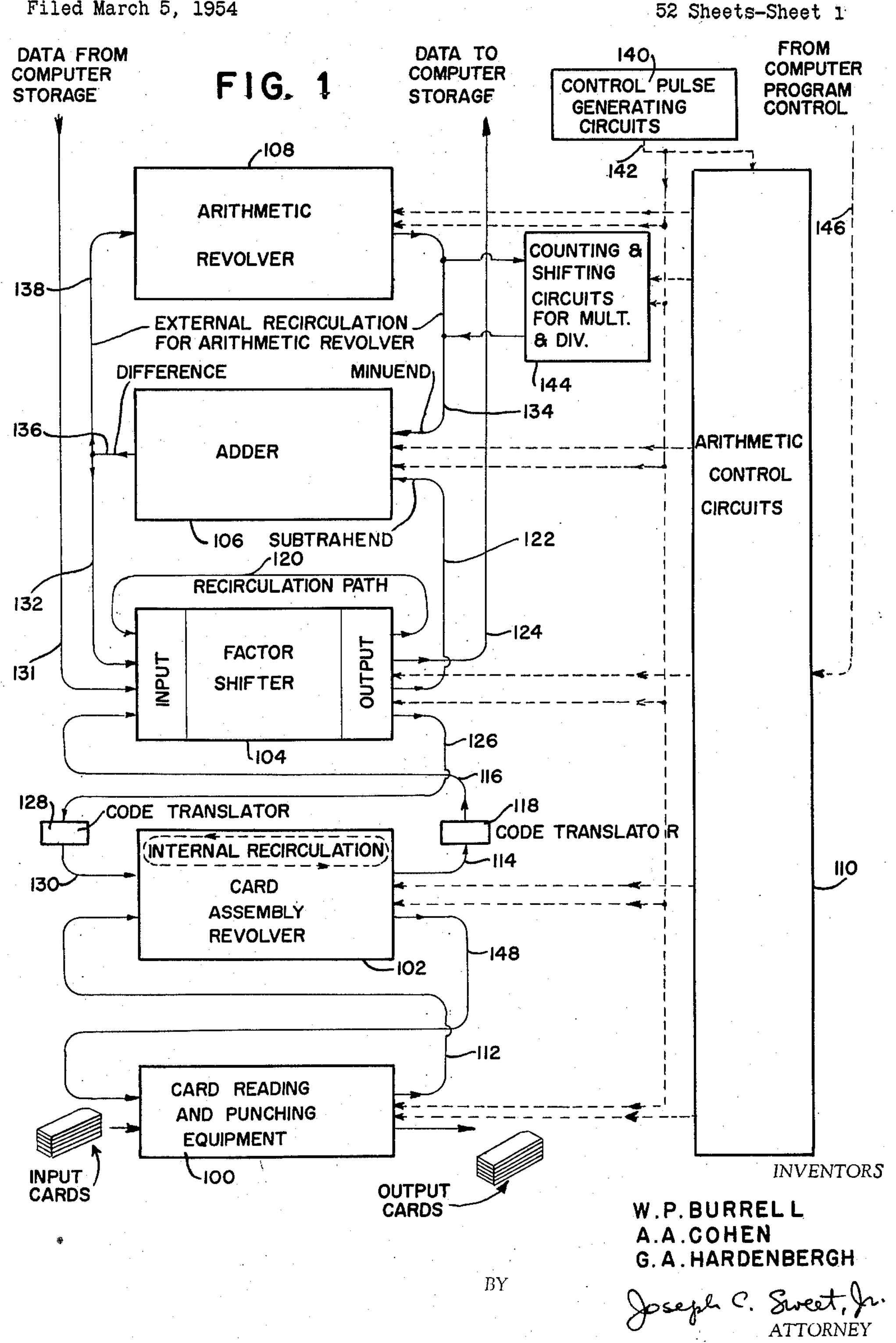
Figure 1 is a block diagram of the system of the present invention.

The general organization of the apparatus will be understood by reference to Figure 1, the main components of the apparatus being shown in block form and suitably designated by legend. These components are the Card Reading and Punching Equipment 100, a Card Assembly Revolver 102, a Factor Shifter 104, an Adder 106, an Arithmetic Revolver 108 and Arithmetic Control Circuits 110.

Basically the arrangement is such that one number, in digital form, will be caused to circulate serially between the Arithmetic Revolver 108 and the Adder 106, and, while the number is thus circulating, another number may be entered into the Adder from the Factor Shifter 104. Thus the numbers in passing through the Adder 106 combine in a predetermined manner, and the resulting number then circulates through the Arithmetic Revolver and Adder or is directed to the Factor Shifter for further routing.

In greater detail, in our above-mentioned co-pending application, Serial No. 284,914, and also hereinbelow, equipment corresponding to the Card Reading and Punching Equipment 100 and the Card Assembly Revolver 102 is described. Briefly, cards such as the well-known IBM cards form an input to the card reading equipment and the contents of the card in digital form are applied over line 112 to the Card Assembly Revolver 102, the contents of the card being converted into magnetic flux form on the surface of a revolving magnetizable member, preferably a drum having a magnetizable periphery. Thus the information is converted from what may be termed physical form, on the record card, to what will be termed a magnetic form on the drum of the Card Assembly Revolver. The magnetic image of the card on the drum of Card Assembly Revolver is constantly recirculated and is available for rapid access. One advantage of having the card data in such magnetic flux form is that in this form access time is greatly reduced compared to the access time with the data in physical form. That is, notwithstanding the fact that the novel equipment disclosed in our copending application provides extremely rapid reading of the data in physical form, nevertheless, the access time when the data is in magnetic form is even further reduced.

Having the contents of a record card in magnetic form on the drum of the Card Assembly Revolver, all or a portion of the card up to a number of predetermined size, such as, for example a 10 digit number, may be applied over lines 114 and 116 to the Factor Shifter 104. Preferably, the code of the data is changed in a code translator 118 connected between these lines 114 and 116.

As will be described more fully below, the Factor Shifter 104 is, preferably, a vacuum tube register for retaining a number in digital form, with means being provided for shifting and circulating the contents through *n* stages. Multiple inputs and outputs are provided, these being connected through circuits labelled "Input" and "Output," respectively.

For convenience, the invention will be described in terms of such a Factor Shifter 104 capable of containing a 10 digit number and an Arithmetic Revolver 108 capable of containing two 10 digit numbers, or a total of 20 digits, suitably set apart.

With a number in the Factor Shifter 104, the digits of this number may be circulated in sequence through the Factor Shifter by passage through a recirculation path designated 120, or, the number may be dispatched to three output lines, one being a line 122 leading to the Adder, the second being a line 124 leading to a storage unit, such as the magnetic drum storage section of a digital computer, and the third may be over line 126 returning to the Card Assembly Revolver 102 through a code translator 128 and a line 130 connecting the code translator with the Card Assembly Revolver 102.

The Factor Shifter may have two additional inputs supplementary to that over line 116 from the Card Assembly Revolver, the second input being over line 131 from a storage unit, and another input being over line 132 from the output of the Adder 106.

All arithmetic operations are performed by applying numbers as a minuend input to the Adder 106 over a line 134, and as a subtrahend input to the Adder over line 122. The Adder is of the "Subtractive" type, and the difference of the input numbers appears on Adder output line 136. Line 136 is connected via line 132 as one of the inputs to the Factor Shifter, as above described, and this line 136 is also connected via line 138 as an input to the Arithmetic Revolver 108. The output of the Arithmetic Revolver appears on the line 134, which as just described is the minuend input to the Adder.

It will assist in the complete understanding of the present invention if it be kept in mind that the Arithmetic Revolver 108, the minuend line 134, the Adder 106, the difference line 136 and the line 138 constitute a basic recirculation path over which a digital number flows in serial form. With a number revolving or recirculating over this path, at predetermined times a second number may be shifted from the Factor Shifter over line 122 as the subtrahend input of the Adder in predetermined synchronism with the number being inserted through the minuend input line 134, the result being a difference number issuing on the output line 136 of the Adder. This new number may then continue to circulate continuously through the Arithmetic Revolver and Adder or may be routed via line 132 through the Factor Shifter to one of its three outputs.

Control of the circuits is produced by a pulse generating unit 140 labelled in Figure 1 as the Control Pulse Generating Circuits. Basically, all digital movements throughout the circuitry will occur either at what may be termed a Master Pulse time or at other times between Master Pulse times and related, in time spacing, to the Master Pulses. In the specific embodiment described in detail below, a Master Control Pulse is provided followed by five so-called Phase control pulses A, B, C, D and E. The flow of these control pulses is diagrammatically indicated by the dashed lines leading from the output line 142 of the pulse circuit 140, there being dashed line branches extending to all of the circuit components.

The apparatus shown in Figure 1 is arranged to perform addition, subtraction, multiplication and division. In the performance of multiplication and division, it is necessary to employ counting and shifting circuits, and these are comprised in Figure 1 in the block designated 144.

The above mentioned Arithmetic Control Circuits 110 are employed for properly controlling the various components 100, 102, 104, 106, 108, and 144 for performing data conversion from cards to magnetic form and for performing arithmetic operations as desired. Control for the Arithmetic Control Circiuts 110 is provided over line 146 leading from a program control center, such as a digital computer program control section.

To describe the operation of the invention generally, it may be assumed that a given number in a card, such as a payroll rate, may be inserted in the Factor Shifter over line 116, or from computer storage over line 131. At this time, it may be assumed that a number 0 is circulating through the Arithmetic Revolver and Adder, that is, the digital number in serial form 0000000000 will be circulating in the Adder-Arithmetic Revolver path. The chosen number inserted in the Factor Shifter is next placed in the Arithmetic Revolver-Adder recirculation path by shifting this number from the output of the Factor Shifter via line 122 to the input of the Adder, complementing the number as it is shifted out of the Factor Shifter. Accordingly, the 9's complement of the chosen number will appear at the difference output line 136, and this number will then circulate in the Arithmetic Revolver-Adder path in place of the previous number 0000000000. For example, the payroll rate number may be 12, or in serial digit form 0000000012. Next, it may be desired to add to this number another number, say 5, indicating a wage rate increase. This number may be obtained from a card image, in magnetic form, on the Card Assembly Revolver and be shifted into the Factor Shifter, appearing therein as 0000000005. The Factor Shifter number may then be complemented and entered into the subtrahend input of the Adder, whereby the total appears at the difference output line 136 and may revolve through the Arithmetic Revolver-Adder re-circulation path. When desired, the number may be routed from line 136 to line 132 and thus be inserted into the Factor Shifter for subsequent routing to storage or to the Card Assembly Revolver.

It will be understood that the contents of the Card Assembly Revolver may be passed through line 148 to the card punching portion of the equipment 100 to punch the output cards.

An important aspect of the invention lies in the synchronizing of the circuitry by reliance upon a single rotatable member, such as a rotatable drum having a magnetizable surface.

Figure 2:
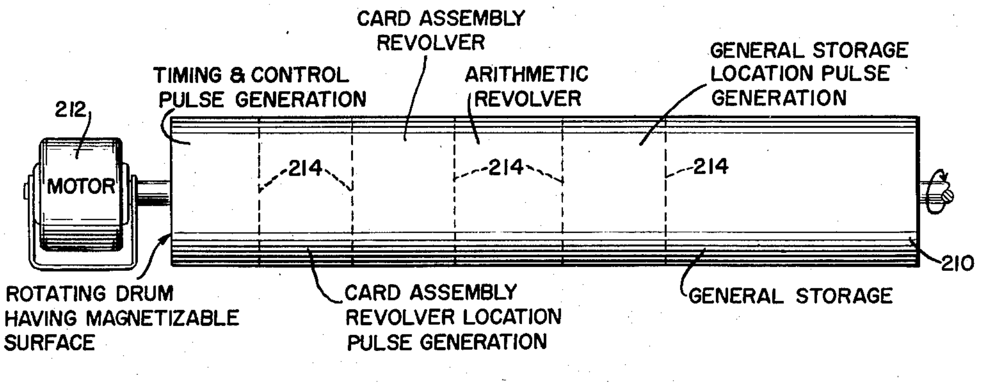
Figure 2 is a diagrammatic illustration of a rotatable magnetic drum employed in the invention.

Referring now to Figure 2, there is shown such a drum designated 210 driven by a suitable motor 212. Methods and apparatus for recording, storing and reading digital data in the form of magnetic flux spots or cells on the surface of a rotating drum or the like have been set forth in our copending application Serial No. 284,914 and in United States Patent No. 2,540,654, issued to Arnold A. Cohen et al. From these references it will be understood that a plurality of stationary magnetic transducers are positioned in close proximity to the surface of the drum 210 to operate in circumferential tracks on the drum surface.

For the purposes of the present invention, the surface of the drum may be divided into sections as indicated by the dashed lines 214 in Figure 2. These sections may be employed for Timing and Control Pulse Generation, for Card Assembly Revolver Location Pulse Generation for the Card Assembly Revolver, for the Arithmetic Revolver, for General Storage Location Pulse Generation, and for General Storage, all as suitably indicated by legend in Figure 2. It should be particularly noted that the portion of the drum 210 devoted to generation of timing and control pulses may form a part of the Control Pulse Generating Circuits, designated as 140 in Figure 1.

In this invention, provision of a single drum 210 provides absolute synchronization of all components of the circuitry without requiring maintenance of absolutely constant drum speed. Thus, the arrangement is far more simple than that provided by independent pulse generators, the frequency of which may vary relatively. While it is desirable to provide a motor 212 which can be maintained within fairly close limits of speed, nevertheless an appreciable range of speed variation is possible, since all operations are tied to the magnetic spots or cells passing the transducers in predetermined sequence, thus preventing one section, of the circuitry from changing its operation in time sequence with respect to other sections of the circuitry.

CIRCUIT TERMINOLOGY

Detailed circuitry for the major components of the invention as shown in Figure 1 will now be described. However, before proceeding with the detailed description, some of the more commonly used basic circuit elements and units will be described in connection with the block symbols of Figures 3A, 3B and 4–8, inclusive.

*Flip-flops*

Referring to Figure 3A, there is illustrated a block to represent a conventional flip-flop or Eccles-Jordan circuit. Within the block is the legend FF representing the words "flip-flop" and this block also contains a 0 and a 1 for indicating the 0 and 1 states of the flip-flop. There is also indicated an A input to the 0 side and a B input to the 1 side. Above the A input is an A′ output and above the B input is a B′ output. In operation, the flip-flop will be in its 1 state when a relatively positive potential appears on B′ and a relatively low potential on A′, the flip-flop being in the 0 state when A′ is high and B′ is low. With the flip-flop set at 1, a pulse on A will set the circuit to 0 but further pulses of the same polarity on A will not shift the circuit. With the flip-flop set at 0, a pulse on B will set the circuit to 1, but further pulses of the same polarity on B will not shift the circuit. In the flip-flop circuits described herein it has been found preferable to use negative pulses to the inputs A and B.

Figure 3B is similar to Fig. 3A except that a third input marked T is provided, and the circuit block accordingly has the legend CFF placed therein to abbreviate the words "complementing flip-flop." The T input provides means for shifting the flip-flop from whatever state it is in to the opposite state upon the application of a negative pulse at T. This circuit is described in greater detail below under the heading Complementing flip-flop.

*Gates*

Figure 4:
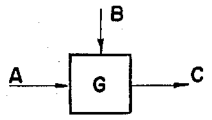
Figure 4 is a block diagram of a gate circuit.

Referring to Figure 4, a conventional gate circuit is shown in block form having two inputs A and B and one output line C. This may comprise a conventional multi-grid vacuum tube circuit wherein a signal of predetermined type on one input must coexist with another such signal on the other input. Normally, the inputs will be required to be relatively positive potentials in order for a negative-going output to appear on line C. It will be understood that the shortest of the coexistent inputs will determine the length of the output signal, or at least the overlap time of the inputs will so determine the output.

*Blocking diodes*

Figure 5:
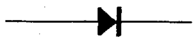
Figure 5 is an illustration of a blocking diode circuit.

Referring to Figure 5, the diode is designated by the usual solid arrowhead and bar. The solid arrowhead portion of the symbol for a crystal diode indicates the direction of easy conventional current flow. The symbol for a crystal diode may be compared with that for a vacuum-tube diode by considering the solid arrowhead equivalent to an anode and the bar to a cathode.

*Single pulse circuits*

Figure 6:
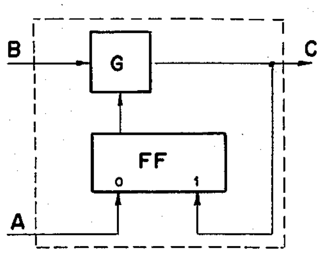
Figure 6 is a block diagram of a single-pulse circuit.

Referring to Figure 6, there is illustrated a flip-flop and gate, interconnected in such manner that a signal on input A will set the flip-flop to 0 to open or enable the gate G to pass a subsequent pulse appearing on input B. This subsequent pulse may be applied to further use on output C and also shifts the flip-flop to its 1 state to prevent further pulse transmission through the gate until reoccurrence of a signal on line A. The occurrence of a signal on line B will pass a full-size pulse through the gate before the existence of the signal on output line C effects closure or disabling of the gate.

*Pulse inverters*

Figure 7:
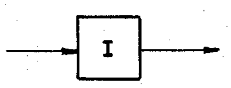
Figure 7 is a block illustration of a pulse-inverting circuit.

Referring to Figure 7, where it is necessary to invert a pulse from positive to negative or from negative to positive, a pulse inverting circuit is employed, this being represented by a block containing the letter I.

*Cathode followers*

Figure 8:
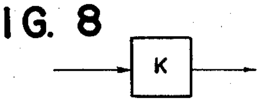
Figure 8 is a block illustration of a cathode follower circuit.

Referring to Figure 8, cathode follower circuits are designated by a letter K within a block.

FACTOR SHIFTER

The Factor Shifter will now be described in detail with reference to Figures 9P, Q, R and S. (The layout of Figures 9A–9Z is indicated in Figure 9AA.) By way of example only, the Factor Shifter is illustrated (Figs. 9R and 9S) as having a capacity of 10 digits, there being a unit's stage ($10^0$), 8 stages $10^9$–$10^2$ (only stage $10^9$ of which is shown), and a ten's stage ($10^1$). These stages are indicated by corresponding legends in Figures 9R and 9S.

In each stage, one digit is retained in binary coded form in seven flip-flop circuits designated (Figs. 9R and 9S) 310(*a*) through 310(*g*).

Referring first to the unit's stage, each of its flip-flops 310(*a*)–310(*g*) (Figs. 9R and 9S) is connected to be cleared or set to its 0 state by a negative pulse applied over a Loading Shift Line 312. With each flip-flop of the unit's stage at 0, a digit in binary coded form may be set into the register consisting of these flip-flops 310(*a*)–310(*g*) in the following manner: What is termed a tetrad input is applied in binary coded pulse form to the 1 side of the group of four flip-flops 310(*a*)–310(*d*) via lines 314(*a*)–314(*d*) (Fig. 9R). What is termed a dyad input is applied in pulse form to the 1 side of the group of two flip-flops 310(*e*) and 310(*f*) (Fig. 9S) via lines 314(*e*) and 314(*f*), again in binary coded form. The final input, termed a redundant element input, is applied to the 1 side of the complementing flip-flop 310(*g*) (Fig. 9S) via line 314(*g*).

Assuming that the digit in binary coded form is retained in the unit's order flip-flop register comprising these flip-flops 310(*a*)–310(*g*), the outputs of these flip-flops, in binary coded form, are connected through respective cathode followers K to the 1 output lines 322(*a*)–322(*g*) and also to the 0 output lines 324(*a*)–324(*g*). Referring briefly to Figure 1, the just mentioned output lines are available for connection to the Factor Shifter output lines 122, 124 and 126, leading, respectively, to the Adder, the storage unit and the Card Assembly Revolver.

Supplemental to the just described output lines, the outputs of the flip-flops 310(*a*)–310(*g*) of the unit's order stage are also connected over the 1 lines 326(*a*)–326(*g*) and the 0 lines 328(*a*)–328(*g*) to the inputs of the vacuum tube shifting circuits 330(*a*)–330(*a*) in the $10^9$ order stage of the Factor Shifter. The circuits 330(*a*)–330(*g*) are described in detail below under the heading Vacuum Tube Shifting Networks and are shown in Figures 19A and 19B. The function of each of these circuits is to pass to its respective output the setting of the flip-flop connected to its input upon the occurrence of a pulse on a line 332. The outputs of these shifting circuits 330(*a*)–330(*g*) are connected as inputs to the flip-flops 310(*a*)–310(*g*) of this $10^9$ order stage of the Factor Shifter, and upon occurrence of the pulse on line 332, these flip-flops will be set, respectively, to correspond to the setting of the flip-flops 310(*a*)–310(*g*) in the unit's order stage.

An explanation of the tetrad, dyad and redundant element inputs will be given below under the heading Codes.

As will be developed below, it may be desired, at times, to set the Factor Shifter so that it has a positive (+) sign. For this purpose, a line 316 (Fig. 9S) is provided, which may be pulsed negatively. This line is connected via a diode to the 1 side of flip-flop 310(*f*) and is also connected via a diode to the T terminal of the complementing flip-flop 310(*g*). As described above in connection with Figure 3B, the T connection provides means for shifting this flip-flop 310(*g*) from whatever state it is in to the opposite state upon the application of a negative pulse at T, thereby complementing this redundant flip-flop. This circuit is described in detail below under the heading Complementing Flip-Flop and is shown in Figure 20.

At other times it may be desired to set the Factor Shifter sign negative (—). For this purpose, there is provided a line 318 which also may be negatively pulsed. This line is connected to the 1 side of flip-flop 310(*e*) and is also connected to the T input of flip-flop 310(*g*).

At other times it may be desired to clear the Factor Shifter sign, and for this purpose there is provided a line 320 which is connected to the 0 sides of flip-flops 310(*e*) and 310(*f*). As will appear below, due to the coding employed, the sign digit will always have a redundant element that is complementary to that associated with the same digit without sign indication. Thus, when the dyad element is cleared, the redundant element is complemented, this being achieved by the connection of Clear F.S. Sign Line 320 to the input T through blocking diode 321.

At this point it may be noted that, while not described specifically, many of the input circuits of the present invention include blocking diodes to prevent undesired back circuits, as shown in the figures.

As indicated by the dashed lines between stage $10^9$ and the ten's stage of the Factor Shifter, a similar connection between the outputs of flip-flops 310(*a*)–310(*g*) in each stage and a respective shifting circuit 330(*a*)–330(*g*) in the next stage is repeated, this type of connection continuing from stage $10^9$ to stage $10^8$, stage $10^8$ to stage $10^7$, etc., and finally from the ten's stage to the unit's stage, as shown, where a final set of shifting circuits 330(*a*)–330(*g*) provides the inputs to the first-mentioned flip-flops 310(*a*)–310(*g*) of the unit's order stage. Thus it is seen that there is a complete ring of flip-flop stages through which a digit, entered in the unit's stage, may be circulated.

Assuming the complete Factor Shifter to be set to 0 (all flip-flops 310(*a*)–310(*g*) in all stages at 0), the Factor Shifter may be loaded by applying the desired digit in binary coded form to the tetrad, dyad and redundant element inputs, respectively, to set some or all of the flip-flops 310(*a*)–310(*g*) of the unit's order stage to 1, as called for by the particular permutation representative of the applied digit. Subsequently, as upon the occurrence of a pre-selected control pulse, the Loading Shift Line 312 may be pulsed, and this pulse will be applied not only to reset the flip-flops 310(*a*)–310(*g*) of the unit's order stage to 0, but will also be applied via branch line 312', diode 329, and inverter 331 to pulse the lines 332 which enable the shifting circuits 330(*a*)–330(*g*) of each of the stages $10^9$–$10^1$. It is to be noted, however, that the pulse on this line 312' is blocked by diode 333 from enabling the shifting networks 330(*a*)–330(*g*) in the unit's order stage. Repeated application of binary coded digits to the tetrad, dyad and redundant element inputs of the units order stage, followed in sequence by intervening pulses on the Loading Shift Line, will load the Factor Shifter up to and including the ten's stage by repeatedly shifting the contents of each stage into the next stage, as will now be clear. To completely fill the Factor Shifter by finally moving the digit of the ten's stage into the unit's order stage, following the entry of the 10th or last digit into the unit's order stage, a Circular Shift Line 334 may be pulsed instead of the Loading Shift Line 312. It will be noted that the Circular Shift Line enables the shifting circuits 330(*a*)–330(*g*) of all stages of the Factor Shifter, the connection to the unit's stage circuits being via inverter 335, and that to the circuits of the other stages being via diode 333 and inverter 331.

A numerical example illustrating the manner in which a digit is inserted and shifted in the Factor Shifter may be helpful. The following Table A illustrates the sequence in loading the Factor Shifter, either from General Storage (Fig. 2) or from the Card Assembly Revolver via the 12–7 translator. In the following tables, an X indicates that the particular stage of the Factor Shifter is cleared during this step. Further, the letter MP in the left-hand column indicates Master Pulse time, and C indicates the time of the clearing operation, at C pulse time between Master Pulses. In Table A, it is assumed that the previous number in the Factor Shifter was 2468246824 and that the number being inserted is −1357913579. The unit's digit is inserted first, along with the sign of the number.

TABLE A

| | | | | | | | | | | | |
|---|---|---|---|---|---|---|---|---|---|---|---|
| MP--- | 2 | 4 | 6 | 8 | 2 | 4 | 6 | 8 | 2 | 4 | Field Begin. |
| C------ | 4 | 2 | 4 | 6 | 8 | 2 | 4 | 6 | 8 | X | |
| MP--- | 4 | 2 | 4 | 6 | 8 | 2 | 4 | 6 | 8 | −9 | |
| C------ | −9 | 4 | 2 | 4 | 6 | 8 | 2 | 4 | 6 | X | |
| MP--- | −9 | 4 | 2 | 4 | 6 | 8 | 2 | 4 | 6 | 7 | |
| C------ | 7 | −9 | 4 | 2 | 4 | 6 | 8 | 2 | 4 | X | |
| MP--- | 7 | −9 | 4 | 2 | 4 | 6 | 8 | 2 | 4 | 5 | |
| C------ | 5 | 7 | −9 | 4 | 2 | 4 | 6 | 8 | 2 | X | |
| MP--- | 5 | 7 | −9 | 4 | 2 | 4 | 6 | 8 | 2 | 3 | |
| C------ | 3 | 5 | 7 | −9 | 4 | 2 | 4 | 6 | 8 | X | |
| MP--- | 3 | 5 | 7 | −9 | 4 | 2 | 4 | 6 | 8 | 1 | |
| C------ | 1 | 3 | 5 | 7 | −9 | 4 | 2 | 4 | 6 | X | |
| MP--- | 1 | 3 | 5 | 7 | −9 | 4 | 2 | 4 | 6 | 9 | |
| C------ | 9 | 1 | 3 | 5 | 7 | −9 | 4 | 2 | 4 | X | |
| MP--- | 9 | 1 | 3 | 5 | 7 | −9 | 4 | 2 | 4 | 7 | |
| C------ | 7 | 9 | 1 | 3 | 5 | 7 | −9 | 4 | 2 | X | |
| MP--- | 7 | 9 | 1 | 3 | 5 | 7 | −9 | 4 | 2 | 5 | |
| C------ | 5 | 7 | 9 | 1 | 3 | 5 | 7 | −9 | 4 | X | |
| MP--- | 5 | 7 | 9 | 1 | 3 | 5 | 7 | −9 | 4 | 3 | |
| C------ | 3 | 5 | 7 | 9 | 1 | 3 | 5 | 7 | −9 | X | |
| MP--- | 3 | 5 | 7 | 9 | 1 | 3 | 5 | 7 | −9 | 1 | Field End. |
| C------ | 1 | 3 | 5 | 7 | 9 | 1 | 3 | 5 | 7 | −9 | |
| MP--- | 1 | 3 | 5 | 7 | 9 | 1 | 3 | 5 | 7 | 9 | Start Arithmetic Operation. |

As another example, in the following Table B is shown a similar sequence for a short field, i.e., the digit being entered is less than the Factor Shifter capacity of ten digits. In this table, it has been assumed that the initial contents are the same as in Table A, i.e., 2468246824, and that the number being inserted is +9753.

TABLE B

| | | | | | | | | | | | |
|---|---|---|---|---|---|---|---|---|---|---|---|
| MP--- | 2 | 4 | 6 | 8 | 2 | 4 | 6 | 8 | 2 | 4 | Field Begin. |
| C------ | 4 | 2 | 4 | 6 | 8 | 2 | 4 | 6 | 8 | X | |
| MP--- | 4 | 2 | 4 | 6 | 8 | 2 | 4 | 6 | 8 | +3 | |
| C------ | +3 | 4 | 2 | 4 | 6 | 8 | 2 | 4 | 6 | X | |
| MP--- | +3 | 4 | 2 | 4 | 6 | 8 | 2 | 4 | 6 | 5 | |
| C------ | 5 | +3 | 4 | 2 | 4 | 6 | 8 | 2 | 4 | X | |
| MP--- | 5 | +3 | 4 | 2 | 4 | 6 | 8 | 2 | 4 | 7 | |
| C------ | 7 | 5 | +3 | 4 | 2 | 4 | 6 | 8 | 2 | X | |
| MP--- | 7 | 5 | +3 | 4 | 2 | 4 | 6 | 8 | 2 | 9 | Field End. |
| C------ | 9 | 7 | 5 | +3 | 4 | 2 | 4 | 6 | 8 | X | |
| MP--- | 9 | 7 | 5 | +3 | 4 | 2 | 4 | 6 | 8 | 0 | |
| C------ | 0 | 9 | 7 | 5 | +3 | 4 | 2 | 4 | 6 | X | |
| MP--- | 0 | 9 | 7 | 5 | +3 | 4 | 2 | 4 | 6 | 0 | |
| C------ | 0 | 0 | 9 | 7 | 5 | +3 | 4 | 2 | 4 | X | |
| MP--- | 0 | 0 | 9 | 7 | 5 | +3 | 4 | 2 | 4 | 0 | |
| C------ | 0 | 0 | 0 | 9 | 7 | 5 | +3 | 4 | 2 | X | |
| MP--- | 0 | 0 | 0 | 9 | 7 | 5 | +3 | 4 | 2 | 0 | |
| C------ | 0 | 0 | 0 | 0 | 9 | 7 | 5 | +3 | 4 | X | |
| MP--- | 0 | 0 | 0 | 0 | 9 | 7 | 5 | +3 | 4 | 0 | |
| C------ | 0 | 0 | 0 | 0 | 0 | 9 | 7 | 5 | +3 | X | |
| MP--- | 0 | 0 | 0 | 0 | 0 | 9 | 7 | 5 | +3 | 0 | |
| C------ | 0 | 0 | 0 | 0 | 0 | 0 | 9 | 7 | 5 | +3 | |
| MP--- | 0 | 0 | 0 | 0 | 0 | 0 | 9 | 7 | 5 | 3 | Start Arithmetic Operation. |

In both the tables, the numbers shown are those which would be present after the indicated pulse, since the pulse initiates the transition.

In connection with Tables A and B, operation of the Loading Shift Line 312 clears the rightmost column, shifting its contents to the leftmost column. The remaining digits are shifted one place to the right with the exception of the second column from the right, whose contents are lost. Thus, one pulse on the Loading Shift Line will cause the previous unit's digit to appear in the leftmost column, the previous ten's digit will disappear, the previous hundred's digit will become the ten's digit, and the unit's stage will be cleared. The Circular Shift Line 334 shifts the contents of the Factor Shifter circularly to the right, so that the digit which was in the rightmost position appears in the leftmost position. Note again, particularly, that the unit's column of the Factor Shifter is the sole position of the Factor Shifter into which digital information may be inserted from the other circuits, or from which information may be read to other circuits.

Note also that the sign of the number in the Factor Shifter is associated with one digit only. The sign information appears in the dyad portion of the unit's column of a number, and when a number is read into the Factor Shifter from General Storage or from the Card Assembly Revolver, the unit's column of the Factor Shifter will therefore contain the sign information in its dyad portion. Since the sign information influences either the arithmetic process to be followed (in addition and subtraction) or the sign of the result (in entry, multiplication, and division), the sign must be sensed by the Arithmetic Control Circuits. As pointed out above, due to the coding system employed, the sign digit will always have a redundant element that is complementary to that associated with the same digit without sign indication. Since the Adder deals only with the tetrad and the redundant element, a correction must be made to the redundant element of the unit's column before an arithmetic operation is started. Thus, a preliminary step in all arithmetic operations, starting with a number in the Factor Shifter, is the reading of the Factor Shifter sign information and its translation into either the result sign or the process to be followed. Then the dyad is cleared and the redundant element complemented.

Similarly, when a number is read from the Arithmetic Revolver to the Factor Shifter, the sign of the number in the Arithmetic Revolver must be read into the dyad of the unit's column and the redundant element must be complemented. Lines 316 and 318 (Fig. 9S) are provided for this purpose.

The Factor Shifter may be loaded from a field of any length from one to ten digits, inclusive. If it is loaded from a field of less than ten digits, the remainder of its ten-digit capacity must be filled with zeros, as shown in Table B, so that the Factor Shifter will contain a true representation of the number in correct alignment. To achieve this, gate 336 (Fig. 9T) is provided, as will be explained more fully below under the heading Factor Shifter Control, this gate 336 being connected via line 337 and blocking diode 338 to redundant element line 314($g$) (see Fig. 9U) and through respective blocking diodes 340 and 342 to lines 314($a$) and 314($b$) of the tetrad input (see Fig. 9T). As will be apparent from the ensuing description entitled "Codes," these are the particular input lines of the Factor Shifter which must be pulsed to insert a coded zero therein.

CODES

In the above description of the Factor Shifter, the inputs thereto on the lines 314($a$)–314($g$) are designated, respectively, as the tetrad input on lines 314($a$)–314($d$), the dyad input on lines 314($e$) and 314($f$), and a redundant element input on line 314($g$). These inputs pertain to what is called an internal machine code, in contrast to the twelve element code of the twelve punching positions on the record cards. For purposes of circuit economy and for other reasons which will appear more fully later, it is the purpose of the Code Translators 118 and 128 in Figure 1 to convert the code from twelve to seven elements.

Referring to Figure 11, there is illustrated a table useful in describing the code. Within the grid 4 blocks wide by 13 blocks high appear various notations including numerals, letters, punctuation marks, etc. Across the top of the grid, starting at the left, the left-hand vertical row is marked "Blank," the next is marked 12, the next 11, and the right-hand column is marked 0. To the left of each vertical row, the upper horizontal row is marked "Blank," the next lower row 8–3, the next 8–4, and continuing, respectively, 0 through 9. As indicated by the legends placed at the upper left-hand corner of the grid, the just mentioned markings constitute the card code, those markings across the top of the grid representing what will be termed the zone punch of the card, while the markings extending down the left-hand side of the grid constitute the numeric punch of the card.

Referring now to Figure 10, this illustrates an IBM card which will be more fully described later. For the present, it will be noted that the uppermost punching row is designated 12, the next lower 11, and the next lower 0. Below these are rows 1 through 9. Thus, there are twelve actual punching rows and one imaginary or blank punching row, making a total of thirteen positions. This allows thirteen positions in a vertical column for representing a digit, a letter, a punctuation mark, or any other desired character.

Referring again to Figure 11, it is seen from the table that if a given card column, such as column 54 designated by legend in Figure 10, is to represent a number 4, then the index point in the 4 row will be punched. If the said column is to indicate a letter V, both the index point in the 5 row and the index point in the 0 row will be punched. Further, according to the table, if the column on the card is to represent a J or a −1, the index point in the 1 row will be punched and also the index point in the 11 row. It is believed that, from these examples, it will now be clear how the table in Figure 11 is to be interpreted.

It will be further understood that where a punch is referred to, when the card is translated to magnetic form on the Card Assembly Revolver, a punch will be represented by a spot of magnetic flux in one direction, whereas a "no-punch" will be represented by similar flux in an opposite direction, or the like.

The circuitry of the 12–7 translator 118 of Figure 1, as well as the circuitry of the companion 7–12 translator 128, will be described below under the heading Code Translators.

The output code may be understood by considering the binary representations placed along the right-hand side of the grid in Figure 11 and the additional binary representations placed along the bottom of said grid. As indicated by the legends at the lower right-hand corner of the grid, the tetrad portion of the code, which is eventually applied to the four tetrad input lines 314($a$)–314($d$) of the Factor Shifter (Fig. 9R), appears along the right-hand side of the grid. The dyad portion, which is applied to lines 314($e$) and 314($f$) of the Factor Shifter (Fig. 9S), appears along the lower end of the grid in Figure 11. Further, there is the redundant element input, which is applied to line 314($g$) of the Factor Shifter (Fig. 9S). The value of this for each of the various characters in the grid is shown in a small square located in the lower right-hand corner of each rectangular block of the grid. Thus, on seven lines—the four tetrad lines, the two dyad lines and the single redundant element line—there is the equivalent of the twelve input lines. Repeating the examples previously given, in the seven element internal code: a 4 is indicated by 0111 on the tetrad lines 314($a$)–314($d$), by 00 on the dyad lines 314($e$) and 314($f$), and by 0 on the redundant element line 314($g$). The letter V is indicated by 1000 on the tetrad lines, 11 on the dyad lines and 0 on the redundant element line. The letter J or a −1 is indicated by 0100 on the tetrad lines, 10 on the dyad lines, and 1 on the redundant element line.

It is to be particularly noted in the seven element code of Figure 11 that the 9's complement of each number may be obtained merely by making the 0's of the tetrad into 1's, and the 1's into 0's. For example, the 9's complement of 7 is 2, and it will be noted that 7 is coded as 1010 and 2 as 0101. As another example, 1 is the 9's complement of 8, and 8 is coded as 1011 and 1 as 0100. This is particularly important in connection with the output of the tetrad portion of the unit's order stage of the Factor Shifter, since a number, as retained in the flip-flop register, may be complemented simply by reading the 0 outputs instead of the 1 outputs.

It should be further noted, in connection with Figure 11, that some of the characters, such as the $, require the punching of two index points of the numeric zone in the same column. The $ character requires the punching of both the 8 index point and the 3 index point.

It will be further noted that each of the thirteen numeric possibilities of the card code corresponds to a definite tetrad of the seven element internal code, and that each of the four zone possibilities in the card code corresponds to a definite dyad in the seven element internal code. It follows that translations between the four-fold zone group and the dyad, and between the thirteen-fold numeric group and the tetrad, are separate and independent.

The seventh, or redundant element, of the internal code is chosen to make the number of 1's odd in the code expressing a given character. Each column in the table of Figure 11 corresponds to an "odd" or an "even" dyad; i.e., a dyad having an odd or even number of 1's, all zeros being indicative of even. Each row in the table corresponds to an odd or an even tetrad. The redundant element for a given character is 1 if the corresponding row and column agree in "oddness," and the redundant element is 0 if they disagree. For example, 9 in Figure 11 will have a redundant element of 1, as shown in the right-hand corner of the block, since its column is even and its row is even, while 8 will have a redundant element of 0, since its column is even but its row is odd. Since the redundant element is uniquely determined by the zone and the numeric, it may be formed independently of the actual code translation.

While the preceding demonstrates that the alphabet and various symbols may also be utilized in the present invention, the ensuing description will be limited to the use of coded digits.

FACTOR SHIFTER GATING

Referring now to Figures 9T and 9U, suitable input gating from the 12–7 translator 118, from the Adder 106 (see Figure 9N) and from the storage unit (line 131 in Figure 1) to the Factor Shifter, are shown.

In Figure 9T, the 12–7 translator 118 is illustrated with the seven element output on line 116 being applied to a group of seven gates designated as 352(*a*)–352(*g*), and the outputs of these gates being applied to the Factor Shifter input, as illustrated, over the group of lines 354 which lead to and are connected with lines 314(*a*)–314(*g*) of the Factor Shifter (Figs. 9R and 9S). This group of gates is connected to be energized over line 356 (Fig. 9T).

A group of five gates designated generally as 358(*a*)–358(*e*) are provided for gating the input over line 132 from the Adder output. Since the signals on line 132 are negative, a respective inverter is included in the input line to each of these gates, which are otherwise enabled over line 360. The five elements of the code on the five output lines from these gates are the four tetrad lines and the redundant element line. Since the dyad portion of the code is concerned mainly with the sign of a number and is not directly an output of the Adder, it is handled separately therefrom.

Seven gates designated 362(*a*)–362(*g*) in Figure 9U are further provided for gating, into the Factor Shifter, data fed over line 131 from the drum data storage unit output transducers 363 (Fig. 9W), these gates being enabled by means of line 364.

There is also shown in Figure 9U the 7–12 output translator 128, which reconverts from the internal machine code to the twelve element output code for application of outputs through the Card Assembly Revolver to the card punching equipment.

Additional output gating from the Factor Shifter for applying data to the Adder by way of line 122 is shown in Figure 9P. A group of gates 366(*a*)–366(*d*) is provided for gating the 1's side output of the tetrad flip-flops of the Factor Shifter unit's stage to the line 122 and a second group of gates 368(*a*)–368(*e*) is provided for gating the 1 output of the redundant element flip-flop and the 0 outputs of the tetrad flip-flops of this unit's stage to the line 122. The gates 366(*a*)–366(*d*) are connected to be enabled, through an inverter, from line 370, and the gates 368(*a*)–368(*e*) are similarly connected to be enabled from line 372. It will be noted that gate 368(*a*), whose input comprises the redundant element 1 line, will be enabled by a pulse on either line 370 or line 372 by virtue of blocking diodes, as shown. As will appear more fully below, the line 370 is employed for transmitting a number in the Factor Shifter directly to the Adder, and the line 372 is employed for transmitting the complement of the number in the Factor Shifter to the Adder. It will be recalled that, as discussed above under the heading Codes, the complement of the number is readily produced by inverting the 1's and the 0's, respectively, obtained from the Factor Shifter tetrad, through the agency of these gates 366 and 368.

There is also shown in Figure 9Q a group of lines designated 126 for collecting the Factor Shifter output for application to the 7–12 output translator 128 (Fig. 9U), and a branch of this line, line 124 (Fig. 9U and Fig. 1) feeds the data storage unit. Gates 381(*a*)–381(*g*) are provided (Fig. 9U) for gating the "1" lines of group 126 to the General Storage input transducers 383 (Fig. 9W). These gates 381(*a*)–(*g*) may be enabled over line 384 from Storage Control, as indicated.

CARD ASSEMBLY REVOLVER

Figures 9V and 9W show the drum illustrated in Figure 2, and also show the circuitry for the Card Assembly Revolver.

In our copending application Serial No. 284,914 there is described card reading equipment and associated circuitry whereby the contents of a punched card or other record card may be transferred and applied as a card image to the surface of a magnetizable drum. This technique has been briefly mentioned above and will be fully described below under the heading Card Reading and Punching Equipment. Briefly, for the present purpose of explaining the circuitry of the Card Assembly Revolver, the "card image" in magnetic flux form on the surface of the drum is continuously read by reading transducers, and the signals thereby generated are re-applied to the drum through recording transducers. Preferably, erase transducers also operate in each of the tracks of the revolver to present a clean track to the recording transducers. Suitable circuits, well known in the art, may be provided to operate these erase transducers.

Referring to Figure 9V, the Card Assembly Revolver of the drum illustrated comprises the recording transducers, designated generally by the reference numeral 410, and the reading transducers and the erase transducers, similarly designated by the reference numerals 412 and 414, respectively. There are twelve transducers in each of these groups, thus forming means for handling the twelve element card code. Further, there are provided a Card Assembly Revolver control recording transducer 410', a reading transducer 412' and an erase transducer 414'.

It will be understood that suitable reading circuits and writing circuits will be associated with each transducer, such circuits being described, for example, in United States Patent 2,540,654.

There is also provided a drum Card Assembly Revolver Locator section, this section comprising recording transducers 416, reading transducers 418 and erase transducers 420. These sets of transducers—seven in each set—operate in seven tracks to handle eighty address numbers. The address numbers are made up of seven binary digits, one digit being read from each track. Since $2^7$ is equal to 128, there is an adequate number of addresses to locate 80 digits.

As is fully described in our copending application Serial No. 284,914, the frequency of pulse data for the recording transducers 410 from the card reading equipment is so correlated with the speed of drum movement that eighty pulses may be recorded before the first or leading pulse is read by the reading transducers 412. The pulses, as thus read, may then be re-applied to the recording transducers 410 to thus continuously recirculate the data, or, alternatively, the data from transducers 412 may be applied over line 114 to the 12–7 output translator 118 (Fig. 1 and Fig. 9T).

It is intended that the Card Assembly Revolver Locator section comprising transducers 416, 418 and 420 will be initially loaded with eighty different address numbers. A register 422 (Fig. 9T), which may be in the form of a plurality of neon indicator lamps, is provided for indicating a binary coded number which represents the position of the first column of the card in the Card Assembly Revolver. It will also be noted that there is a direct recirculation path designated 426 (Fig. 9V) from each of the transducers 418 to the corresponding transducer 416. At such time as the marker pulse in the control track of the Card Assembly Revolver (see the heading Card Reading and Punching Equipment below) energizes the transducer 412', a pulse travels over line 428 to cause register 422 to indicate the address number being read at that moment by transducers 418.

It will be understood that since the Card Assembly Revolver has eighty columns, representing eighty digits or other characters, and the capacity of the Factor Shifter is ten digits, only a predetermined number of columns from the "card image" can be shifted into the Factor Shifter. Accordingly, it will be desired to select what is termed a "field" from the card, this field being from one to ten columns in length. For this selective purpose there is provided and shown in Figure 9T a "field begin" coincidence selection circuit 430 and a "field end" coincidence selection circuit 432. Each of these circuits may be identical and will be arranged, as will be understood by those skilled in the art, so that a given number in binary form may be set up in a plurality of toggle switches 430′ and 432′, respectively, so that potentials may then be compared with potentials issuing from the transducers 418 to provide an output pulse on lines 430″ and 432″ whenever predetermined address numbers are generated in the transducers 418. Suitable coincidence selection circuits are shown, for example, in United States Patent 2,540,654.

At a predetermined time, as will be explained fully below, a "Start Read C.A.R. to F.S." pulse will be applied to a line 434 (Figure 9T) and this will enable a single pulse circuit 436 (such as that shown in Figure 6) to pass to line 438 the next following and only the next following Field Begin pulse appearing on line 430″. Similarly, there is provided an additional single pulse circuit 440 (which also may be of the type shown in Figure 6) for providing, on a line 442, a single pulse, generated by the Field End pulse, on line 432″. The second input to circuit 440 is from the output line 438 of the single pulse circuit 436 in order to provide, automatically, the correct sequence of pulses on lines 438 and 442, respectively.

In general, since there may be from eight 10 column fields up to eighty 1 column fields on a card, the "card image" in the Card Assembly Revolver may be repeatedly relied upon for data. Therefore, the "card image" may continue to revolve for various periods of time.

TIMING AND CONTROL PULSE GENERATION

Referring to Figure 9V and also to Figure 2, a portion of the drum 210 is devoted to carrying flux spots or cells for developing control pulses. As shown in Figure 9V, tracks 610, 612, 614, 616, 618, and 620 are provided for carrying flux cells for generating the Master Pulses (MP), the A pulses, the B pulses, the C pulses, the D pulses and the E pulses, respectively. These pulses may be actually generated by the transducers generally designated by the reference numeral 622. The Master Pulses may be spaced apart on track 610 so as to provide, for example, eighty cells per inch, and the A, B, C, D, and E cells are staggered, as diagrammatically illustrated in exaggerated form on the drum shown in Figure 9V, so as to provide a set of the Control Pulses A, B, C, D, and E between each two adjacent Master Pulses. The transducers 622 may be aligned parallel to the axis of the drum, and the flux spots staggered as shown, or the cells may be aligned parallel to the axis of the drum and all spaced apart the Master Pulse distance, with the transducers 622 staggered. The Master Pulses and the A, B, C, D, and E pulses are distributed throughout the machine, as indicated, by legend, at the appropriate places. It will be understood that wherever a line is designated as carrying a Control Pulse, the indication is that the pulses are continuously appearing thereon without selective gating control at any point.

FACTOR SHIFTER CONTROL

The circuit for controlling the Factor Shifter, insofar as entry therein from the Card Assembly Revolver is concerned, is shown in Figure 9T. A Field Begin pulse on line 438 sets a flip-flop 652 to its 0 state, with the result that an enabling signal is applied for opening a gate 654 for in turn applying C pulses to a decade counter 656. Upon the completion of ten counts, indicating that Factor Shifter is filled, an output pulse will issue from the counter 656 on line 658, and this is applied to the 1 input of flip-flop 652 to disable the gate 654. In the event that a Field End pulse occurs before the counter output occurs, the Field End pulse will pass through gate 660 which was enabled by the 0 output of flip-flop 652. This passed pulse sets a flip-flop 662 to its 0 state to open the gate 336, previously referred to, and to which Master Pulses are applied. As previously mentioned the purpose of this application of Master Pulses is to complete the loading of the Factor Shifter with 0's in the event of a short field, i.e. less than ten digits in length. The output of the counter 656 is also applied to set a flip-flop 668 to its 0 state in order to open gate 670 and thereby apply a C pulse over line 672 to a connection with the Circular Shift Line 334 of the Factor Shifter. The C pulse transmitted through gate 670 is also applied to set a flip-flop 674 (Figure 9U) to its 0 state and thereby open a gate 676 to apply a single pulse to a line 678, for the purpose of indicating a completion of the insertion of a number into the Factor Shifter, so that arithmetic operations may be begun. The C pulse transmitted through gate 670 (Fig. 9T) is additionally applied to set the flip-flops 662 and 668 (Fig. 9T) to their 1 state.

During the insertion of the number into the Factor Shifter, C pulses will be applied through gate 654 not only to the input of counter 656, but also through blocking diode 680 to the Loading Shift Line 312. Blocking diode 680 is necessary to prevent the application to counter 656 of pulses appearing on line 687 (Fig. 9R) referred to below.

As described below under the heading Program Control, this transfer of the contents of the Card Assembly Revolver to the Factor Shifter requires control from the Program Control. For this purpose, a gate 681 is provided, enabled by line 439 leading from Field Begin line 438 through an inverter, and having as its other input line 682, which is energized from Program Control (see Fig. 9C) whenever it is desired to read from the Card Assembly Revolver into the Factor Shifter. The output of gate 681 is connected to the 0 input of a flip-flop 653, and Field End line 442 is connected to its 1 input. A line 655 is connected to the 0 output of this flip-flop 653 and carries a gate enabling signal only between the Field Begin and Field End pulses when line 682 is enabled. Line 655 is connected to a gate 657 for enabling the latter, to which Master Pulses are also applied. While gate 657 is thus enabled, Master Pulses are applied to line 356 and thereafter inverted to enable gates 352($a$)–352($g$). These gates control the transfer of fields of the Card Assembly Revolver to the Factor Shifter.

As will also be described below under the heading Program Control, a further operation requiring control is the reverse transfer, i.e. the transfer of the contents of the Factor Shifter to the Card Assembly Revolver. For this purpose a gate 659 (Fig. 9W) is provided, enabled again, via line 439, from Field Begin line 438 (Fig. 9T) and having as its other input line 661, which is energized from Program Control (see Fig. 9C) whenever it is desired to read from the Factor Shifter into the Card Assembly Revolver. The output of gate 659 is connected to the 0 input of a flip-flop 663, and Field End line 442 is connected to its 1 input. A line 665 is connected to the 0 output of this flip-flop 663 and carries a gate enabling signal only between the Field Begin and Field End pulses when line 661 is enabled. Line 665 is connected to a gate 667 for enabling the latter, to which Master Pulses are also applied. While gate 667 is thus enabled, Master Pulses are applied to line 991 and thereafter inverted to enable gates 993($a$)–993($l$) shown in Figure 9Y. These gates control the transfer of the contents of the Factor Shifter to a selected field of the Card Assembly Revolver.

Another control circuit is provided for loading the Factor Shifter from the Adder over the line 132 in Figure 1. This circuit will be explained at this point, although a complete understanding of the input control pulses and the use of certain output pulses awaits full explanation below.

As has been briefly indicated above, the Arithmetic Revolver 108 and Adder 106 in Figure 1, as interconnected by lines 134 and 138, constitute a constant recirculation path for a given number. Thus, the number is constantly circulating over the difference line 136, which is the output from the Adder, and is constantly available for application over line 132 to the Factor Shifter. Obviously, it is necessary to begin the loading of the Factor Shifter at a given instant, so as to be certain which digit of the number leads the entry to the Factor Shifter. Referring again to Figure 9T, it will be recalled that gates 358(*a*)–358(*e*) are provided and energized by a signal on line 360 to permit insertion into the Factor Shifter from the Adder output. It will now be apparent that with an enabling signal on line 360 and the proper pulsing of the Loading Shift and Circular Shift Lines 312 and 334, respectively, of the Factor Shifter (Figures 9R and 9S), digits flowing through gates 358(*a*)–358(*e*) may be inserted into and retained in the Factor Shifter.

Referring again to Figure 9R, a decision to start loading the Factor Shifter from the Adder output is indicated by a pulse on line 683. At a certain instant, upon the occurrence on line 1324 of a pulse fully described below and termed the new *a* pulse, gate 684 will be opened to pass the new *a* pulse to set flip-flop 685 to its 0 position. This action opens gate 686 connected to the 0 output of the flip-flop and permits C phase pulses to pass to line 687, which is connected with the Loading Shift branch line 312' of the Factor Shifter. Flip-flop 685 in its 0 state also enables the above mentioned line 360. Thus, a digit which will be available in the Adder output, as more fully described below, will pass to the unit's order stage of the Factor Shifter.

At a certain time, under the control of the Arithmetic Revolver, as will be fully described below, a so-called *b* marker pulse appears on line 690 (Fig. 9R) and passes through the gate 691, which is enabled by the 0 output of flip-flop 685, to set the flip-flop 685 to its 1 state, the output of which is not connected, and to set a second flip-flop 692 to its 0 state. A gate 693 is connected to the 0 output of flip-flop 692 and is also supplied with C phase pulses. Thus, a C phase pulse will be applied to line 694 which is connected to the Circular Shift line 334 of the Factor Shifter. However, the 0 output of flip-flop 692 also enables a gate 695, to which Master Pulses are applied. Thus, a Master Pulse will be applied to the 1 input of flip-flop 692, the 1 output of which is not connected, so that only the one necessary C phase pulse is applied to the Circular Shift line to completely fill the Factor Shifter, as explained above under the heading Factor Shifter. The single Master Pulse passing through gate 695 and shifting flip-flop 692 to its 1 state is also applied to a line 697 for supplying a "resume" signal which may be employed as described below at various points of the system. Further, the single Master Pulse passing gate 695 and appearing on line 697 is applied to two gates 698 and 699 (Fig. 9G) to convey, via lines 316 and 318 leading to Figure 9S, a command to set the Factor Shifter sign in accordance with the sign of the Arithmetic Revolver, as denoted by the signals on lines 1442 and 1444 (Fig. 9G) respectively, described below under the heading Arithmetic Sign and Zero Control.

CARD READING AND PUNCHING EQUIPMENT

Referring to Figure 10, as above mentioned, this shows a replica of a well known "IBM" punched record card having the features of twelve recording positions, rows, or lines 701 by eighty vertical columns 702. Each of the eighty vertical columns is divided into twelve index points of information 703, there being one index point 703 for each of the twelve recording positions. These features are further designated by legend in Figure 10. The printed matter on the card serves to aid in visually checking the information on the card, and is not necessary for the proper functioning of the apparatus.

The general arrangement and operation of the card reading and punching equipment will now be described with reference to Figure 12, this figure also showing diagrammatically the Card Assembly Revolver referred to above.

A supply of input record cards is diagrammatically designated as 708. This supply of cards is introduced into a card reader 710, one card at a time. Assuming, for purpose of illustration, that the cards are of the type shown in Figure 10, the card reader 710 may receive the input cards so that a row 701 of eighty of the index points 703 lies beneath a row of eighty feeler brushes, one for each index point. When the card is in position for reading each row, a serializer 712 will test each brush, in time sequence, to determine if an aperture exists at each index point 703. After one row is tested, the next row will be tested, and so on, until the complete card is processed.

The serial probing of index points is under the control of a column pulse distributor 714 which generates a series of discrete electrical pulses at predetermined times. Pulses from the pulse distributor, for controlling the serializer 712, are available over a line 714*a* leading to the serializer.

The information generated at the serializer 712 is available, as a series of pulses, having a time occurrence dependent on the discovery of apertures along each row of eighty index points, this pulse information being applied to the tracks of the Card Assembly Revolver by the transducers 410 (Figure 9V). The Card Assembly Revolver, designated in Figure 12 as 716, utilizes a portion of the surface of the drum 210 as above described. The pulse information may be recorded on the drum surface in accordance with the techniques set forth in United States Patent 2,540,654 to Cohen et al.

At the completion of the processing of a card in reader 710 and serializer 712, the arrangement is such that the complete card (or possibly only a portion thereof) is reconstituted as a card image, in magnetic form, in the Card Assembly Revolver.

The portion of the magnetizable member devoted to carrying the flux cells or spots for generating the Master Pulses and A, B, C, D, and E pulses is called the Timing Section and is designated as 716' in Figure 12.

When a card or portion thereof has been converted to magnetic form and is in the Card Assembly Revolver, this data is made continuously available, at a set of output terminals diagrammatically indicated in Figure 12 as block 718. From these output terminals 718 the data may go to data processing equipment, designated as 720, which may be the digital data handling circuits described in detail herein.

Upon completion of data handling in data processing equipment 720, or upon availability of new or revised information at processing equipment 720, or any other source, such data may be applied to a set of input terminals, designated by block 722, through which the data may be reinserted into the Card Assembly Revolver. Then, whenever it is desired to remove the data from the revolver, it may be reconverted to punched card form.

To convert data from magnetic form to punched card form, the data is fed from the Card Assembly Revolver into a staticizer 724. This is a device which operates a card punch 726 to punch a supply of output cards 728. The staticizer 724 is also controlled by column pulse distributor 714 over a line 714*b*.

Normally, but not necessarily, data returned from the arithmetic circuits will be re-entered into the same track or tracks of the revolver from which it was originally delivered. Therefore, in such case, the revolver may be loaded with new data simultaneously with the removal of data.

A further description of the Card Reading and Punching Equipment will now be given in greater detail.

Reference is now made to Figure 13, which diagrammatically illustrates a representative embodiment of the structural arrangement of a card reading and punching apparatus.

Figure 13 is taken primarily from the disclosure of the R. B. Johnson Patent 2,275,396, the disclosure of that patent being incorporated by reference into this application for descriptive purposes. The Johnson patent further refers to the patent to C. D. Lake, Reissue 21,133, which serves to further explain the mechanism of the Johnson patent. Accordingly, it is also intended that the disclosure of the Lake patent be incorporated by reference into the present application for purposes of description.

In Figure 13, the card reader and card punch are designated generally as 710 and 726, respectively, in order to correspond with the illustration in Figure 12. The view in Figure 13 is an edgewise view, partly in section, based upon Figure 1 of said Johnson patent. In the card reader 710, a stack of input cards 730 feed through a reader hopper R and are sequentially fed between feed rollers 731 and 732 by means of a card picker 733. As each card progresses between the feed rollers 731 and 732, a complete row of eighty index points is sensed by an aligned row of feeler brushes 734. Wherever apertures are present along the row of index points, the feeler brushes 734 extend through the apertures to contact a conductive roller 735 and thus complete an electric circuit as described below. As the cards progress between the rollers 731 and 732 and are sensed, the leading edge of the card (the top as illustrated in Fig. 10) will be engaged by a second pair of feed rollers 736 and 737 before the trailing edge of the card (the bottom as illustrated in Fig. 10) leaves the first pair of feed rollers 731 and 732. The result is that each card is fed continuously past the feeler brushes 734. After the card leaves the second pair of feed rollers 736 and 737, it is dropped into a hopper 738.

The card punch 726 is similar in arrangement except that, in this instance, card punches rather than feeler brushes are provided. The cards are fed from a hopper P in this instance. The card punches are designated as 740 and again there is an aligned row of eighty punches. As in the case of the card reader 710, the cards move through the reader 726 under the action of first and second pairs of feed rollers and eventually the cards are dropped into a hopper 741.

The dashed lines 742 in Figure 13 designate schematically a mechanical drive to each of the various rollers, card pickers and the like. A complete gear-train mechanism for this purpose is shown in said Johnson and Lake patents. Normally, the driving equipment 742 will revolve the reader and punch through one cycle, during which a complete card may be processed, both in the reader 710 and punch 726, or in either unit alone. To carry out this operation a motor 743 is provided which drives the card reader and punch equipment by means of a one-revolution clutch 744. Attached to the output of clutch 744 (in the mechanical drive 742 for the purpose of the present invention) is a segmented commutator control or switching disc 745 made of insulating material and provided with embedded conductive segments 746 arranged in an outer ring and one inner conductive segment 747. The outer ring comprises twelve conductive segments 746 and one blank or insulating segment 746′. Cooperating with the outer ring of segments 746 is a brush 748, and cooperating with the one inner conductive segment 747 are a plurality of brushes 749.

In operation, the motor 743 rotates continuously and upon energization of a clutch operating solenoid 744′ (by circuits to be described below) the clutch 744 will engage so that the disc 745 and, also, the various movable components of the reader 710 and punch 726 will begin to move. The disc 745 will normally be at rest, in the position shown in Figure 13: that is, the clutch 744 will disengage so that the blank segment 746′ will be under the brush 748. As the disc begins to revolve, clockwise as viewed in Figure 13, the card pickers 733 and 733′ of the reader 710 and punch 726, respectively, will feed the bottom card in each hopper into the first pair of feed rollers. As soon as the feed rollers have revolved a sufficient distance to place the first row of index points adjacent to the ends of the brushes 734 and punches 740, respectively (assuming a card is in both units), the brush 748 will contact the first of the conductive segments 746 to complete an electric circuit which will operate a relay as described below. This sequence of events will continue as the brush 748 contacts one segment 746 after another, and at the same time the cards will be moved to correspondingly align their respective rows beneath the brushes 734 and punches 740.

The one inner conductive segment 747 meanwhile will successively contact each of the brushes 749 associated with disc 745. The brushes 749 serve, through connection to circuits described below, to designate to certain electronic circuits just which of the rows of index points of the cards are under the brushes and/or punches.

As stated above, there are twelve conductive segments 746 and one blank segment 746′ arranged in the outer ring. The twelve conductive segments thus provide one segment for each respective row of the cards. It will furthermore be noted that the "leading" edge of the single segment 747 of the inner ring falls slightly behind what may be termed the leading edges of segments 746. That is, the brushes 749 will not engage segment 747 until after the brush 748 is already engaged with one of the segments 746. Accordingly, the circuits through brushes 749 will be made only during the intervals when the circuit is made through brush 748.

The next component which will be described is the column pulse distributor 714 (Figure 12). The function of this component is to supply pulses for coordinating the Card Assembly Revolver with the serializer 712 and staticizer 724.

Referring now to Figures 9V and 9W, the timing and control portion of drum 210 contains a track of boundary maker magnetic cells, this track being designated 810. A portion of the drum is reproduced in Figure 14 for convenience, with boundary marker track 810 indicated, as well as the Master Pulse track 610. In Figure 14, reading heads 823(*a*) and 823(*b*) and reading amplifiers 824(*a*) and 824(*b*) convert recorded pulses from magnetic form on the two tracks 610 and 810, respectively, to electrical form.

In a typical system for this invention, a drum speed of 1765 r.p.m. and a drum diameter of 16 inches may be used, with 800 Master Pulse magnetic marks permanently recorded around the periphery of track 610, and with 10 boundary marker pulse marks in the boundary marker track 810, these being spaced 80 pulse periods apart with respect to marks on the timing track 610. The boundary marker pulses are used to check alignment of the Column Pulse Distributor, as will become clear below.

The marks on track 610 are read by the reading head 823(*a*) and amplified by the reading amplifier 824(*a*), whereby positive pulses are furnished to a ring counter-of-ten 825 and also to an output gating circuit 831. The ring counter 825 may be of a type having a number of tube trigger circuits with only one of the triggers in "on" status at any one time. The counter circuit is arranged in such a manner that when an advancing pulse is applied to all of the triggers, the next trigger beyond the one which is "on" will be turned "on" by the preceding "on" trigger, with the latter being turned "off." This may be a ring counter as shown, for example, in the article by A. W. Burks entitled "Electronic Computing Circuits of the Eniac," Proceedings of the I.R.E., vol. 35, August 1947, pp. 757–760. Therefore, each timing pulse applied to the ring counter-of-ten 825 advances it one step. The carry from this counter 825 is applied to line 826 and its associated amplifier 827 and causes an advance of a ring counter-of-eight 828. The outputs of these two ring counters are applied, respectively, through decoupling cathode followers 829(*a*) and 829(*b*) to an eight-by-ten matrix 830.

A suitable eight-by-ten matrix which may be used is the one shown in Figure 15. The ten successive pulses from the ring counter-of-ten 825 successively "enable" each of the ten lines (extending vertically in Figure 15) of all of eight sub-matrices, each designated as 830'. Each of the eight sub-matrices is otherwise enabled, in turn, on lines 836 by the ring counter-of-eight. Therefore, by means of the 80 possible combinations of enable pulses to the matrix circuits from the ring counters, it is possible to produce eighty column pulses on eighty different lines 830''. The eighty column pulses then furnish enabling signals to eighty gates 831. The successive enabling of these gates, which are of the two-input type, allows the passage of timing pulses to the eighty amplifiers 832 of Fig. 14, resulting in the production of eighty successive column pulses at the output. These eighty successive column pulses commence with column pulse eighty and proceed to the lowered numbered columns, ending with column pulse one. In the drawings, the lines on which the respective column pulses will appear are designated $C_{80}$, etc.

Additional understanding of suitable matrix circuits may be had by reference to "Rectifier Networks for Multiposition Switching," by D. R. Brown and N. Rochester, Proceedings of the I.R.E., vol. 37, No. 2, February 1949, pages 139–147.

The present invention requires that each column pulse one, i.e. $C_1$, occur simultaneously with one of the boundary marker pulse marks on track 810 (Fig. 14). This can be insured when the circuits are initially energized by utilizing the output from reading amplifier 824(*b*) to pass the next Master Pulse, via reading amplifier 824(*a*), as the initial pulse to ring counter-of-ten 825. Thereafter, the alignment of the Column Pulse Distributor is checked in the circuit 834 shown in the upper left-hand corner of Figure 14 by comparing the output of column pulse one ($C_1$) with the output of the boundary marker track 810. Marks on the boundary marker track 810 are read by the reading head 823(*b*) and amplified by the reading amplifier 824(*b*), whereby positive pulses are furnished to the circuit 834. If both the resultant positive output of boundary marker track 810 and the positive output of column pulse one on lead 833 are presented to a gate 835 at the same time, a negative pulse is produced on lead 837 which tends to close gate 837' and produces no output on lead 838. This is indicative of proper alignment and produces no actuation of an alarm mechanism 839. However, if for some reason the line carrying column pulse one ($C_1$) is energized and no output is present from the boundary marker track 810 and associated circuitry, a gate 837' will permit the passage of a positive pulse to lead 838 to actuate the alarm 839. A similar situation will occur if the boundary marker output is present without a simultaneous column pulse one ($C_1$) output.

The interconnection of the above described components will now be described in detail with reference to Figures 9X, 9Y and 9Z. In these figures, the card brushes 734 are diagrammatically illustrated as being engageable with the conductive roller 735, as described previously in connection with Figure 13. Depending on the particular design of the card reader and punch, there will be a certain time factor involved as the cards move through that apparatus. For purposes of illustration, it will be assumed that the motor 743 drives the reader and punch at such speed that the brushes 734 (Figure 13) are able to be in contact with the conductive roller 735 (whenever apertures are present) for about 40 milliseconds. The arrangement is such that the previously mentioned brush 748 (Fig. 13) of the card reader-punch is connected to energize a relay coil 904 (Fig. 9X) to close a relay contact 906 so that a positive potential is applied to this conductive roller 735. The segments 746 (Fig. 13) of disc 745, which brush 748 contacts, will each be of such length, in relation to the speed of rotation of disc 745, that the relay contact 906 remains operated for only a portion of the 40 milliseconds mentioned above, for example, about 8 milliseconds.

Each of the card brushes 734 is connected to feed one of eighty diode networks 908, these networks being normally biased so that no output will be produced on output lines 910 if no contact is made through the card brushes 734 to roller 735. Each of the diode networks 908 has two inputs, one being the electrical signal resulting from a brush passing through a card aperture and the other input being a particular column pulse from the Column Pulse Distributor. The bias on each network is such that a column pulse alone will not produce an output pulse. In Figure 9X, lines 912, as designated by legend, are connected with the output lines ($C_1$–$C_{80}$) of the Column Pulse Distributor. There are eighty of the lines 912 connected, respectively, to the eighty diode networks 908. Therefore, as the Column Pulse Distributor applies enabling pulses to these lines 912, beginning with $C_{80}$ and proceeding toward $C_1$, an output pulse will appear on a respective line 910 for each of those card brushes 734 which contacts roller 735 while a given row of a card is beneath the card brushes 734, there obviously being no output pulse for those brushes 734 which do not pass through a card aperture to engage the roller 735. Thus each brush is probed or sampled in sequence.

The respective output pulses of the diode networks 908 are collected in groups of ten by additional diode networks 914. The collection into groups of ten is simply to minimize loading of the diode networks 908. The collected outputs of the diode networks 914 are connected to a common output line 916, which is connected as the first enable of a gate 918. At such times as pulses applied to gate 918, by sensing of an aperture, are to pass through gate 918, a card handling enabling signal will be applied over a line 919 to act as the second enable of this gate 918.

From the foregoing it will be clear that a card will move into the card reader 710 (Figure 13), at a command signal described below, and at a predetermined moment after the start of card feed, the first or 12's row (at the top of the card in Fig, 10) appears adjacent the card brushes 734. During the period when the brushes sense the apertures of the 12's row, the relay 904 will be energized by commutator disc 745 (Fig. 13) to close its contact 906 and thus apply the above mentioned positive potential to roller 735 for the above mentioned eight millisecond period. This potential applied to roller 735 will also be applied over a line 917 and a delay circuit 917' to trigger a timed single pulse generator 920. The application of the potential on line 917 to this generator 920 will be delayed by delay circuit 917' for a short interval in order to permit the inner ring segment 747 (Fig. 13) to engage one of the brushes 749, for reasons which will become apparent below.

The function of the single pulse generator 920 is to produce one, and only one, pulse coinciding with a timing pulse each time the positive enabling potential appears on roller 735. Master Pulses on line 921 are applied as the other input to single pulse generator 920, and after the potential from roller 735 appears on line 917, the next Master Pulse will be "passed" through circuit 920 and will appear on its output line 942. However, no additional Master Pulses will pass through circuit 920 until the potential on roller 735 has been removed and re-applied.

A suitable circuit for the pulse generator 920 is shown in Figure 6 and another suitable circuit is shown in Figure 16. The latter circuit is designed to prevent the passing of a substandard pulse, which may result if the potential issues from delay circuit 917′ just as a Master Pulse is dying out on line 921. In Figure 16, timing (MP) pulses are applied through the line 921. Another line, designated 922, is normally at substantially ground potential and is connected, via the delay circuit 917′ (Fig. 9X) and line 917, to the roller 735 to receive the positive potential applied to roller 735. This positive potential, on line 922, raises the potential on a grid 923 (Fig. 16) of a gas tube 924 of a slow recovery relaxation oscillator circuit designated generally as 925. This causes a discharge through this tube 924, which cycles the oscillator 925. Cycling of the oscillator produces a negative pulse which is shortened in circuit designated generally as 926. The resulting negative pulse 918 in the cathode circuit of circuit 926 sets a flip-flop 927, which enables a gate 928. The first Master Pulse to appear on lead 921 after this gate is enabled passes through the latter and produces a pulse on lead 929 which sets a flip-flop 930 to thus enable a gate 931. The next Master Pulse on lead 921 passes through this gate 931 and appears on lead 932.

The two sets of flip-flops and gates are used here because it might be possible, as above stated, for gate 928 alone to produce an output pulse of substandard size in the event of partial or only near coincidence between the enabling of gate 928 and the occurrence of a Master Pulse on lead 921. It will be evident that an output pulse of full size will be produced from the gate 931.

This resulting pulse from gate 931 is amplified in the circuit of tube 933 and, by means of a pulse transformer 934, the pulse is made available, as a positive pulse on output line 942. The portion of the circuit designated generally as 936 is arranged to produce a single pulse which is delayed by less than one-half of a Master Pulse period for resetting flip-flops 927 and 930.

The time constants of the grid and anode circuits of gas tube 924 are so selected that the gas tube 924 is fired upon the initial appearance of the potential on roller 735 and cannot be fired again until after a suitable time has elapsed, this time period being arranged to exceed the eight millisecond period during which the positive potential is available at roller 735.

It should be noted at this point that if the circuit of Figure 16 is utilized for the single pulse generator 920 of Figure 9X, the pulse appearing on line 942 (Fig. 9X) is produced by the second Master Pulse occurring after an output is produced from delay circuit 917′, whereas if the circuit of Figure 6 is utilized, the pulse appearing on line 942 is produced by the first such Master Pulse. This does not affect the synchronization of the invention, however, as will be apparent from the ensuing description. The important factor is merely that, for each discrete enabling signal on line 917, only one of the Master Pulses will be permitted to pass to output line 942.

The pulse on line 942 will be applied to the drum Card Assembly Revolver control recording transducer 410′ (Figure 9V) to place a marker pulse in its associated revolver control track. Since the revolver control track is on the same drum as the Master Pulse track, the just written marker pulse will be aligned with one of the Master Pulse spots on track 610. The pulse on line 942 will also be applied over a branch line 942′ to enable a group of twelve gates 946(*a*)–946(*l*) shown in Figure 9X.

These gates 946(*a*)–(*l*) are each also provided with a second enable connected to a respective one of the previously mentioned brushes 749 (Fig. 13) associated with the card reader-punch disc 745. Therefore, when the 12's row of the card is under the card brushes 734, the first, i.e. line 945(*a*), of a group of lines 945(*a*)–(*l*) connected to the card reader-punch brushes 749 will enable the gate 946(*a*). Subsequently, when the 11th row, 10th row, etc., pass beneath the card brushes 734, the lines 945(*b*)–945(*l*) will be energized, in succession, to serially enable the remaining ones of the gates 946(*b*)–(*l*), in turn.

Assuming that the 12's row of the card is under the the card brushes, gate 946(*a*) will be enabled to pass a single Master Pulse applied to it via line 942′ and this passed pulse will be applied over line 948(*a*) to cause a flip-flop circuit 950(*a*) to be set to its 1 state, thereby placing a relatively positive energizing potential on its 1 side output line 952(*a*).

This energizing potential on line 952(*a*) will serve to provide the first enable over branch line 954(*a*) (Fig. 9Y) to a revolver input gate 956(*a*) shown in Figure 9Y, and also, in the same figure, to provide an enable signal over branch line 958(*a*) to a revolver output gate 960(*a*). The just-mentioned revolver gates are associated with the first of a set of twelve Card Assembly Revolver track elements (see Figure 9V), which are identifiable, respectively, with the twelve rows of the cards. Each set of revolver track elements includes a recording transducer designated generally 410, a reading transducer designated generally 412, and an erase transducer 414. More specifically, the output of gate 956(*a*) is connected to recording transducer 410(*a*), the output of gate 956(*b*) is connected to recording transducer 410(*b*), etc., with the output of gate 956(*l*) connected to recording transducer 410(*l*). The inputs to gates 960(*a*)–960(*l*) are similarly connected to respective ones of the reading transducers 412(*a*)–412(*l*).

It will be understood, however, that various numbers of revolver track elements may be employed, according to the particular type of card employed, within the scope of the present invention.

Revolver input gate 956(*a*) and revolver output gate 960(*a*) of Figure 9Y will remain enabled as long as flip-flop 950(*a*) remains in its 1 state, i.e. until it is reset. This does not occur until all eighty columns of the card row now under the brushes are sensed in turn.

The result of the revolver input gate 956(*a*) being enabled is that the series of pulses produced by reading card apertures in the card row under the brushes and available on line 916 (Fig. 9X) will pass through gate 918 and amplifying and shaping circuit 963, and thence via line 964 (Figs. 9X and 9Y) and gate 956(*a*) to be recorded in the left-most Card Assembly Revolver track, associated with recording transducer 410(*a*) (Fig. 9V). At the same time, the result of revolver output gate 960(*a*) (Fig. 9Y) being enabled is that previously recorded flux spots in the same revolver track will be read by reading transducer 412(*a*), and a series of output pulses will pass through this enabled output gate 960(*a*) and appear on line 965 (Fig. 9Y) leading to the staticizer circuits shown in Figure 9Z (see also Figure 12).

By the time that the leading recorded flux spot (or cell reserved for a non-existent spot) on this first Card Assembly Revolver track has reached the reading transducer 412(*a*) (Fig. 9V), sufficient time has elapsed to record, in this track, all flux spots required to represent the eighty possible apertures in the 12's row of the card sensed by the card brushes 734 and timed by the eighty distributor pulses $C_1$–$C_{80}$. At this time, the single Master Pulse previously available on line 942, and which was recorded by the revolver control transducer 410′ on the associated revolver track as a marker pulse, will have reached its reading head 412′, and this pulse will now be available on line 966. Line 966 is connected to Figure 9X as a reset line for the twelve flip-flops 950(*a*)–950(*l*). Accordingly, this pulse on line 966 will reset flip-flop 950(*a*) to remove the enabling potential from its 1 output line 952(*a*) and to establish a similar enabling potential on its 0 output line 968(*a*). This line 968(*a*) is connected to provide an enable to a recirculation gate 978(*a*), shown in Figure 9Y, and the opening of this gate will permit data read by the reading transducer 412(*a*) and fed via line 114 (Figs. 9V, 9X and 9Y) to gate 978(*a*), to recirculate through this gate and back to recording transducer 410(*a*). At the same moment that gate 978(*a*) is opened, the removal of the enabling potential on line 952(*a*) will close the input and output gates 956(*a*) and 960(*a*) (Fig. 9Y), leaving the recorded data to "revolve" in this first Card Assembly Revolver track associated with transducers 410(*a*) and 412(*a*).

Shortly after the recording of the final pulse, if any, resulting from the probing of the index points in the 12's row of the card, the card reader-punch motor 743 (Fig. 13) will have revolved the disc 745 sufficiently to have advanced the 11's row of the card beneath the reading brushes. The result of this is that gate 946(*a*) of Figure 9X will now be disabled, and the next gate 946(*b*) will be enabled to pass another Master Pulse from timed single pulse generator 920, resulting in the setting of the second flip-flop circuit 950(*b*) to its 1 state. The second Card Assembly Revolver track from the left in Figure 9V will then be loaded in a manner entirely analogous to the loading of the first or leftmost track. Thereafter, as the reading of the card continues, eventually the 12th or rightmost Card Assembly Revolver track will be loaded and the complete card will then have been transferred into magnetic form. The "card image" will now be continuously available in revolving status on the magnetizable surface of the drum and through the recirculation path, and in such form is adapted for very rapid access and, obviously, much more rapid than is possible when the card is in punched form.

While timed signal pulse generator 920 of Figure 9X may be energized from the boundary marker pulses on track 810 (Fig. 9V), it is preferable to energize it from the Master Pulses on track 610 (Fig. 9V) in order to reduce the access time from the card. If circuit 920 were energized by boundary marker pulses instead of by Master Pulses, and if the output from the delay circuit 917′ occurred just after one boundary marker pulse in point of time, it would otherwise be necessary to wait until the next boundary marker pulse occurred to read the card, assuming that the circuit of Figure 6 is used for circuit 920, or until the second boundary marker pulse thereafter occurs if the circuit of Figure 16 is utilized for circuit 920. By using Master Pulses for this purpose, output pulses from matrix 908 (Fig. 9X) are read into the Card Assembly Revolver at the first possible moment after an output is produced from delay circuit 917′ (Fig. 9X). Note that this reading may start with any one of the distributor pulses $C_{80}$ through $C_1$, rather than waiting for the next distributor pulse $C_{80}$, as would be the case if circuit 920 were energized from boundary marker pulses.

However, each "bit" corresponding to a particular distribtuor pulse $C_n$ is always recorded at a predetermined location or address within a sector (defined by the boundary marker pulses) of the corresponding track on the Card Assembly Revolver and thereafter, in effect, appears in that same location in each of the other nine sectors of that track due to the recirculation of the information on each track. There are eighty such successive locations or addresses within each sector, and the particular address in each sector of each Card Assembly Revolver track which is parallel with a boundary marker pulse on track 810 defines a "bit" corresponding to a distributor pulse $C_1$. Proceeding from the reading transducers toward the recording transducers, the next address on each track, which is parallel with the next Master Pulse on track 610, defines a "bit" corresponding to a column pulse distributor $C_{80}$, and so forth for distributor pulses $C_{79}$ through $C_1$, again in turn.

For example, when the 12's row of a card is being recorded in the first or leftmost track of the Card Assembly Revolver, it may happen that the "bit," if any, corresponding to the $C_{50}$ pulse is entered first, and then the remaining "bits," if any, corresponding to pulses $C_{49}$ through $C_1$, and $C_{80}$ through $C_{51}$, in turn. Assuming that there is a "bit" corresponding to the $C_{50}$ pulse, the first "bit" thus entered will be recorded in the $C_{50}$ address of one sector, the next "bit," if any, in the successive ($C_{49}$) address of the same sector, and so forth, through the last or $C_1$ address of that sector. The next "bit," if any, will be entered in the $C_{80}$ address of the next sector, which is adjacent to the $C_1$ address of the previous sector, and the remaining "bits," if any, will be entered in the successive $C_{79}$ through $C_{51}$ addresses, in turn, of this same "next" sector. Thereupon, flip-flop 950(*a*) (Fig. 9X) will be returned to its 1 state by the marker pulse derived from transducer 412′ (Fig. 9V) via line 966. This closes input revolver gate 956(*a*) and opens recirculation gate 978(*a*) in Figure 9Y so that the information just recorded at address $C_{50}$ in the previous sector and now being read by reading transducer 412(*a*) in Fig. 9V will be recirculated to recording transducer 410(*a*). It is thus apparent how the information recorded in successive addresses $C_{50}$ through $C_1$ of the previous sector will be repeated in this second sector of the first Card Assembly Revolver track as it passes under recording transducer 410(*a*), how the information recorded in successive addresses $C_{80}$ through $C_1$ of the second sector will be repeated at corresponding addresses in the third sector, and so forth.

Thereafter, when the 11's row of the card is being read and recorded in the second track (from the left) of the Card Assembly Revolver, it may occur that the "bit," if any, corresponding to the $C_{23}$ pulse is read first, followed by the "bits," if any, corresponding to the pulses $C_{22}$ through $C_1$ and $C_{80}$ through $C_{24}$, in turn. Thus, the "bits," if any, corresponding to the $C_{23}$ through $C_1$ pulses will be entered, starting at the $C_{23}$ address, into that sector of the second track which is under recording head 410(*b*) (Fig. 9V) when the reading of the 11's row of the card is started, and the "bits," if any, corresponding to pulses $C_{80}$ through $C_{24}$ will be entered, in turn, starting at the $C_{80}$ address, in the next sector as the drum 210 revolves. The remainder of this next sector will thereafter be filled through the associated recirculation line in the same manner as just described above, and succeeding sectors of the same track will be filled similarly, due to flip-flop 950(*b*) of Fig. 9X being returned to its 0 state as soon as the "bit," if any, corresponding to the $C_{24}$ pulse is entered into the second sector of the second Card Assembly Revolver track referred to.

It will thus be apparent that if there were a $C_{80}$ "bit" recorded in both the 11's and 12's columns of a card (which would, however, be meaningless in the code of Fig. 11), these "bits" would be read simultaneously by the reading transducers 412(*a*) and 412(*b*) of Fig. 9V. Again, briefly, this is because each successive sector is filled with corresponding information from the previous sector due to the recirculation path provided, the fact that the different Card Assembly Revolver tracks and the timing tracks are all on the same drum, and the further fact that the distributor pulses $C_{80}$ through $C_1$ are synchronized with successive Master Pulses, pulse $C_1$ also coinciding with a boundary marker pulse on track 810 (Fig. 9V).

In connection with the recirculation referred to above, note that such recirculation is provided for each of the Card Assembly Revolver tracks whenever the corresponding flip-flop 950(*a*)–(*l*) of Fig. 9X is in its normal or 0 state.

It will be understood that the card columns are thus in effect aligned across the drum revolver tracks of the Card Assembly Revolver. At will be more fully apparent below, it is desirable to have the columns so aligned because it may be desired to remove corresponding "bits" of the information simultaneously, i.e. in parallel, from all of the revolver elements. However, while the alignment of the columns on the drum may, as shown, conveniently be in physical alignment, i.e. in lines parallel to the axis of the drum, nevertheless, even if the various columns are staggered circumferentially on the respective tracks of the drum, electrically the columns may be aligned by suitably staggering the position of the reading and recording transducers in the various tracks. Therefore, the columns may be arranged in "electrical" alignment even if they are not in physical alignment.

It will furthermore be observed that each row of a card may appear in a separate track of the drum surface or they may all appear in the same track. In the latter case, each column will occupy discrete portions about the circumference of the drum. In either case, electrical alignment exists.

After the complete Card Assembly Revolver has been loaded, the information may be removed from all of the tracks simultaneously and forwarded to the data and processing equipment. In fact, the information in the Card Assembly Revolver tracks may be tapped at any time and this will not interfere with or tend to erase the information which is circulating. The tapping-off of information from the Card Assembly Revolver tracks may be through gates 352(*a*)–352(*g*), shown in Figure 9T.

In serially removing information from the respective Card Assembly Revolver tracks to the card punch, it has been pointed out above that this data will be available on line 965 (Figure 9Y) whenever the revolver output gates 960(*a*)–960(*l*) are opened. As shown in Figure 9Z, the data on line 965 will first pass through a gate 982 enabled over a line 984 which is arranged, in a manner to be described below, to carry a continuous card handling enable potential whenever the Card Assembly Revolver is to be loaded and unloaded. The pulses available through gate 982 will first be received from the revolver element 962(*a*), then 962(*b*) and so forth, in sequence. The sequential unloading comes about because of the sequential enabling of the previously mentioned flip-flops 950(*a*)–(*l*) of Figure 9X and the previously mentioned lines 952(*a*)–(*l*) leading therefrom.

The pulses passing through gate 982 (Fig. 9Z) are first amplified and shaped in circuit 986 and are then made available on a bus conductor 988 which is, in turn, connected to the second grid 990 of each of eighty thyratron stages 992. Accordingly, each time such a pulse appears on bus 988, all eighty of the grids 990 will be simultaneously enabled. However, the first grids 994 of the thyratron stages 992 are individually controlled by the Column Pulse Distributor. Therefore, as will be apparent from the foregoing, the solenoid coils 996 of each of the punches of the card punch will be energized at the index point involved) as the thyratron stages 992 are energized in sequence. The thyratrons may be readily "cleared" by momentarily removing the source of anode potential following the punching of each row in the cards. Means for so clearing the circuit is obvious and therefore not shown.

It is also possible to have information delivered from data processing equipment or other source into the Card Assembly Revolver. As shown in Figure 9Y, this is under control of a line 991 on which may be caused to exist Master Pulses for application to those gates 993(*a*)–993(*l*) which are otherwise enabled. The incoming enabling voltages comprise signals to these gates available from the Factor Shifter over cable 130 leading from translator 128 (Figure 9U). This cable 130 comprises twelve lines corresponding to the twelve element IBM card code, and it will be recalled that a signal will appear on only one of these lines at a time, when numerical information is being transmitted, i.e. one of the 0–9 lines.

Line 991 is connected to the output of gate 667 in Figure 9W, which output comprises the Master Pulses occurring between Field Begin and Field End times when a potential appears from Program Control on line 661, indicating that it is desired to read from the Factor Shifter into the Card Assembly Revolver. Each of these Master Pulses on line 991 is inverted in inverter 995 before application to all of gates 993(*a*)–(*l*) simultaneously, so that numerical information appearing at that moment in the form of an enabling potential on one of the twelve lines of cable 130 is entered in the respective revolver track through a respective one of the recording transducers 410(*a*)–(*l*) of Figure 9V. Note, particularly, that each Master Pulse can pass only to that one of the recording transducers 410(*a*)–410(*l*) whose corresponding gate 993(*a*)–993(*l*) is enabled over cable 130 from translator 128 (Figure U), thereby entering the digit, stored at that moment in the unit's stage of the Factor Shifter, into the proper one of the twelve tracks of the Card Assembly Revolver at that address which is under the recording transducers 412 at the same moment. When the next Master Pulse occurs, the digit previously in the ten's stage of the Factor Shifter will have been shifted into the unit's stage and the magnetic drum will have revolved to the next address. This continues for the ten column shifts of the Factor Shifter between the selected Field Begin and Field End times to transfer to the Card Assembly Revolver from the Factor Shifter the 10 digits stored in the latter.

It is, of course, also necessary that the recirculation paths for the Card Assembly Revolver elements be opened during this period. This is accomplished by applying the output of gate 659 (Fig. 9W) over line 997 and respective blocking diodes to the 1 input of each of flip-flops 950(*a*)–950(*l*) of Figure 9X, thus disabling each of recirculation gates 978(*a*)–(*l*) (Fig. 9Y). At Field End time the recirculation paths are again closed, however, due to the application of a Field End pulse via line 942′ and a blocking diode 998 to line 966 and the common connection to the 0 input sides of each of flip-flops 950(*a*)–950(*l*).

ADDER

The Adder will now be described with reference to Figures 9N and 9O. The Adder is actually a subtractive device and may be termed a subtractive Adder. An input translator 1010 (Fig. 9N) is provided for converting five elements (the tetrad elements and the redundant element) of the machine code, described above and employed for numeric information, into a form of biquinary code wherein one of five lines (each line representing respectively 0, 2, 4, 6 or 8) is energized to represent the "even" whole number component (0, 2, 4, 6 or 8) of the digit, and one of two additional lines (representing 0 or 1) is energized to represent the "odd-even" indication. Referring to Figure 9N, the input, in the five element machine code, appears on a 5-wire cable 1012 leading from line 122 (Figures 9P and 9M). One output appears on one of five conductors of the 5-wire cable 1014, and the other output appears on one of the two lines 1016 and 1018, representing the odd and even indications, respectively.

The Input Translator 1010, per se, includes a flip-flop register as described below, and this register is provided with a clearing circuit including line 1020. A suitable matrix circuit for the Input Translator 1010 is shown in Figure 25 and described below under the heading Adder Input Translator.

The five separate lines of the translator output cable 1014 feed through five cathode follower circuits, designated 1022, there being one for each individual line, and thence via cable 1024 to a 5 x 5 Subtraction Table matrix 1026. The outputs of these cathode follower circuits 1022 are also applied over a cable 1028 through five gates, designated 1030, to a Minuend Register 1032. These gates 1030 are arranged to be enabled by suitable pulses applied over line 1034′, and the Minuend Register is arranged to be cleared over line 1036 by E pulses generated by drum 210 (Figure 9V).

Suitable circuits for the Subtraction Table matrix 1026 are shown in Figure 26 and described below under the heading Adder Subtraction Table. The Minuend Register 1032 is not described in detail since it is simply a flip-flop register, well known to those skilled in the art.

The output from Subtraction Table matrix 1026 appears on cable 1038, comprising five individual lines (see Figure 26) and is applied through five respective cathode follower circuits 1040 to a circuit termed a Two-Step Adjuster 1042. There is also connected, between the Subtraction Table 1026 and Adjuster 1042, a line 1044 for indicating a carry from the Subtraction Table and a line 1046 for indicating "no carry." The output from this Adjuster 1042 is further applied, over 5-wire cable 1048 and through five respective cathode follower circuits 1050, to a One-Step Adjuster 1052. The output from the One-Step Adjuster 1052, comprising a signal on one of ten lines of cable 1054, is applied through ten cathode followers 1056 and cable 1057 to an Output Translator circuit 1058 shown in block form in Figure 9O. The latter reconverts the code from the generally bi-quinary code described above to the five element machine code; its output appears on cable 1060 and is applied through five gates 1062 to output line 136 (Figs. 9O, 9L, 9I, 9F, 9E, 9D, 9G, 9J, 9M, 9P, 9R and 9T), leading via line 132 of Fig. 9T to gates 358(*a*)–358(*e*) (Fig. 9T) and also via line 138 (Figs. 9T, 9V and 9W) to transducers 1312 (Fig. 9W). Gates 1062 (Fig. 9O) are arranged to be enabled over line 1063 carrying E phase pulses.

The Two-Step Adjuster 1042 (Fig. 9N) has an additional inputs line 1066, which may be energized to subtract 2 in the Two-Step Adjuster, and line 1068 for subtracting 0. It also has an output line 1070 for indicating "no carry" and an output line 1072 for indicating a carry.

For the One-Step Adjuster there is provided a line 1074 for causing the addition of 0 and a line 1076 for causing the addition of 1. Branching from line 1074 is a line 1078 for indicating a carry for use in arithmetic sequence control circuits to be described below. There is also a line 1080 branching from line 1076 for similarly indicating a "no carry."

The Two-Step Adjuster and the One-Step Adjuster are described in detail below under the headings Adder-2-Step Adjuster and Adder-1-Step Adjuster and are shown in Figures 27 and 28, respectively.

To provide the necessary controls for the Adjusters, there is provided a two-stage binary counter 1082 (Fig. 9N) having its first or $2^0$ stage providing, over output lines 1084 and 1086, respectively, the "add 1" and "add 0" commands to lines 1076 and 1074, respectively. In similar manner the second or $2^1$ stage of counter 1082 is connected by output lines 1088 and 1090, respectively, to provide the "subtract 0" and "subtract 2" commands to input lines 1068 and 1066, respectively, of the Two-Step Adjuster 1042.

The odd and even indication lines 1016 and 1018, respectively, from the Input Translator 1010 are applied as first enables to gates 1092 and 1094, respectively. The second enable to gate 1092 comprises D pulses applied via line 1096, and the second enable of gate 1094 comprises III pulses (described presently) applied via line 1098 connected to line 1034′. The outputs of gates 1092 and 1094 are combined on line 1100 as the input to the two stage binary counter 1082, by which this counter may be advanced through its cycle.

The two stage binary counter 1082 is presettable to 00 over line 1102 and presettable to 01 over line 1104. Further, gates 1106 and 1108 are provided and have E pulses applied thereto over a common enabling line 1110 so that the "no carry" and carry signals on lines 1070 and 1072, respectively, may be gated to the presetting lines 1102 and 1104, respectively.

Before proceeding further with a description of the operation of the Adder, it may be noted at this point that the Input Translator 1010 operates on a time sharing basis in order to save a considerable number of components.

The operation of the Adder, in general, is as follows: The Adder accepts, on the five conductor input cable 1012, two respective five "bit" digits serially in time sequence and each in said five element machine code. Subsequently there is provided, on the five conductor output cable 1060 (Figure 9O), the difference (see also Fig. 1) between the first received five element digit on cable 1012 (which is the minuend) and the second received digit (which is the subtrahend). As explained more fully below, both input digits are received on input cable 1012 (Fig. 9N) and the resultant output is transmitted to output cable 1060 (Fig. 9O) within one Master Pulse interval (this being one Master Pulse digit time). Thus, the Adder may be termed a serial-serial device in that it deals both with digits arriving serially and with events occurring serially within one digit time, i.e. the time duration between two successive Master Pulses.

By reference to the legends appearing in Figure 9N, it will be understood that certain time spaced control pulses derived from the machine control pulses are necessary. It will be recalled that the Master Pulses and also the phase pulses A, B, C, D and E are developed by one portion of the rotating magnetic drum 210, as described above under the heading Control Pulses. For example, on line 1020 there will be applied all E pulses and also what may be termed III pulses, derived from delay circuit 1256 (Figure 9M) via line 1258. In some modes of operation these III pulses are A pulses delayed to fall between A and B pulses (see, in Fig. 9M, line 1232, gate 1240 and delay circuit 1256), and in other modes of operation these are B pulses delayed to fall between B and C pulses (see, in Fig. 9M, line 1234, gate 1238 and delay circuit 1256). This is pointed out more fully below in connection with the chart of Figure 17. These III pulses are also inverted in inverter 1033 (Fig. 9N) and applied, as mentioned above, to line 1034′, which enables the group of gates 1030 leading the Minuend Register 1032, and to line 1098, which enables the gate 1094 described above. As also mentioned above, D pulses are applied as one enable to gate 1092. E pulses are also applied to line 1036, feeding Minuend Register 1032, as well as to the line 1110 comprising the common enabling connection to gates 1106 and 1108, and to line 1063 (Fig. 9O) enabling the group of gates 1062.

Referring generally to the application of control pulses to the Adder, it will be understood that a control pulse (hereafter termed a III pulse) is required to occur between the minuend and subtrahend inputs in order to clear the Input Translator and to transfer the even component of the minuend to the Minuend Register, as described later, and the even indication of the odd-even indication of the minuend to the two stage binary counter 1082. A similar control pulse (hereafter termed a D pulse) is needed to transfer the odd indication of the odd-even indication of the subtrahend to the two stage binary counter 1082. The time within the Master Pulse periods in which the various events occur within the Adder is somewhat variable, inasmuch as the Adder is required to operate in several different modes, as will be described in greater detail below. However, the order in which the events occur does not vary.

The operation of the Adder may now be traced in greater detail as follows:

At a Master Pulse time the Input Translator 1010 will have been previously cleared and the adjustment control circuits, including the counter 1082, will provide a carry or "no carry" on line 1078 or 1080, respectively. At this Master Pulse time, and only at this time, the mode of operation of the Adder may be changed, and at this time a carry may be forced via line 1104 or the carry may be suppressed via line 1102. After the Master Pulse time, the minuend is read into the Input Translator at either an A or B pulse time, depending upon the Adder mode (see Figure 17). After this, control pulse III is applied. The latter transmits the even component of the minuend digit to the Minuend Register, the even portion of the odd-even indication to the adjustment control circuits through gate 1094, and clears the Input Translator. Subsequently, on a B or C pulse, the subtrahend digit is read into the Input Translator. At that time, the output of the Subtraction Table 1026 provides, as described below, the true difference of the even components of the minuend and subtrahend input digits, and, except in the case when the two input digits are the same (0 output from the Subtraction Table 1026), the carry resulting from the subtraction is provided. On the D phase pulse, the odd portion of the odd-even indication of the subtrahend digit is read into the adjustment control circuits through gate 1092. At this time all the information has reached its proper destination in the Adder and, after allowing for rise times in the Adder, the Two-Step Adjuster, and the One-Step Adjuster, the correct difference digit information is available. It may be pointed out here that the indecision concerning carry for 0 output from the Subtraction Table 1026 is resolved in the Two-Step Adjuster. On the next E phase pulse applied to the group of gates 1062 (Fig. 9O), the output or difference digit is read into the output line 136, the Input Translator (Fig. 9N) and Minuend Register are cleared, and the output carry is set into the adjustment control circuits through gates 1106 and 1108.

*Adder operation*

A brief description of the manner in which the Adder operates may be helpful at this point. Assuming that it is desired to subtract 3 from 8, the true values of these digits will be inserted in succession in the Adder through the Input Translator 1010 (Fig. 9N), the minuend value 8 being entered first, followed by the subtrahend value 3. The even component 8 of the minuend value 8 is first stored in Minuend Register 1032 in the manner described above, and during this operation the two-stage binary counter 1082 is advanced from its initial setting of "00" to a setting of "01" because of the III pulse applied to gate 1094 while its other input line 1018 is enabled (due to the fact that the minuend value is even). It will be recalled that this III pulse also enables gates 1030 in Figure 9N to enter the even component of the minuend into the Minuend Register 1032 and at the same time clears the Input Translator 1010 over line 1020 to permit the subsequent insertion of the subtrahend digit into the Adder. Thereafter the subtrahend value 3 is entered into Input Translator 1010 and there separated into its even component, i.e. the digit 2, and an indication on line 1016 that the subtrahend value is odd. At the subsequent D pulse time, the two-stage binary counter 1082 is advanced further to a setting "10" by gate 1092 because of this enabling of odd indication line 1016. The result of advancing two-stage binary counter 1082 through this second step is that both lines 1076 and 1066 leading to the One-Step Adjuster 1052 and Two-Step Adjuster 1042, respectively, now have output signals thereon.

Referring next to Figure 26, which shows the detailed circuitry of the 5 x 5 Subtraction Table 1026, a sustained signal will appear on 8 minuend input line 2744 because of the even component of the minuend value stored in Minuend Register 1032, and the 2 subtrahend input line 1024 will carry a similar signal because of the even component of the subtrahend value passed by Input Translator 1010 and a respective one of the five cathode followers 1022 (Fig. 9N). The result of this subtraction of 2 from 8 is a signal on the 6 output line 1038 and a signal on "no carry" line 1046.

As may further be seen from an inspection of the detailed circuitry of Two-Step Adjuster 1042, shown in Figure 27, the result of a signal on both its 6 input line 2762 and its "subtract 2" input line 1066 (from the two-stage binary counter 1082) is a signal on the 4 output line 1048 thereof. Note also that "no carry" input line 1046 is directly connected to "no carry" output line 1070 leading to the Adjustment Control gate 1108 (Fig. 9N). At E pulse time of the Master Pulse period during which this subtraction is taking place, and which defines the end of this particular step of the subtraction cycle, gate 1108 will thus pass an E pulse, applied to it via line 1110, to line 1102 to set the two-stage binary counter 1082 to an initial setting of "00" for the next subtraction cycle, thereby indicating that no carry was produced from the cycle just described. Note that this fact is also indicated for use in other portions of the machine on "no carry" line 1080.

The above mentioned signal on the 4 output line 1048 of the Two-Step Adjuster 1042 is next passed through a respective one of the five cathode followers 1050 (Fig. 9N) and applied to the 4 input line 2772 of One-Step Adjuster 1052, whose detailed circuit is shown in Figure 28. It will be recalled that "add 1" line 1076 from the two-stage binary counter 1082 also has a signal thereon, thereby producing an output on 5 output line 1054. The desired answer (8—3=5) has thus been obtained.

The operation of the Adder for an addition process is similar, but an example may also be helpful. Assuming that it is desired to add the digits 2 and 5, the Addend 5 will be available to the Adder in 9's complement form as the subtrahend and the Augend 2 will be available in true form as the minuend, i.e. the digits 2 and 4 will be entered in succession, in that order, via Input Translator 1010 (Fig. 9N), 2 being the minuend and 4 the subtrahend. Also, in this machine, in the addition process, a pulse is initially applied to "force carry" line 1104 when the additive command is transmitted from Program Control to institute the Augment mode of the Adder, as described below. This initially advances the two-stage binary counter 1082 from its setting of "00" to a setting of "01," so that an output signal is available upon line 1074 leading to One-Step Adjuster 1052 and upon line 1068 leading to the Two-Step Adjuster if the counter is not advanced further.

The minuend value 2 is entered as a true number in the Adder first and the even component thereof (2) stored in Minuend Register 1032 in the manner described above. During this operation the two-stage binary counter 1082 is advanced one step further (to a setting "10") because of the III pulse applied to gate 1094 while its other input line 1018 is enabled (due to the fact that the minuend digit is even). Thereafter, the even component (4) of the subtrahend value is entered in the 5 x 5 Subtraction Table 1026 from Input Translator 1010, the even component 2 of the minuend value already being available to the 5 x 5 Subtraction Table from the output of Minuend Register 1032. Note that the two-stage binary counter 1082 was not advanced further at D pulse time during the entry of the subtrahend, inasmuch as the subtrahend value was also even and line 1016 was therefore not enabled. Note again, also, that the result of advancing two-stage binary counter 1082 through two steps (to the setting "10") is that both lines 1076 and 1066 leading to the One-Step Adjuster 1052 and Two-Step Adjuster 1042, respectively, now have output signals thereon.

As may be seen from inspection of Figure 26, the result of subtracting 4 from 2 is a signal on the 8 output line 1038 of the 5 x 5 Subtraction Table 1026 and a signal on its carry line 1044.

As may further be seen, from an inspection of Figure 27, the result of a signal on both the 8 input line 2762 and the "subtract 2" input line 1066 of Two-Step Adjuster 1042 is a signal on the 6 output line 1048 thereof. Note also that input carry line 1044 is directly connected to output carry line 1072 leading to the Adjustment Control gate 1106 (Fig. 9N). At E pulse time of the Master Pulse period during which this subtraction is taking place, and which defines the end of this particular step of the subtraction cycle, gate 1106 will thus pass an E pulse to line 1104 to set the two-stage binary counter 1082 to an initial setting of "01" for the next subtraction cycle.

The above mentioned signal on the 6 output line 1048 from the Two-Step Adjuster 1042 is next passed through a respective one of the five cathode followers 1050 (Fig. 9N) and applied to the 6 input line 2772 of One-Step Adjuster 1052 (Fig. 28). It will be recalled that "add 1" line 1076 from the two-stage binary counter 1082 also has a signal thereon, thereby producing an output on 7 line 1054. The desired answer (2+5=7) has thus been obtained, and a carry has been entered into two-stage binary counter 1082 to set it to "01" for adjustment purposes during the next cycle.

The Adder operates continuously, and in the next cycle, both the addend and augend being 0, the answer should also be 0. The augend 0 is entered in true form as the minuend, its even component (0) being passed to Minuend Register 1032 by the same III pulse that advances two-stage binary counter 1082 to a setting "10" due to the enabling of line 1018 (since the minuend was even). Thereafter the 9's complement of the subtrahend value of 0 (9) is entered in the Input Translator and there separated into its even component (8) which is entered in the 5 x 5 Subtraction Table 1026 at the same time that a signal is applied to odd indication line 1016 to enable gate 1092 and further advance two-stage binary counter 1082 to a setting "11" at D pulse time. The result of advancing two-stage binary counter 1082 through three steps (to the setting "11") is that both lines 1074 and 1066 leading to the One-Step Adjuster 1052 and Two-Step Adjuster 1042, respectively, now have output signals thereon.

Referring again to Figure 26, the result of subtracting 8 from 0 is a signal on the 2 output line 1038 of the 5 x 5 Subtraction Table 1026 and a signal on its carry line 1044.

Referring next to Figure 27, the result of a signal on both the 2 input line 2762 and the "subtract 2" input line 1066 of Two-Step Adjuster 1042 is a signal on the 0 output line 1048 thereof. Note again that the carry signal on input line 1044 is directly connected to output carry line 1072 leading to Adjustment Control gate 1106 (Fig. 9N). This carry signal will, at the ensuing E pulse time, thus set two-stage binary counter 1082 to an initial setting of "01" for the next subtraction cycle, as described previously.

The above mentioned signal on the 0 output line 1048 from the Two-Step Adjuster 1042 is next passed through a respective one of the five cathode followers 1050 (Fig. 9N) and applied to the 0 input line 2772 of One-Step Adjuster 1052 (Fig. 28). It will be recalled that "add 0" line 1074 from the two-stage binary counter 1082 also has a signal thereon, and an output is thus produced on 0 output line 1054. The desired answer of 0 has thus been obtained, and it is also seen that the same answer will be obtained during successive subtraction cycles until a subtrahend value other than 0 is entered in the Adder.

Table C shows the adjustments which must be made through the Two-Step Adjuster 1042 and One-Step Adjuster 1052 of Figure 9N for the various conditions of carry or "no carry," odd or even minuend value, and odd or even subtrahend value during the subtraction of one digit from another. In this table, a carry is indicated by a −1 and a "no carry" by a 0. An even minuend digit is indicated by a 0 and an odd minuend digit by a +1. An even subtrahend digit is indicated by a 0 and an odd subtrahend digit by a −1.

TABLE C

| Carry (= −1) or "No Carry" (=0) | Minuend (Odd=+1) | Subtrahend (Odd= −1) | Adjustments to— | |
|---|---|---|---|---|
| | | | 2-Step Adjuster | 1-Step Adjuster |
| 0 | +1 | 0 | 0 | +1 |
| −1 | +1 | 0 | -------- | -------- |
| 0 | 0 | 0 | 0 | 0 |
| 0 | +1 | −1 | -------- | -------- |
| 0 | 0 | −1 | -------- | -------- |
| −1 | +1 | −1 | −2 | +1 |
| −1 | 0 | 0 | -------- | -------- |
| −1 | 0 | −1 | −2 | 0 |

Table C' shows the timing of the adjustment pulses required and indicates the manner in which this is achieved through the advancement of the two-stage binary counter 1082 of Fig. 9N through from 0 to 3 steps. The D, E, and III pulses have been referred to above. The II pulse comprises the pulse appearing on "force carry" line 1104 as initiated by Program Control for various Adder modes, as will be apparent from the following description regarding Adder modes. Further, the first column corresponds to the first three columns of Table C, the last two columns correspond to the same columns of Table C, and an A in the second, third or fourth column indicates that the advance is to take place at the respective time of occurrence of the pulse identified in the heading of that column.

TABLE C'

| | Advance Count on Control Pulse— | | | Number of Advances | Binary Reading of Counter | Adjustments to— | |
|---|---|---|---|---|---|---|---|
| | E or II | III | D | | | 2-Step Adjuster | 1-Step Adjuster |
| 0 +1 0 | ------ | ---- | ---- | 0 | 00 | 0 | +1 |
| −1 +1 0 | A | ---- | ---- | ---- | ---- | ---- | ---- |
| 0 0 0 | ---- | A | ---- | 1 | 01 | 0 | 0 |
| 0 +1 −1 | ---- | ---- | A | ---- | ---- | ---- | ---- |
| 0 0 −1 | ---- | A | A | ---- | ---- | ---- | ---- |
| −1 +1 −1 | A | ---- | A | 2 | 10 | −2 | +1 |
| −1 0 0 | A | A | ---- | ---- | ---- | ---- | ---- |
| −1 0 −1 | A | A | A | 3 | 11 | −2 | 0 |

*Adder modes*

It has been stated above that the Adder may operate in several different modes. These will now be described with reference to Figure 17. This figure illustrates a table, along the left-hand side of which are set forth the Adder modes of operation as follows: Augment (AUG.), Diminish (DIM.), Pad (PAD), Idle (IDL.), Clear (CLR.), Enter (ENT.), Complement (COM.), and Enter Quotient Digit (EQD). Along the top of the table, the time occurrence of Master Pulses is indicated by the letters MP and, spaced therebetween, are indications of the time occurrence of the phase pulses A to E, inclusive. Further, a pulse A' appears between A and B and is a delayed A pulse, and pulse B' appears between B and C and is a delayed B pulse. It will be recalled that this is the sequence of pulses MP and A to E, inclusive, as developed by the transducers described under the above heading Control Pulses. The delayed pulses A' and B' are developed by passing the A and B pulses, respectively, through a delay unit 1256 (Fig. 9M).

Horizontally aligned with the Adder modes and vertically aligned with the phase pulses appear certain characters indicating operations involving the Adder which are to occur at the time of certain phase pulses during different modes of Adder operation. For example, in the Augment line under the B pulse there is the notation AR. This means that the minuend is to be read from the Arithmetic Revolver (AR) 108 (Fig. 1), to the Input Translator 1010 (Fig. 9N) of the Adder at B pulse time. Thereafter, in this Augment mode, at B′ time the III or B′ pulse is applied, as for example to line 1020 (Fig. 9N), for clearing the Adder Input Translator 1010. Opposite Augment in this table of Figure 17 and under the C phase pulse, the notation FS′ indicates that the complement of a number in the Factor Shifter 120 (Fig. 1) is to be applied to the Adder Input Translator 1010 (Fig. 9N) as the subtrahend. With regard to the D and E phase pulses of this table, these indicate that such pulses are to be applied to various control circuits as per the legends in Figures 9A to 9Z, inclusive, at these times.

To further describe the symbols in the table of Figure 17, a 0 indicates that a number 0 is to be applied to the Adder Input Translator 1010 (Fig. 9N), FS indicates that the actual or uncomplemented number in the Factor Shifter is to be applied, a 9 indicates that a number 9 is to be applied (for complementing purposes), and a DK indicates that a number from a digit counter (to be described hereinbelow) is to be applied, each, respectively, to the Adder Input Translator 1010 (Fig. 9N).

The Adder mode can be changed at, and only at, a Master Pulse time. Since, as has been explained above in connection with Figure 1, the Adder is a part of the recirculation path of the Arithmetic Revolver, the Adder must always be functioning, and, in one of the modes as set out in Figure 17, the order to avoid losing the contents of the Arithmetic Revolver. As will be explained in greater detail below under the heading Arithmetic Revolver, the Arithmetic Revolver has a delay time of 19.4 digit times (or Master Pulse times) and the Adder provides the other 0.6 digit time delay to provide a total delay of 20 digit times. Thus the Adder must always provide an output digit at E pulse time, and, in those modes in which the Arithmetic Revolver output is supplied to the Adder input, the Adder must accept the output from the Arithmetic Revolver at B pulse time, regardless of whether the Arithmetic Revolver output is to be used as the minuend or the subtrahend, since it is only available at B pulse time. The flexibility of control pulse time just described is provided because the first digit presented to the Adder must always be the minuend.

The Adder modes, as explained in Figure 17, may be described functionally as follows:

Augment (Aug.)—The 9's complement of the digit in the Factor Shifter is subtracted from the digit in the Arithmetic Revolver.

Diminish (Dim.)—The digit in the Factor Shifter is subtracted from the digit in the Arithmetic Revolver.

Pad (Pad)—The number 9 is subtracted from the digit in the Arithmetic Revolver.

Idle (Idl.)—The number 0 is subtracted from the digit in the Arithmetic Revolver.

Clear (Clr.)—The number 0 is established in the Arithmetic Revolver and 0's are thereafter subtracted from the 0.

Enter (Ent.)—The 9's complement of the digit in the Factor Shifter is subtracted from 0 to enter the number in the Factor Shifter into the Adder-Arithmetic Revolver recirculation path.

Complement (Com.)—The digit in the Arithmetic Revolver is subtracted from 0.

Enter Quotient Digit (EQD)—The digit in the Digit Counter (the Digit Counter is described below under the heading Digit Counter) is subtracted from 0.

*Adder control*

Referring now to Figure 9M, a circuit is illustrated for controlling the Adder so that it operates in the selected one of the various modes. Lines 1210, 1212, 1214, 1216, 1218, 1220, 1222 and 1224 are indicated by legend, respectively, as the Augment (AUG), Diminish (DIM), Pad (PAD), Idle (IDL), Clear (CLR), Enter (ENT), Complement (COM), and Enter Quotient Digit (EQD) lines. In operation, as will be described below, properly timed pulses available on any one of the mode lines are employed to set either one or more of a group of flip-flops 1230($a$)–1230($g$). For example, a pulse on the Augment line 1210 will set flip-flops 1230($a$), 1230($b$) and 1230($d$) to their 0 states, and will set flip-flops 1230($c$), 1230($s$), 1230($f$) and 1230($g$) to their 1 states. This setting is accomplished by means of crystal diodes connected in matrix fashion as shown in Figure 9M. Pulses on the other mode lines 1210 through 1224 will set the flip-flops 1230($a$)–1230($g$) in a manner corresponding to the placement of the crystal diodes shown in this figure.

A phase pulses are applied to the Adder control circuit over a line 1232, B phase pulses over line 1234 and C phase pulses over line 1236. A gate 1238 has one input from the 0 output of flip-flop 1230($a$), while its second input is from the B phase pulse line 1234. A gate 1240 is connected to have one input from the 1 side of flip-flop 1230($a$) and a second input from the A phase pulse line 1232. A gate 1242 is provided having as a first input the 0 output of flip-flop 1230($b$), and as a second input a connection to the B phase pulse line 1234. A gate 1244 has as its first input the 0 output of flip-flop 1230($c$) and as a second input a connection to the C phase pulse line 1236. Other gates 1246, 1248, 1250 and 1252 each have as a first input the 0 output of flip-flops 1230($d$), 1230($e$), 1230($f$), and 1230($g$), respectively. The second input to each of gates 1346 through 1252 is by connection to the C phase pulse line 1236.

A delay circuit 1256, mentioned above, is provided and has for its input the outputs of gates 1238 and 1240, each output passing through a respective blocking diode. The output line 1258 from delay circuit 1256 extends to a connection, with the line 1020 (Fig. 9N) of the Adder Input Translator and carries the III pulses referred to previously. An output line 1260, extending from the gate 1240 (Fig. 9M) through a blocking diode, is connected to a "Set to 0" Register 1261. An output from gate 1244 is also connected through a blocking diode to this output line 1260 and serves as another input to register 1261. The output of this register is connected to three of the lines 1272, and a pulse appearing at its input will pass the numeral 0 in the five-element machine code over the multiple conductor cable 122 to a connection with the Adder Input Translator input cable 1012 (Figs. 9M and 9N).

The output of gate 1242 is a line 1262 for carrying a pulse commanding a transfer of digits from the Arithmetic Revolver to the Adder. This line is connected as one enable of gates 1328 (Fig. 9D).

The output of gate 1246 is on line 372 for commanding transfer of complemented digits from the Factor Shifter to the Adder. This line is connected as one enable of gates 368($a$)–368($e$) in Figure 9P.

The output of gate 1248 is no line 370 for commanding transfer of the digit in the Factor Shifter to the Adder without being complemented. This line is connected as one enable of gates 366($a$)–366($d$) and 368($a$) in Figure 9P.

The output of gate 1250 is on line 1268 connected as the input to a "Set to 9" Register 1270. A pulse appearing on line 1268 will thus energize three of the lines 1272 shown and thereby pass a number 9 in the five element machine code over the multiple conductor cable 122 to a connection with the Adder Input Translator input cable 1012.

The output of gate 1252 is on line 1276 for commanding a transfer of the digit from the digit counter (to be described below under the heading of Digit Counter) to the Adder. This line is connected as one enable of gates 2368 in Figure 9H.

There is an additional output of the Adder control circuit appearing on line 1278 extending to the "Force Carry" or "preset to 01" line 1104 (Figs. 9M and 9N) of the Adder. This line 1278 is connected, through respective blocking diodes, to Augment line 1210, Enter line 1220, and Enter Quotient Digit line 1224, and a pulse will thus appear on line 1278 whenever one of these lines is pulsed to initiate the respective Adder mode.

As one example of operation, if the Augment mode is selected, by a pulse on line 1210 (Fig. 9M) as transmitted at a Master Pulse time, the flip-flops 1230(*a*), 1230(*b*) and 1230(*d*) will be set to their 0 states and the flip-flops 1230(*c*), (*e*), (*f*) and (*g*) to their 1 states. The result is that gates 1238, 1242 and 1246 will be enabled and pulses will be transmitted to the respective output lines thereof upon the occurrence of B and C pulses. B pulses will pass at B phase time through gate 1242 and over line 1262 to transfer a digit from the Arithmetic Revolver to the Adder. B pulses will also be applied to the delay circuit 1256 through gate 1238 and will pass (as III pulses) on line 1258 to the line 1020 of the Adder Input Translator. At a later time, C pulses will pass through gate 1246 and over line 372 to transfer the 9's complement of the digit in the Factor Shifter to the Adder.

As another example, if the Clear mode is selected, by a pulse on line 1218 (Fig. 9M) as transmitted at a Master Pulse Time, flip-flop 1230(*c*) will be set to its 0 state and the other flip-flops 1230(*a*), 1230(*b*) and 1230(*d*)–(*g*) to their 1 states. The result is that gate 1240 will be enabled by the 1 state of flip-flop 1230(*a*) and gate 1244 will be enabled by the 0 state of flip-flop 1230(*c*), and pulses will be transmitted to the respective output lines thereof upon the occurrence of A and C phase pulses, respectively. A phase pulses will be passed through gate 1240 and over line 1260 to actuate the "Set to 0" Register 1261 and thus selectively pulse three of the lines 1272 to insert a coded "0" in the Adder. A phase pulses will also be applied to the delay circuit 1256 through this gate 1240, and the delayed (or III pulses) will pass via line 1258 to the line 1020 of the Adder Input Translator (Fig. 9N). At a later time, C phase pulses will pass through gate 1244 and over line 1260 to again actuate the "Set to 0" Register 1261 and again pulse the same three of the lines 1272 to insert a coded "0" in the Adder. From these examples, it is believed to be clear how the Adder will be controlled for each mode of operation.

ARITHMETIC REVOLVER

The Arithmetic Revolver is diagrammatically shown in Figure 1 and there designated by reference character 108. The details of this unit will now be described in greater detail, with reference principally to Figures 9D, 9E, 9V and 9W.

The Arithmetic Revolver is similar to the Factor Shifter in that it is a temporary storage place for binary-coded decimal information. It differs from the Factor Shifter in that the digits are expressed in only five binary items instead of seven, in that it is based on magnetic flux storage instead of tube storage, in that its capacity is twenty digits instead of ten in the exemplary embodiment, and in that the twenty digits of information are constantly recirculated serially through an external recirculation path which must include the Adder.

The Arithmetic Revolver is made up of several components, these including five revolver tracks defined by the heads 1310, 1312 and 1326 on the magnetizable drum 210 of Fig. 9W, a sixth or control track on the drum 210, as described below, a marker generator, as described below, for causing the recording of identification or location control pulses in this control track and for producing additional control pulses, and an Arithmetic Revolver Sign and Zero Control circuit, described below under the heading Arithmetic Revolver Sign and Zero Control.

Referring now to Figure 9W, the set of five transducers 1310 act as the Arithmetic Revolver output transducers, and a set of five transducers 1312 act as the input transducers. The input is over a five-conductor line 138 and the output over a five-conductor line 134. As contrasted with the Card Assembly Revolver, which has an eighty digit delay time between its input transducers 410 (Fig. 9V) and its output transducers 412, the Arithmetic Revolver has only a 19.4 digit delay time between the input and output transducers 1312 and 1310, respectively. The total twenty digit delay time is provided by the adder by virtue of a 0.6 Master Pulse period delay time therein in the recirculation circuit comprising the output of the lines 136 and 138 (see Fig. 1), the input heads 1312 (Fig. 9W), the portions of the five tracks between the input heads 1312 and the output heads 1310, and back to the Adder via line 134, input gates 1328 and line 1316 of Fig. 9D leading to the Adder input line 1012 (Fig. 9N).

An output transducer 1318 (Fig. 9V) and an input transducer 1320 operate in the sixth or control track of the Arithmetic Revolver and have a nineteen digit delay time therebetween. The output from transducer 1318 is via line 1322 and the input to transducer 1320 is via line 1324. Further, there is a set of six transducers 1326 in the data tracks (Fig. 9W) and in the control track (Fig. 9V) of the Arithmetic Revolver for erasing these tracks.

In tracing the Arithmetic Revolver output line 134 through Figures 9W, 9V, 9T, 9R, 9P, 9M, 9J and 9G, in turn, to Figure 9D, it will be noted that this line extends to the five gates 1328 mentioned above, and thence over line 1316 directly to the input line 1012 (Fig. 9M) leading to the Adder Input Translator 1010 (Fig. 9N). In tracing the Arithmetic Revolver input line 138, it will be noted that this line is connected in Figure 9T to line 136 leading from the five output gates 1062 (Fig. 9O) associated with the Adder Output Translator 1058. Thus, the output of the Adder is constantly applied to the Arithmetic Revolver input, and the output of the Arithmetic Revolver is constantly applied to the Adder input, the latter connection being through the above mentioned control gates 1328 (Fig. 9D) which, as will be described more fully below, are normally open to permit the constant recirculation which has been referred to.

*Marker generator*

It has been mentioned above that the Arithmetic Revolver has a capacity in the present example of twenty digits, as contrasted with the ten digits which may be held in the Factor Shifter. Actually, the intended purpose of the Arithmetic Revolver is to carry two ten-digit numbers, the arrangement being, in general, that in one portion of the Arithmetic Revolver one ten-digit number may be circulated, and as arithmetic operations are performed, the result of the operation may be inserted as a ten digit number in the other portion of the Arithmetic Revolver.

Pulses which will here be termed *a* pulses are recurrently applied to the Arithmetic Revolver control track through the input transducer 1320 and, after the 19 digit delay time which exists between the transducers 1320 and 1318, the *a* pulse is read out over line 1322. The pulse read out is termed the "old $a-1$" (*a*, minus one) pulse (being $a-1$ rather than *a* since only 19 digit times have elapsed). Further, there is generated what is termed a *b* pulse. However, this is generated by circuits which count off ten from a preceding *a* pulse, and the *b* pulses are not actually applied to the Arithmetic Revolver control track. To summarize, an *a* mark pulse occurs after twenty digit times, while a *b* pulse occurs ten digit times after (and before) each *a* mark. Therefore, the *b* pulse can be thought of as dividing the 20 digit "span" of the Arithmetic Revolver into two equal parts of 10 digits each.

As above stated, it is the function of the Marker Generator to receive what are termed old $a-1$ pulses and, from these pulses, to produce what are termed "old *a*" pulses, "old $a+1$" pulses and the *b* pulses. Also, the Marker Generator generates what is termed a "new *a*"

pulse for reinsertion into the control track through line 1324 and transducer 1320.

The necessity for these pulses is as follows: When a division by ten is required, as will be more fully explained below, the Marker Generator is "retarded" and produces an *a* +1 pulse 21 Master Pulse periods (digit delay times) after the recording of the preceding new *a* pulse, thereby effectively moving the decimal place of the number contained in the data tracks ahead one digit. When a multiplication by ten is required, the marker generator is "advanced," producing an old *a*—1 pulse 19 Master Pulse periods after the preceding new *a* and thereby moving the decimal place of the number in the data tracks one digit back. The *b* pulse is used to divide the normal 20 digit span of the Arithmetic Revolver into the two ten-digit spans. The Arithmetic Revolver is thus equipped to handle problems of multiplication and division by using the *b* pulse to mark the beginning of where the answer is to be stored in the Arithmetic Revolver data tracks. When the ten step process is completed, the initial position of the *b* pulse on the tracks will be indicated by an *a* pulse, which will then mark the units digit of the answer.

The components of the Marker Generator are as follows: Referring to Figure 9E, when division or multiplication operations are NOT involved, it will be desired to have the new *a* pulse in the same relative position in the revolver as was the old *a* pulse. The Arithmetic Revolver output control line 1322 is connected as the 0 input of a flip-flop 1330 and, upon the occurrence of each old *a*—1 pulse, this flip-flop will be set to its 0 state to open a gate 1322 to pass to line 1334 the next Master Pulse occurring. This pulse on line 1334 is used to reset flip-flop 1330 to its 1 state and is also applied through inverter 1336 to one input of a gate 1338. Gate 1338 is enabled from positive And circuit 1339, whose two inputs comprise the 1 output of flip-flop 1340 and the 0 output of flip-flop 1342. The output line 1344 of gate 1338 is connected to the Arithmetic Revolver control track input line 1324. Thus, assuming that flip-flop 1340 is in its 1 position and that flip-flop 1342 is in its 0 position to condition gate 1338, the 19 digit time delay in the control track existing on line 1322 will be extended by 1, by means of the flip-flop 1330, gate 1332, inverter 1336 and gate 1338, to be reapplied as the new *a* pulse over line 1324. [It should be noted particularly that the control track between recording head 1320 and reading head 1318 (Fig. 9V) is only 19.0 Master Pulse periods long, as contrasted with the 19.4 periods of the data tracks, and that the control recording transducer 1320 (Fig. 9V) is aligned with data recording transducers 1312 (Fig. 9W)].

The output of gate 1332 (Fig. 9E) on line 1334 is further connected as the 0 input of flip-flop 1346. A gate 1348 is connected to the 0 output of flip-flop 1346 and when the later is in its 0 state, the next Master Pulse occurring will be applied to line 1350 to be available as an old *a*+1 pulse, to reset the flip-flop 1346 to its 1 state, and, also, through inverter 1352, to serve as the input for 1354, which is otherwise enabled.

When it is desired to shift the mode of operation to cause the new *a* pulse to be the old *a*—1 pulse, a negative pulse is applied at *b* pulse time to an "advance" line 1356, leading from Figure 9I. Such a pulse on this line will set the flip-flop 1340 to its 0 position, thus closing gate 1338 and opening a gate 1358, which also has applied thereto, through inverter 1359, the old *a*—1 pulses on line 1322. Therefore, the old *a*—1 pulse, representing a 19 digit time delay, will appear on line 1360 connected to the Arithmetic Revolver control track input line 1324. Accordingly, there is a direct recirculation, resulting in the application of a new *a* pulse 19 digit times are the previous *a* pulse.

On the other hand, if it is desired to retard the Arithmetic Revolver markers so that the new *a* is the old *a*+1, a "retard" line 1362 (leading from Figure 9H) may be negatively pulsed, whereupon the flip-flop 1342 is set to its 1 position, again effecting the closing of gate 1338 and opening gate 1354. The output of gate 1354 appears on line 1364, which is also connected to the Arithmetic Revolver control track input line 1324, and its input comprises the old *a*+1 pulses referred to previously. Since, to produce each old *a*+1 pulse, the old *a*—1 pulse on line 1322 has been delayed through flip-flop 1330 and gate 1332 and has also been delayed through the flip-flop 1346 and gate 1348, a 21 digit time delay is provided.

It should be noted that each old *a*+1 pulse on line 1350 is also connected through line 1366 to simultaneously set flip-flop 1340 to its 1 state and flip-flop 1342 to its 0 state. Note again, also, that because of the positive AND circuit 1339, having its inputs connected to this 1 output of flip-flop 1340 and 0 output of flip-flop 1342, gate 1338 is caused to be closed unless both the 1 output of gate 1340 and the 0 ouput of gate 1342 exist simultaneously. In other words, the pulsing of either the "advance" line 1356 or "retard" line 1362 will cause closure of gate 1338. While' the reset or open condition of gate 1338 is not established until the second delay of the initiating old *a*—1 pulse, caused by the flip-flop 1346, nevertheless this condition will be established well in advance of a following pulse, either on line 1356 or line 1362, which may occur only at *b* pulse times.

It has been mentioned above that the *b* pulses occur midway in the span between the *a* pulses, or in other words, 10 digit times behind the new *a* pulses recorded. Continuing to refer to Figure 9E, the *b* pulses appear on line 1380. These pulses are available to the general circuitry, but are not applied to any track of the Arithmetic Revolver. The *b* pulses are basically maintained in step with the *a* pulses by means of a decimal counter 1382. That is, counter 1382 produces, on output line 1384, a single pulse for every ten input pulses on line 1386. The supply of input pulses on line 1386 is derived from Master Pulses applied to line 1388, which is connected as the first enable of gates 1390 and 1392. A counter retard flip-flop 1394 is provided with its 1 output serving as the second input of gate 1390 and its 0 output serving as the second input of gate 1392.

In normal operation, it being assumed that alignment of the 10 digit time spacing between the new *a* and *b* pulses has been established, the flip-flop 1394 will be in its 0 state and Master Pulses will pass directly through gate 1392 and via line 1386 to the counter 1382. Alignment having been established, every second pulse on line 1384 will coincide with the new *a* pulse. However, a flip-flop 1396, connected as a binary counter with gates 1398 and 1400, will cause only the first and alternate pulses thereafter on line 1384 to be produced as *b* pulses on line 1380. This is because these *b* pulses are applied to the 1 input of flip-flop 1396, whose 1 output is connected as the enable of gate 1398 and whose 0 output is connected as the enable of gate 1400, which controls the passage of pulses from line 1384 to line 1380. Line 1384 is also connected as the other input of gate 1398, and the output thereof, which should comprise only the pulses existing simultaneously with the new *a* pulse, is applied over line 1402 to a coincidence detector circuit 1404. Circuit 1404 is used as a check, and if the pulses on line 1402 correspond to the new *a* pulses on line 1324, a pulse will appear on line 1406. However, if these is a mismatch, a signal will appear on line 1408.

Assuming normal operation to be continuing, when the "advance" line 1356 is pulsed, a flip-flop 1410 is set to its 1 state, thus enabling gate 1412 because of its connection to the 1 output of flip-flop 1410. C phase pulses are applied to gate 1412 over line 1416, and one such pulse will pass through gate 1412 to the counter input line 1386 before the flip-flop 1410 has reverted to its 0 state by virtue of C phase pulses being applied to its 0 input line 1418. Thus, it will be noted that an extra pulse has been inserted between Master Pulse times, with the result of advancing the decimal counter so as to advance the *b* pulses to maintain their correspondence with the new *a* pulses.

Conversely, when the Marker Generator is retarded by pulsing the "retard" line 1362, the flip-flop 1394 is set to its 1 position, thus opening gate 1390 and closing gate 1392. The next Master Pulse must then pass through gate 1390 to reshift flip-flop 1394 to its 0 position before gate 1392 is again opened to pass a Master Pulse. In this series of events it will be clear that the passage of one Master Pulse has been blocked, and the decimal counter 1382 loses a count. This in effect moves the *b* pulses back to correspond again with the new *a* pulses.

*Arithmetic sign and zero control*

The Arithmetic Revolver Sign and Zero Control Circuit is shown in Figure 9G. The purpose of this circuit is to determine the resultant sign of an arithmetic process which may be in progress. This is accomplished by constantly checking for a signal upon those two lines transmitting the five element machine code which carry no signal when a coded zero is being transmitted. Referring for the moment to Figure 29, which shows the Adder Output Translator, it will be seen that no signal appears upon the middle two output lines 1060 for a "0" input, and that a signal appears on at least one of these two lines for any input 1 through 9. Accordingly, taps are taken in Figure 9D from the corresponding lines of cable 136, connected to the Arithmetic Revolver input (see Fig. 1) for connection to lines 1430 and 1432. Each of these lines 1430 and 1432 is connected in Figure 9G through a respective blocking diode to the 1 input of a 0 test flip-flop 1434. The 0 input line of flip-flop 1434 is designated 1436 and is negatively pulsed once, 20 digit times before the end of each arithmetic process. Such a pulse on line 1436 will start a 0 test, and a 0 indication will appear on the 0 output line 1438 unless a negative pulse has been applied to the 1 input, in which case a signal indicating that the Arithmetic Revolver contents are Not equal to 0 will appear on the 1 output line 1440. It may be seen from an inspection of Figures 29, 9O and 9D that a signal in the form of a negative pulse will appear on either or both of lines 1430 and 1432 at E pulse time for all non-0 digits in the Adder output-Arithmetic Revolver input path.

In the Arithmetic Revolver Sign and Zero Control Circuit (Fig. 9G) thre is also provided a line 1442 on which may appear a signal for causing a lead digit, indicating a + sign, to be inserted in the Arithmetic Revolver number. Further, there is provided a line 1444 for causing a lead digit indicating a minus sign to be inserted into the Arithmetic Revolver number. The matter of utilizing the signals on lines 1442 and 1444 will be described below.

As will also be described below, in connection with the operation of the system, when the number in the Arithmetic Revolver path is a 0, this will be set up as a positive number. That is, it may be said that normally 0's are set biased toward positive. To so set a 0 to +, a gate 1446 is provided, having a first input on a line 1448 connected with the Arithmetic-Revolver-equals-0 line 1438. The second enable of this gate 1446 is derived from inverter 1449, connected to a line 1450 which is connected, in turn, to line 1656 (Fig. 9H) and thereby to other lines in the system that carry a "resume" signal at certain times in the various arithmetic processes. Thus, upon the simultaneous occurrence of a 0 signal on line 1448 and a "resume" signal on line 1450, the "resume" signal will pass to output line 1452. This pulse will set a flip-flop 1454 to its 0 state and a flip-flop 1456 to its 1 state. The 1 output of flip-flops 1456 is unconnected, but the 0 output of flip-flop 1454 is connected with the previously mentioned line 1442. Thus, a 0 in conjunction with a "resume" signal will cause the + line 1442 to be energized. The minus line 1444 is connected to the 0 output of flip-flop 1456 and thus, for a 0 and a "resume" signal, the line 1444 will Not be energized.

It is also possible to cause the Arithmetic Revolver sign to be set to minus, set to +, or be complemented by external means. That is, a line 1458 is provided for the purpose of setting the Arithmetic Revolver sign negative. Line 1458 is connected to the 1 input of flip-flop 1454 and to the 0 input of flip-flop 1456. The 1 output of flip-flop 1454 is unconnected, but the 0 output of flip-flop 1456 is connected to the line 1444, which is the negative line.

To set the Arithmetic Revolver sign positive, a line 1460 is provided and connected directly to the previously mentioned output line 1452 of gate 1446 in the Zero Control Circuit, and thus to the 0 input of flip-flop 1454 and the 1 input of flip-flop 1456.

To complement the Arithmetic Revolver sign, or in other words to change the sign from + to minus, or vice versa, there is provided a complement line 1462 connected to a third or T input of both of the flip-flops 1454 and 1456. A pulse on this line 1462 will thus reverse both flip-flops 1454 and 1456 to a state opposite from the respective previously existing state. A suitable flip-flop circuit for this purpose is described below under the heading Complementing Flip-Flop. Line 2284, leading from Figure 9I, is also connected to these T inputs for complementing purposes, and will be referred to further below in connection with that figure.

ARITHMETIC OPERATIONS

As stated above, the system of the invention is basically capable of subtraction operations and also addition, multiplication and division operations. Further, means are provided for originally entering numbers into the Arithmetic Revolver-Adder recirculation path and, also, for removing numbers from this path back through the Factor Shifter to a predetermined output thereof.

It will be recalled that the output of the Arithmetic Revolver, leading to the Adder, constitutes the minuend, and that its input from the Factor Shifter constitutes the subtrahend. Assuming that the system is empty, zeros will be circulating in the Arithmetic Revolver recirculation path. Thus, to insert a chosen number into this path, it is only necessary to apply the complement of the number to the subtrahend input of the Adder, whereupon, the complement being subtracted from 0, the true number appears as the difference output, and this number then circulates between the Arithmetic Revolver and the Adder. A number may be entered and a subsequent number subtracted therefrom, and also multiplication and division may take place by a system of successive shifts, as will be described more fully below.

For the purpose of carrying out the basic arithmetic processes of addition, subtraction, multiplication and division and, also, for entering and removing numbers to and from the Factor Shifter, certain appropriate control circuits are provided. These will now be described under the following headings.

*Entry control*

For purposes of facilitating arithmetic operations, there are two entry commands, positive entry and negative entry. For both of these commands, the Arithmetic Revolver is cleared and then the absolute value of the contents of the Factor Shifter is inserted. For positive entry, the sign of the Arithmetic Revolver is set to the sign (either "+" or "−") of the number in the Factor Shifter. For negative entry, the sign of the Arithmetic Revolver is set opposite to the sign (either "+" to "−," or "−" to "+") of the number in the Factor Shifter.

Since, in the embodiment described, the Arithmetic Revolver contains 20 digits and the Factor Shifter contains only 10 digits, the clearing of the Arithmetic Revolver is started at the time that the number is read into the Factor Shifter. Thus, the Clear (CLR) mode of the Adder is to be started by that 'field begin" signal which initiates the loading of the Factor Shifter. Referring to Figure 9T, it will be recalled that the "field begin-read to F.S." signal appears on line 1524. When the Factor Shifter loading is completed, the start arithmetic operation signal which then appears on line 678 (Fig. 9U) may be employed to set the Arithmetic Revolver sign to agree with the Factor Shifter sign.

Referring now to Figure 9J, the entry control comprises a crystal diode matrix, generally designated by the reference numeral 1510, to which the following information in the form of positive signals may be applied: On line 1512 a signal indicating that the Factor Shifter sign is positive, on line 1514 a signal indicating that the Factor Shifter sign is negative, on line 1516 a signal indicating that the entry command is for positive entry, or on line 1518 a signal indicating that the entry command is for negative entry.

The entry control circuit is supplied with new *a* pulses from line 1324 via line 1520, and with *b* pulses from line 1380.

The particular "field begin" signal which occurs when the insertion of the number into the Factor Shifter is begun will be applied via line 1524 to a gate 1526. The enable of gate 1526 is via line 1528, connected through respective blocking diodes of a positive Or circuit 1529 to both lines 1516 and 1518. Thus, for either positive or negative entry, gate 1526 will pass the "field begin-read to F.S." pulse to output line 1530, where it is available via line 1532 for connection through blocking diode 1534 to the "start zero test" line 1436 of the Arithmetic Revolver Sign and Zero Control Circuit (Fig. 9G). Also, the pulse on line 1530 is available, via line 1536 and blocking diode 1538, for connection to the line 1218 for causing the Adder to operate in the Clear mode.

The diode matrix 1510 correlates the Factor Shifter sign information and the positive or negative nature of the entry command so that, upon the occurrence of a start arithmetic operation pulse on line 1540, either gate 1542 or a gate 1544 will be open, one enable of each of these gates being provided by connection to this line 1540. When the Factor Shifter sign is plus and the entry command is positive, an enabling signal will be applied over matrix line 1546 to open gate 1542 and a pulse will be available on the set Arithmetic Revolver sign pulse line 1460 leading to Figure 9G. The gate 1542 will be similarly opened for a negative Factor Shifter sign and a negative entry command, by the appearance of the necessary signal on matrix line 1550. For a positive Factor Shifter sign and negative entry, or a negative Factor Shifter sign and positive entry, gate 1544 will be opened and gate 1542 will be closed. With gate 1544 open, a pulse will be available on the set Arithmetic Revolver sign negative line 1458, which also leads to Figure 9G.

A second connection is taken from the output of positive Or circuit 1529, which indicates either a positive or a negative entry command, through line 1554 to a gate 1556, which is otherwise enabled over line 1558 by the start arithmetic operation pulse which appears on line 1540. The pulse on line 1558 passing through gate 1556 is connected to set a flip-flop 1560 to its 0 state and thus open a gate 1562 having one enable connected to the 0 output of flip-flop 1560. The second enable of this gate 1562 is the new *a* marker pulse line 1520. Thus, the first new *a* marker pulse occurring after the start arithmetic operation pulse passes through gate 1562 to output line 1564. This output pulse is employed to shift the flip-flop 1560 to its 1 state, to shift a flip-flop 1566 to its 0 state, and to cause a shifting of the Adder mode to Enter by passing the pulse on this line 1564 to the Enter control line 1220 leading to Figure 9M. It will be noted that the pulsing of the Enter line 1220 also forces a carry into the Adder over line 1104 (Fig. 9M).

The next occurring *b* marker pulse passes through a gate 1568 (Fig. 9J) having as one enable the line 1380 and as another enable the 0 output of flip-flop 1566. The output of gate 1568, on line 1570, is applied to shift the flip-flop 1566 to its 1 state and also to apply a pulse through blocking diode 1572 to a line 1574 connected with the Idle line 1216 of the Adder. The *b* pulse on line 1570 is also applied via another diode to a line 1576 for connection to the suppress carry line 1102 of the Adder (Fig. 9N). A pulse is also applied simultaneously via a third diode to line 1578 for connection via line 1656 (Fig. 9K) to other points in the system and is employed as a "resume" signal. For example, the "resume" signal is applied in Figure 9G to the line 1450 of the Arithmetic Sign and Zero Control Circuit for making a test of the contents of the Arithmetic Revolver. That is, the "resume" signal is also used to test the contents of the Arithmetic Revolver. If the Arithmetic Revolver content is 0, then the Arithmetic Revolver sign is set to + (in the Arithmetic Revolver Sign Control Circuit as above described), since 0 can arise in the Arithmetic Revolver with either sign, and the control circuits are based upon "0" appearing positive.

It will be understood from the foregoing that completion of the entry process is manifested by the occurrence of pulses on the Idle control line 1216 (connected with line 1574 at the Entry Control Circuit as just described), the "resume" signal line 1578, and the suppress carry line 1576; the number previously entered into the Factor Shifter circulating in the Arithmetic Revolver recirculation path; and, with the Adder operating in the Idle mode.

*Addition and subtraction control*

Having a number circulating in the Arithmetic Revolver and assuming that an additional number is in the Factor Shifter, a suitable circuit to control the system for the performance of an addition or subtraction operation will now be described. Referring to Figure 9K, this circuit comprises a diode matrix 1610 for correlating the sign of the number in the Factor Shifter, the sign of the number in the Arithmetic Revolver and the nature of the command, i.e. whether it is for addition or subtraction.

It will be recalled that the number in the Arithmetic Revolver constitutes the minuend in the actual subtraction in the Adder.

It should further be noted at this point that the additive commands (which embrace both addition and subtraction) are translated into two commands, "sum" and "difference," in the following way: "Sum" represents an increase in the absolute value of the Arithmetic Revolver contents, and "difference" represents a reduction in the absolute value or a reversal in sign. This may be understood from the following table:

TABLE D

| Factor Shifter Sign | Arithmetic Revolver Sign | Operation Sign | Process |
|---|---|---|---|
| + | + | + (add) | sum |
| + | − | − (subt) | sum |
| − | + | − | sum |
| − | − | + | sum |
| + | + | − | diff. |
| + | − | + | diff. |
| − | + | + | diff. |
| − | − | − | diff. |

In "sum" operations, the sequence is to initiate the Augment mode of the Adder at the first *a* marker pulse after a start arithmetic operation pulse, and at the same time to force a carry in the Adder. Then the Pad mode is started at the next occurring *b* pulse. Thereafter, the Idle mode is started at the next new *a* pulse, the carry is suppressed, and a "resume" signal issued. This may be best understood by again referring to the control circuit comprising the matrix 1610 (Fig. 9K). In this matrix, in accordance with the above Table D, as an example, the combination of positive input signals denoting, respectively, a + Factor Shifter sign, a + Arithmetic Revolver sign and an additive command will result in a signal on matrix line 1612 for enabling a gate 1614 via line 1616 connected through a respective blocking diode with this line 1612. In similar fashion for each other combination of signals of Table D, either a signal will appear on line 1616 indicating a "sum" process or a signal will be available on line 1618 indicating a "difference" process. The line 1618 provides a first enable to a gate 1620. The gates 1614 and 1620 each have as second enables a connection to a line 1622, which carries a start arithmetic operation pulse. This line is connected via intermediate line 1540 (Figs. 9B and 9C) to the start arithmetic operation line 678 (Figs. 9C, 9F and 9S) of the Factor Shifter control circuit (Fig. 9U). Thus, assuming a "sum" process, gate 1614 will be enabled and the start arithmetic pulse on line 1622 will pass to the line 1624, which is connected to the 0 input of a flip-flop 1626. The pulse on line 1624 will thus enable gate 1628 connected to the 0 output of this flip-flop 1626. Hence the next occurring new *a* pulse introduced to the circuit via line 1630, which is connected as the second input of this gate 1628, will pass the new *a* pulse to line 1632 and a point 1634 thereon. Point 1634 is connected to the 1 input of flip-flop 1626, to the 0 input of a flip-flop 1636, and to a line 1638 which is connected through blocking diode 1639 to the Augment mode control line 1210 of the Adder control circuit. Thus, the Augment mode is begun, and a carry is forced into the Adder over line 1104 (Fig. 9M).

The shifting of flip-flop 1636 to its 0 state, by action of the new *a* pulse, enables a gate 1640 which has one input connected with the 0 output of this flip-flop 1636. The second input of gate 1640 comprises line 1642 connected with a line 1644 which is in turn supplied with *b* pulses from line 1380 (Fig. 9J). Accordingly, the next occurring *b* pulse will pass through gate 1640 to appear on the Pad control line 1214 of the Adder control circuit.

The 0 output of flip-flop 1636 is also connected via line 1648 as one enable of a gate 1650, this gate being otherwise enabled over line 1652 connected to the new *a* input line 1630. Thus, the next new *a* pulse will be applied to and pass through gate 1650 and will appear on line 1654. This line is connected to the 1 input of flip-flop 1636 and also, through a blocking diode 1655, to line 1656 which provides a "resume" signal. A connection is also made from line 1654 through another blocking diode 1657 to line 1658, which is connected in Figure 9M to the suppress carry line 1102 of the Adder. Further, a connection is made from line 1654 through a third blocking diode 1659 to a line 1660 connected to the Idle control line 1216 of the Adder control circuit. Thus, upon the occurrence of the first new *a* pulse following the *b* pulse, the Idle, suppress carry, and "resume" lines are pulsed.

In a "difference" process, the sequence is to start the Diminish mode at the first new *a* pulse after the first start arithmetic operation pulse. The start arithmetic operation pulse in a "difference" process passes through gate 1620 to set a flip-flop 1662 to its 0 state and thereby open a gate 1664 connected with the 0 output of flip-flop 1662. The next new *a* pulse is connected through line 1666 to the other input of this gate 1664 and passes through the latter to point 1668. This point is connected to set flip-flop 1662 to its 1 state, to set a flip-flop 1670 to its 0 state, and to pass a pulse to line 1671 for connection via blocking diode 1672 to the Diminish control line 1212. Point 1668 is also connected via line 1671 and another blocking diode 1673 to a line 1674 for connection, in Figure 9J, to the "start zero test" line 1436 of the Arithmetic Sign and Zero Control Circuit.

The Idle mode is started at the next *b* pulse since the *b* pulse supply line 1644 is connected as one input of a gate 1678 which is enabled by the 0 output line 1680 of the flip-flop 1670. The *b* pulse will pass through this gate 1678 to line 1682, which connects through blocking diode 1683 to Idle line 1660, and thus causes a resumption of the Idle mode.

The next following new *a* pulse passes through a gate 1684, which is also enabled from the 0 output line 1680 of flip-flop 1670, and resets the latter to its 1 state. This passed new *a* pulse is also connected through blocking diode 1685 to suppress carry line 1658, in order to suppress, in the Adder Adjustment Circuits, the effect of any carry resulting from operation of the Adder in the Diminish mode.

It is to be noted that upon the occurrence of this next following new *a* pulse, if there is no carry from the Adder, as indicated by the absence of a signal on the carry line 1686 and a signal on "no carry" line 1694, the process is completed by reason of the fact that the new *a* pulse, while passing through gate 1684 and inverter 1689, will Not be able to pass through gate 1690. However, the new *a* pulse will be able to pass through gate 1692 enabled by the signal appearing on the "no carry" line 1694, and this output appears on line 1696 and is connected through a line 1698 to a point 1700 on line 1654, which point is a connection common to the previously mentioned Idle line 1660, the "resume" signal line 1656, and the suppress carry line 1658. Note that for this condition of "no carry" following operation of the Adder in the Diminish mode, the suppress carry line 1658 is actuated by a new *a* pulse from the output of gate 1684 through two parallel paths, one directly via diode 1685 and the other indirectly via inverter 1689, gate 1692, lines 1696 and 1698, point 1700 and diode 1657.

On the other hand, if a carry is present, as indicated by a signal on the carry line 1686 and the absence of a signal on "no carry" line 1694, this indicates that the Adder operation in the Diminish mode has resulted in an "overcast," i.e., a change of Arithmetic Revolver sign, and therefore both the Arithmetic Revolver sign and the Arithmetic Revolver contents must be complemented. Accordingly, this next following new *a* pulse will pass through gate 1684, inverter 1689 and gate 1690 (but not through gate 1692) to set a flip-flop 1702 to its 0 state and to apply a pulse to a line 1704 connected with the Complement (COM.) control line 1222 and also, through a blocking diode 1706, to the line 1462 leading to the Factor Shifter which serves to complement the Arithmetic Revolver sign. The resultant carry from Complement operation of the Adder is suppressed by the next successive new *a* pulse passing through a gate 1708, enabled by the 0 side of flip-flop 1702, and thence over line 1710 to line 1698. As above described, a pulse on line 1698 not only suppresses the carry in the Adder but also causes it to operate thereafter in the Idle mode, and, further, supplies a "resume" signal to line 1656. Line 1710 is also connected to the 1 input of flip-flop 1702, and thus shifts the latter in status to close gate 1708 after passing this one new *a* pulse from line 1630.

It may be noted at this point that, since a "sum" process cannot produce a 0 in the Arithmetic Revolver unless the 0 was previously there, the only way the 0 can be left in the Arithmetic Revolver by a "sum" process is by adding ten 0's to twenty 0's. (It is not necessary to start a zero test for a "sum" process.) However, a "difference" process can produce a 0 in the Arithmetic Revolver. Thus, the zero test is started when the "difference" process is started, and the appropriate sign correction is made by the subsequent "resume" signal.

COUNTING AND SHIFTING CIRCUITS FOR MULTIPLICATION AND DIVISION

The next major control circuit to be described is the multiplication control circuit. However, before describing this circuit, there will first be described what is termed a digit counter and also a step counter, these counters being employed in multiplication and division operations. These circuits have been indicated diagrammatically in block 144 in Figure 1.

It may further be briefly explained at this point that in the multiplication control circuits the procedure is to extract a multiplier digit from the Arithmetic Revolver to control the addition of the multiplicand from the Factor Shifter into the Arithmetic Revolver the number of times indicated by the multiplier digit. In division, in general, the dividend is shifted one place ahead in the Arithmetic Revolver and then the divisor is subtracted from the "leading half" of the Arithmetic Revolver until an "overcast" occurs. The divisor is then added in once, and the quotient digit, which is the number of successful subtractions, is counted in the digit counter.

*Digit counter*

The digit counter is shown diagrammatically in Figure 9H and is shown in further detail in Figure 18, in both cases being designated by the reference numeral 1802. Referring first to Figure 18, the digit counter may basically include a decimal type ring counter 1803 for which ten input and ten output lines are provided, the count appearing as a signal on one of the ten lines. The capacity of the counter is one decimal digit. Since the external machine code is in the five element form, the decimal counter will also include five element-to-decimal and decimal-to-five element code translators designated 1804 and 1805, respectively. In Figures 9H and 18, the five element input is through a five conductor line 1810 and the output through a five conductor line 1812. Following conversion to the ten line code, the input will be applied to the "preset" lines of the counter. The output will be from a reading connection to each stage of the counter. In addition there is a line 1814 provided for clearing the digit counter to 0, and line 1816 for setting the digit counter to contain a count of 9, and a line 1818 for shifting the counter one stage in a direction to step down the counter.

Further, there is an output line 1822 for indicating when the number in the digit counter is equal to 0, a line 1824 for indicating when the number in the digit counter is equal to 1, and a line 1826 for indicating when the number in the digit counter is equal to either 2, 3, 4, 5, 6, 7, 8 or 9.

The ten "preset" lines are designated by the reference character 1828 in Figure 18. The line 1814 for setting the counter to zero is connected to the "0 preset" line and the line 1816 for setting the counter to nine is connected to the "9 preset" line.

The counter output lines are designated 1829. The line 1822 indicating that the count in the counter is equal to zero is connected to the 0 output line, the line 1824 for indicating that the count in the counter is equal to one is connected to the 1 output line, and the line 1826 for indicating that the count is between 2 and 9 is connected to the 2–9 output lines through a group of respective blocking diodes designated 1830.

The translators 1804 and 1805 may be of any well known type and operate on the principle of the Adder output translator described below under the heading Adder Output Translator.

*Step counter*

The step counter is illustrated in block diagram form in Figure 9H and there designated by the reference numeral 1901. This counter is also a decimal counter and has a first input line 1900 for setting the counter to 0. A second input line 1902 is provided for advancing the counter. In addition, there is an output line 1904 for indicating the end carry.

MULTIPLICATION CONTROL

Before going into the detailed description of the circuit for controlling the system for a multiplication process as shown in Figure 9H, the following comments are pertinent: The marker generator described above under the heading Marker Generator provides the new *a* and *b* pulses. As will become more fully apparent below, the new *a* marker pulse indicates, at times between arithmetic operations, what may be termed the leading or units column of the Arithmetic Revolver, and, as has been discussed above in connection with the Additive Commands, the new *a* marker pulse is also used to indicate the proper time to start an addition from the Factor Shifter. In the more complex arithmetic operations, shifts of the contents of the Arithmetic Revolver must be performed. That is, a shift will have the effect of a multiplication or division by 10, i.e. a shifting of the decimal point one digit at a time. As will now be apparent from the above description of the Arithmetic Revolver and the marker generator, it is more economical circuitwise to shift the markers in the control track than to shift the contents of the revolver in the data tracks thereof. Therefore, provision has been made for advancing and retarding the markers as explained above.

The digit counter described above under the heading Digit Counter is, as stated, a subtractive type counter, and this is used in multiplication to count the number of additions of the multiplicand (as it comes from the Factor Shifter) required for each digit of the multiplier.

The step counter, described above under the heading Step Counter, is also employed in multiplication. This counter is employed to count the ten steps involved in the operation. In multiplication, the ten steps represent the treatment of the ten multiplier digits.

There are two possible multiplication commands: "Multiply" and "Negative Multiply." In both cases, the operation in all circuits except the Arithmetic Revolver Sign and Zero Control Circuit is the same. The combined information as to the operation sign (multiply or negative multiply) and the Factor Shifter sign is used to complement the Arithmetic Revolver sign if necessary. The Arithmetic Revolver sign is complemented if the Factor Shifter sign is positive and the command is a negative multiply. Also, the Arithmetic Revolver sign is complemented when the Factor Shifter sign is negative and the command is multiply.

Referring now to Figure 9H, the circuit is characterized by a matrix 2010 for correlating the Factor Shifter sign and the sign of the command. That is, an indication as to whether the Factor Shifter sign is positive or negative will appear as a positive signal on line 2012 or 2014, respectively. A multiply command will appear as a positive signal on line 2016 and a negative multiply as a positive signal on line 2018. The sources of these lines are shown in Figures 9S and 9B, respectively. According to the combination of Factor Shifter and command signs involved, the matrix performs the function of opening gate 2020 for complementing the Arithmetic Revolver sign by means of a signal on line 2022 leading to the Arithmetic Revolver Sign and Zero Control Circuit via line 1462 (Fig. 9K).

Both multiply command lines 2016 and 2018 are connected through respective blocking diodes of a positive Or circuit 2023 to a gate 2024, which will thus be opened on the existence of either type of multiply command and regardless of the Factor Shifter sign. The second input to both gates 2020 and 2024 is over line 2026 connected to receive a start arithmetic operation signal from line 1622. This start operation signal is generated in the Factor Shifter control circuit and there applied to line 678 (Fig. 9U). The start arithmetic operation passing through gate 2024 sets a flip-flop 2028 to its 0 state, sets a flip-flop 2030 to its 1 state, and clears the step counter by connection over lines 2032 and 1900.

With flip-flop 2028 in its 0 state, the next new *a* pulse on line 2034 (connected to line 1324 in Figure 9E) can pass through a gate 2036, enabled by the 0 output of flip-flop 2028, to be inverted in inverter 2037 and applied to both a gate 2038 enabled from the 0 output of flip-flop 2030 and a gate 2040 enabled from the 1 output of flip-flop 2030. The new *a* pulse also shifts flip-flop 2028 to its 1 state, the output of which is not connected. The flip-flop 2030 having been set to its 1 state by the start arithmetic operation pulse and gate 2040 having thus been opened, the new *a* pulse passes through this gate 2040 and sets a flip-flop 2042 to its 0 state, is applied to line 1814 to clear the digit counter, is applied to line 2046 to initiate the Clear mode of the Adder, is applied to line 2048 to start a zero test, and is applied to line 2050 to suppress the carry in the Adder, the connection to these lines all being through respective blocking diodes.

A gate 2052 is enabled from the 0 output of flip-flop 2042 and its other input comprises B phase pulses on line 2054. Thus, on the B phase pulse following the new *a* pulse (which occurs at a Master Pulse time), the B phase pulse will be transmitted through gate 2052 to appear on line 2056 for simultaneously opening five gates 2058, through which data on line 134' from the Arithmetic Revolver is passed to the input line 1810 of the digit counter 1802.

A gate 2060 is also enabled from the 0 side of flip-flop 2042 and the other input of this gate comprises master pulses on line 2062. When gate 2060 is first enabled by flip-flop 2042 going to its 0 state, one master pulse will pass on line 2064. This passed pulse will set flip-flop 2042 to its 1 state, the output of which is unconnected, will set a flip-flop 2066 to its 0 state, and will cause the Adder to shift to its Idle mode by virtue of the connection to line 2068.

On the next following *b* marker pulse, a three-way choice is made by means of three gates 2070, 2072 and 2074. One input to gate 2070 is from output line 1822 of the digit counter 1802, a signal on which indicates that the contents of the latter are equal to 0. One input to gate 2072 is from output line 1824 of the digit counter, a signal on which indicates that the contents thereof are equal to 1. One input to gate 2074 is from digit counter output line 1826, which is provided with a signal if the contents of the digit counter are between 2 and 9, inclusive. The second input to the gates 2070, 2072 and 2074 is the output of inverter 2082, whose input is connected to the output of a gate 2084 enabled by the 0 output of flip-flop 2066 and whose other input comprises *b* marker pulses on line 2086.

If the number in the digit counter is equal to 0, the Arithmetic Revolver control markers are retarded in preparation for the extraction of the next multiplier digit, since no action other than this shift is required for a 0 digit. That is, the gate 2070 will be enabled and one *b* marker pulse will pass therethrough to a point 2088. From this point there is a connection through blocking diode 2076 to the 0 side of flip-flop 2028 to reset the latter to its 0 state, a connection to the 1 input of flip-flop 2066 which has its 1 output unconnected, a connection through blocking diode 2078 to a line 2090 which is connected to the line 1902 at the step counter 1901 for advancing the same, and a connection through blocking diode 2080 to the marker generator "retard" control line 1362 leading to Figure 9E.

It will be noted that the connection from point 2088 to the 0 input of flip-flop 2028 sets up the circuit to handle the next digit.

If the number in the digit counter is 1, the gate 2072 will be open and the *b* marker pulse will pass to a point 2096. This point is connected through blocking diode 2098 to point 2088 and the above recited results of the pulse at point 2088 will ensue. In addition, there is a connection from point 2096 through blocking diode 2100 to the 0 input of a flip-flop 2102, through blocking diode 2103 to a line 2104 which is connected to the Augment control line 1210 (Fig. 9K) of the Adder control, and through blocking diode 2106 to the step down control line 1818 of the digit counter. Thus, when the number in the digit counter is 1, the number in the Factor Shifter is added in the Arithmetic Revolver (starting at the *b* marker pulse time) by energization of the Augment line, the Arithmetic Revolver marker pulses are retarded (since no further additions will be required in this alignment), and the digit counter is stepped down by one, thus going to zero.

If the number in the digit counter is from 2 to 9 inclusive, as indicated by a signal on line 1826, the gate 2074 will be enabled and the *b* marker pulse will pass therethrough and appear at a point 2108. This point is connected to the 0 input of flip-flop 2102, the line 2104 leading to the Augment line 1210, and line 1818, as before, but blocking diode 2100 prevents the transmission of the pulse at point 2108 back to point 2096 so that the Arithmetic Revolver marker pulses are Not retarded. However, even with this restriction, the number in the Factor Shifter is added into the Arithmetic Revolver, starting at *b* marker pulse time, and the digit counter is stepped down by one count. Upon the occurrence of successive *b* marker pulses, this operation is repeated until the digit counter reaches 1, at which time the operation described above for that condition occurs.

In connection with flip-flop 2102, it will be noted that the purpose of this flip-flop is to enable gate 2114 connected to the 0 output thereof to pass the next old *a* marker pulse which appears on line 2116 leading from line 1334, (Fig. 9E). This passed pulse sets flip-flop 2102 to its 1 state, the output of which is unconnected, and also applies the old *a* pulse via blocking diode 2117 and line 2118 to the Pad control line 1214 (Fig. 9K) of the Adder control circuits. Thus, so long as the contents of the digit counter are between 1 and 9, inclusive, the Augment mode of the Adder, started at each *b* pulse time, is followed by the Pad mode starting at the old *a* pulse time thereafter.

After the *a* and *b* marker pulses have been shifted ten times, the multiplication has been completed and the new *a* marker pulse following this shift is used to provide a "resume" signal to Program Control. This is achieved by virtue of an incoming signal on a line 2110 connecting the 0 input of flip-flop 2030 with output line 1904 of the step counter. This line carries the end carry signal of this counter, indicating the completion of ten shifts. Gate 2038 is enabled from the 0 output of flip-flop 2030, and thus the next new *a* marker pulse occurring after the end carry signal will pass through gate 2038 to point 2120, and thence through blocking diode 2111 and line 2112 to line 1656 for purposes of providing a "resume" signal where desired.

A connection from point 2120 is also made through blocking diode 2122 to the suppress carry line 2050, and a similar connection is made through blocking diode 2124 to the line 2068 leading to the Adder Idle line 1216 (Fig. 9K).

DIVISION CONTROL

In division, two commands are provided. One is a Divide command, the other Shift and Divide. The latter command provides a left or leading shift of the dividend in the Arithmetic Revolver before the division process is commenced. The desirability of such a shift will become further apparent from the description below. This shift may be from one to ten places, inclusive.

The control circuits for both the Divide and Shift and Divide commands are shown in Figure 9I. Referring now to this drawing, the inputs to the circuit are as follows: a start arithmetic operation signal appears on line 2202 leading from line 678 (Fig. 9F), a Divide command appears on line 2204 leading from Figure 9B, a Shift and Divide command appears on line 2206 leading from Figure 9C, and a signal indicating that the Factor Shifter sign is negative appears on line 2208 leading from line 322(*e*) of Figure 9Q. Further required inputs are *b* marker pulses on line 2210 leading from line 2086 (Fig. 9H), old *a* pulses on line 1334 leading from Figure 9E, old *a*+1 pulses on line 1350, also leading from Figure 9E, a signal indicating a carry from the Adder adjustment control line 1078 leading from Figure 9N, and a signal indicating "no carry" on line 1080, also leading from Figure 9N. There is, further, a signal indicating the step counter end carry on line 1904 leading from Figure 9H, and a signal indicating that the digit counter reading equals 1 on line 2212 leading from line 1824 in Figure 9H. The outputs of the circuit will be described in the course of the following description.

Considering first a Shift and Divide command, such a command signal will appear on line 2206 and enable gate 2224, whose other input comprises the output of inverter 2203 fed from the start arithmetic operation line 2202. The output of gate 2224 is connected to a line 2225, which is connected, in turn, in Figure 9H with the clearing line 1814 of the digit counter 1802. The latter is thus set to 0 at the beginning of a Shift and Divide command.

Flip-flops 2226 and 2228 control the shifting in the following manner: The 0 input of flip-flop 2226 is also connected to the output of gate 2224, and gate 2230 is connected to the 0 output of flip-flop 2226. Master pulses are also applied to gate 2230 from line 2229, and when flip-flop 2226 is switched to its 0 state, a master pulse will be transmitted to a point 2232. From this point there is a connection to the 1 input of flip-flop 2226, to the 0 input of flip-flop 2228 and, via blocking diode 2233, to a line 2234 connected to enable gates 2236(*a*)–2236(*e*), shown in Figure 9L, for transmitting the preset divide shift count on cable 2238 (see Fig. 9C) to the digit counter input line 1810 (Fig. 9H) over cable 2240. The master pulse transmitted to line 2234 will also set flip-flop 2226 to its 1 state, thus preventing the transmission of future master pulses. The transmitted master pulse will also set flip-flop 2228 to the 0 state, thus enabling gate 2242 connected to the 0 output thereof. One input of gate 2242 is connected to the *b* marker pulse line 2210, and the opening of this gate will cause gate 2244 to pass a pulse from digit counter=1 line 2212 to the 1 input of flip-flop 2228 over line 2246 when the digit counter contents reach one. Until that time, the successive *b* marker pulses from the output from gate 2242 are applied to line 1356 to advance the Arithmetic Revolver markers as explained above in conection with Figure 9E, and the *b* marker pulses passing gate 2242 also appear on line 2250, which is connected to the digit counter step-down line 1818 (Fig. 9H).

As just mentioned, flip-flop 2228 will remain in its 0 state and *b* pulses will continue to step down the digit counter over line 2250 until the digit counter contents equal 1, whereupon the next incoming *b* marker pulse on line 2210 will set flip-flop 2228 to its 1 state. At this time the gate 2242 will be closed. It is further to be noted that the pulse on line 2246, indicating a digit counter reading of 1, is applied via line 2252, blocking diode 2254, and line 2256 to the 0 input of a flip-flop 2260. Gate 2262 is connected to the 0 output of flip-flop 2260 and the second input to this gate comprises line 2264 connected to the *b* marker pulse line 2210. Thus, the particular *b* marker pulse transmitted to gate 2244 which closes gate 2242 also opens gate 2262 so that the next *b* marker pulse is available on output line 2268 of the latter for initiating a Division cycle. The first *b* marker pulse passing through gate 2262 also closes this gate by virtue of the connection of its output line 2268 to the 1 input of flip-flop 2260.

From the foregoing it will be clear that for a given shift count commanded over lines 2238 and 2240 (see also Figs. 9L and 9H), the successive *b* marker pulses will have shifted the contents of the Arithmetic Revolver accordingly. From this point on, the Division cycle is the same. In other words, the remaining process is the same as though the proper placement of the number in the Arithmetic Revolver already existed and the Divide line 2204 leading from Figure 9B had been energized. In this regard it will be noted that the Divide line 2204 provides one input to gate 2270, the second input of which is from the start arithmetic operation line 2202 via inverter 2203, and the output of which, on line 2272, is connected through a blocking diode 2274 to the 0 input line 2256 of flip-flop 2260. Thus, a command signal on the Divide line 2204 is the equivalent of the previously described pulse passing through gate 2244 and indicating a digit counter reading of 1 following a Shift and Divide command.

Before proceeding, it should be noted that the Factor Shifter minus sign signal on line 2208 provides the enable for a gate 2276, whose other input comprises a connection through inverter 2277 to a line 2278, which is in turn connected through blocking diode 2280 to line 2272 and through blocking diode 2282 to the output of gate 2224. The output of gate 2276 is connected to line 2284, which is in turn connected to the complement Arithmetic Revolver sign control line 1462 in Figure 9G as mentioned previously. Thus, if the Factor Shifter sign is minus, the Arithmetic Revolver sign is complemented at the start of either a Divide or a Shift and Divide command.

Continuing now with either Divide or Shift and Divide commands, the process is as follows: First, the dividend in the Arithmetic Revolver is shifted one place ahead. Then the divisor from the Factor Shifter is subtracted from the leading half of the Arithmetic Revolver until an overcast occurs. The divisor is then added in once and the quotient digit (the number of successful subtractions as counted in the Divide command) is entered in the space previously occupied by the leading digit of the divisor. The remaining quantity is then shifted one place ahead and the process repeated until ten quotient digits have been entered. This leaves the quotient in the trailing half of the Arithmetic Revolver and the remainder in the leading half.

It is the responsibility of the programmer to insure that division is started in such alignment that the answer will be within machine range, i.e., the first or left-hand quotient digit shall not exceed 9, since the twenty digit number left in the Arithmetic Revolver at the end of a division cycle is not meaningful as a twenty digit number, but rather is meaningful as two ten digit numbers. It is also the responsibility of the programmer to insure that the succeeding commands separate the remainder and the quotient, as for example, by reading out the desired one in an entry command.

Now referring again to Figure 9I, at the start of division, as commanded either by the digit counter equal 1 pulse or a Divide command pulse on line 2256, this pulse is applied via line 2258 to the 0 input of a flip-flop 2259 (which is employed to detect the end of the division process) and, also, through blocking diode 2261 and line 1900 leading to Figure 9H, to clear the step counter 1901. As above mentioned, this pulse also switches flip-flop 2260 to its 0 state to enable gate 2262.

The next *b* marker pulse occurring thus passes through gate 2262 to its output line 2268 to achieve the following: Through point 2290, line 2291 and blocking diode 2292, the digit counter is set to 9 by connection to line 1816 leading to Figure 9H via Figures 9L and 9K, in turn, and through point 2290, line 2291 and blocking diode 2293, the step counter is advanced one step over the advance step counter line 1902 leading to Figure 9H via a similar path. Through point 2296 connected via blocking diode 2297 with point 2290, the single *b* marker pulse passing gate 2262 will also set a flip-flop 2298 to its 0 state and, further, will be applied through blocking diode 2300 to the previously mentioned line 1356 for advancing the Arithmetic Revolver markers one place.

The setting of flip-flop 2298 to its 0 state enables gate 2304. The other input of this gate comprises line 1350 carrying the old $a+1$ pulses. One of these pulses issuing over output line 2306 is employed to set a flip-flop 2308 to its 0 state and also is applied to the 1 input of flip-flop 2298 to reset this flip-flop to its 1 state, thus closing gate 2304 after the passage of a single old $a+1$ pulse.

With flip-flop 2308 in its 0 state, three gates 2310, 2312 and 2314 are simultaneously enabled. The second input of gate 2310 comprises a supply of $b$ marker pulses on line 2316, and thus each $b$ marker pulse will establish, over output line 2318 (connected to line 1212 in Figure 9K), the Diminish mode of the Adder. The second input of gate 2314 is line 2320 connected at point 2322 to the line 1334 carrying the old $a$ pulses. Thus, upon the occurrence of the first old $a$ pulse following the $b$ pulse which established the Diminish mode, a pulse will pass through gate 2314 to line 2324, which is connected through blocking diode 2326 to line 1216 for establishing the Idle mode in the Adder. The second input of gate 2312 comprises line 2330 connected to the old $a+1$ line 1350. Thus, the next following old $a+1$ pulse will pass through gate 2312 and appear upon its output line 2332. This line is connected via line 2334 and blocking diode 2336 to line 2338, which is connected in Figure 9N to the suppress carry line 1102 of the Adder. This output line 2332 of gate 2312 is also connected via inverter 2333 as one input to gate 2340, which is enabled by the line 1080 carrying the "no carry" signals from the Adder. Thus, if there is no carry, the old $a+1$ pulse transmitted through gate 2340 appears on its output line 2342 for connection at point 2344 to the line 2250 connected to step down the digit counter. Also connected to the output of gate 2312, via inverter 2333, is the input line 2346 of a gate 2348 which is enabled by connection to the line 1078 carrying the carry signals from the Adder. Thus if "no carry" is indicated on line 1080, the output of gate 2312 is directed to step down the digit counter, while if there is a carry, as indicated by a signal on line 1078, the output of gate 2312 will instead be transmitted to output line 2350 of gate 2348 and, by connection through point 2352, will reset the flip-flop 2308 to its 1 state and set a flip-flop 2354 to its 0 state. Thus, it will be observed that the old $a+1$ pulse has not only suppressed the carry (if one occurs) by means of the pulse on suppress line 2338, but also has tested for an "overcast" by means of the arrangement of gates 2340 and 2348 as just described.

It may further be noted at this point that output line 2350 of gate 2348 is also coupled via blocking diode 2356 to line 2358, which is connected to line 1674 in Figure 9K, and a pulse for initiating a 0 test is accordingly applied to the Arithmetic Revolver Sign and Zero Control Circuit at this time in the event that a carry signal appears on line 1078.

If there is no overcast, the digit counter is stepped down one step by the signal appearing on line 2250. If there is an overcast, the process is terminated and the 0 test initiated as just mentioned. The termination comes about through the resetting of the flip-flop 2308 to its 1 state, thus closing gates 2310, 2312, and 2314.

From the above it will be apparent that in the division process the contents of the Factor Shifter have been subtracted from the contents of the Arithmetic Revolver until an overcast occurs. Moreover, the number of subtractions without overcast are counted in the digit counter.

The flip-flop 2354 is provided for the purpose of controlling the addition process and, as above stated, this is set to its 0 state through gate 2348 upon the detection of an overcast. Flip-flop 2354 controls the addition and entry of the quotient digit in the following manner: The 0 output of flip-flop 2354 is connected through point 2360 to enable a gate 2362 whose other input comprises line 2363 connected to line 2316 carrying $b$ marker pulses. Thus the next $b$ pulse will be transmitted through gate 2362 and appear on its output line 2364 connected to the Augment control line 1210 of the Adder. The output of flip-flop 2354 is also connected through point 2360 to enable a gate 2366 which is also supplied with old $a$ pulses through a connection to point 2322 on line 1334. Thus the next following old $a$ pulse will appear on line 1222 leading to Figure 9M for establishing the EQD mode of the Adder. During the EQD mode, the quotient digit is entered into the Adder by a group of five gates 2368 (Fig. 9H) which are enabled by line 1276 extending from the Adder control section (Fig. 9M). The outputs of these five gates 2368 on line 2369 are connected to the respective ones of lines 1316 in Figure 9G.

An additional use of the 0 output of gate 2354 is to enable gate 2370, whose other input comprises line 2372 connected to the old $a+1$ line 2230. Thus, upon the occurrence of the next old $a+1$ pulse, the output of gate 2370 will appear at point 2374, which is connected to line 2338 for suppressing the carry from the Adder and is also connected through point 2376 to reset flip-flop 2354 to its 1 state, to provide one enable of a gate 2378, to establish the Idle mode of the Adder over line 1216 and, through point 2380, to the advance step counter line 1902 and to line 1816, which sets the digit counter to 9.

The flip-flop 2259 controls the termination of the division cycle in the following manner: The gated $b$ pulse used to start the Augment mode via line 2364 is further connected via line 2382 and inverter 2383 to a gate 2384, which is enabled from the 0 output of gate 2259. The output of gate 2384 is connected to previously mentioned point 2296, and thus, the flip-flop 2298 is, in turn, reset to its 0 state to start the subtraction process unless the step counter end carry signal on line 1904 has occurred. In the latter instance since line 1904 is connected as the 1 input of flip-flop 2259, gate 2384 will be closed and gate 2378 opened.

Since the step counter 1901 (Fig. 9H) was cleared by the start divide pulse on line 2256 and then advanced, first by the next $b$ pulse (on line 2291) and thereafter by the next Master Pulse following each start EQD mode pulse (i.e. by the next old $a+1$ pulse appearing at point 2380), the end carry on line 1904 will occur after the ninth quotient digit is entered. At this time the marker pulses have been shifted ten times, and the next start Augment mode pulse on lines 2364 and 2382 is prevented from shifting the marker pulses further since gate 2384 is closed. However, gate 2378 is open, and therefore a "Resume" pulse appears on output line 2386 of gate 2378 simultaneously with the succeeding start Idle mode pulse after this start Augment mode pulse.

GENERAL STORAGE

As mentioned previously, the general storage data may be obtained from the information stored on the drum 210 (Fig. 9W), or, alternatively, it may be obtained from another source. When this data is stored on drum 210, the previously mentioned output transducers 363 and input transducers 383, as illustrated in Figure 9W, are utilized, together with conventional erase transducers 385. General storage location pulse generation must also be provided and is indicated generally by the reference numeral 387 in Figure 9W. Since this pulse generation is similar to that shown in Figure 9V for the Card Assembly Revolver, its description will not be repeated. Further, the control circuits for locating and utilizing desired general storage data may be similar to those shown for the Card Assembly Revolver, or plugboard wiring may be utilized in conventional manner to locate desired data.

PROGRAM CONTROL

Figures 9A, 9B, and 9C show circuits which form what may be termed a "program control." As mentioned above, the circuits described thus far comprise essentially circuits for handling digital information for performing arithmetic operations thereon. As has been further mentioned, these circuits will ordinarily comprise a part of a complete digital computer, the remaining portions of the computer including not only general storage portions just described briefly, but also automatic program controls. However, such additional detailed circuitry is not shown, in order to confine the present disclosure to reasonable proportions.

The present program control is, therefore, intended to simulate an automatic program control, and it will be understood that the operations to be established manually by the present program control circuits can be established automatically and in various desired sequences by automatic control circuitry, either of presently existing types or other designs.

Referring now to the drawings, the Program Control is characterized by what may be termed a console designated generally as 2410, and extending across Figures 9A–9C. This console includes an Entry control station 2412, an Add control station 2414, a Subtract control station 2416, a Positive Multiply control station 2418, a Negative Multiply control station 2420, a Divide control station 2422, and a Shift and Divide control station 2424.

In addition, the console 2410 includes a control station 2426 for starting a reading operation from the Card Assembly Revolver into the Factor Shifter. There is also a control station 2428 for causing a direct transfer of the contents of the Factor Shifter into the Arithmetic Revolver path, i.e. this produces a start arithmetic operation pulse, and a control station 2430 is provided for instigating a card conversion operation, i.e. having a card read and placed as a "card image" in the Card Assembly Revolver and concurrently therewith, if desired, having the "card image" previously in the Card Assembly Revolver transferred to the card punching equipment. Also included in console 2410 is a control station 2432 for directing the output of the Adder to the Factor Shifter, and a control station 2440 for transferring the contents of the Factor Shifter to the Card Assembly Revolver.

Note that control stations 2412, 2414, 2416, 2418, 2420, 2422 and 2424 are supplied with a positive potential from bus 2434 since their outputs are to be directly used for gating purposes, while control stations 2426, 2428, 2430, 2432 and 2440 are supplied with a negative potential from bus 2435 since their outputs are primarily utilized for setting control flip-flops. The output gating potentials required from the latter stations are obtained either from the outputs of these flip-flops or by inverting the potential signals obtained from bus 2435.

Assuming that the machine is empty, to begin operations the operator, knowing the contents of a card, will close the normally open switch at the card conversion station 2430 (note the diagrammatic showing in Figure 9C of the spring biasing this station, as well as stations 2428 and 2432, to indicate that their switches are actuated only momentarily), and this will momentarily apply the negative potential on bus 2435 to the 0 input of flip-flop 2430′ to set it to its 0 state. An enabling signal will thus be applied from its 0 output over line 919 to Figure 9X and line 984 to Figure 9Z to begin a card reading and punching cycle as has been described above in connection with these figures. The contents of the card will be transferred to the Card Assembly Revolver, and the address of the leading column of the card will be indicated in the card begin address register 422 (Figure 9T). Since the machine has been assumed to be empty, no punching operations will take place, of course.

When the card conversion operation is completed, a pulse will be applied from line 2450 to the 1 input of flip-flop 2430′ to reset it to its 1 state and, also, over line 2450′, diode 2451, and line 697 to the resume signal 2436 in Figure 9B to indicate visually the completion of the operation. Line 2450 comprises the output of gate 2452 (Fig. 9W), enabled by line 958(*l*) leading from Figure 9Y, and whose other input comprises line 2453 connected to the control marker pulse track reading transducer 412′ in Figure 9V via line 966. It will be recalled that line 958(*l*) is energized only during the reading of the final or 9's row of the card (Fig. 10), and line 2453 is pulsed via transducer 412′ (Fig. 9V) only after all eighty columns of this row have been read and their information recorded in the Card Assembly Revolver. Thus the pulse on output line 2450 does indicate that the card conversion operation has been completed.

Since the machine has been assumed to be empty initially, a 0 (0000000000) will be circulating through the Arithmetic Revolver recirculation path. Now let it be assumed that the operator desires to place the number 124 into the Arithmetic Revolver path. It should be noted here that the unit's digit "4" of the number will be entered first into the Card Assembly Revolver, followed by the hundred's digit and thousand's digit, in turn.

The operator will be aware from his previous knowledge of the card as to the particular field of three columns on the card (and the "card image") which contains the desired number. Accordingly, the Field Begin and Field End address will be set in the coincidence selection circuits 430 and 432, respectively (Fig. 9T). The operator will next turn to the console Entry control station 2412 (Fig. 9A) and set the switch at that station to contact either the minus entry contact or the positive entry contact, depending upon the desired type of operation. If the switch is set to the minus entry position, a positive potential obtained from bus 2434 will be applied to line 1518, and this will energize the diode matrix in the entry control circuit (Fig. 9J) accordingly. On the other hand, if positive entry is to be carried out, the switch will be set to the + position and the positive potential will appear on line 1516 to energize the entry control circuit of Figure 9J.

With the entry station 2412 set as desired, the operator will next close the switch at console station 2426 (Fig. 9C) to apply the negative potential on bus 2435 to line 2427. This line is connected through inverter 2443 to line 682 leading to gate 681 (Figure 9T) and enables the latter. The negative potential on line 2427 is also applied through blocking diode 2444 and differentiating circuit 2445 to the 0 input of a flip-flop 2426′, which is thereby switched to its 0 state and opens a gate 2426″ to pass one Master Pulse to line 434. This Master Pulse will actuate the single pulse circuit 436 (Fig. 9T) to continue the entry operation by reading the number from the selected field of the Card Assembly Revolver into the Factor Shifter. The entry of the number into the Factor Shifter will proceed according to the detailed explanation given previously, the last seven places being filled with zeros, and the number 0000000124 will thus be stored in the Factor Shifter. At the completion of the Factor Shifter storage operation, a start arithmetic operation pulse will appear on line 678 (see Figures 9U and 9C), and this will actuate the entry control circuits of Figure 9J to transfer the 9's complement of the number 0000000124 from the Factor Shifter into the Adder. Subtraction of the 9's complement value (9999999875) from 0000000000 in the Adder produces a difference value of 0000000124, which thereafter circulates and recirculates in the Adder-Arithmetic Revolver path.

After the completion of the entry operation, a "resume" pulse is applied to line 1578 (Fig. 9J) and thence to line 697 and "resume" signal 2436 (Fig. 9B), as previously described. The operator will accordingly return the entry switch at station 2412 to neutral and open the switch at station 2426.

If it is now desired to add another number to the one in the recirculation path, such number may be selected from the card by resetting the Field Begin and End registers 430 and 432. The switch at Add station 2414 is then moved into engagement to apply the positive potential from bus 2434 to line 2414'. Next, the switch at console station 2426 is again closed to start another reading from the Card Assembly Revolver into the Factor Shifter, and this will ultimately (by means of the control circuits of Figure 9K) result in the 9's complement of the number being further transferred from the Factor Shifter into the Adder at the proper time to cause the addition of the subsequent number to the first number. For example, if the second number was 326, the result now recurrently appearing at the Adder output will be 0000000450.

After the completion of the addition operation, a "resume" pulse is applied to line 1656 (Fig. 9K) and thence to line 697 and "resume" signal 2436 (Fig. 9B), again as previously described. The operator will accordingly open the switches at stations 2414 and 2426.

It will be understood that the result of the number may now be held in the recirculation path for further operations thereon, or it may be desired to withdraw this number for routing to the Factor Shifter and then to any one of the three outputs of the Factor Shifter, as shown in Figure 1. If the number is to be routed to the Factor Shifter, the switch at console station 2432 will be closed, thus setting its flip-flop 2432 to its 0 state and producing an output upon line 683 leading to the control circuits shown in the upper left-hand corner of Figure 9R. These cause gates 358(*a*)–358(*e*) of Figure 9T to be opened, and the Adder output is thus connected to the Factor Shifter as described previously in connection with Figure 9R.

After the completion of this operation, a "resume" pulse is applied to line 697 (Fig. 9R) and thus to "resume" signal 2436 (Fig. 9B). The switch at station 2432 is already open, being spring biased, but this signal indicates to the operator that another operation may now be commenced. The "resume" signal on line 697 is also applied to the 1 input of flip-flop 2432' (Fig. 9C) via line 697' (Figs. 9D, 9A, 9B and 9C) to reset this flip-flop to its 1 state.

A further number may now be added to, subtracted from, or used as a multiplier or divisor for the number in the Adder-Arithmetic Revolver recirculation path by initially selecting the chosen number from the Card Assembly Revolver "card image" by means of setting the Field Begin and Field End addresses in the manner described previously in connection with the entry operation, then closing the switch of the desired arithmetic operation control station, and finally closing the switch of control station 2426 (Fig. 9C) as before.

The procedure for addition has already been described. If subtraction is desired, the switch of Subtract Control station 2416 (Fig. 9A) is closed to apply the positive potential of bus 2434 to line 2416'; if positive multiplication is desired, the switch of Positive Multiply control station 2418 (Fig. 9B) is closed to apply the positive potential of bus 2434 to line 2016; if negative multiplication is desired, the switch of Negative Multiply control station 2420 (Fig. 9B) is closed to apply the positive potential of bus 2434 to line 2018; if division with no initial shift is desired, the switch of Divide control station 2422 (Fig. 9B) is closed to apply the positive potential of bus 2434 to line 2204; and, if division preceded by a shift of the dividend relative to the divisor is desired, the switch of Shift and Divide control station 2424 (Fig. 9C) is closed to apply the positive potential of bus 2434 to line 2206 and, also, the number of places of initial shift desired is set by means of Shift Count Register 2424' (Fig. 9C). This shift number is set in the form of gating potentials on *n* of five lines 2238 (Figs. 9C and 9L) in accordance with the five element internal machine code, as described previously in connection with Figure 9L.

The operation of the machine through the desired subtraction, multiplication or division operation that takes place upon the closure of the switch of control station 2426 (Fig. 9C) is similar to that described above for addition, except that the respective control circuits control each operation in the manner described previously. It will be recalled that the control circuits for subtraction are shown in Figure 9K, those for division (whether or not preceded by an initial shift) in Figures 9H and 9I, and those for multiplication in Figure 9H, and that the only difference between positive and negative multiplication is the setting of the sign of the resultant number thereafter recirculating in the Adder-Arithmetic Revolver path by means of the matrix 2010 (Fig. 9H).

As in addition, a "resume" pulse will be applied to "resume" signal 2436 (Fig. 9B) via line 697 after the completion of the chosen arithmetic operation to indicate visually that the operation is completed and, therefore, that the switch of the control station 2426 should be opened, as well as that of the respective control station 2416, 2418, 2420, 2422, or 2424. The "resume" pulse following subtraction is, as in addition, derived from line 1656 (Fig. 9K), that following multiplication is derived from line 2112 (Fig. 9H), and that following division is derived from line 2386 (Fig. 9I).

The preceding description has assumed that the decision as to the type of operation desired (addition, subtraction, positive multiplication, negative multiplication, shift and division, or division without an inital shift) is made prior to the time that the chosen number is entered into the Factor Shifter from the Card Assembly Revolver. This is not necessary, however, and if desired, the chosen number can be entered into the Factor Shifter from the Card Assembly Revolver in the manner described above without previously closing the switch of control station 2414, 2416, 2418, 2420, 2422, or 2424. In this event, the start arithmetic operation pulse which is produced on line 678 from the output of gate 676 (Fig. 9U) has no function other than clearing the sign of the Factor Shifter over line 320 (Figs. 9S and 9U). At the time thereafter when a decision has been made as to the particular arithmetic operation desired, all that is necessary (since the chosen number is already stored in the Factor Shifter) is to close the switch of the desired control station 2414, 2416, 2418, 2420, 2422, or 2424 (together with setting the desired number of shifts in Shift Count Register 2424'' in the case of shift and division) and then close the switch of control station 2428 to produce a "simulated" start arithmetic operation pulse on line 678. Closure of the switch at control station 2428 applies the negative potential of bus 2435 to the 1 input of a flip-flop 2428' to set this flip-flop to its 0 state. Gate 2428'' is enabled from the 0 output of this flip-flop, and its other input comprises master pulses. When enabled, this gate 2428'' passes the next master pulse to the flip-flop 2428' to reset the latter to its 1 state and also passes this single master pulse over line 2429 to a connection with the start arithmetic operation line 678.

It is also necessary, as indicated in Figure 1, to be able to transfer the contents of the Factor Shifter to the Card Assembly Revolver. Control station 2440 (Fig. 9C), mentioned previously, is provided for this purpose. First, the operator will set the Field Begin and Field End coincidence circuits 430 and 432 (Fig. 9T) according to the space available in the "card image" of the Card Assembly Revolver. Next, the switch at control station 2440 is closed. Closure of this switch applies the negative potential of bus 2435 through blocking diode 2446 and differentiating circuit 2445 to the 0 input of flip-flop 2426' to produce a pulse on line 434 in the manner described previously in connection with entering a chosen number from the Card Assembly Revolver "card image" to the Factor Shifter. Closure of the switch of control station 2424' also applies the negative potential of bus 2435 to inverter 2447, whose output is connected via line 661 (Figs. 9C and 9W) to enable gate 659 of Figure 9W.

As described previously in connection with that figure, this results in the opening of gates 993(*a*)–993(*l*) of Figure 9Y to enter the chosen number from the Factor Shifter (after passage through code translator 128, Figs. 1 and 9U) into the selected field of the "card image" of the Card Assembly Revolver.

After the completion of this operation, a "resume" pulse is applied via line 2448 (Figs. 9W, 9U, 9S, 9Q, and 9N, in turn), blocking diode 2449 (Fig. 9K), line 1656 (Figs. 9K, 9H, and 9E) and line 697 (Figs. 9E and 9B) to "resume" signal 2436 (Fig. 9B). The resultant visual signal indicates to the operator that the switch of control station 2440 should now be opened.

The "resume" line 2448 comprises the output of gate 2454 (Fig. 9W), which is enabled from the 0 output line 665 of gate 663 and to whose other input are applied Field End pulses from line 442 via inverter 2455. It will be recalled that gate 663 is enabled only for the period between the Field Begin and Field End pulses selected by coincidence circuits 430 and 432 (Fig. 9T), and that the signal on output line 2448 of gate 2454 thus occurs at the end of the selected field and after the chosen number has been read from the Factor Shifter to the Card Assembly Revolver. It should also be recalled that the Card Assembly Revolver recirculation gates 978(*a*)–978(*l*) of Figure 9Y are opened (in the manner described previously, via line 997) by the same Field Begin pulse which set flip-flop 663 of Figure 9W to its 0 state at the beginning of the selected field, and are not closed again until the occurrence thereafter of the selected Field End pulse. Further, during this operation, gates 657 and 681 (Fig. 9T) will be closed, as explained previously, so that the previously recurring output of the Card Assembly Revolver is not read into the Factor Shifter.

To demonstrate further the utility of the invention, it will be clear that a series of commands may be established in any convenient type of sequence switching system and this system then employed to operate the switches of the console 2410 in a predetermined sequence. Thus, a series of arithmetic operations and of card reading and punching operations may be made to occur automatically.

CIRCUIT DETAILS

The following description covers the detailed circuitry of various circuits referred to in block diagram form previously.

*Factor shifter shifting network*

In the Factor Shifter, shifting circuits 330(*a*)–(*g*) (Fig. 9R) are employed to transfer the output reading of each stage into the flip-flop register of the following stage. Referring to Figure 19A, the reference numeral 330 designates a similar circuit block in which inputs A and B are to be connected to the outputs of an interconnected flip-flop. Outputs A′ and B′ are provided for connection to the inputs of a following flip-flop. An input C is provided for triggering the transfer.

Referring to Figure 19*B*, the circuit is shown in greater detail as comprising vacuum tubes 2512 and 2514 having the anodes thereof connected via line 2517 to a source of positive potential and having inputs A and B connected to second grids 2518 and 2520 of tubes 2512 and 2514, respectively. Outputs A′ and B′ are taken from the anodes 2522 and 2524 of tubes 2512 and 2514, respectively, to reflect the respective voltage drops across anode resistances 2526 and 2528 upon the occurrence of an enabling pulse on input C, this input being applied to first or control grids 2530 and 2532 of tubes 2512 and 2514, respectively.

*Complementing flip-flop*

Referring to Figure 20, there is shown a conventional flip-flop circuit 2550 to which is added a third or complementing input T. Input T is connected to each of inputs A (the 0 state) and B (the 1 state) through blocking diodes 2552 and 2554, respectively. These diodes permit pulses on input T to appear on both of the inputs A and B, but a pulse on input A or on input B cannot reach the other input B or A (as the case may be). Thus, pulses on input T will reverse the status of the flip-flop and, in its present use, provide the complement of the previous output, as described above.

*Code translators*

It has been explained previously that the 12 element card code as received from the Card Assembly Revolver is converted into a 7 element internal code in the 12–7 translator designated by the reference numeral 118 in Figure 1. It has further been explained that the 7 element internal code is translated into the 12 element card code in the 7–12 code translator 128 of Figure 1. Referring now to Figure 21, there is shown a block diagram of the 12–7 translator 118, and in Figure 22 there is shown a block diagram of the 7–12 translator 128.

In Figure 21, the card code will appear as a set of binary signals on the group of 12 lines designated 114. The binary data on lines 114 will be converted in matrix 2612 to appear as a signal on only one of 4 lines 2614 representing the zone punch of the card, and on only one line of 13 lines 2616 representing the numeric punch. In addition, the redundant element will appear as a signal on the single line 2618.

The zone punch, as indicated by a signal on one of the 4 lines 2614, will be further acted upon in matrix 2620 and the dyad portion of the internal code will appear in the form of binary signals on lines 2622 and 2624. The numeric punch, as represented by a signal on one of the lines 2616, will be further acted upon in matrix 2626 and will appear as the tetrad portion of the internal code in the form of binary signals on lines 2628, 2630, 2632 and 2634.

To understand the details of the matrices 2612, 2620 and 2626, reference is made to Figure 23, wherein similar lines are similarly designated. It is believed that the operation of these matrices will be apparent to one skilled in the art from an inspection of Figure 23, and accordingly no detailed description is given here.

A block diagram of the 7–12 translator is shown in Figure 22. This is substantially the reverse of the 7–12 translator, except that the 7 element input comprises two lines for each element so that each individual element may be represented in binary fashion. This is required by reason of the fact that the output of the Factor Shifter is in the form of a 0 and a 1 line extending from each flip-flop of the unit's stage thereof. In Figure 22, the diode matrix is designated 2652, the tetrad matrix 2654, and the binary matrix 2656. Details of the matrices 2652, 2654, 2656 may be completely understood with reference to Figure 24, wherein the arrangement of input, intermediate and output lines is as indicated in Figure 22. Again, it is believed that the operation of this circuit will be clear from the drawings, and hence no further explanation is needed.

*Adder input translator*

Referring now to Figure 25, which shows the Adder input translator 1010, the input (on a group of 5 lines 1012), which is in the 5 element code comprising the tetrad and redundant elements, is applied to a register comprising a group of five flip-flops designated 2710. The flip-flops of group 2710 are connected with diode matrices as shown in Figure 25 to convert the 5 element binary code into a single Even Component signal on one of five output lines of a group designated 1014 for application to the 5 x 5 Subtraction Table. In addition, the odd-even indication of the number is available as a signal on line 1018 if the number is even and on line 1016 if the number is odd. The precise operation of the diode matrices 2712 and 2714 will be apparent to one skilled in the art from an inspection of Figure 25 and hence will not be further explained here.

*Adder subtraction table*

Referring to Figure 26, the subtrahend input comprises a continuing potential on one of 5 lines of a group 1024 and the minuend input comprises a similar continuing potential on one of 5 lines of a group 2744. By connection through the diode matrices, as shown in Figure 27, a "no carry" signal is available on line 1046 or a carry signal is available on line 1044 for each input condition, these lines extending for connection to the 2-step adjuster circuit. The Even Component of the difference is available as a signal on one of 5 output lines of a group designated 1038 for connection to the 2-step adjuster. Again the operation of the diode matrices will be apparent to one skilled in the art from an inspection of the drawing.

*Adder 2-step adjuster*

Referring to Figure 27, the 2-step adjuster 1042 is a matrix circuit with the input from the subtraction table appearing as a signal on one of 5 lines of a group 2762. The carry or "no carry" input is on line 1044 or 1046, respectively, and the input command to "subtract 0" or "subtract 2" appears on line 1068 or 1066, respectively. The output appears as a signal on one of 5 lines of a group 1048 for connection to the 1-step adjuster.

*Adder 1-step adjuster*

Referring to Figure 28, the 1-step adjuster 1052 derives its primary input from the 2-step adjuster on lines 1048 and the "add 0" and "add 1" commands on lines 1074 and 1076, respectively. In performing the adjustment, the matrix converts the input to appear as a signal on one of ten output lines 1054.

*Adder output translator*

Figure 90:
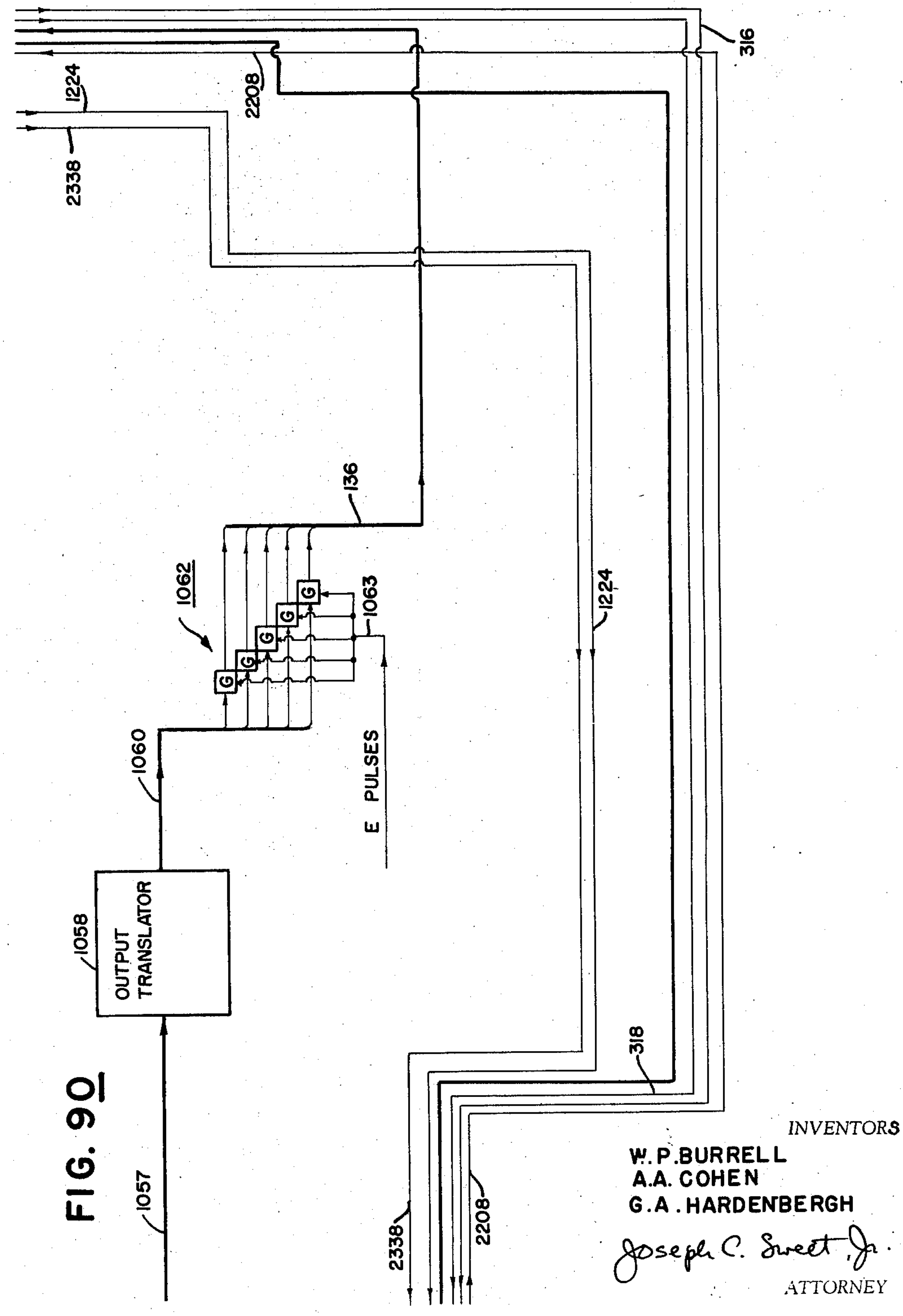

Referring to Figure 29, the Adder output translator is a matrix circuit for converting a number in decimal code in the form of a signal on one of 10 lines of group 1060 (from the 1-step adjuster 1052) to a corresponding number in binary form on one or more of the 5 lines of group 1060 leading to the output gates 1062 of Figure 90.

NUMERICAL EXAMPLES

To further facilitate an understanding of the invention, numerical examples will now be described for the major arithmetic operations described previously. These are shown in Figures 30A–30H, wherein the vertical columns (groups of ten squares aligned vertically) represent individual digit times, i.e. the time between two adjacent Master pulses. The *a* and *b* marker pulses are shown in the top row of squares, the minuend, subtrahend, carry and difference digits are shown in the next four rows, the particular mode in which the Adder is operating is abbreviated in the next three rows, the setting of the digit counter (where relevant) is shown in the next row, and the setting of the step counter (where relevant) is shown in the lowermost row. Thus, the minuend and subtrahend inputs and the difference output, all of which occur on phase pulses within one Master Pulse interval, will be found in vertical alignment. The *a* and *b* marker pulses, which it will be recalled occur at Master Pulse times, are shown in the interval whose start they mark. Carries are shown in the interval in which they are effected in the following manner: A carry which arose from the previous subtraction is shown as a "l" in the appropriate square, a carry which has been forced by the control circuits (regardless of the previous digit) will be shown by an "f" in the appropriate square, and "no carry" will be shown by a blank square, unless it represents a suppression by the control circuits of the carry, if any, resulting from the previous subtraction, in which case an "s" will be shown in the appropriate square.

In order to reduce complexity, signs have been disregarded in these numerical examples and, further, they are all presented on the basis of a half-size arithmetic unit, i.e., the Factor Shifter has a capacity of 5 digits rather than 10, the Arithmetic Revolver contains 10 digits instead of 20, and a chosen field transferred from the "card image" of the Card Assembly Revolver to the Factor Shifter must contain a maximum of 5 digits rather than 10. Certain modifications to the control circuits would, of course, be necessary for a machine with these proportions. For example, the step counter 1901 (Fig. 9H) would be a scale-of-5 counter, and the marker generator shown in Fig. 9E would be modified to produce successive *a* marker pulses 10 Master Pulse times apart and *b* marker pulses 10 Master Pulse times apart also. This modification to the marker generator would involve shortening the Arithmetic Revolver delay to 9 digit times and replacing the decimal counter 1382 (Fig. 9E) by a scale-of-5 counter.

Figure 30B:
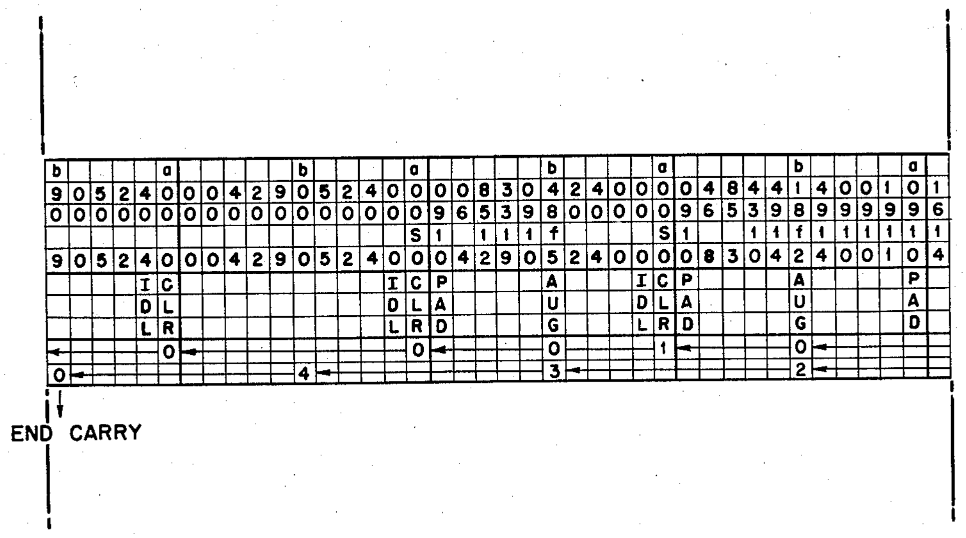
Figure 30C:
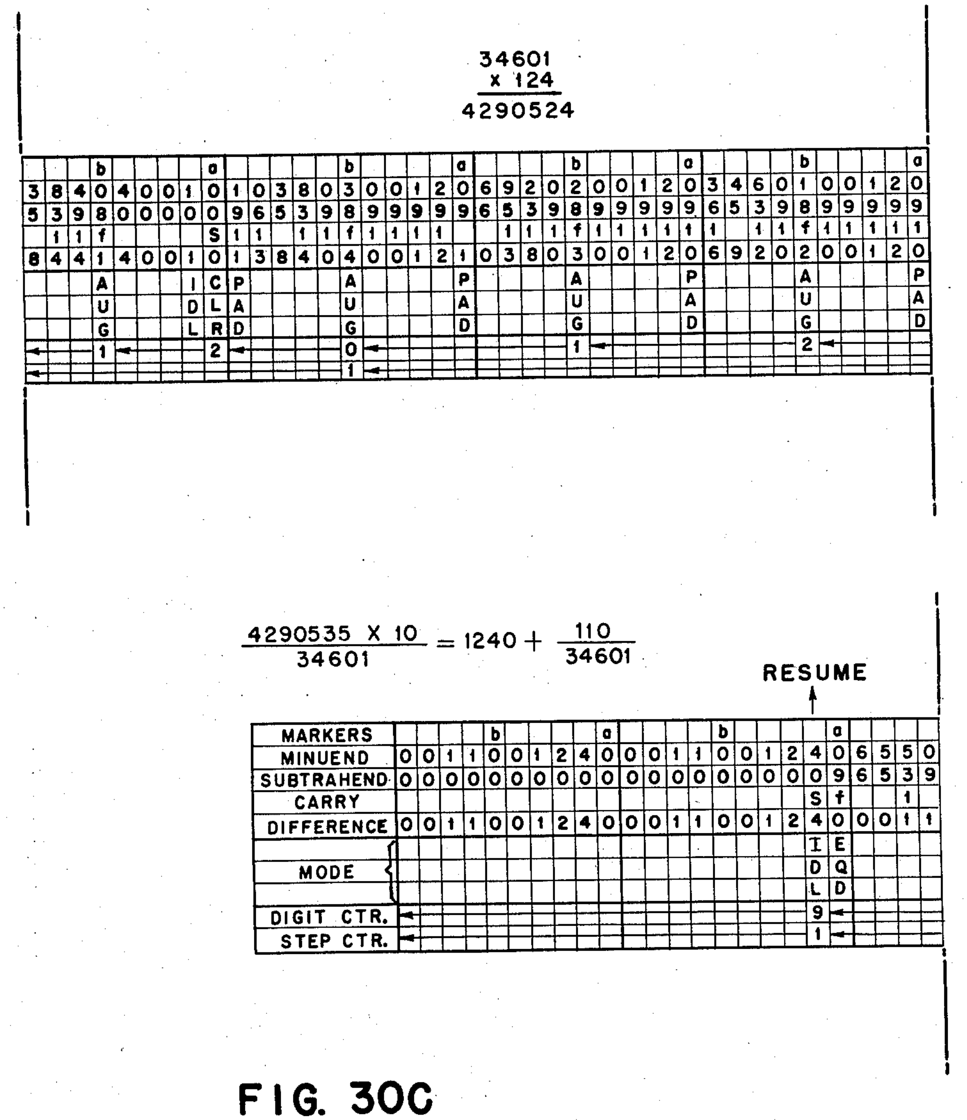
Figure 30D:
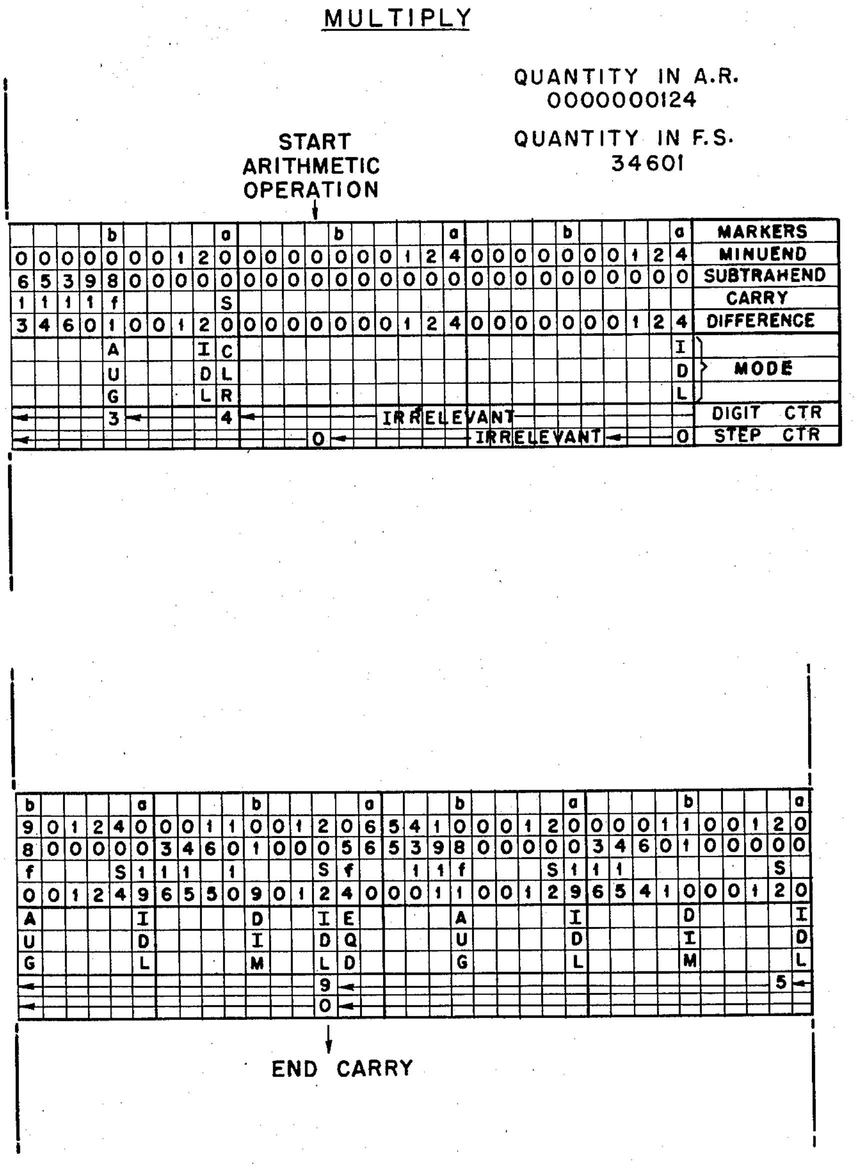
Figure 30E:
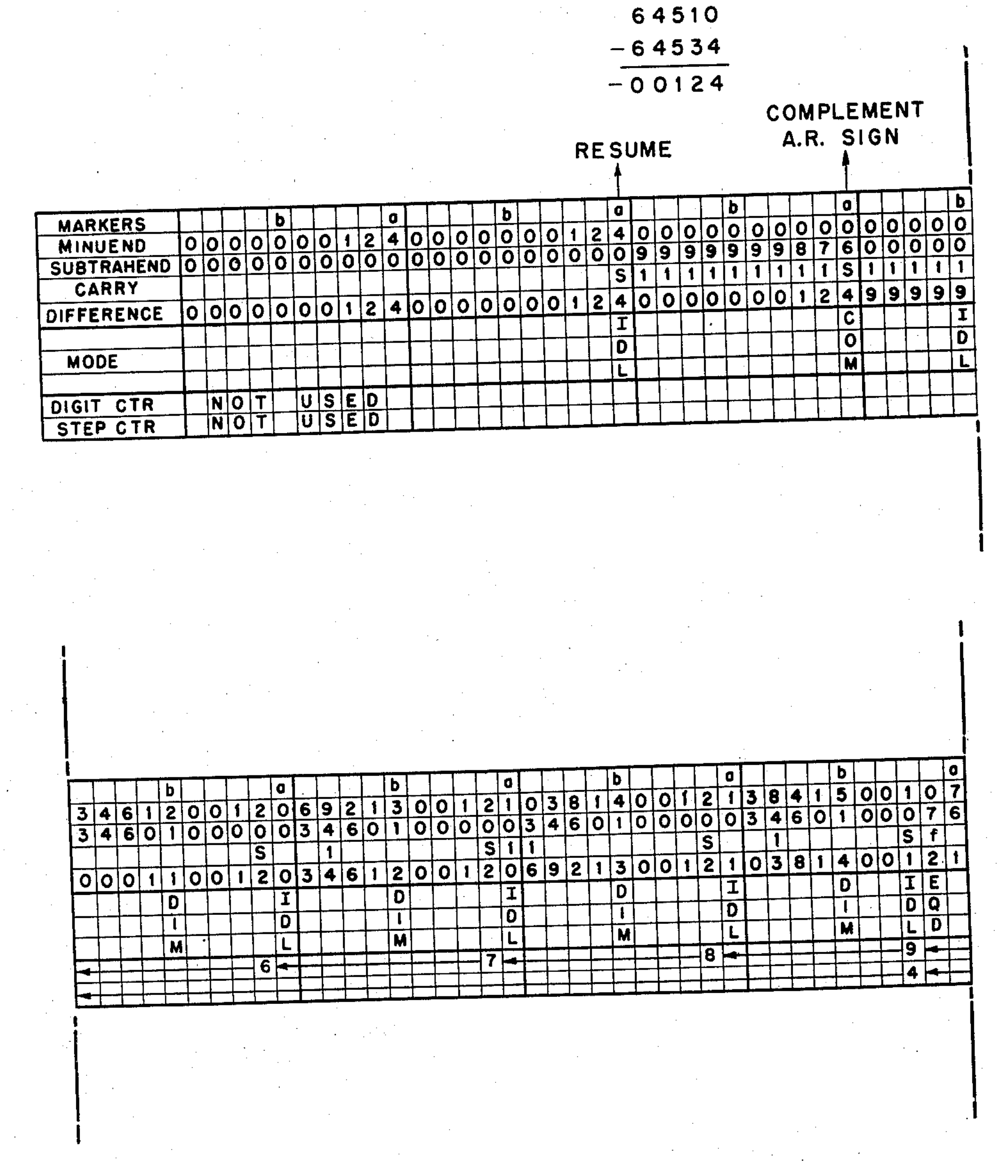
Figure 30F:
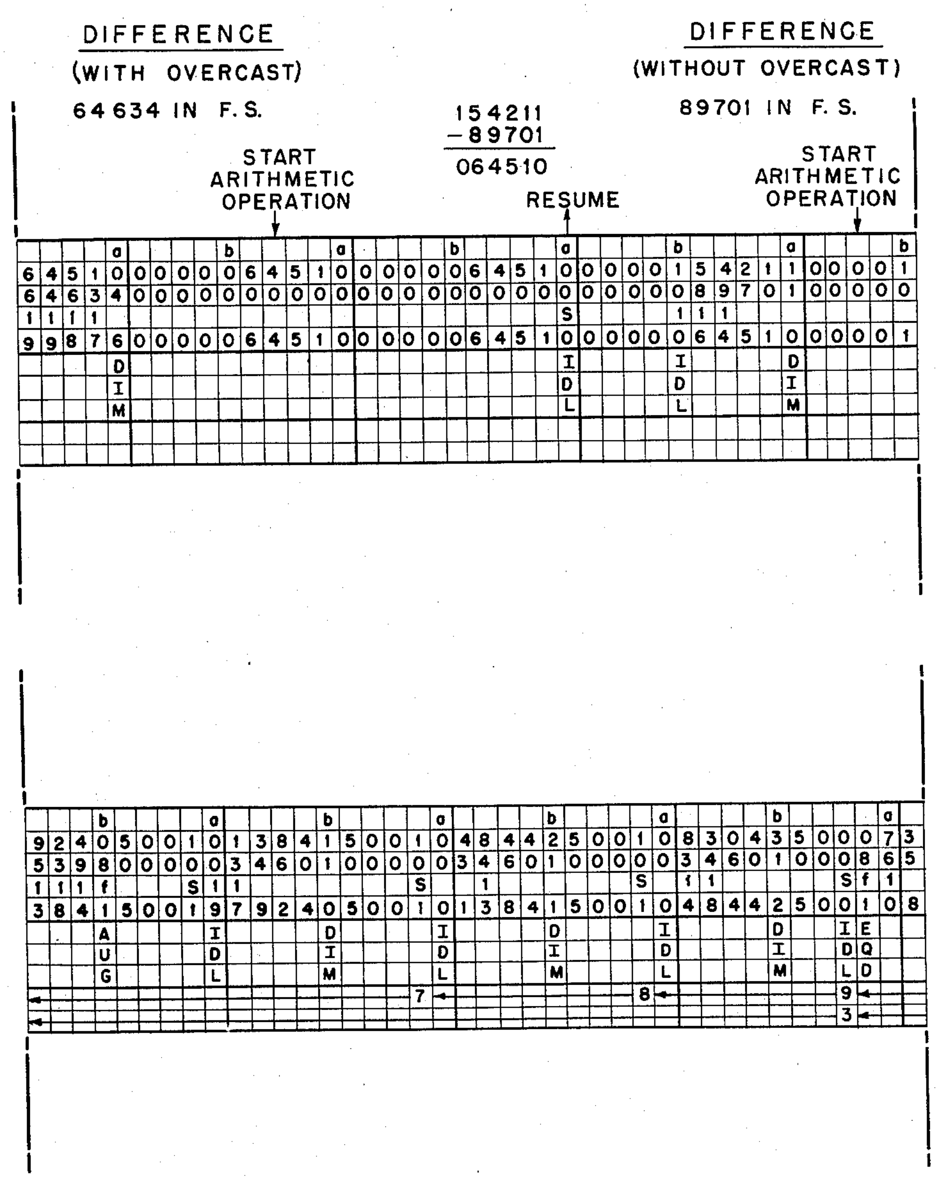
Figure 30G:
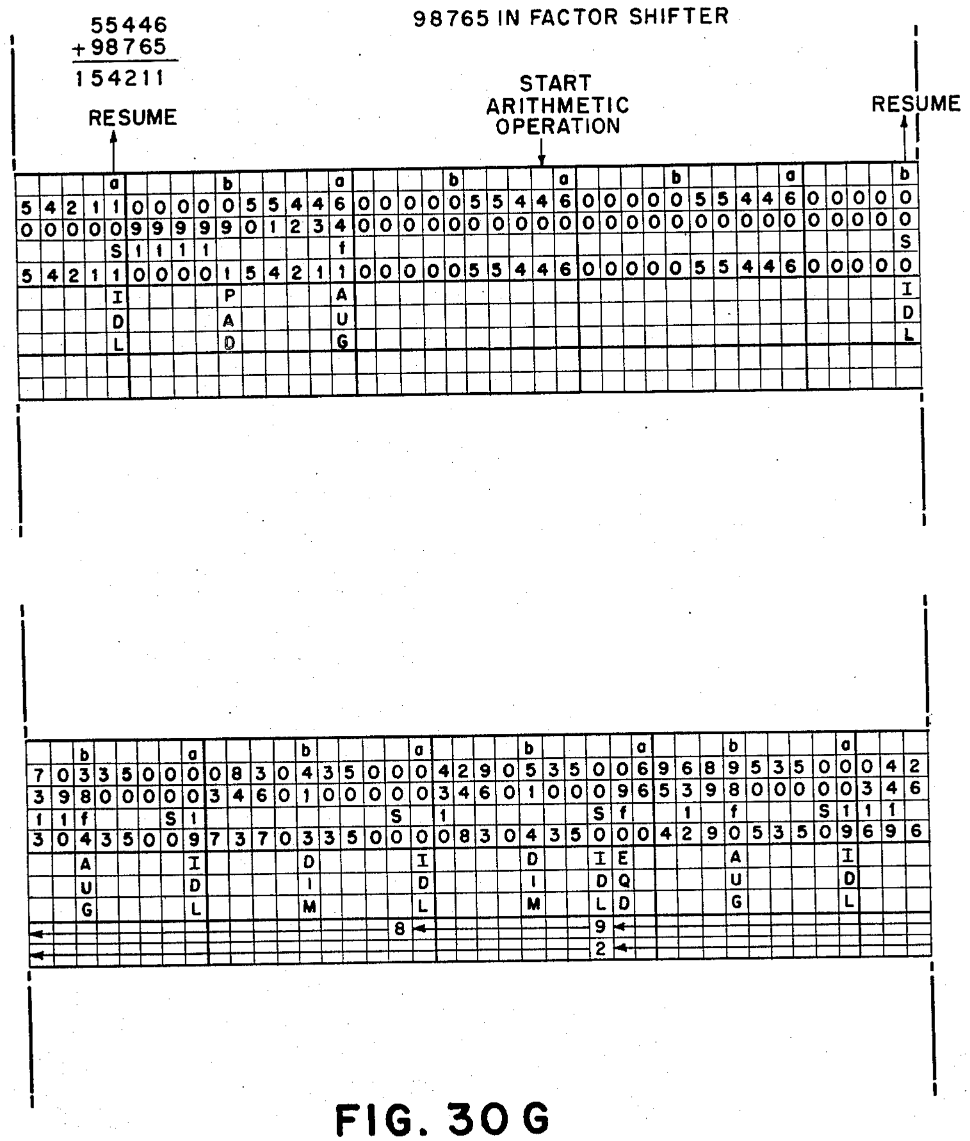
Figure 30H:
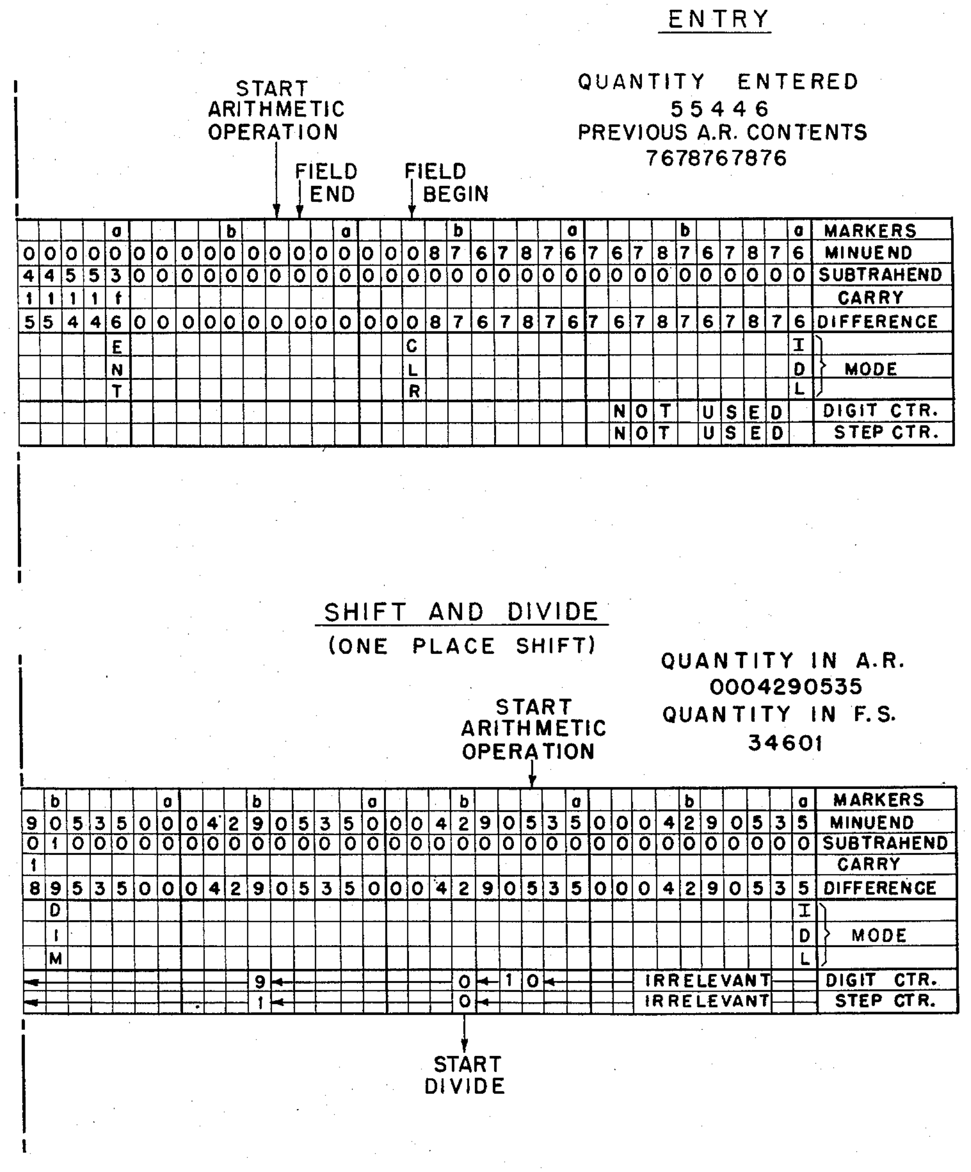

The digits appearing in the Adder occur successively from right to left in the figures, i.e. they start at the right hand side of Figure 30H and proceed to the left through Figures 30G, 30F, 30E, 30D, 30C, 30B and 30A, in turn. This "backward" representation has been adopted since it permits the reading of numbers in the conventional (left-to-right) manner and thus somewhat facilitates identification of the factors, as well as greatly facilitating reading the initial and final contents of the Arithmetic Revolver. The Adder modes are noted at the time they change and continue to the left until a new mode is started. However, where the same mode is initiated again by a new control pulse, this is indicated by a repetition of the abbreviation of the previous Adder mode.

Referring first to the upper half of Figures 30A–30H, and more particularly to the upper half of Figures 30E–30H, there is shown here in succession, starting at the righthand side of Figure 30H, an entry into the Adder, a sum process, a difference process without overcast, and a difference process with overcast. Note that the digit counter and step counter are not utilized during these operations, as indicated in the appropriate rows in Figures 30E–30H.

In the entry process, it has been assumed that the previous contents of the Arithmetic Revolver are 7678767876 and that the quantity being transferred from the Card Assembly Revolver "card image" through the Factor Shifter into the Adder is 55446. It will be noted that the minuend value of the Adder in the first ten positions comprises the above number 7678767876 and, since it is further assumed that no finite subtrahend value is entered during this period, the difference value is the same.

During the second cycle of operation shown, whose beginning is marked by an *a* pulse, it will be noted that a Field Begin pulse occurs at the time of the second Master Pulse after the ensuing *b* marker pulse. It will be recalled that the occurrence of this Field Begin pulse is under the control of the Field Begin circuit shown in Figures 9T, 9V and 9X. The Field Begin pulse initiates the Clear mode of the Adder through the control circuit shown in Figure 9J and, accordingly, zeros now appear as the minuend, subtrahend and difference output of the Adder until the occurrence of the first *a* marker pulse following the start arithmetic operation pulse.

This start arithmetic operation pulse is produced from gate 676 (Fig. 9U) one Master Pulse time after the Field End pulse, which occurs here 5 Master Pulse times after the Field Begin pulse. Upon the occurrence of the first *a* marker pulse after the start arithmetic operation pulse (which, in effect, signifies that the chosen number has been entered into the Factor Shifter and that arithmetic operations can now begin), the Entry mode of the Adder is initiated by the control circuits of Figure 9J, a carry is forced, and the 9's complement (3) of the unit's digit (6) of the quantity stored in the Factor Shifter (55446)

is entered as the subtrahend. The difference value "6" results from this subtraction and a carry occurs, as shown in the next column to the left. The 9's complements of the remaining digits of the quantity stored in the Factor Shifter are then entered in turn starting with the hundred's digit, at successive Master Pulse times as the subtrahend, and the difference values 4, 4, 5, and 5 are produced, in turn, from these subtractions. At the ensuing *b* pulse time, the operation of the Adder is changed to the Idle mode, the carry from the previous subtraction is suppressed, and a "resume" signal is produced, indicating the completion of the entry operation. Note that the desired value, 55446, has now been entered into the Adder and will continue thereafter to circulate in the Adder-Arithmetic Revolver path, as shown in the next cycle, whose beginning is marked by the ensuing *a* marker pulse in Figure 30G. This recirculation will continue until another operation is commanded from Program Control.

Assume next that with this number 55446 circulating in the Adder-Arithmetic Revolver path and the quantity 98765 stored in the Factor Shifter, a sum process is to take place. It is also assumed that after the sum process is commanded from Program Control, a start arithmetic operation pulse is produced from its control station 2428 (Fig. 9C) at the next Master Pulse after the next *a* marker pulse, as shown in Figure 30G.

Upon the occurrence of the next *a* marker pulse thereafter, operation of the Adder in the Augment mode is initiated by the circuits of Figure 9K, a carry is forced, and the 9's complement (4) of the unit's digit (5) of the quantity stored in the Factor Shifter (98765) is entered as the subtrahend value. Note that the unit's digit (6) of the quantity previously circulating in the Adder-Arithmetic Revolver path is marked by this *a* pulse and, accordingly, the sum of the subtrahend value "4" and the forced carry will be subtracted from this minuend value "6.", providing a difference value of "1" and no carry. The 9's complements of the other digits stored in the Factor Shifter are then entered in turn, starting with the hundred's digit, as subtrahend values and produce difference digits 1, 2, 4 and 5, in turn.

At the ensuing *b* marker pulse time, operation of the Adder is switched to the Pad mode by the circuits of Figure 9K, thereby entering the 9's complement of zero, i.e. "9," as the minuend value at the successive 5 Master Pulse times. Note that this produces the correct answer, i.e. the sum of the previous quantity circulating in the Adder-Arithmetic Revolver path (55446) and the quantity stored in the Factor Shifter (98765) is 154221. Upon the occurrence of the next *a* marker pulse, the Idle mode of the Adder is again initiated, the carry resulting from the previous subtraction is suppressed, and a "resume" pulse is produced from the circuits of Figure 9K to indicate that the sum operation is completed.

Assume, next, that with this quantity 154211 circulating in the Adder-Arithmetic Revolver path and the quantity 89701 stored in the Factor Shifter, a difference operation is commanded by Program Control and thereafter initiated by a start arithmetic operation pulse from its control station 2428 (Fig. 9C) at the second Master Pulse time following the *b* marker pulse shown at the extreme right of Figure 30F. Upon the occurrence of the next *a* marker pulse thereafter, which marks the unit's digit (1) of the quantity previously circulating in the Adder-Arithmetic Revolver path (154211), operation of the Adder in the Diminish mode is begun by the control circuits of Figure 9K, and the true value of the unit's digit (1) of the quantity stored in the Factor Shifter (89701) is entered as the subtrahend to produce a difference value of "0." The true values of the other digits of the quantity stored in the Factor Shifter are then entered in turn, starting with the hundred's digit, as the subtrahend and produce difference digits 1, 5, 4 and 6, in turn. At the ensuing *b* marker pulse time, operation of the Adder is again changed to the Idle mode, and the resulting carry from the previous subtraction, when subtracted from the minuend digit 1, produces a difference value of "0." Thus the correct answer, 064510, has again been obtained. Upon the occurrence of the next *a* marker pulse thereafter, the Idle mode is again established by the control circuits of Figure 9K, a "resume" pulse is produced to signify the completion of the difference operation, and the letter "s" in the fourth square from the top in this column indicates that if a carry had been produced from the previous subtraction, it would have been suppressed at this time.

The difference operation just described did not result in an "overcast." To demonstrate the operation of the invention for such a condition, let it be assumed next that with the above value 64510 circulating in the Adder-Arithmetic Revolver path and the value 64634 stored in the Factor Shifter, a difference operation is to take place again. This operation is indicated as being initiated by the start arithmetic operation pulse shown in Figure 30F as occurring at the third Master Pulse time following the next *a* marker pulse. This start arithmetic operation pulse, as before, will be produced from control station 2428 (Fig. 9C). Upon the occurrence of the next *a* marker pulse thereafter, shown at the left of Figure 30F, operation of the Adder in the Diminish mode will again be initiated by the control circuits of Figure 9K. Accordingly, the true value of the unit's digit (4) of the quantity stored in the Factor Shifter (64634) will be entered as the subtrahend and subtracted from the unit's digit (0) of the number previously circulating in the Adder-Arithmetic Revolver path (64510) and comprising the minuend, thereby producing the difference value 6.

The true value of the remaining digits of the value stored in the Factor Shifter are next entered in turn, starting with the hundred's digit, as the subtrahend and produce difference digits 7, 8, 9 and 9, in turn. Note that since the number in the Factor Shifter (which constitutes the subtrahend) is larger than the number previously circulating in the Adder-Arithmetic Revolver path (which constitutes the minuend), a carry results from each subtraction or, in other words, there is an overcast. The carry resulting from the last subtraction referred to is effective at the next *b* marker pulse time, shown at the extreme right of Figure 30E, to produce a difference value of 9, and this will continue for each of the 4 successive Master Pulse times. Note that, as before, at the *b* marker pulse time just referred to, operation of the Adder is changed to the Idle mode. At the ensuing *a* marker pulse time, it will be noted that there is now a carry which is suppressed. This is sensed by the control circuits of Figure 9K and, accordingly, the operation of the Adder is changed to the Complement mode (rather than the Idle mode, as in the last example), and a signal is applied from these control circuits of Figure 9K to the circuits of Figure 9G to complement the Arithmetic Revolver sign, i.e. in this case to make it negative. The unit's digit (6) of the difference value (9999999876) just produced in the previous cycle, starting at Diminish mode time, is now entered as the subtrahend value and subtracted from "0" to produce a difference value 4. The remaining digits of the difference value produced during the previous cycle are then entered in turn, starting with the hundred's digit, as the subtrahend, and each is subtracted from "0" to produce the correct answer for the operation, i.e. 00124. Note that a carry is produced from each subtraction. At the ensuing *a* marker pulse time thereafter, the operation of the Adder is changed to the Idle mode, the carry from the previous subtraction is suppressed, and a "resume" pulse is produced by the control circuits of Figure 9K as before. The Adder will now continue to recirculate the value 00124 in the Adder-Arithmetic Revolver path, as indicated in Figure 30E, until some further operation is commanded by Program Control.

With the above quantity 0000000124 circulating in the Adder-Arithmetic Revolver path, let us assume next that this value is to be multiplied by a value 34601 stored in the Factor Shifter. The resultant operation is shown in the upper half of Figures 30A–30D, starting at the right-hand side of Figure 30D and proceeding to the left thereof across Figures 30C, 30B, and 30A, in turn.

Both the digit counter and the step counter are utilized in a multiplication operation, but it will be noted that the setting of the step counter is indicated in Figure 30D as being irrelevant until the receipt of the start arithmetic operation pulse from control station 2428 (Fig. 9C) of Program Control, at which time the step counter is cleared and set to 0. Similarly, the setting of the digit counter is indicated as being irrelevant until the occurrence of the ensuing *a* marker pulse, at which time the unit's digit (4) of the value previously circulating in the Adder-Arithmetic Revolver path (0000000124) is entered into the digit counter, the Clear mode of the Adder is initiated for one Master Pulse period by the control circuits of Figure 9H, and the carry, if any, from the preceding subtraction is suppressed. Note, however, that in this instance the subtraction occurring at the Master Pulse time immediately preceding this *a* marker pulse did not produce a carry. Note, further, that this one Master Pulse period clearing operation of the Adder at this *a* pulse time causes a "0" to appear as the minuend value and another "0" to appear as the subtrahend value, and that the difference is accordingly also "0." Upon the occurrence of the next Master Pulse period the operation of the Adder is changed to the Idle mode by the control circuits of Figure 9H and, accordingly, the hundred's, thousand's, etc., digits of the value previously circulating in the Adder-Arithmetic Revolver path are entered, in turn, as the minuend.

At the *b* marker pulse time thereafter, the operation of the Adder is changed to the Augment mode by the control circuits of Figure 9H, the digit counter is stepped down by one, i.e. to a setting of 3, a carry is forced in the Adder, and the 9's complement (8) of the unit's digit (1) of the quantity stored in the Factor Shifter (34601) is entered as the subtrahend to produce a difference value of 1. The 9's complements of the other digits of the value stored in the Factor Shifter are then entered in turn, starting with the hundred's digit, as the subtrahend, thereby producing the difference digits 0, 6, 4, and 3, in turn. At the ensuing *a* pulse time, the operation of the Adder is changed to the Pad mode by the control circuits of Figure 9H, and the 9's complement of 0, i.e. 9, is then entered as the subtrahend at this and the ensuing 4 Master Pulse times to produce the difference digits 0, 2, 1, 0, and 0, in turn. Upon the occurrence of the next *b* marker pulse, the digit counter is again stepped down by one, i.e. to a setting of 2, operation of the Adder is again changed to the Augment mode, a carry is forced, the 9's complement (8) of the unit's digit (1) of the value stored in the Factor Shifter (34601) is again entered as the subtrahend, and the unit's digit (1) of the difference value produced during the last cycle of operation (0012034601) is entered as the minuend to produce a difference value 2. The operation of the Adder during the ensuing Augment and Pad modes is similar to that just described, and hence will not be repeated.

It should be noted, however, that upon the inception of the next Augment mode thereafter, the digit counter (which was at a setting of 1) is stepped down to 0, and that the step counter is advanced by one. The Arithmetic Revolver output is accordingly, retarded one place by the occurrence of the ensuing *a* marker pulse 6 Master Pulses after the *b* marker pulse which marks the beginning of this Augment mode, rather than the usual 5. The Pad mode is, as before, started 5 Master Pulses after the Augment mode, but it is followed immediately by operation of the Adder in the Clear mode at this ensuing *a* marker pulse time, and then by operation in the Idle mode for the ensuing 4 Master Pulse times. Note again that operation of the Adder in the Clear mode transferred the ten's digit (2) of the quantity originally circulating in the Adder-Arithmetic Revolver path (0000000124) into the digit counter.

It is not believed necessary to detail the remainder of the multiplication operation since it is similar to that previously described and, it is believed, will be apparent to one skilled in the art from an inspection of Figures 30A, 30B, and 30C. Note, however, that each time the digit counter is stepped down to a setting of 1, the next *b* marker pulse thereafter retards the output of the Arithmetic Revolver one place, so that the ensuing *a* marker pulse occurs 6 Master Pulse times thereafter instead of 5, and that the step counter is advanced one step each time that the digit counter reaches "0," or at the next *b* marker pulse thereafter in the event that the multiplier digit entered in the digit counter is "0."

Note, also, that when the step counter reaches its maximum (in this case, 5), an end carry is produced, as shown in Figure 30B, and the step counter then returns to 0. Note, further, that when the digit counter is stepped down to 0 and the next multiplier value is 0, as shown in the central portion of the upper half of Figure 30B, while the output of the Arithmetic Revolver is still advanced one place and the step counter is advanced by one at the ensuing *b* marker pulse time, the Idle mode is not changed to the Augment mode at this time nor to the Pad mode 5 Master Pulse times thereafter, and that there is, therefore, no carry to be suppressed at the ensuing *a* pulse time when the Clear mode of the Adder is begun.

Note, finally, that the Idle mode of the Adder which is started at the next Master Pulse time is thereafter reestablished upon the occurrence of the ensuing *a* marker pulse simultaneously with the production of a "resume" signal from the control circuits of Figure 9H because of the intervening end carry signal at *b* marker pulse time. The product of the multiplication, i.e. 4290524, now continually appears as both the minuend input and the difference output of the Adder, and the value 0004290524 will circulate in the Adder-Arithmetic Revolver path, as shown in Figure 30A, until a further operation is commanded from Program Control.

Referring now to the lower half of Figures 30C–30H, there is here shown a sample Shift and Divide example involving a one place shift (as ordered by setting the Shift Count Register 2424'' in Figure 9C to a count of 1) with the quantity 0004290535 in the Arithmetic Revolver and the quantity 34601 in the Factor Shifter, all as indicated on Figure 30H. Starting at the right-hand side of Figure 30H and proceeding to the left thereof, it will be noted that the reading of the digit counter is indicated as being irrelevant prior to the receipt of the simulated start arithmetic operation pulse from control station 2428 (Fig. 9C) of Program Control (which pulse occurs at the next Master Pulse time after the switch of this control station is closed), and similarly the reading of the step counter is indicated as being irrelevant until the occurrence of the next *b* marker pulse thereafter. Reference may be made to Figure 9I for the major control circuits used in connection with the Shift and Divide problem, remembering, however, the necessary modifications because of the reduction of the Factor Shifter capacity to 5 digits and the reduction of the Arithmetic Revolver capacity to 10 digits, instead of 10 and 20, respectively, as shown in the circuits of Figures 9A–9Z.

Upon the occurrence of the start arithmetic operation pulse starting this Shift and Divide operation, the digit counter is cleared and the value set in the shift counter register entered therein, i.e. the digit 1 in this particular example. Thereafter, at the next *b* marker pulse time, the digit counter is stepped down one step, i.e. to 0, the step counter is cleared to a setting of 0, a Start Divide pulse is provided to the control circuits of Figure 9I, and the Arithmetic Revolver output is advanced one place by the ensuing *a* marker pulse which occurs 4 Master Pulses after this *b* pulse, as shown, instead of 5. Note that this *a* pulse thus marks the next lower or tenth's place of the minuend value, i.e. the digit 0, rather than the unit's digit (5) as marked by the two previous *a* marker pulses shown in Figure 30H, starting at the right thereof. The dividend has thus effectively been shifted one place to the left.

Upon the occurrence of the next *b* marker pulse, the digit counter is set to 9, the step counter is advanced one step to a setting of 1, and the Arithmetic Revolver output is again advanced one place by the ensuing *a* pulse which again occurs 4 Master Pulses after the preceding *b* pulse. The dividend has now been effectively shifted two places to the left and the *a* pulse now marks the hundredth's place thereof.

Upon the occurrence of the next *b* pulse, the Diminish mode of the Adder is started and the true value of the unit's digit, i.e. "1," of the value stored in the Factor Shifter entered as the subtrahend. The difference "9" appears at the output of the Adder, and a carry signal is provided for appearance at the next Master Pulse time in view of the fact that the subtrahend value was larger than the minuend value. At this next Master Pulse time, the true value of the hundred's digit, i.e. "0," of the quantity in the Factor Shifter is entered into the Adder as the subtrahend, and the sum of the subtrahend and the carry is subtracted in the Adder from the minuend digit 9, the difference "8" being provided at the output of the Adder.

The true values of the remaining digits of the quantity stored in the Factor Shifter are then entered, in turn, at successive Master Pulse times as the subtrahend value as shown. At the next *a* pulse time, operation of the Adder is changed to the Idle mode, and the carry resulting from the subtraction at the previous Master Pulse time is subtracted to provide a difference value of 9. The resulting carry signal is, however, suppressed at the next Master Pulse time as indicated, and the difference output of the Adder during this and the succeeding three Master Pulse periods is, therefore, the same as the minuend value. Note that the Arithmetic Revolver was not advanced at the previous *b* pulse time and, therefore, the *a* marker pulse which started the Idle mode of the Adder, as just described, occurred the normal 5 Master Pulse times after the preceding *b* pulse. Since a carry occurred at this *a* pulse time (although its effect at the next Master Pulse was suppressed, as described above), operation of the Adder is changed to the Augment mode at the next *b* pulse time, and since no end carry signal has been received (which would indicate the completion of the problem), the Arithmetic Revolver output is again advanced one step by the ensuing *a* marker pulse, which once again occurs 4 Master Pulse times after this *b* marker pulse. A carry is forced simultaneously with the start of the Augment mode of the Adder, and the 9's complement of the unit's digit, i.e. "8," is entered as the subtrahend, resulting in a difference value "0." During the ensuing 4 Master Pulse periods, the 9's complement of the other digits of the quantity stored in the Factor Shifter are entered in turn, starting with the hundred's digit, as the subtrahend. The difference between these values and the respective digits of the minuend, which it will be noted now comprises the difference value derived from the previous operation of the Adder, provide the new difference digits shown.

At the next Master Pulse time following the occurrence of the next *a* pulse, the operation of the Adder is changed to the EQD mode, thereby forcing a carry in the Adder at this time and entering the value of the quotient digit stored in the digit counter, i.e. "9" in this instance, as the subtrahend. The resulting difference value (0) comprises the first quotient digit and will thereafter circulate in the Arithmetic Revolver-Adder path, appearing in the next cycle at the Master Pulse time after the *a* marker pulse. The carry resulting from the resulting subtraction in the EQD mode is suppressed at the next Master Pulse time following the entry of the quotient digit, the operation is changed to the Idle mode, the step counter is advanced by one step to a setting of 2, and the "set to 9" input of the digit counter 1802 (Fig. 9H) is again pulsed to reset it to 9 (although in this instance it was not necessary, being already at 9).

Upon the occurrence of the next *b* pulse, the operation of the Adder is again changed to the Diminish mode, and the true value of the number stored in the Factor Shifter again entered digit by digit, starting with the unit's digit as before. It is not believed necessary to detail the further operation which is shown continuing to the left in Figures 30G, 30F, 30E, 30D, and 30C in turn, since it is believed that this is apparent to one skilled in the art from these figures in view of the preceding description. Note, however, that the digit counter is stepped down by a count of one at the Master Pulse time following each initiation of the idle mode of the Adder, when this is preceded by operation in the Diminish mode, if no carry from the preceding *a* pulse time operation is suppressed by the suppress pulse occurring at the following Master Pulse time. Also, note that the reading in the digit counter at each EQD mode time is then transferred to the Factor Shifter as the subtrahend, concurrent with a force carry. The resultant difference is the true value of the quotient digit and thereafter circulates in the Adder-Arithmetic Revolver path, appearing each time in the next cycle at the Master Pulse time after the *a* marker pulse. Thus the quotient digits 0, 1, 2, 4, and 0 appear in turn in successive positions in the Adder-Arithmetic Revolver path as the operation progresses.

Note, further, that the digit counter is reset to 9 concurrently with the initiation of each Idle mode following an EQD mode, and that the step counter is simultaneously advanced one step until the counter reaches its maximum (in this case, 5) and an end carry is produced, as shown in Figure 30D. The step counter now returns to 0, and the end carry signal signifies that the Shift and Divide operation will be completed when the next following quotient digit is entered, as shown at the extreme left of Fig. 30*d*.

Accordingly, at the next Master Pulse time following this final operation of the Adder in the EQD mode during this particular Shift and Divide operation, a "resume" pulse is provided to Program Control, as shown at the extreme right of Figure 30C, the carry from the previous step is suppressed, the digit counter is set to 9, the step counter is advanced by one, and the machine thereafter continues in the Idle mode until a new operation is commanded from Program Control. Note that the desired answer 01240 has been obtained and now circulates in the Adder-Arithmetric Revolver path, the unit's digit being marked by the *a* marker pulse, and that the remainder 110 also circulates in the same path, the unit's digit being marked by the *b* marker pulse.

While there have been shown, described and pointed out the fundamental novel features of this invention as applied to a preferred embodiment, it will be understood that various omissions, substitutions and changes in the form and details of the devices illustrated and in their operation may be made by those skilled in the art without departing from the spirit of the invention. For example, instead of the Field Begin and Field End selection circuits shown, plugboard wiring may alternatively be utilized by providing a plugboard wherein the $C_1$ to $C_{80}$ pulses are available at convenient terminals, a selected one of these terminals then being connected by a patch cord to the input of single pulse circuit 436 (Fig. 9T) to serve as a Field Begin pulse and, similarly, another one of these terminals of the plugboard being connected to the input of single pulse circuit 440 (Fig. 9T) to produce a Field End pulse. It is the intention therefore to be limited only as indicated by the scope of the following claims.

What is claimed is:

1. In a digital data circuit, means comprising an adder section having an input and an output, means including a drum comprising an arithmetic revolver section having an input and output, said arithmetic revolver section providing time delay storage for a predetermined number of digits, means connecting the output of said arithmetic revolver section to the adder section input and the adder section output to the arithmetic revolver section input, means comprising pulse generation and control means cooperating with said adder section and said arithmetic revolver section for producing serial circulation of data in the continuous recirculation path formed by the adder section and arithmetic revolver section, means comprising a factor shifter section with a predetermined number of stages for retaining a corresponding number of digits, each in its own individual stage, means including factor shifter control means to directly shift the respective contents of each of the stages of said factor shifter section from stage to stage thereof, and means connected with said pulse generation and control means for transferring digits from the output of said factor shifter section to said adder section input in predetermined synchronism with digits circulating through said adder section and arithmetic revolver section.

2. A digital circuit as in claim 1 and further including means comprising an addition control section, the latter section including means for transferring the true value of the digits in the factor shifter to said adder section input, whereby the digits circulating through the arithmetic revolver section are added to digits transferred from the factor shifter.

3. A digital circuit as in claim 1 and further including means comprising a subtraction control section, the latter section including means for causing the transfer of the complement of the digits in the factor shifter to said adder section input, whereby digits transferred from the factor shifter are subtracted from digits circulating through the arithmetic revolver section.

4. A digital circuit as in claim 1 and further including means comprising a multiplication control section, the latter section having digital counter and step counter means for causing successive additions of digits in the adder section for multiplying a digital number transferred from the factor shifter to the adder by a digital number circulating through the arithmetic revolver section.

5. A digital circuit in claim 1 and further including a division control section, the latter section including means comprising digit counter and step counter means for causing successive subtractions between digits circulating in the arithmetic revolver section and digits transferred from the factor shifter section to provide the division of a digital number circulating through the arithmetic revolver section by a digital number transferred from the factor shifter section to the adder section.

6. A digital circuit as in claim 1 and further including means comprising an addition control section, means comprising a subtraction control section, means comprising a multiplication control section, means comprising a division control section, and means comprising a program control section, the latter section being arranged to permit selective addition, subtraction, multiplication and division operations between digits of digital numbers serially circulating through said arithmetc revolver section and serially transferred from the factor shifter section to the input of said adder section.

7. A digital data circuit as in claim 1 wherein the adder section comprises a subtractive matrix, wherein the input to the adder section from the arithmetic revolver section constitutes the minuend input to the adder section, and wherein the input to the adder section from the factor shifter section constitutes the subtrahend input to the adder section, the output of the adder section being arranged to carry the difference between the minuend and subtrahend inputs.

8. A digital circuit as in claim 7 and further including means comprising an addition control section, the latter section including means for causing the transfer of the complement of the digits in the factor shifter to said subtrahend input of the adder section, whereby the digits circulating through the arithmetic revolver section are added to digits transferred from the factor shifter.

9. A digital circuit as in claim 7 and further including means comprising a subtraction control section, the latter section including means for transferring digits from the factor shifter directly to the subtrahend input of the adder section, whereby digits being entered in the adder through said subtrahend input are subtracted from digits circulating through the arithmetic revolver section.

10. A digital circuit as in claim 7 and further including means comprising a multiplication control section, the latter section including digit counter and step counter means for causing successive additions of digits in the adder section for multiplying a digital number transferred from the factor shifter to the adder through said subtrahend input to the adder by a digital number circulating through the arithmetic revolver section.

11. A digital circuit as in claim 7 and further including a division control section, the latter section including means comprising digit counter and step counter means for causing successive subtractions between digits circulating in the arithmetic revolver section and digits transferred from the factor shifter section to produce division of a digital number circulating through the arithmetic revolver section by a digital number transferred from the factor shifter section to said subtrahend input of the adder section.

12. A digital circuit as in claim 7 and further including means comprising an addition control section, means comprising a subtraction control section, means comprising a multiplication control section, means comprising a division control section, and means comprising a program control section, the latter section being arranged to permit selective addition, subtraction, multiplication and division operations between digits of digital numbers serially circulating through said arithmetic revolver section and serially transferred from the factor shifter section to the input of said adder section.

13. A digital circuit as in claim 12 and further including a card assembly revolver section comprising a drum for storing digits in a recirculation path, first means connected with said path for providing an output from the card assembly revolver section, and second means connected with said path for providing an input to said card assembly revolver section, the factor shifter section having an input, the output of the card assembly revolver section being connected to the input of said factor shifter section and the input to said card assembly revolver section being connected to the output of said factor shifter.

14. A digital circuit as in claim 7 and further including a card assembly revolver section comprising a drum for storing digits in a recirculation path, first means connected with said path for providing an output from the card assembly revolver section, second means connected with said path for providing an input to said card assembly revolver section, and means connecting the output of the card assembly revolver section to the input of said factor shifter section and the input of said card assembly revolver section to the output of said factor shifter.

15. A digital circuit as in claim 14 and further including means comprising record card reading equipment and punching equipment, the reading equipment having an output connected with the input of the card assembly revolver and the punching equipment having an input connected with the output of said card assembly revolver.

16. A digital circuit as in claim 14 and further including a first code translator connected between the card assembly revolver output and the factor shifter input and a second code translator connected between the factor shifter output and the card assembly revolver input.

17. A digital circuit as in claim 16 and further including means comprising record card reading equipment and punching equipment, the reading equipment having an output connected with the input of the card assembly revolver and the punching equipment having an input connected with the output of said card assembly revolver.

18. A digital circuit as in claim 1 and further including a card assembly revolver section comprising a drum for storing digits in a recirculation path, first means connected with said path for providing an output from the card assembly revolver section, second means connected with said path for providing an input to said card assembly revolver section, and means connecting the output of the card assembly revolver section to the input of said factor shifter section and the input of said card assembly revolver section to the output of said factor shifter.

19. A digital circuit as in claim 18 and further including a first code translator connected between the card assembly revolver output and the factor shifter input and a second code translator connected between the factor shifter output and the card assembly revolver input.

20. A digital circuit as in claim 18 and further including means comprising record card reading equipment and punching equipment, the reading equipment having an output connected with the input of the card assembly revolver and the punching equipment having an input connected with the output of said card assembly revolver.

21. A digital circuit as in claim 19 and further including means comprising record card reading equipment and punching equipment, the reading equipment having an output connected with the input of the card assembly revolver and the punching equipment having an input connected with the output of said card assembly revolver.

22. In a digital data circuit, means comprising an adder section having an input and output, means comprising an arithmetic revolver section having an input and output, said arithmetic revolver section including a magnetizable member movable in successive cycles of travel, transducing means for recording digital data on the movable member at one point in the path of travel thereof, further transducing means for reading the thus recorded digital data at a second point in the path of travel thereof, the arrangement being such that the arithmetic revolver section provides a time delay storage for a predetermined number of digits between the recording and reading transducers, means connecting the arithmetic revolver section output to the adder section input and the adder section output to the arithmetic revolver section input, means comprising pulse generation and control means for generating pulses under control of said movable member, said pulse generation and control means controlling said adder section and arithmetic revolver section for serially circulating digits in the continuous recirculation path formed by the adder section and the arithmetic revolver section, means comprising a factor shifter section for retaining a predetermined number of digits in a predetermined number of stages, each stage of the factor shifter section comprising a vacuum tube digit storage register, means including factor shifter control means to successively shift the contents of the factor shifter section from stage to stage thereof, the factor shifter being provided with an output connected only to the unit's stage thereof, said factor shifter output being further connected to the input of said adder section, and means connected with said pulse generation and control means for controlling the transfer of digits from the unit's stage of the factor shifter section to the adder section input in predetermined synchronism with digits circulating through said adder section and the arithmetic revolver section.

23. A digital data circuit as in claim 22 wherein the adder section comprises a subtractive matrix and wherein the input to the adder section from the arithmetic revolver section constitutes the minuend input to the adder section and wherein the input to the adder section from the factor shifter section constitutes the subtrahend input to the adder section, the output of the adder section being arranged to carry the difference between the minuend and subtrahend inputs.

24. A digital circuit as in claim 23 and further including means comprising an addition control section, the latter section including means for complementing the digits in the factor shifter as they are transmitted to the adder subtrahend input, whereby digital numbers circulating through the arithmetic section are added to digital numbers transferred from the factor shifter.

25. A digital circuit as in claim 23 and further including means comprising a subtraction control section, the latter section including means for transferring digits from the factor shifter directly to the subtrahend input of the adder section, whereby digits being entered in the adder through said subtrahend input are subtracted from digits circulating through the arithmetic revolver section.

26. A digital circuit as in claim 23 and further including means comprising a multiplication control section, the latter section including digit counter and step counter means for causing successive additions of digits in the adder section for multiplying a digital number transferred from the factor shifter to the adder through said subtrahend input to the adder by a digital number circulating through the arithmetic revolver section.

27. A digital circuit as in claim 23 and further including a division control section, the latter section including means comprising digit counter and step counter means for causing successive subtractions between digits circulating in the arithmetic revolver section and digits transferred from the factor shifter section to provide the division of a digital number circulating through the arithmetic revolver section by a digital number transferred from the factor shifter section to said subtrahend input of the adder section.

28. A digital circuit as in claim 23 and further including means comprising an addition control section, means comprising a subtraction control section, means comprising a multiplication control section, means comprising a division control section, and means comprising a program control section, the latter section being arranged to permit selective addition, subtraction, multiplication and division operations between digits of digital numbers serially circulating through said arithmetic revolver section and serially transferred from the factor shifter section to the input of said adder section.

29. A digital circuit as in claim 28 and further including a card assembly revolver section comprising a drum for storing digits in a recirculation path, first means connected with said path for providing an output from the card assembly revolver section, second means connected with said path for providing an input to said card assembly revolver section, and means connecting the output of the card assembly revolver section to the input of said factor shifter section and the input of said card assembly revolver section to the output of said factor shifter.

30. A digital circuit as in claim 29 and further including means comprising record card reading equipment and punching equipment, the reading equipment having an output connected with the input of the card assembly revolver and the punching equipment having an input connected with the output of said card assembly revolver.

31. A digital circuit as in claim 23 and further including a card assembly revolver section comprising a drum for storing digits in a recirculation path, first means connected with said path for providing an output from the card assembly revolver section, second means connected with said path for providing an input to said card assembly revolver section, and means connecting the output of the card assembly revolver section to the input of said factor shifter section and the input of said card assembly revolver section to the output of said factor shifter.

32. A digital circuit as in claim 31 and further including means comprising record card reading equipment and punching equipment, the reading equipment having an output connected with the input of the card assembly revolver and the punching equipment having an input connected with the output of said card assembly revolver.

33. A digital circuit as in claim 22 and further including a card assembly revolver section comprising a drum for storing digits in a recirculation path, first means connected with said path for providing an output from the card assembly revolver section, second means connected with said path for providing an input to said card assembly revolver section, and means connecting the output of the card assembly revolver section to the input of said factor shifter section and the input of said card assembly revolver section to the output of said factor shifter.

34. A digital circuit as in claim 33 and further including means comprising record card reading equipment and punching equipment, the reading equipment having an output connected with the input of the card assembly revolver and the punching equipment having an input connected with the output of said card assembly revolver.

35. A digital circuit as in claim 22 and further including means comprising an addition control section, the latter section including means for transferring the true value of the digits in the factor shifter to said adder section input, whereby digital numbers circulating through the arithmetic section are added to digital numbers transferred from the factor shifter.

36. A digital circuit as in claim 22 and further including means comprising a subtraction control section, the latter section including means for causing the transfer of the complement of the digits in the factor shifter to said input of the adder section, whereby digits transferred from the factor shifter are subtracted from digits circulating through the arithmetic revolver section.

37. A digital circuit as in claim 22 and further including means comprising a multiplication control section, the latter section including digit counter and step counter means for causing successive additions of digits in the adder section for multiplying a digital number transferred from the factor shifter to the adder by a digital number circulating through the arithmetic revolver section.

38. A digital circuit as in claim 22 and further including a division control section, the latter section including means comprising digit counter and step counter means for causing successive subtractions between digits circulating in the arithmetic revolver section and digits transferred from the factor shifter section to provide the division of a digital number circulating through the arithmetic revolver section by a digital number transferred from the factor shifter section to the adder section.

39. A digital circuit as in claim 22 and further including means comprising an addition control section, means comprising a subtraction control section, means comprising a multiplication control section, means comprising a division control section, and means comprising a program control section, the latter section being arranged to permit selective addition, subtraction, multiplication and division operations between digits of digital numbers serially circulating through said arithmetic revolver section and serially transferred from the factor shifter section to the input of said adder section.

40. In a digital data circuit, means comprising an adder section having an input and output, means comprising an arithmetic revolver section having an input and output, the arithmetic revolver section including a magnetizable member movable in successive cycles of travel, transducing means for recording digital data on the movable member at one point in the path of travel thereof, further transducing means for reading the thus recorded digital data at a second point in the path of travel thereof, the arrangement being such that the arithmetic revolver section provides a time delay storage for a predetermined number of digits between the recording and reading transducers, the arithmetic revolver section output being connected to the adder section input and the adder section output being connected to the arithmetic revolver section input, means comprising pulse generation and control means for generating pulses under control of the movable member, said pulse generation and control means controlling said adder section and arithmetic revolver section for serially circulating digits in the continuous recirculation path formed by the adder section and arithmetic revolver section, means comprising a factor shifter section for retaining a predetermined number of digits in a predetermined number of stages, each stage of the factor shifter section comprising a vacuum tube digit storage register, means including factor shifter control means to successively shift the contents of the factor shifter section from stage to stage thereof, the factor shifter being provided with an output connected only to the unit's stage thereof, said factor shifter output being further connected to the input of said adder section, means controlled by said pulse generation and control means for transferring digits from the unit's stage of the factor shifter section to the adder section input in predetermined synchronism with digits circulating through said adder section and arithmetic revolver section, a card assembly revolver section for storing digits in a recirculation path, said card assembly revolver comprising a member movable in repeated cycles of travel, recording transducers for recording digital data at one point in a path of said last-mentioned member and reading transducers for reading digital data at a second point in said path of said last-mentioned member, means connected with said reading transducers for providing an output from the card assembly revolver section, means connected with said recording transducers for providing an input to said card assembly revolver section, and means connecting the output of said card assembly revolver section to the input of said factor shifter section and the input of said card assembly revolver section to the output of said factor shifter section.

41. A digital adder circuit comprising a primary input and a subtraction matrix, said matrix having a minuend input and a subtrahend input, the primary input including an input translator for receiving groups of digits in series, a minuend register, means for routing a minuend digit to said minuend register for storage therein and application to the minuend input of said subtraction matrix, and means connecting the input translator directly to the subtrahend input of said subtraction matrix for subsequently applying a subtrahend digit to said matrix to effect subtraction thereof from the digit maintained in said minuend register, the arrangement being such that the input translator is utilized on a time sharing basis.

42. A digital adder circuit comprising an input translator for receiving digits in a five element binary code and translating the input to appear as an even whole number on one of five output lines, the input translator further including means for indicating the odd or even character of a digit in said five element code, a subtraction matrix having a minuend input and a subtrahend input, the subtrahend input of the subtraction matrix being connected directly to said output lines, a minuend register, the input of the minuend register being connected to said output lines and the output of the minuend register being connected to the minuend input of the subtraction matrix, and means including pulse generation and control means for routing a minuend digit to said minuend register for storage therein and application to the minuend input of said subtraction matrix, the arrangement being such that the input translator is utilized on a time sharing basis.

43. A digital adder circuit as in claim 42 and further comprising a 2-step adjustment circuit having an input and output, the input of the 2-step adjustment circuit being connected to the output of the subtraction matrix, a 1-step adjustment circuit having an input and output, the input of the 1-step adjustment circuit being connected to the output of the 2-step adjustment circuit, and means including a two stage binary counter connected with said pulse generation and control means and further connected with said odd or even indicating means for controlling the operation of the 2-step and 1-step adjustment circuits.

References Cited in the file of this patent

UNITED STATES PATENTS

| | | |
|---|---|---|
| 2,609,143 | Stibitz | Sept. 2, 1952 |
| 2,701,095 | Stibitz | Feb. 1, 1955 |
| 2,749,037 | Stibitz | June 5, 1956 |
| 2,770,797 | Hamilton et al. | Nov. 13, 1956 |
| 2,792,987 | Stibitz | May 21, 1957 |

FOREIGN PATENTS

| | | |
|---|---|---|
| 692,912 | Great Britain | June 17, 1953 |